United States Patent [19]

Stanley et al.

[11] Patent Number: 4,524,416
[45] Date of Patent: Jun. 18, 1985

[54] STACK MECHANISM WITH THE ABILITY TO DYNAMICALLY ALTER THE SIZE OF A STACK IN A DATA PROCESSING SYSTEM

[75] Inventors: Philip E. Stanley, Westboro; Piotr Szorc, Carlisle, both of Mass.

[73] Assignee: Honeywell Information Systems Inc., Waltham, Mass.

[21] Appl. No.: 430,488

[22] Filed: Sep. 30, 1982

Related U.S. Application Data

[63] Continuation of Ser. No. 140,624, Apr. 15, 1980.

[51] Int. Cl.³ .............................................. G06F 15/16
[52] U.S. Cl. ................................................. 364/200
[58] Field of Search ......................... 364/200, 910, 900

[56] References Cited
U.S. PATENT DOCUMENTS 3,686,641  8/1972  Logan et al. ...................... 364/200
4,130,867  12/1978  Bachman et al. .................. 364/200
4,325,120  4/1982  Colley et al. ..................... 364/200

Primary Examiner—Gareth D. Shaw
Assistant Examiner—Tim A. Wiens
Attorney, Agent, or Firm—John S. Solakian; Nicholas Prasinos

[57] ABSTRACT

In a data processing system, a stack mechanism creates a stack of operands in a series of memory locations. The memory locations are grouped into stack frames corresponding to the operands included within individual procedures executed by a processing unit of the data processing system. The stack has a maximum number of allocatable storage locations with the actual physical size of the stack being equal to the total number of operands stored therein. The size of the stack is dynamically alterable to conserve usable storage locations in the memory and accessing of operands within a stack frame can be relative to the top or bottom of the stack frame.

8 Claims, 25 Drawing Figures

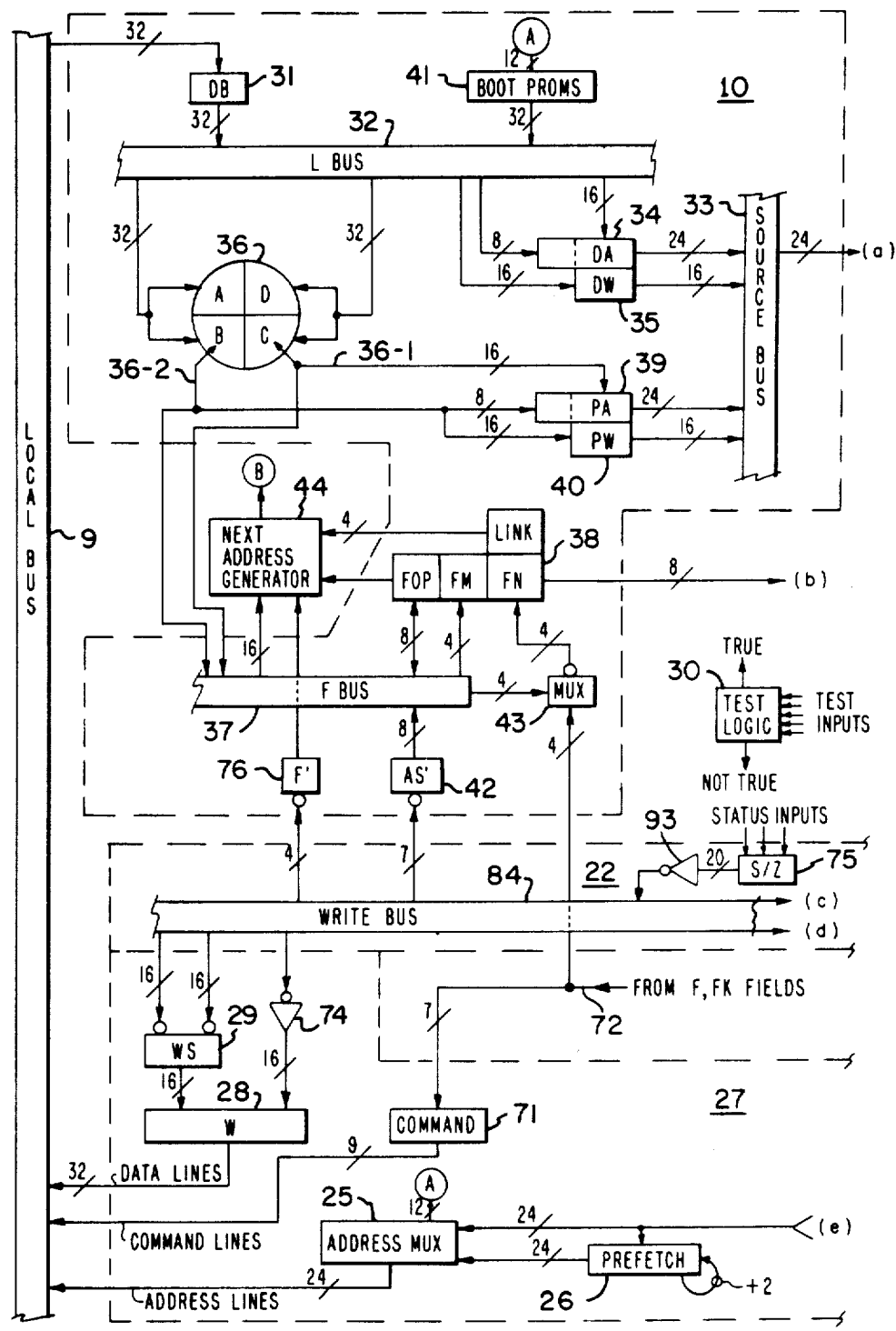
FIG. 2 (SHEET 1 OF 2)

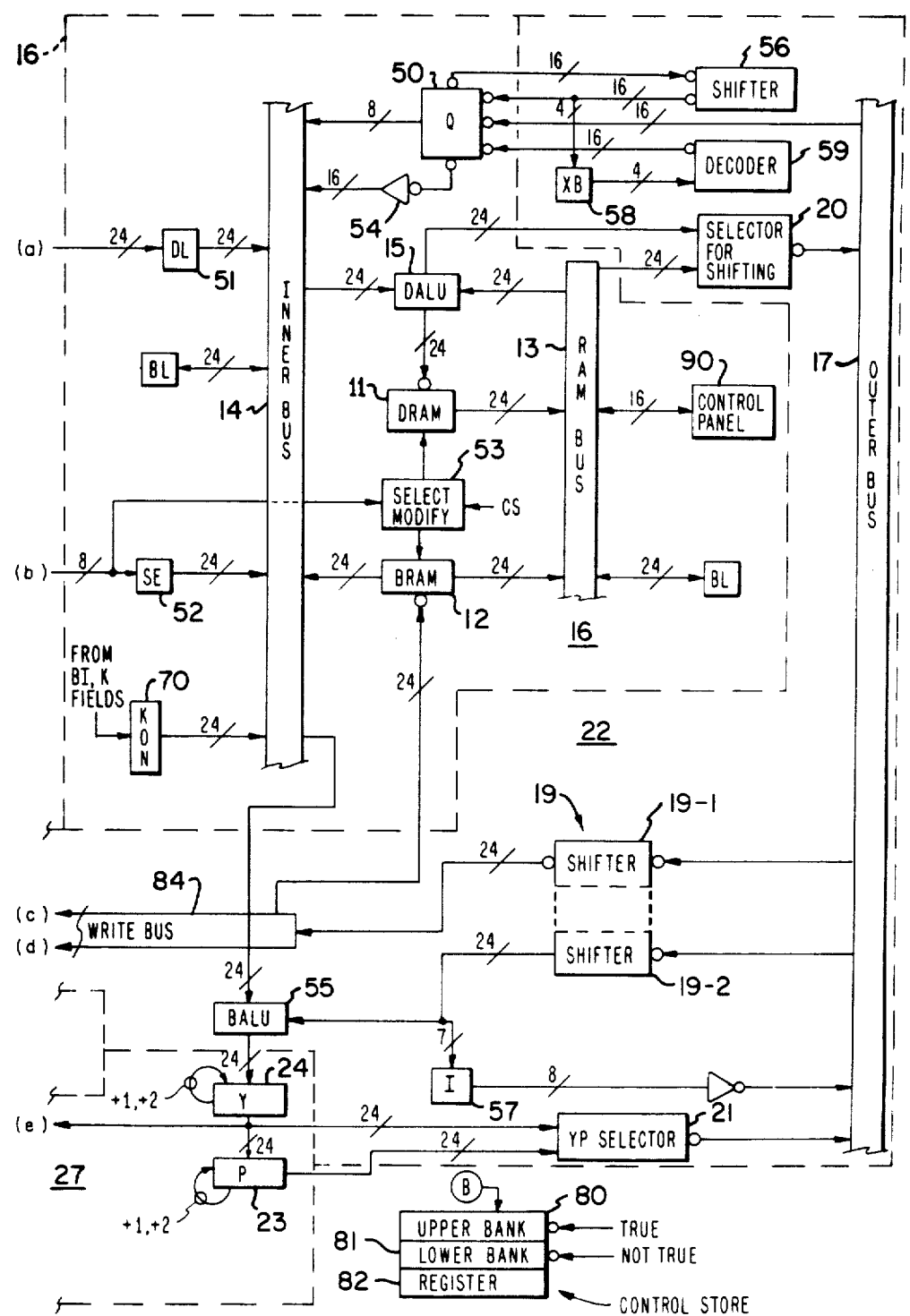
FIG. 2 SHEET 2 OF 2

|     | LOWER BANK | UPPER BANK |
|-----|------------|------------|
| X0  | NA(1-10)   | NA(1-9),NA(A) |
| X1  | NA(1-10)   | NA(1-9),NA($\overline{A}$) |
| XA  | NA(1-10)   | NA(1,2),XA PROMS(5)(3-10) |
| XB  | NA(1-10)   | NA(1,2),110,F(12),XB PROM(1)(7-10) |
| XR  | NA(1-10)   | NA(1,2),000,CF=(KOP),XR PROM(1)(7-10) |
| XE  | NA(1-10)   | NA(1,2),KOP,F(0),#=0,F(4-8)(6-10) |
| XW  | NA(1-10)   | NA(1,2),0,0D SIZ PROM(1)(4-6),<br>1,0D/ADDR. PROM(8),XW PROM(9,10) |
| XL  | NA(1-10)   | NA(1-6), LINK(7-10) |

| 8 | 16 | 31 |
|---|---|---|
| SE | D0 | |
| SE | D1 | |
| SE | D2 | |
| SE | D3 | |
| SE | D4 | |
| SE | D5 | |
| SE | D6 | |
| SE | D7 | |
| SE | K0 | |
| SE | K1 | |
| SE | K2 | |
| SE | K3 | |
| SE | K4 | |
| SE | K5 | |
| SE | K6 | |
| SE | K7 | |
| | E0 | |
| | E1 | |
| | E2 | |
| STKA = | E3 | |
| STKP = | E4 | |
| IV = | E5 | |
| PSIP = | E6 | |
| PCIP = | E7 | |
| | L0 | |
| | L1 | |
| | L2 | |
| | L3 | |
| | L4 | |
| | L5 | |
| | L6 | |
| | L7 | |

DRAM

| | |
|---|---|
| | B0 |
| | B1 |
| | B2 |
| | B3 |
| | B4 |
| | B5 |
| | B6 |
| | B7 |
| | A0 |
| | A1 |
| ZSAV = | A2 |
| RDDR = | A3 |
| STKT = | A4 |
| STKB = | A5 |
| PCPU = | A6 |
| | A7 |

BRAM

4,524,416

STACK MECHANISM WITH THE ABILITY TO DYNAMICALLY ALTER THE SIZE OF A STACK IN A DATA PROCESSING SYSTEM

This is a continuation of application Ser. No. 140,624, filed Apr. 15, 1980.

FIELD OF THE INVENTION

This invention relates with particularity to an improved stack mechanism for use within a central processing unit to maintain, during processing operations, an orderly set of links between the entry and exit points in successive independent procedures performed by the central processing unit.

BACKGROUND OF THE INVENTION

It has been quite common within a data processing system to reserve a set of memory locations or registers to be used as an area for temporarily storing information. Such memory or registers have been referred to as a stack into which operands are pushed down (stored) and popped off (unloaded) on a last-in, first-out (LIFO) basis. The stack is divided into stack frames usually related to the programming concept of a procedure. A modular program, one having a plurality of procedures, will have multiple stack frames within a particular stack when a given procedure calls another procedure, e.g., returning jump, or calls itself, e.g., reentrant procedure call.

In prior art computer systems, the stack subdivisions or frames were commonly of a predetermined length and were not capable of being dynamically expanded or contracted. Accessing within a stack was accomplished by means of stack pointers, i.e., registers storing selected addresses of elements within the stack. A stack frame was created by storing addresses in the stack beginning with frame base relative address zero and incrementing in a numerically positive direction. One of the stack pointers was continually updated to reflect the address of the most recent entry in the stack frame relative to the base of the stack, i.e., the top of the stack pointer. Addressing of operands within the stack was performed by indexing from the current address of the top of the stack.

A problem has been found to arise when the only way to access operands within a stack frame is by indexing relative to the top of the frame. This is because any significant number of pushes or pops relating to a stack frame results in a continual change in the address of other operands in the stack relative to the top of the stack. As an example, a new stack frame is often created when a call is made from one procedure to a different procedure within a program. A call is accompanied by a number of parameters or operands transferred by the calling procedure to be stored in the stack frame created for the called procedure. These operands may contain the return address in the calling procedure as well as specific values for certain parameters. If, in the course of performing the called procedure, numerous entries are pushed onto the stack or popped off of the stack it may be impossible to determine the proper index relative to the top of the stack for addressing the return address to the calling routine. Such a problem will arise when the called procedure does not pop off all of the entries in its stack frame prior to returning to the calling procedure.

There is a second problem attendant with the prior art stack mechanisms. This arises from the common practice of allocating a fixed number of locations for each stack frame. This poses an artificial constraint on the stack mechanism and results in inefficient use of the memory or registers set aside to store the stack. For example, if a stack frame corresponding to a given procedure only requires a few entries, then the remaining entries in the frame will go unused and result in a significant waste of valuable memory space. In addition, some stack frames may require more space than what is normally allocated and, therefore, a stack overflow will occur. Finally, the selection of the size of the individual stack frames is commonly selected to minimize the number of stack overflows and therefore, has been commonly selected to be larger than necessary. This contributes to the inefficient use of the memory locations allocated for the system stack.

OBJECTS AND SUMMARY OF THE INVENTION

It is accordingly an object of the present invention to provide a stack mechanism within a data processing system which requires a minimum number of storage locations.

A further object of this invention is to improve stack mechanisms whereby operands within a stack frame can be accessed by indexing relative to both the top of the stack frame and the bottom of the stack frame.

Another object of this invention is to increase or decrease in size dynamically a stack frame in a stack mechanism.

Yet another object of this invention is to improve stack mechanisms whereby the amount of storage allocated for storing each operand within a stack frame is dependent upon the length of the operand.

It is yet another object of this invention to assemble stack frames in a manner that efficiently allocates the storage locations to the stack.

Additional objects and advantages of the invention will be set forth in part in the description which follows, and in part will be apparent from the description or may be learned from the practice of the invention. The objects and advantages of the invention may be realized and obtained by means of the instrumentalities and combinations particularly pointed out in the appended claims.

To achieve the foregoing objects in accordance with the invention, as embodied and described herein, a data processing system having a memory for storing operand stacks comprising sequences of memory locations for addressably storing stack operands and wherein stack macroinstructions are executed to create an operand stack with a specified number of memory locations, to dynamically alter the number of memory locations included in an operand stack, and to delete a created operand stack, includes a stack mechanism for creating, altering, or deleting operand stacks in response to stack macroinstructions, the stack mechanism comprising; a control store for storing a plurality of sequences of microinstructions, each sequence of microinstructions associated with a different one of the stack macroinstructions; stack register means defining the characteristics of an associated operand stack as stack operands are added to and deleted from the operand stack, the register means including a current stack allocated register for storing an indication of the number of memory locations in the associated operand stack, a stack top register for storing the address of the stack operand most recently added to the associated operand stack, and a stack bottom register for storing the address of the memory location preceding the memory location storing the first operand included in said associated operand stack; and a central processing unit coupled to the control store, the stack register means, and the memory, the central processing unit for accessing said microinstructions stored in the control store associated with a stack macroinstruction, for executing the accessed microinstructions, and for dynamically changing the the contents of the registers in the stack register means in accordance with the changes in a operand stack resulting from the execution of the stack microinstructions associated with a stack macroinstruction.

BRIEF DESCRIPTION OF THE DRAWINGS

The manner in which the apparatus of the present invention is constructed and its mode of operation can best be understood in light of the following detailed description, together with the accompanying drawings, in which:

FIG. 2 is a detailed block diagram of an embodiment of a central processing unit capable of employing the stack mechanism of the instant invention;

FIG. 6 is a table illustrating the signals used for addressing the control store of FIG. 5 and for responding to various branch conditions arising from the performance of the firmware stored in a control store of FIG. 5;

FIG. 10 illustrates the stack mechanism registers resident within the central processing unit of FIG. 2 and employed in implementing the stack operation of the instant invention;

DETAILED DESCRIPTION OF THE PREFERRED EMBODIMENTS

1. System Overview

Figure 1:
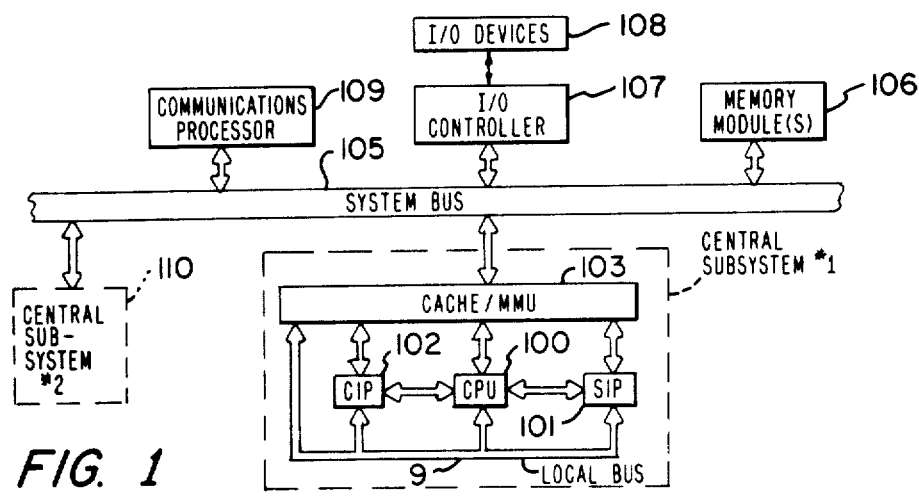
FIG. 1 is a general block diagram of a system in which the stack mechanism of the present invention may be included.

FIG. 1 is a general block diagram of the configuration of the system in which the CPU to be described may be included. Such system, includes a central processor unit (CPU) 100, and optional processors which may include a scientific instruction processor unit (SIP) 101 and a commercial instruction processor unit (CIP) 102. These optional processor units may be used to extend the range of the basic processor unit 100 for special applications. The system may also include a Cache/MMU (Cache memory/memory management unit) unit 103, an electrical system bus 105, memory modules (main or system memory) 106, input/output (I/O) controllers 107 coupled to I/O devices 108, and a multiline communications controller or processor (MLCP) 109. The system may also include a multiprocessor configuration in which there is a second central subsystem 110 which includes all or a portion of the above described system.

The central subsystem processors are connected to each other by way of a local bus 9 and they are connected to the rest of the system by way of the Cache/MMU unit 103. The function of the Cache/MMU unit in the central subsystem is to provide a buffer storage for the portion of main memory 106 that is currently being used by the processors, and to provide for translation of the main memory addresss. The function of the local bus is to provide an interconnection among the three processors and the Cache/MMU unit. There is one physical local bus 9 which is organized into numerous interfaces. As shown in FIG. 1, there are private interfaces between the CPU 100 and the other two processors. There is also a private interface from each processor unit to the Cache/MMU. The local bus is a time-shared or public interface, that is, shared by all three processor units and by the Cache/MMU. In addition, the Cache/MMU 103 provides an interface via the system bus 105 to the rest of the system, primarily the memory 106 and the I/O devices 108 via controllers 107.

The CPU block diagram of FIG. 2 will now be discussed. More particularly, the various electrical buses and functional units and their interrelationships shall be discussed. The primary elements of the CPU are shown within the dotted lines. A first such element is the local bus interface 10 which includes a data buffer, a round robin procedure storage buffer 36, and various procedure/data word and address multiplexers (muxes) coupled with a source bus 33 as well as other devices to be discussed. The first element 10 is utilized for the purpose of receiving data from the system bus 105.

A second element 16 is the arithmetic element and includes several devices including two sets of register arrays (RAMS) called the DRAM 11 and the BRAM 12, and the RAM or R Bus 13, to which RAMS 11 and 12 connect. It also includes the Input or Inner Bus 14 to which the BRAM, as well as other devices, connects. The second element also includes the DALU 15, i.e., the arithmetic logic unit, which is coupled to drive the DRAM 11.

A third element 22 of the CPU includes the Outer Bus 17 and the Write Bus 84, the shifters 19-1 and 19-2 which connect them, and the selectors which drive them. These selectors include the DALU/R Bus selector 30 and the Y register/P register (YP) selector 21.

A fourth primary element 27 is the address section of the CPU and includes the procedure address register (P) 23 and the data address register (Y) 24. It also includes the address multiplexer 25 and the Prefetch address register 26. Also included in element 27 is the write data register (W) 28, and the write data selector (WS) 29. This portion of the CPU is utilized for the purpose of transferring data to the local bus 9.

Figure 5:
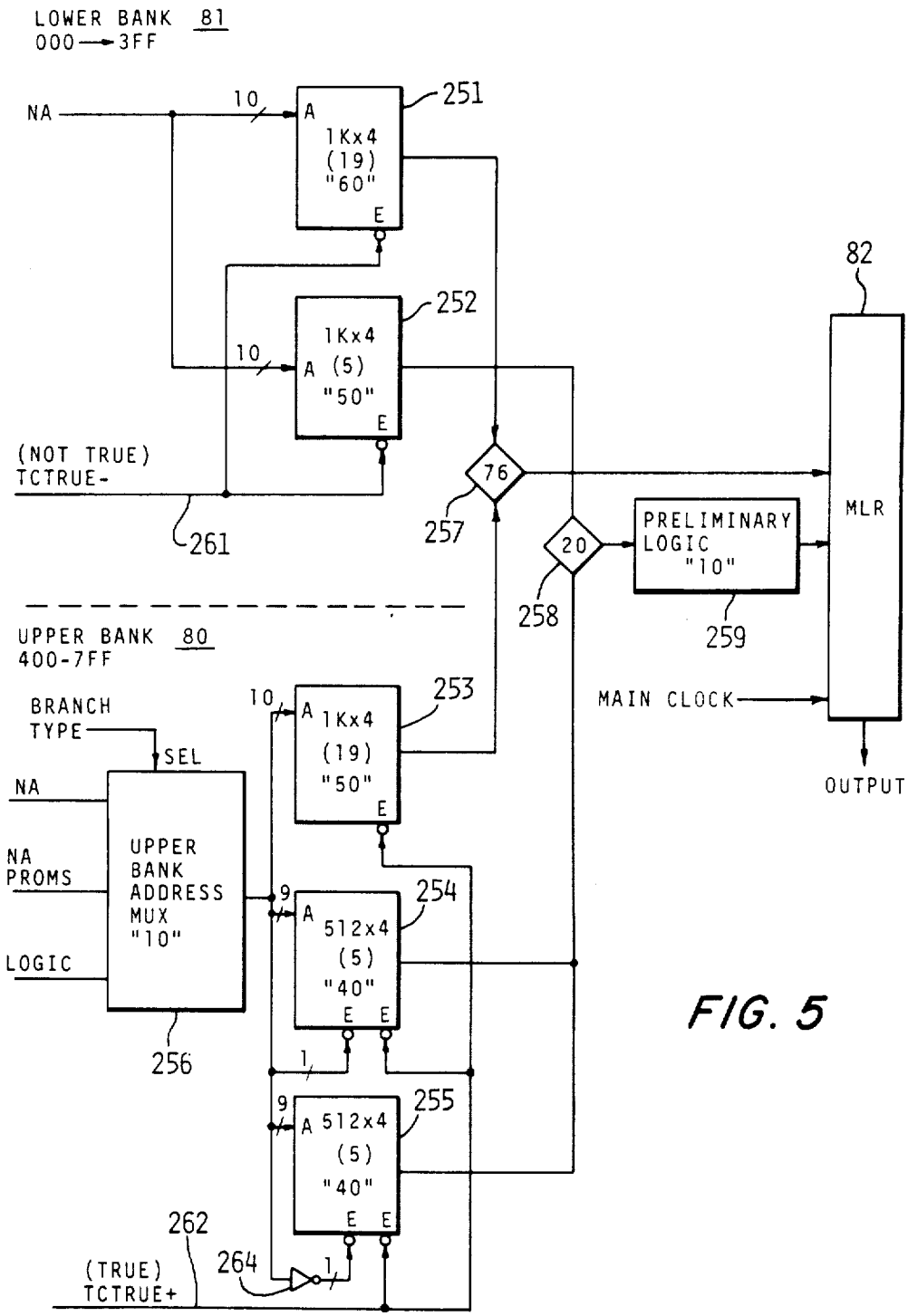
FIG. 5 is a detailed block diagram of the control store and associated logic included in the central processing unit of FIG. 2.
Figure 7:
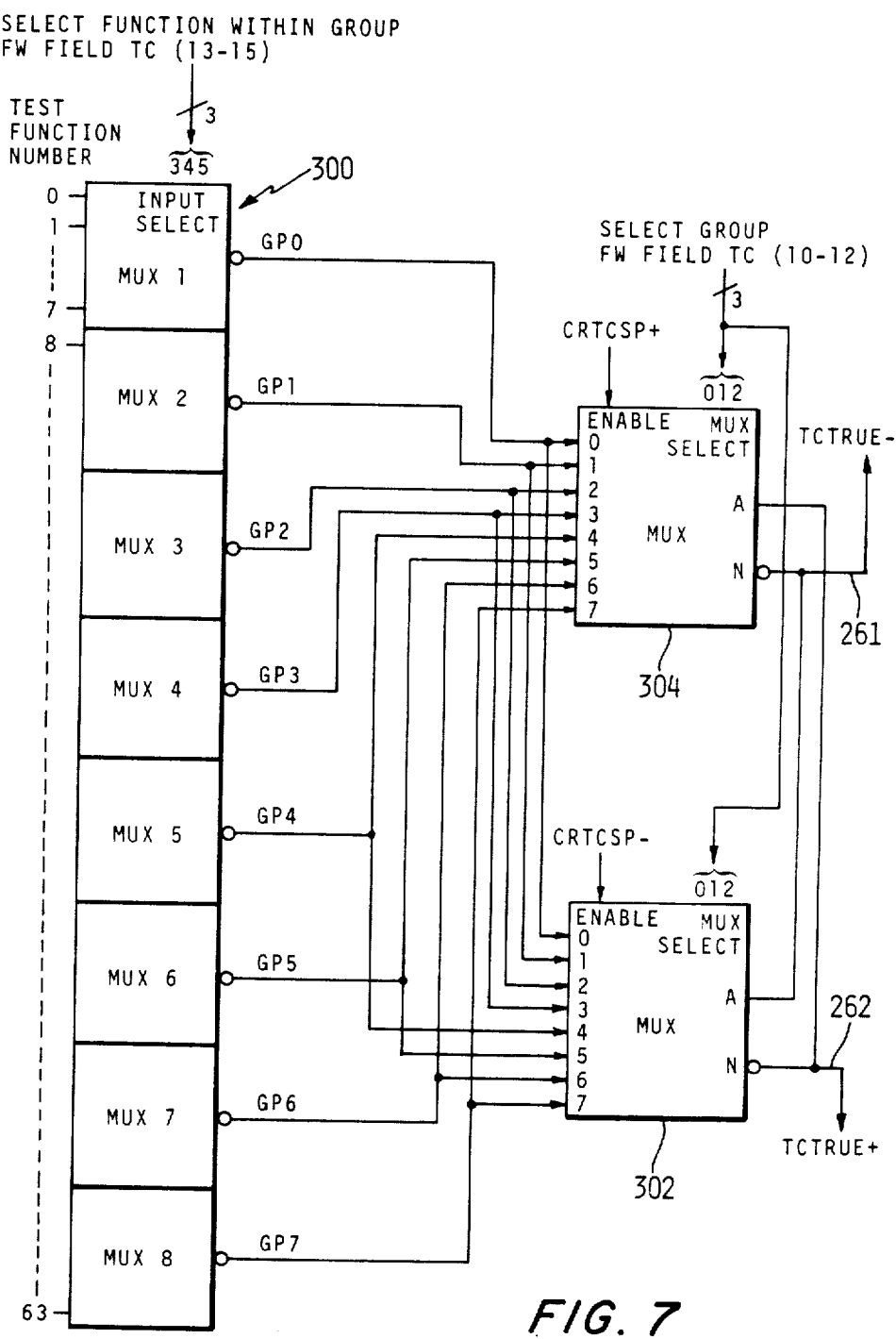
FIG. 7 is a detailed block diagram illustrating test logic used to enable the control store of the central processing unit of FIG. 2.

Device 30 is the test logic of the CPU, which is shown in FIG. 7, and includes a set of eight-to-one multiplexers which in turn drives a second set of at least two eight-to-one multiplexers which generate a single binary signal called "Test True" or "Test False", which is then used to control branching in the firmware. The Test True and False signals are coupled to the PROMS included in the control store banks 80 and 81 as shown in FIG. 5.

The next address generator 44 is coupled to the F register 38 and the F Bus 37. The next address generator is primarily concerned with generating addresses for use in the CPU.

The function of element 10, which is the local bus data input area, is to receive data which is returning from the Cache/MMU or from other devices on the local bus, to select data from the bootstrap PROMs if a bootstrap procedure execution is requested and to direct such data to the appropriate data buffer. If an instructional fetch is called for, the data is placed in the function register. More particularly, the primary data buffer 31 receives 16 or 32 bit data words from the local bus 9. Its output is connected to the L bus 32. The L bus is used both to drive the source bus 33 by use of a pair of selectors DA 34 and DW 35 and to drive the four word procedural data word buffer 36. Non-procedural data words enter the CPU via the source bus 33 which is driven from the data selectors from the L bus 32. Procedural data words enter the CPU via a different set of selectors, PA 39 and PW 40, coming from the procedure buffer 36. The procedure buffer has the responsibility of containing the next two or three procedural data words to be executed, so that when they are required, time will not have to be spent fetching them. It is automatically reloaded from the Cache/MMU via the local bus as it is emptied by the CPU.

The F bus 37 is a special bus which is used for gating information for the F register 38, i.e., the four areas labeled FOP, FM, FN and Link. The F register is the primary instruction register of the CPU. The function of the F bus 37 is to take data from the F register 38 and provide data to the F register from various sources. There is also a multiplexer 43 which allows the loading of either constants or data from element AS' 42 into either the Link or the FN location of the F register 38.

Also in the element 10, which is the data input area, there is a set of bootstrap PROMS 41 which can be used to provide instructions, in place of instructions from memory if operating in the bootstrap mode.

The storage device 36 having locations A, B, C, and D, is a round robin four-word procedural data word store. Whenever it has room for two procedural data words, i.e., it is at least half empty, then it automatically initiates a memory read of procedural data words via the local bus 9, from the Cache/MMU. The returning procedural data words are dropped into the next two locations which are available in this round robin store. As the CPU uses procedural data words by either emitting it to the source bus 33 for use inside the processing elements of the CPU, or by sending it to the F register 38 because it is part of an instruction, then the two pointers 36-1 and 36-2, which represent in effect cursors in the round robin store, advance to the next location available by use of a conductor included in device 36 which successively enables the four locations to the outputs of device 36. The left-hand cursor or pointer 36-2 indicates the next procedural data words to be fetched; the right-hand cursor 36-1 represents the procedural data word following that. Sometimes one procedural data word is used up in which case the procedural data word indicated by the left-hand cursor would be used to generate the information, passing through the PW multiplexer 40. Sometimes there is a requirement for two procedural data words (as when pulling a large address form (LAF) address). Then the procedural data words indicated by both the left-hand and the right-hand cursors are combined in the PA multiplexer 39 of the procedure selector. This will be described more fully when this logic is described.

Thus, element 10 is the area concerned with bringing data into the CPU through the source bus, via either data selectors 34 and 35, or the procedural data word selectors 39 and 40, or bringing data directly into the instruction (F) register 38 via the procedural data word buffer 36 and the F bus 37. Device (F') 76 is used to hold selected bits from auxiliary address information or syllables. The address syllable is actually part of a 16-bit data descriptor. Certain bits in the descriptor have to be retained for subsequent analysis. The operand-size bit in the CIP descriptor and the operand size and signed versus unsigned bits in the K register descriptor have to be retained. These are retained in the five-bit F' register 76.

The second element 16 contains the arithmetic/logic unit (DALU) 15, the BRAM 12 and the DRAM 11, containing all of the programmer visible registers, plus a number of non-programmer visible work registers. These data storage elements are organized as follows: The DRAM 11, which is one of the two sources which can drive the RAM bus 13, contains 32 locations, each of which is 24 bits wide. These locations are used to hold so-called D registers, two halves (K & L) of the so-called K registers which are 32 bits long, a number of internal pointers, and seven so-called M registers. The BRAM 12, which contains 16 words, each 24 bits wide, contains the seven base registers plus a number of programmer visible and programmer invisible pointers of various types.

Figure 3:
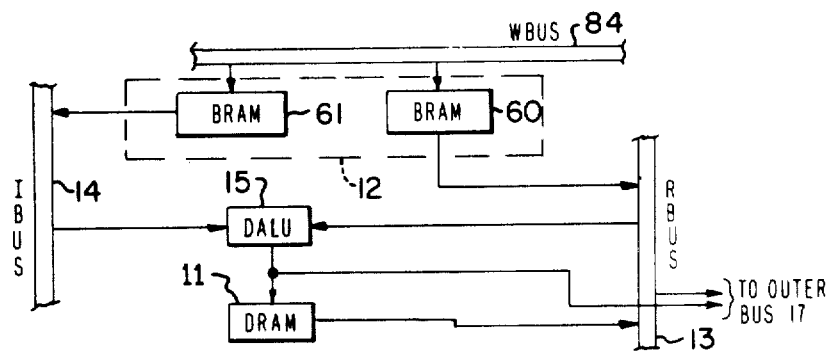
FIG. 3 illustrates details of connections to the arithmetic logic unit of the central processing unit of FIG. 2.

FIG. 3 shows in more detail the relationship between the RAMs, the buses, and the DALU 15. The DRAM and BRAM can each be sources to the RAM bus 13. The BRAM 12 is actually a dual structure; that is, there are two parallel BRAMs 60 and 61 in the CPU. The two elements of the BRAM are loaded identically. One such element which drives (or transfers data to) the R bus is element 60, and the other which drives the I bus is the BRAM element 61. The important aspect of the two identical BRAMs is that the system speed is increased.

The R bus can be driven either by the BRAM 60, or by the DRAM 11. Other sources, as will be seen, also drive the I bus 14. The DALU 15 uses the I bus and the R bus as its inputs and the output of the DALU is then recycled to the DRAM and/or used elsewhere in the CPO.

Element 16 includes two buses of major interest. The so-called input or Inner bus (I) 14 is the primary source of original input within the processor, that is, data from memory comes into this bus as does the output of the Q register 50 via driver 54, and also the output of the BRAM 12. The second bus, the so-called R or RAM bus is the point at which the outputs of the two different RAMs, the BRAM and the DRAM, are coupled. The outputs of these two buses are the inputs to the DALU 15, which generates data which can either be returned into the DRAM or sent to the outer bus 17 for further processing in the system.

Both the inner and the RAM buses employ a hardware element referred to as the so-called "batlatch" (BL) which is a gate whose input and output are tied together for coupling signals onto the bus. This batlatch is intended to take over control of that signal after the driving source is required to go off the bus for timing and sequencing reasons. When this happens, the batlatch then supports that signal at the same level as it was when the driving sources were present, until the batlatch is turned off at which time the bus signal can relax (go to a predetermined level such as zero volts).

The RAM bus 13 is the interface for the transfer of data between the control panel 90 and the central processing unit, and is connected to it via 16 bidirectional signal lines. Memory data couples to the Inner bus 14 via a set of drivers called the data latches (DL) 51. The data latched are paralleled by a second series of latches called SE or sign extension latches 52. These SE latches are used either to sign or zero extend the data latches when they are only providing a sixteen bit quantity to the 24 bit bus. Similary, the SE logic 52 is used to take either 7 or 8 bits of the current instruction, and sign extend it to 24 bits for use by the branch and value instructions which get their displacement and their operand, respectively, from the right-hand portion of the instruction word.

There is also associated with the BRAM and DRAM logic called the select/modify logic 53, which allows the DRAM and the BRAM to be addressed in blocks of eight registers, using various fields in the instruction to control the individual register selection within that block.

Constants generator (KON) 70 is also included in element 16, the primary ALU area, and is another source to the Inner bus 14, that is, it is the source that can be used to generate 24 bit constants onto the inner bus for use by the arithmetic unit under control of the firmware.

Thus, element 16 is the primary arithmetic operation area in the CPU; that is, it is concerned with operand manipulation and with the generation of operands for insertion into the data RAM, or operands which are intended to be sent to the Outer bus, either to be returned to the BRAM, or to be sent to the various address and data registers for output to the local bus 9.

Element 22 is concerned primarily with the section of the CPU referred to as the Outer bus, and the write bus. The Outer bus is the bus upon which various data paths are collected, i.e., the Y register, the P register, the output of the DALU and the RAM bus. The Write bus is the bus which is used to transfer operands to the BRAM, to the write data registers, and to the BALU 55 which is the ALU primarily responsible for address manipulation.

Between the Outer bus 17 and the Write bus 84, is a set of twenty-four multiplexing shifters 19, which allow the shifts of 1, 2, or 4 bits in either direction on Outer bus 17 operands. In addition, there is also a set of sixteen multiplexing shifters 56 which are used to load operands in the Q register.

Two of the four different types of operands which are sourced to the Outer bus originate at the DALU and at the RAM bus and are selected through a two-to-one multiplexer 20 coupled to the Outer bus 17. Two other sources for the Outer bus are the Y register, which is the data address register, and the procedure address (P) register. The outputs of these two units are coupled via a two-to-one multiplexer (Y/P selector) 21 and sourced onto the Outer bus 17. Also coupled to the Outer bus 17 is the I register 57, the indicator register for the central processing subsystem. The contents of the Outer bus 17 can be transferred either directly or shifted to the Write bus 84 for further processing in the CPU. They can also be loaded into the Q register 50 directly so that the Q register can be used for double precision shift operations.

All shifting which takes place within the CPU takes place by manipulation of operands between the Outer bus and the Write bus. The twenty-four shifters 19 are used to shift 24 bit operands, the size of the operands on the O bus 17 and W bus 84, left or right under the control of the control store word. They can shift by either 1, 2, or 4 positions, transfer the operand straight through, or transfer the operand through with the two right-hand bytes of the operand interchanged. The operation of these shifters is controlled by a special field in the control store word. This section of the CPU is used for 24 bit operands shifts. When 32 bit (double register) operands, are shifted, the right-hand operand is loaded into the Q register via the Outer bus, and then a shift is performed in which not only the W bus shifter 19, but also the sixteen Q register shifters 56 are operated. The Q register contents are thereby treated as a 16 bit extension on the right-hand end of the 24 bit operand which is being shifted onto the W bus 84; the ends of these two shifters are coupled together, thus allowing a 40 bit shift to occur. In such double register shifts, the operands of interest are the 16 bits which are returned to the Q register and the 16 bits which are transferred to the right-hand two bytes of the Outer bus, while the left-hand eight bits of the W bus data are usually discarded.

Element 75 represents the collection of the status bits in the CPU for emission to the W bus via driver 93 under certain conditions. The W bus has two sources, the primary one being the shifter 19 from the Outer bus 17. This shifter 19 can be disabled as an input to bus 88 and instead the status bits (S/Z) 75 can be placed on the Write bus 84 for subsequent analysis by the firmware.

One unit of hardware which is associated with the Q register which has not been previously discussed is the XB register 58 and the decoder 59 coupled thereto. The XB register 58 is used during index shifting to capture those bits of the index which are shifted right for sub-word operands and which are lost because they move to the right of the single word bit in the address. They are captured in the XB register, one bit for half-word shifts, two bits for digit shifts, and four bits for bit-sized operand shifts. The XB register contents are subsequently used to directly control left versus right half selection when dealing with half-word operands, when generating a parameter to be sent to the commercial instruction processor unit for digit operands, and to generate a mask of 15 binary zeros and a single binary one, in conjunction with the decoder 59, when operating on bit operands. That is, for a bit operand, a word is read, a mask is used to set or clear the selected bit in the word, and then the word is written back into the memory. The mask is generated from decoder 59 and is an input to the Q register 50. That is, one of the items that can be loaded into the Q register is the decoder mask generated from the contents of the XB register 58.

The fourth major element in the CPU is area 27, the element which is concerned with the generation of addresses, commands and operands for transmittal to the local bus 9, and via the local bus to either the CIP unit, the SIP unit, or the Cache/MMU and hence, to memory or to Input/Output (I/O) devices. This major element can be broken down into approximately three areas, the first being the write data register (W) 28 and the write selector (WS) 29. Register 28, is a 32 bit register with a partitioned load capability, that is, either the right half or the left half, or both halves of this register can be loaded. The right half is always loaded from 16 bits of the Write bus 84 via drivers 74. The left half is written with data which comes from the write selector 29. This write selector has as its 16 inputs either the 16 bits of the right half of the Write bus or the eight left-hand bits of the Write bus plus either sign or zero extension. The Write bus is the primary path by which data can be sent to the W register 28 in order to subsequently write such data to any other device coupled on the local bus.

The next area in the local bus output interface 27 is the command driver 71. The command driver 71 drives a series of command lines which accompany all transfers by the CPU on the local bus and indicates to the Cache/MMU either a memory reference cycle, an I/O reference cycle, or a local bus reference cycle to the Cache/MMU or one of the local bus processing units. The information which is transferred onto the commonad lines is derived from the F and FK fields of the control store or firmware (FW) word shown in FIG. 4, which also at other times the functioning of the F register 38 of element 10.

The third portion of element 27 includes the two primary address registers, i.e., the Y register 24, for non-procedural data word memory addresses and for addresses to other devices on the local and system buses, and the P register 23 (the program counter), and the prefetch register 26.

The P counter 23 keeps track of the last word which the firmware has used, which word has been taken from the round robin buffer 36 and input to the CPU for operations thereon. The prefetch register 26 keeps trck of which word is to be next fetched from memory; that is, the P and PF registers may differ by any number in memory address from one to four words, depending on how full the round robin buffer is and how recently the central processing system has taken procedural data words from the buffer. If the central processing system has taken all the procedural data words from the buffer, it takes a finite amount of time for the Cache/MMU to respond with new procedural data words in response to a request, and fill buffer 36 again. Under those circumstances, the prefetch register 26 and the address of the P counter or register 23 would be close together or the same in address content. When the buffer 36 is full, and the CPU has not taken any procedural data words recently, then the P register will be two to four words behind the prefetch register because it is indicating the last word taken from the prefetch register indicates the next word to be sent forth from memory as soon as there is room for it in the prefetch register.

The contents of the P register 23 are never admitted to the local bus as a memory address source. The two sources for data which can go to the local bus via the virtual address multiplexer 25 are the Y register 24, which is used for all non-procedural data word fetches, and the prefetch register 26, which is used automatically by the prefetch logic to go to memory and request procedural data words for use in subsequent firmware steps.

The arrows on devices 23, 24 and 26 are indicative of the incrementing capability of those particular registers. That is, the P register can increment by either one or two words depending on the number of procedural data words which are taken out of the prefetch buffer at a time. That is, pulling one procedural data word from the prefetch 36 buffer automatically increments the P register by one; pulling two procedural data words from the prefetch buffer 36 automatically increments the P register by two. The prefetch register always increments by two, because prefetches are always performed on a pair of procedural data words. The Y register can increment by either one or two under the control of the firmware as it is used, or in preparation for future use. There is a bus control field in the firmware word which allows control of such incrementing and the various cycle requests to the local bus.

The inputs to the W register 28 are two 16-bit data paths which are exercised in various ways. If it is desired to write a 24-bit address, then the drivers 74 are turned on enabling the right-hand 16 bits of the Write bus to be transferred to the right-hand 16 bits of the W register. The multiplexer 29 is conditioned such that the left-hand eight bits of the Write bus and the eight binary zeros are emitted to the left-hand half of the W register 28. This loads a two-word, 24-bit, address into the W register for subsequently writing into memory. If it is desired to write a single word into memory, then the right half of the W register is not clocked (i.e., enabled), and does not change; and the multiplexer 29 is conditioned to enable the 16 right-hand bits of the Write bus to the 16 left-hand bits of the W register where they are clocked in. For single words writes, the left half of the W register is the data that is written into memory.

The logic heretofore described is used to request and accept data from other entities on the local bus, such as the Cache/MMU or the CIP unit or the SIP unit to operate on it and store it internally in various registers via the two ALUs which are contained in the system, to create new operands which are subsequently modified and sent out to the local bus to one of the entities thereon with an address of which entity (computed internally in the CPU and used to control the local bus). All of these operations are performed under the control of control firmware which is stored in a 2,048-word by 96 bits-per-word control store 80 and 81 which is included in the CPU.

Figure 4:
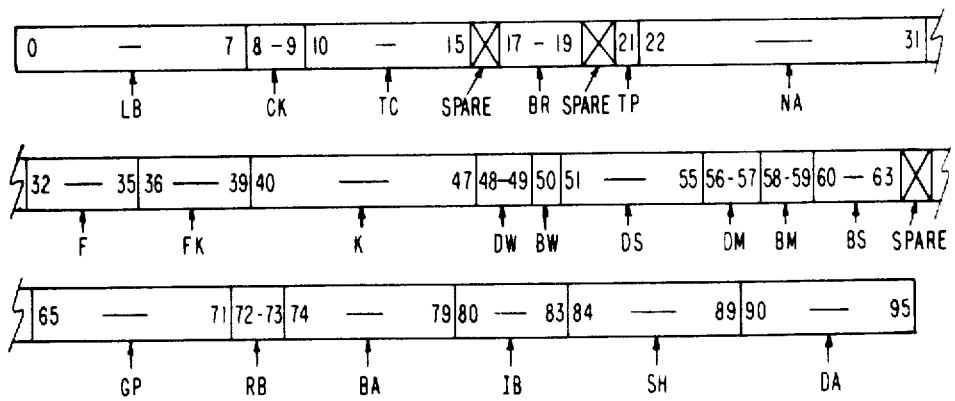
FIG. 4 illustrates details of the composition of locations of the control store included in the central processing unit of FIG. 2.

The control store is partitioned into a number of individual fields, each of which controls some aspect of the internal performance of the CPU. FIG. 4 illustrates the firmware word and the various fields of interest therein. The first of these fields is the local bus (LB) field, bits 0 through 7 of the control store. The LB field is concerned with the requesting of various cycles from the local bus and the responses thereto. It is also responsible for the emission of virtual addresses via the prefetch register or the Y-register, and it controls the various incrementing of the Y and P registers. The local bus field also controls the successive reading of procedural data words from the round robin procedural data buffer 36, and the enabling of the non-procedural data word and procedural data word multiplexers 34, 35, 39 and 40 respectively, onto the source bus 33 for subsequent use by the Inner bus 14.

The next field, the clock (CK) field, bits 8 and 9 of the control store, is used to control the CPU clock speed, i.e., the interval between successive clock pulses in the CPU. Each firmware step has assigned to it the clock speed which is appropriate to its complexity. In the system of the present invention, there are four possible intervals between successive clock pulses: 96 nanoseconds, 105 nanoseconds, or 130 nanoseconds, 170 nanoseconds. Which of these is used for a firmware step is controlled by the CK field for that firmware step.

The next field is the TC field, bits 10 through 15 in the control store. This is a 6-bit field and selects one of 64 possible logic functions within the CPU for testing and control of firmware sequences.

The next field is the BR field, bits 17 through 19, and is used to control the type of action which is taken as a result of a test condition, that is, what type of branch occurred, whether the branch simply selects between two firmware steps, or whether it selects between a firmware step and a so-called control store splatter (the generation of one of a multiplicity of control store next addresses based on the state of one or more logic elements in the CPU in which the next address is controlled by some function of the F register 38 contents).

The next field of interest, the TP field, bit 21 is the Test Polarity field. It controls whether the test condition is tested to determine whether it is true or false.

The NA field, bits 22 through 31 is a ten-bit field which is used to generate at least one of the two addresses which are selected by all branches. The other address is either also derived from the same NA field or from the control store splatters previously mentioned.

The next field, bits 32 through 39, is the F register control field, partitioned into a four-bit part called F and a second four-bit part called FK. The F and FK fields are used to control the loading and strobing of various elements in the F register and in the area of the F bus; that is, it is used to control the strobing of F' and AS' devices, the subparts of the F register 38 and the multiplexer 43. Which of these devices are loaded and what sources they have for their loading are all controlled by the F and FK fields.

The next field, bits 40–47, is the K (i.e., constant) field, and is used to drive the I bus 14. It is an 8-bit field which provides the right-hand eight bits for all constants which are admitted to the I bus. The left-hand 16 bits of the constant are controlled by the I bus field which will be discussed hereinafter. The K field is directly related to the KON device 70.

The next field in the control store, bits 48–63, is concerned primarily with the addressing and control of the DRAM 11 and the BRAM 12. The two-bit field, DW, is used to control writing into the DRAM with one bit controlling write operations into the left most (the most significant) 8 bits of the DRAM, and the other bit controlling write operations into the second right most (the least significant) 16 bits. The next bit, bit 50, (field BW), is used to control write operations into both parts of the BRAM, which are always written into together. The next field DS is five bits in length and provides the selection of one of 32 registers in the DRAM 11. The DM field, bits 56 and 57, is the select-modify field associated with the DRAM and allows the selection of either the DRAM directly or any of three different functions of the F register 38 for qualifying the addressing of the DRAM.

The next field of interest is the B select field (BS), bits 60 through 63, which is used for the selection of one of the 16 registers in the BRAM. The two-bit field comprising bits 58 and 59, is the select-mofify field (BM) for BRAM addressing. It performs similarly to that for the BRAM addressing except that it is separate so that independent select and modify functions can be specified for both the BRAM AND DRAM.

The next field of interest is the GP field, which is seven bits in length (bits 65–71), and is used to control a large number of general purpose micro operations within the processor, such as the clocking of various bistable flip-flops and the enabling of various control functions. It is also used to control access to the control panel from the CPU, to input and output data to the control panel, and to control various flip-flops therein.

The next field, the RB field, bits 72 and 73, is used to control the sourcing of data onto the R bus 13 with one bit controlling the BRAM and the other bit controlling the DRAM.

The BA field, bits 74 through 79, is used to control the functions of the BALU 55, the arithmetic/logic unit which has as its inputs the I buas and the W bus and which can be used to drive the Y register 24. These six bits are used as follows: one as a carry inject to the BALU, one for logic/arithmetic conntrol, and the other four to select particular functions.

The next field of interest is the IB field, bits 80 through 83, and is used to control which data source is enabled to the Inner bus 14. This field can enable the data latches, sign extend the F register or select a constant, or the BRAM in various combinations to the I bus. The next field, the SH field, bits 84 through 89, is used to control both the shifters and the W bus sourcing which was discussed earlier. These six bits enable the system to have a large amount of autonomous control over what registers are enabled to the W bus and whether or not the Q register loads and in what direction the shifters shift the operand as it passes through.

The final field, the DA field, bits 90 through 95, is the function control for the DALU 15 with six bits having analogous functions to those in the BA field, i.e., one bit is a carry inject, one bit selects logic versus arithmetic and the other four bits are to select particular functions.

The control store for the CPU is actually two control stores: an upper bank 80 and a lower bank 81. The upper bank is addressed by the next address generator 44 and the lower bank is addressed directly by a portion of the contents of the then current control store word. In the case of the more common types of branches, both use the NA field of the control store word as the basic source of the next address, and modify it in some way so that the two addresses which go to the upper and lower bank are essentially identical. In the case of the other branches, those which select between a next address and a PROM generator splatter, the lower bank receives the next address field unchanged from the current control store word, while the uppper bank receives the splatter address from the current control store word. The control store is partitioned in this way so that the system can be doing a simultaneous access of both possible next address control store words and can postpone the decision of which one is going to be used until almost the very end of the current control store step, just prior to clocking the data in the control register 82. The details of the control store shall be discussed hereinafter.

The manner in which the CPU and firmware interact to perform certain typical central processor unit operations, such as (a) reading a word from memory; (b) computing a next address for reading another word from memory; (c) writing a word into memory and (d) performing some type of iterative algorithm in which the operations are entirely internal to the CPU, will now be discussed. The situations given will be typical and representative operations will be described.

In the case of reading a word from memory, during a control store step, the control store word will enable the virtual memory address of the word from the BRAM 12 onto the RAM bus 13 via the RB, BS, and BM fields. Then the SH field will condition the Outer bus and the W bus sourcing such that the RAM bus is enabled through the selector 20 to the Outer bus 17, and then unaltered through the shifter 19 onto the W bus 84. The W bus is an input to the BALU 55, which is conditioned by the BA field to enable its W bus input directly to its output. At the same time, the LB field will cause the Y register 24 to load, thus transferring the address into the Y register.

In the next firmware step, the LB field then causes a request to be directed to the local bus indicating that a memory request is required and that the address provided to the local bus should be used to make such request. The command lines 71 are conditioned by the F and FK fields (shown as box 72 in FIG. 2) to indicate the memory read request is required. The address multiplexer 25 is conditioned to enable the contents of the Y register onto the local bus via the 24 address lines. The Cache/MMU memory, which monitors and controls all activity on the local bus, acknowledges the request, while the CPU proceeds to the next firmware step. In the next firmware step, the local bus field will then specify a stall, indicating that the CPU should not leave this firmware step until the end of the local bus cycle has been detected returning the data from the Cache/MMU via the local bus into the CPU data buffer. As soon as this return cycle is detected, then the stall ends, and the CPU will then enter the fourth step of this read cycle.

The fourth step will be one in which the firmware will specify an LB field which uses the data that is in the data buffer, and sources it onto the Inner bus for use by the CPU. The LB field will thus enable either the DA driver 34, or the DW driver 35, depending on whether a word, 16 bits in length, or an address, 24 bits in length, is required onto the source bus. In turn, the I bus field will specify that the source bus, either all 24 bits of it, or 16 bits sign extended to 24, will be enabled onto the Inner bus. In the Inner bus, assuming that there is a 16-bit word that is being received back from the data buffer, the DA field would be used to enable the DALU to read the Inner bus, and then the DW, D select and DM fields would be controlled to address and write into one of the 32 registers in the DRAM. This would complete the fourth step of this control sequence, the first of which loaded the Y register, the second of which made the read request, the third of which waited for data to come back, and the fourth of which took the data and enabled it into one of the registers in the CPU.

A second typical sequence of operations which may be performed by the system is the manipulation of operands in an arithmetic operation, such as adding an operand which has been fetched from memory to one of the data registers and then, after the addition, returning to the data register and also placing it into the write data buffer so that it can be subsequently written back into memory. This sequence of operations would begin following the stall referred to in the previous operation. This step would be one which enabled the data, which in the case of a word operand would be a word, from the data buffer 31, via the L bus and the data multiplexers 35, onto the source bus. Then, the I bus field would specify that the source bus, sign extended via the sign extension device 52 and the data latches 51 be enabled onto the inner bus. At the same time, the R bus control field would specify that the particular data register of interest be enabled to the R bus 13 from the DRAM 11. The DA field, i.e., the DALU control field, would then specify that the DALU be conditioned to add the 24 bits on the R bus 13 to the 24 bits on the I bus 14. This logic 15 would have as its output 24 bits representing the sum. The DW bit would indicate that the output of the DALU was to be written back into the DRAM 11.

At the same time, the output of the DALU would be enabled to the W bus via the SH field. This field would indicate that the selector 20 would be enabled to the Outer bus and would be conditioned to select the DALU output instead of the R bus output for that purpose. Also at the same time, the shifter 1 would be conditioned to pass the Outer bus contents through without change to the Write bus 84. The same LB field which specified DW 35, to the source bus 33, would also have specified that the Write bus would be enabled to the left half of the W register 28 via the selector 29. This would all take place in a single firmware step. Since this is an add operation, presumably the overflow from the add would be tested by a test specified by the test logic 30. The next address logic would generate one address which would indicate a particular entry to go to if the operand is to be written back into memory immediately. The other address, which would be to the lower bank, would be generated to take the next step which would then set the overflow indicator in the I register 57. If there was no overflow, the I register would have been automatically cleared.

The third operation would consist of writing an operand into memory. This would take three firmware steps to perform. The first would be a step in which the address in which the operand is to be written is loaded into the Y register 24. The second step would be to put the operand to be written into the W register 28. The third step would be one in which the LB field would specify that a local bus request, specifying a memory write, be addressed to the local bus for the Cache/MMU to receive and execute.

The first step, that which loads the Y register 24, would get the address presumably from one of the 16 locations in the BRAM random access store. This would be performed by conditioning the I bus field so that the I bus would look at the output of the BRAM. The B select field would indicate which of the 16 BRAM registers was addressed for this purpose. The BALU 55, which is controlled by the BA field, would be conditioned to pass the contents (24 bits) of the Inner bus to its output. The LB field would be one which specified load the Y register. Since input to the Y register is the output of the BALU, this would transfer the contents of the selected BRAM into the Y register. The next control store step would take the operand from its origin, wherever that might be, in this case, for example, one of the 32 DRAM locations. The DS field would select which of the 32 DRAMS would be enabled. The RB field would enable the DRAM onto the R bus. The SH field would select the RAM bus to the Outer bus 17 via selector 20, and the Outer bus to the Write bus 84 via shifter 19 with no shifting taking place. The LB field would specify load the W register, left half. This would be performed by conditioning the W selector 29 to enable the right two-thirds of the Write bus to the left half of the W register, and the W register would be enabled to load its left half.

Finally, the third firmware step would be performed. In this firmware step, the only essential operation is that the local bus field, the LB field, should specify a local bus write to memory. This would use the F and FK bits as command lines going to the local bus to indicate to the Cache/MMU that this is a memory write operation. The address would be enabled to the local bus via the virtual address selector 25 from the Y register 24. The data would be enabled to the local bus from the W register 28. The Cache/MMU memory arbitrating all local bus transfers would recognize this as a memory write cycle, and would take the address, map it, send it to memory accompanied by the data, and indicate on the system bus to the memory that this is a memory write operation.

The fourth sequence of a typical operation which the CPU could perform is that in which a double precision operand is shifted some number of bits to the left or right. Presuming that the operands are both in the BRAM, that is, the two operands of interest are in the BRAM, the first firmware step would initiate the transfer of the right-hand of these two operands to the Q register. This would proceed as follows. The BS field would be conditioned to address one of the 16 locations that contains this operand in the BRAM 12. The R bus field, controlling the RAM bus 13, would be conditioned to take the BRAM output instead of the DRAM output. The SH field would be conditioned to transfer the R bus to the Outer bus via the selector 20, by enabling it to the Outer bus and selecting its input from the R bus, and would also specify that the Q register and the W bus both receive the contents of the Outer bus and would clock the Q register to load it. This would cause the operand addressed in the BRAM to be transferred to the Q register. The next step, or steps, would be those in which the shifts are actually performed. In this step, the other of the two registers containing the second operand in the BRAM is addressed by the B select field and the BRAM is enabled onto the RAM bus 13, via the RB field. Then the RAM bus would be enabled to the Outer bus via the selector 20. The SH field would take any of a number of values depending on which direction and for how many bits the shift is to be performed. The SH field is capable of selecting a left or right shift of either one, two or four bits. In any of these cases, the Q register is considered to be connected as an extension of the Outer bus, creating a 32-bit operand. Actually, it is a 40-bit operand, but the left-hand eight bits of the Outer bus are ignored. This 32-bit operand is shifted either left or right as indicated by the particular SH field. The 16 right-hand bits are returned to the Q register and the 16 left-hand bits together with the eight bits which were ignored are transferred onto the W bus. This is controlled by the SH field which has exclusive control over the shift distance.

The operand having been shifted from the Outer bus to the W bus and from the Q register back to the Q register, the SH field causes the Q register to reload the shifted operand while at the same time the BW field causes the W bus to be written into the addressed BRAM location. Thus, the contents of the B and Q registers have been shifted and returned back to the B and Q registers. The particular end effects associated with this shift, whether this is an open, circular, or arithmetic shift, are a function of the control flip-flops in the CPU. This type of step, in which the actual shifting is performed, is performed some number of times in various combinations, that is, if it were desired to shift left by five bits, then a step which resulted in a shift left by one bit would be succeeded by a step which shifted left by four bits. To shift right by three would require a shift right by two and then by one, for example.

Then, after the final shift has been performed, i.e., after the operands are now correctly aligned in the addressed BRAM location and the Q register, the final step does not cause a shift, but instead returns the Q register contents back to the BRAM location from which it was originally loaded. This would be performed as follows. The I bus field would specify that the I bus is driven by the Q register (16 bits of Q extended by eight bits of binary zeros). The DALU 15 would be controlled by the DA field so that it passed through the I bus unchanged. The SH field would be selected so that it enabled the DALU, unchanged via the selector 20, to the Outer bus 17, and again unchanged, via the shifter 19 to the W bus 84. The BW bit 50 in the firmware word would then be set to condition the loading of the BRAM from the W bus, and the BS (B select) bits would be conditioned to specify which of the 16 locations in the BRAM were to receive the shifted operand. This would all take place in some number of firmware steps, for example, three or more. One step would be used to load the Q register creating a 40 bit operand, one or more to perform the shifting of that operand as required, and then one to return the Q register contents (the right-hand 16 bits) to the BRAM to complete the operation.

FIG. 5 illustrates the organization of the upper and lower bank control store PROMs 80 and 81 respectively, and more particularly the manner in which they are coupled or paired for maximum speed. Each of the banks of the control store includes one or more PROMs, each of which PROMs include a plurality of electronic chips. By way of example, the storage capacity of each bank may be 1024 (1K) addressable locations, each containing 96 bits, i.e., twenty-four chips of 1K each, each location having four bits of storage. To increase the speed of operation, each bank has at least two PROMs, with one PROM faster (lower address propagation time) than the other in each bank in order to compensate for propagation time in other elements included in the control store. Two banks are utilized primarily for efficiently accommodating branch decisions derived from the current firmware word and the next address generator 44. One bank is organized to be addressed directly by the firmware word whereas the other bank (for example, the upper bank) is organized to be addressed by the firmware word and/or a derivative function of the firmware word and various logic elements included in the CPU 100. Accordingly, the upper bank requires a multiplexed input and as shall be discussed, one of the two PROMs in the upper bank is provided with a faster address propagation time than any of the other PROMs in either bank. This is done as a practical matter by utilizing two PROMs, each with an increased speed of operation, i.e., lower address propagation time.

The purpose for pairing of the control store PROMs is to reduce the amount of time necessary in order to generate the next control store address, to select data appropriate to that address, and to enable it to the input of the main control store data register, the so-called MLR 82, which is the output register of the control store. This has been done in the past by using a single set of control store PROMs and selecting the address supplied to them. In such cases, the time required to propagate data through the control store logic is the address select time, i.e., the time from the change of the address input to the PROM to the time at which the output is stable. For typical control store PROMs, this is much longer than the so-called "enable time". Control store PROMs which have an enable input, can typically be turned on and off much faster (the "enable time") than addressed outputs can be provided. Therefore, the basic approach here is to separate the control store PROMs into two groups or banks so that the respective addresses for each group, for example, one of two branch addresses, can be propagating through the control store chips simultaneously, and so that the decision as to which address to utilize can be postponed until the very last moment when the decision is implemented by enabling the output of one or the other of the two groups or banks.

In the described CPU, as with some other computers, all so-called branch operations have a selection of one of a pair of addresses, one of which addresses is explicitly provided by the control store word in the current step, and the other of which is more or less indirectly generated from data available in the current step. In the instant CPU, this pair of addresses is constrained in such a way that all branches consist of selecting between two addresses, one of which is for the lower bank and the other of which is for the upper bank. The lower bank may utilize addresses in the range from 000 through 3FF (hexadecimal), and the upper bank control store addresses from 400 to 7FF (hexadecimal).

The structure used to implement this method of control store partitioning is shown in the block diagram of FIG. 5. As can be seen, the control store is partitioned into five sets of control store elements or PROMs 251 through 255. Elements 251 and 252, which, as indicated in the drawing in parentheses, include a total of 24 control store chips (19 in element 251 and 5 in element 252) are those that contain the data for the lower bank of the control store. Elements 253, 254 and 255 (which include a total of 29 chips) are those that contain the data for the upper bank. Three types of integrated circuits are used to implement these elements. Element 251 is made up of 19 1K (1024) × 4 bit control store chips with a typical address propagation time of 60 nanoseconds. Elements 252 and 253 are made up of specifically selected 1K×4 bit control store chips with a typical address propagation time of 50 nanoseconds. Elements 254 and 255 are made up of selected 512×4 bit control store chips with a typical address propagation time of 40 nanoseconds.

There are two reasons why chips or circuits with different propagation times are used in this logic. The selected parts in elements 253, 254 and 255 are selected to be faster than their counterparts in elements 251 and 252 in order to compensate for the propagation time through the upper bank address multiplexer 256. In addition, elements 252, 254 and 255 are selected to be faster than elements 251 and 253, respectively, because of the propagation delay required in the preliminary logic 259 that is in series with their output to the MLR 82.

The upper bank address multiplexer 256, which is included in next address generator 44, is used to provide one of the two addresses that are being selected among any firmware branch. The lower bank address (the address used by the lower bank control store PROMs) is more or less directly related to the next address which is in the control store word (the NA field) and is the address which is explicitly selected in that control store word. The other address which is used for a branch, that which is used in the upper bank, is some logical derivative of the NA field or is a logically generated address from PROMs or other logic in the CPU as shown by the three inputs to MUX 256, which are selected in accordance with the branch type. This other logic, i.e., the PROMs, and the other logic, and the upper bank address multiplexer which selects it, take additional propagation time which is not present in the address path in the lower bank. The difference between these two address paths is compensated for by the difference in the speeds of the control store chips in series with it. By utilizing one bank (i.e., the lower bank) which has a direct address path, only some of the PROMs need to have increased speed whereas if a MUX, such as MUX 256, was used for both banks, all PROMs would have to have increased speed in order to provide the same propagation time.

As has been noted the propagation delay up to and through the upper bank address MUX 256, which is generating address bits which are received by the faster PROMs of the upper bank, are uniformly faster than their lower bank counterparts. Thus, the data at the output of each PROM is stable at approximately the same time.

The preliminary logic 259 which is connected to the output of the fastest PROMs in each bank, that is elements 252, 254 and 255, is used to perform some preliminary logic decode of the next control store word prior to latching it in MLR 82. That is, this may include the select modify logic 53 which is used to generate the address inputs for the DRAM 11 and the BRAM 12, and which address inputs have to be available early in the control store cycle. More particularly, the address inputs cannot wait to be generated after the main clock has enabled the data into the MLR, but must be generated at the input to the MLR so as to be available as soon as the clock transition has taken place.

The source for the two addresses which are used for selecting a control store word in the lower bank and the upper bank are as follows. The lower bank address, NA, comes directly from the control store word for the current firmware step. Thus, it is available as soon as that control store word has been clocked into the MLR 82. The address NA is an input to both elements 251 and 252. The upper bank address, at the output of multiplexer 256, i.e., the address inputs to elements 253, 254 and 255, is a logical derivative of a number of logic functions included in the CPU. The address multiplexer may be the present embodiment generate eight different functional addresses which can be used by the upper bank. These are the result of the eight possible branch types which can be specified in the control store word.

These branch types are known as X0 and X1, XA, XB, XR, XE XW and XL as shown in the table of FIG. 6. Branch types X0 and X1, which are the most common types of branches, are basically a direct logical function of the NA field. Such branch types use the NA field, with the low order bit NA10 or NA(A) unchanged NA(A) or complemented NA($\overline{A}$). The other six branches are used for specific purposes. The XA branch is used for selecting the appropriate starting address to initiate the decode of a new instruction's opcode. The XB branch is used to perform the initial decoding of some of the address syllables which are possible in the CPU. The XR branch is used to select the starting address for the execution of the routine to read the operand in most cases, or for the execution of certain instructions which are capable of execution immediately. The XE branch is used to select among the starting addresses of the firmware routines which are used to execute the individual instruction algorithms. The XW branch is used to select one of a number of routines which are used to store the operand. The XL branch is used to allow a simplified firmware splatter under the control of the firmware. This branch uses the contents of the link register, which can be loaded under firmware control to control four bits of the upper bank address.

All of the major branches, XA, XB, XR, XE, XW and XL use the two high order bits (NAS 1, 2) of the NA field as their high order bits, but generate the remaining eight bits for their particular address in a different manner.

The XA splatter uses the output of five (5) XA PROMs to generate bits 3 through 10 of the XA next address.

The XB splatter uses three constant signals, two binary ones (11) and a binary zero (0), then one bit which is the output of one of the bit locations of the F register 38, and four outputs from a PROM which is driven by the F register to generate bits 7 through 10 of its NA field.

The XR splatter jams three bits with three binary zeros (000), generates the next bit with the contents of a control flop (KOP) whose state relates to instruction types, and generates the last four bits, bits 7 through 10, from an XR PROM.

The third bit of the XE splatter is the aforesaid instruction type signal. The next bit indicates whether or not bit 0 of the F register is zero, the next whether bits 1 through 3 of the F register 38 are all zeros or not, and bits 4 through 8 of the F register are utilized as bits 6–10 of the NA field.

The XW splatter gives a combination of signals: a constant zero and three outputs of a PROM which decodes and classifies operand size type fit bits 4 through 6. Bit 7 is a logic one, bit 8 is an output of the PROM which classifies operands as either addresses or non-addresses, and, finally two bits which are the output of an XW PROM, for bits 9 and 10 of the NA which identifies whether the result is to go to memory, to a base or data register or to a so-called K register (not shown).

These address lines for the XL branch use bits 1 through 6 of the NA field for the first six bits, and then use four bits of link register to generate the four last bits (bits 7 through 10).

These various inputs are selected by the set of eight-to-one multiplexers which are the upper bank address MUX 256. The particular address which is selected through this MUX is selected by use of the current control store word. In the current control store word, branching is performed by selecting one test condition and testing it for either being satisfied or not being satisfied. The output of this logic is two signals, one TCTRUE− or NOT TRUE, the other TCTRUE+ or TRUE. TCTRUE− is the signal on line 261 in the block diagram of FIG. 5 and TCTRUE+ is the signal on line 262. These signals are connected to the enable inputs of the respective control store PROMs.

At the beginning of a given firmware step, the NA field becomes stable and that address immediately begins propagating through the control store elements 251 and 252. As fast as the logic operates thereafter, the output of the upper bank address MUX 256 becomes stable, and that address begins propagating through control store elements 253, 254 and 255. Note that one of the address bits at the output of the MUX 256 selects between element 254 and element 255. This is because these elements are implemented with higher speed PROMs having a smaller word storage capacity. Accordingly, what is an address line for a 1K word (4 bits/word) PROM, becomes a selective enable line for two 512 word PROMs, with one enable input of PROM 255 coupled via inverter 264. More particularly, in elements 254 and 255, which are the selected 512×4 bit control store PROMs, the address bits are partitioned slightly differently. The reason for this is that a 512 word PROM only requires nine bits of address. The tenth address bit, which is an address bit to all the other control store PROMs, is instead used as a second enable on the 512×4 control store PROMs. That is, element 254 would be enabled for addresses 400 through 5FF, and since the inverse of that same address line is coupled to element 255, it would be enabled for addresses 600 through 7FF.

Thus, as fast as the addresses are available, they are propagated through the control store PROMs. Meanwhile, in parallel, the TC (test condition) logic 30, as shown in detail in FIG. 7, is deciding whether the test condition is satisfied or not satisfied, with the outputs TCTRUE− and TCTRUE+ becoming stable thereafter. If the test condition in the polarity indicated was satisfied, then the low state TCTRUE+ will enable PROMs 253, 254 and 255, while TCTRUE−, being in a high state, will disable PROMs 251 and 252. Thus, the outputs of the wired OR connections as shown by symbols 257 and 258 (76 and 20 lines coupled respectively) will be the contents of the addressed upper bank control store location. However, if the condition was not satisfied, then TCTRUE− (not TRUE) will have the other polarity or state and will enable control store elements 251 and 252, while TCTRUE+ will disable elements 253, 254 and 255. In such case, the outputs of the wired OR connections 257 and 258 will be the contents of the addressed lower bank location.

The enable time for the control store PROMs is typically 15 to 20 nanoseconds. This is significantly faster than the address propagation time for a PROM which, as noted on FIG. 5, may be, for example, 60 nanoseconds for PROM 251. Thus, the "delay" from the time when the test condition results are known has been enhanced so that the enable propagation time of the PROMs is controlling rather than the address propagation time through the PROMs. The reason that these particular concerns have been taken with the timing through this chain of logic, i.e., the propagation time through the upper bank address generation and selection, the timing through the control store PROMs, and the timing through the preliminary logic, is that the worst case time at which the data at the input to the MLR 82 must be stable, is the time at which the main clock is triggered. It is one of the major functions controlling the cycle time, and thus the speed of the CPU.

If each of the control store PROMs had a 60 nanosecond propagation time, then in the worst case, if one were selecting an upper bank address, it would take 80 nanoseconds altogether from some preliminary starting point before the input to the MLR 82 became stable. Thus, to increase the speed, the use of PROMs having three different propagation times is desirable. PROM 252 compensates for the reduced speed or slow down caused by the preliminary or select/modify logic 259. PROM 253 compensates for the increased delay in addressing due to the upper bank address MUX 256. PROM 254 and 255 compensates for both the MUX 256 and the logic 259. Thus, the worst case time through this network is almost the same no matter which bank, upper or lower, is being used, and no matter which output is generated, one that goes directly to the MLR 82 or one that goes to the logic 259, before going to the MLR. If elements 253, 254 and 255 were not faster than elements 251 and 252, the clock period would have to be longer for any firmware step in which the upper bank was the one selected. Thus, the cycle time for that control store step would be longer because there would have to be allowance for the extra time for the next address PROMs and the upper bank address MUX to generate a stable address for the control store PROMs.

The basic principle involved in the logic shown in FIG. 5 is summarized as follows. Since the address path through the control store PROMs is so much slower than the enable path, the address path is always left open, that is, the next address is trickling through the lower bank control store and the output of the address MUX 256 is trickling through the upper bank of the control store, while the decision is being made as to which bank is finally going to be used. The timing of that decision becomes critical only when it becomes time to enable the outputs of these control store PROMs, in which case the test condition generated, true or false, will enable either the lower bank or the upper bank PROMs, depending upon which way the branch is going. The enable path is a much shorter time, 60 nanoseconds for the address propagation as compared to 15 nanoseconds for the enable propagation, thus allowing the decision for bank selection to be postponed for as much as 45 nanoseconds in a typical control store step, and thereby allowing each control store step to be significantly faster.

Now referring to FIG. 7, details of the test logic 30 for generating the TCTRUE+ and TCTRUE− signals is shown. The TCTRUE+ signal is generated at the negation output of multiplexer (MUX) 302 on line 302 on line 262, and the TCTRUE+ signal is generated at the negation output of MUX 304 on line 261. The lines 261 and 262 are coupled to the PROMs as shown in FIG. 5. The multiplexers 302 and 304 each have eight inputs (0-7), with each like numbered input coupled to receive the same input. Such inputs are received from the eight outputs of multiplexer 300 which actually includes eight multiplexers MUX 1-MUX 8, each having eight inputs and one output. The sixty-four inputs to multiplexer 300 are each coupled to receive a test condition from various functions included in the central processing unit 100 as indicated by test logic 30. Depending upon the condition of the function tested, either the upper bank or the lower bank of the control store will be enabled and accordingly addressed. The inputs to the multiplexers which are selected and/or enabled are determined by control bits received from the current control word, i.e., firmware word from the control store.

Thus, it is desirable to branch on a variety of different signals, which may, by way of example, be sixty-four in number, such that only one signal represents the selected one of the sixty-four inputs. The logic of FIG. 7 provides this capability with minimal propagation time by use of two levels of multiplexers, one level comprising multiplexer 300 and the other level comprising multiplexers 302 and 304. The logic of FIG. 7 also enables such branching based on either of two polarities of the same signal.

The operation of the logic of FIG. 7 is as follows. One input to each of the eight multiplexers included in multiplexer 300 is selected for propagation to the negation outputs, GPO through GP7 respectively by the three bits received at select inputs 3, 4 and 5 of each of such eight multiplexers. These three bits are received from the TC field (bits 13-15) of the firmware word. The outputs GPO-GP7 are respectively coupled to the 0-7 numbered inputs of each of the multiplexers 302 and 304. The multiplexers 302 and 304 are also coupled to receive at their enable inputs the signals CRTCSP− and CRTCSP+, respectively. The CRTCSP signals (assertion and negation) are also received from the current firmware word, and more particularly, the TP field in the firmware word, transferred via the register 82. For bit 21 (the TP field), the element at the bit 21 location in the register 82 is actually a bistable element (flip-flop) having both a negation and an assertion output. Depending on the logic level required for other bits of the firware word, either or both the assertion and negation outputs are used.

The multiplexers 302 and 304, which may be purchased from a semiconductor vendor such as Texas Instruments Inc. under part number SN74S251, will allow switching of the assertion and negation outputs of the multiplexer if the signal on the enable input is low or a binary zero. If such signal on the enable input is high, the outputs are floating and accordingly, as configured, such multiplexer having a high enable input will be effectively removed from the logic of FIG. 7. Thus, as can be seen, only one of the multiplexers 302 and 304 will be enabled at any given time. The outputs of the multiplexers 302 and 304 are coupled so that the assertion output of each multiplexer is coupled to the negation output of the other multiplexer to produce a so-called wired-OR circuit connection. Thus, with either of the multiplexers 302 and 304 enabled, the TCTRUE signals are obtained with the proper polarity. The TCTRUE signal which is low or a binary zero, will enable the bank to which it is coupled. That is, if TCTRUE− is low, the lower bank will be enabled.

Thus, as can be seen from the operation of the logic of FIG. 7, if the CRTCCSP− signal is high and accordingly the CRTCSP+ signal is low, the MUX 304 is active or enabled and the signal TCTRUE− reflects the level (high or low) of the one of sixty-four conditions being tested and TCTRUE+ reflects the inverse of such level. If the CRTCSP− signal is low and accordingly the CRTCSP+ signal is high, then MUX 302 is active or enabled and the signal TCTRUE+ reflects the level of the condition being tested and TCTRUE− reflects the inverse of such level. Whether the upper or lower bank of the control store is enabled depends upon which of the signals TCTRUE− or TCTRUE+ is low.

It can be seen that the opcode of an instruction read from memory 106 may be utilized to select one of several test conditions, which test conditions may be different from those received by MUX 300. In such case, the opcode bits could be utilized to select the test condition inputs to a first MUX similar to MUX 300 or a subportion thereof, and two multiplexers similar to multiplexers 302 and 304 could also be used in an arrangement similar to that shown in FIG. 7. It can also be seen that the use of the opcode to so select a test condition could be used independently of or in parallel with the logic of FIG. 7. If used in parallel, then the multiplexers 302 and 304 controlled by the firmware bits would have to be disabled when the multiplexers controlled by the opcode are enabled and vice versa.

Figure 8:
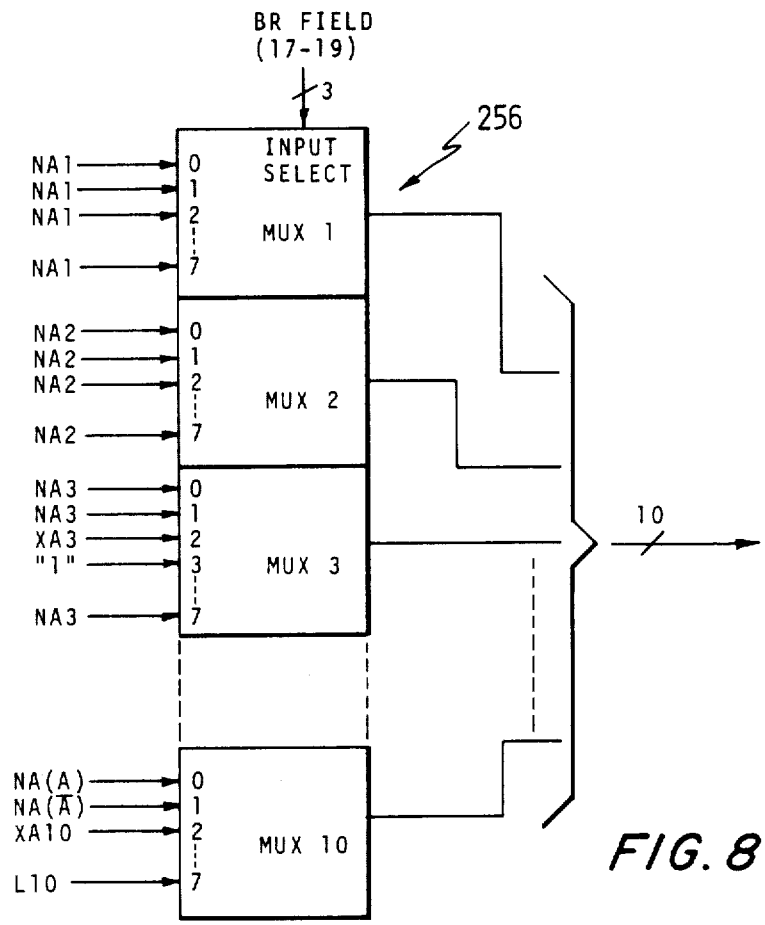
FIG. 8 illustrates the details of a multiplexer used in addressing the control store included in the central processing unit of FIG. 2.

Details of the MUX 256 and the connections thereto are shown in FIG. 8. More particularly, the MUX 256 is shown to include ten multiplexers each with eight inputs. The inputs to these ten multiplexers correspond to the signals indentified in the table of FIG. 6. These signals are coupled for the eight branch types depicted in fig. 6, such that the first signal for each of the branch types is received at the corresponding eight inputs of MUX 1 included in multiplexer 256. Thus, MUX 1 has coupled to each of its eight inputs the signal NA1. MUX 2 also has the same signal (NA2) coupled to each of its inputs. For each of the other multiplexers of MUX 256, except for the first two inputs, the signals coupled to the input are, for the most part, different. For example, MUX 3 has coupled to its number three input, the signal XA3 which, as shown in FIG. 6, is the third bit of the upper bank address for the XA branch, such third bit being a bit from position 3 of a so-called XA PROM which is not shown, but may simply be a decoder coupled to receive its primary inputs from the F register 38 and whose output is coupled for receipt by MUX 3 of multiplexer 256.

The other inputs of the remaining multiplexers of MUX 256 also receive the inputs as depicted in FIG. 6. The first two inputs of MuX 10, NA(A) and NA (Ā) are of further interest. More particularly, the use of these two bits, one the complement of the other, allows more flexible and efficient pairing of control store (PROM) locations for branch operations. In the prior art, it has been known to branch on a branch hit condition to an odd PROM location and to branch on a branch no-hit condition to an even location, or vice versa. However, such prior art technique has limitations. For example, assuming four consecutive locations whose addresses are XXX000, XXX01, XXX10 and XXX11 (where X is either a binary 1 or a binary 0), a sequence which is branching can go to address XXX00 or XXX01 depending on a no-hit or hit condition, or another sequence can go to address XXX10 or XXX11. However, even if locations XXX11 and XXX01 contain exactly the same information, they cannot be shared, i.e., two locations have to be used even for the same contents. This is because both addresses are odd and the only pairing allowed is for odd/even addresses. In another prior ar technique, a no-bit condition could be made to cause the addressing of the location specified by the control store word and a hit condition could cause the addressing of a location specified by the higher order address bits with the two lowest order bits, for example, both being binary ones. In this manner, and address whose two lowest order bits were both binary ones, could be paired with addresses whose two lowest ordered bits were either two binary zeros or a binary one and a binary zero (in either order). However this restricted the common address to an address which had its two lowest ordered bits binary ones (or vice versa, i.e., two binary zeros with appropriate change of the other paired addresses to one whose two lowest ordered bits are either both binary ones or a binary one and a binary zero).

In a data processing unit which allows a variety of sources to generate or form the next address for the control store, the use of the arrangement as shown in the Figures, more specifically FIGS. 5 and 8, is desirable. More particularly, the logic shown in such Figures allows a reduction in the total number of firmware or control store locations by allowing all locations to be used as alternates to an increased number of selected locations. In order to accomplish this, the least significant bit position (NA10) is coupled so that for the X0 branch, NA10 is in fact the same as the NA10 bit, NA(a), received from register 82 for the current control store word, whereas, for the X1 branch, the complement of such bit NA(A), is used.

Figure 9:
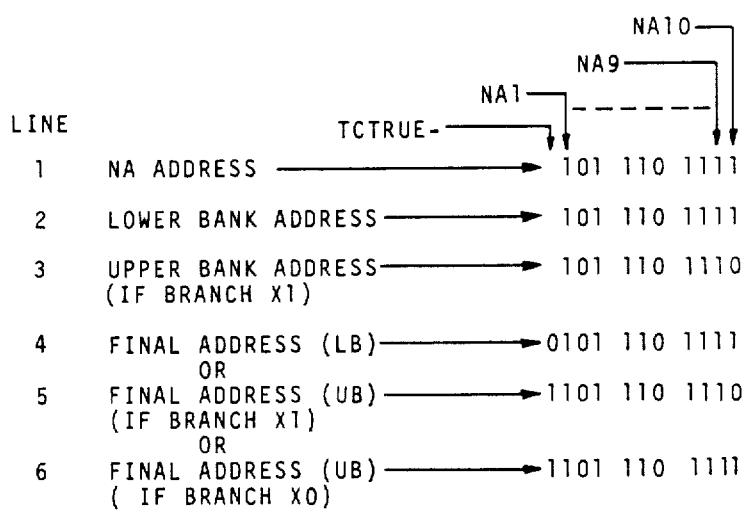
FIG. 9 illustrates an example of the operation of pairing locations in the control store included in the central processing unit of FIG. 2.

By way of example, FIG. 9 should be reference. If the NA address is as shown on the first line, then the lower bank address is, as shown, the same. The upper bank address is however dependent upon whether there is an X0 or X1 branch. If an X1 branch, then the upper bank address is shown in the third line. The final address depends upon whether the signal TCTRUE− is a binary zero or one. If a binary zero then the lower bank PROMs will be enabled. Thus, as shown in the fourth line, the final address will be for the lower bank if TCTRUE− is a binary zero. If TCTRUE− is a binary one, then the final address will be for the upper bank and depending upon whether the branch is X1 or X0, the final address will be as shown in lines 5 and 6 respecctively of FIG. 9. More particularly, it can be seen that the lower bank address on line 4 may be paried with either of the addresses for the upper bank as shown on lines 5 and 6.

In this manner, more efficient pairing of locations may be obtained. Variations of the example shown in FIG. 9 will illustrate that an even address location of the lower bank may be paired with an even or odd address location of the upper bank, and that an odd address location of the lower bank may also be paired with either an even or odd address location in the upper bank.

It can be seen that the above described pairing could be accomplished by setting the binary value of the NA10 bit independent of the binary value of the NA10 bit of the current firmware word. For example, the NA10 bit for the X0 branch may have been set to a binary one instead of NA(A), so long as the NA10 bit for the X1 branch is its complement, in this case, a binary zero.

2. The Stack Mechanism

Having described in detail embodiments for a suitable central processing unit and control store for implementing the stack mechanism of the instant invention, the following will set forth additional details of the CPU, illustrative examples of stacks implemented by the stack mechanism of the instant invention, and a detailed discussion of the operation of the stack mechanism.

The stack of the instant invention is resident in one of memory modules 106 as a reserved memory area for use in system operation. As herein embodied, the stack comprises M memory locations subdividable into a plurality of variable lengths of stack frames. Each stack frame is allocated on an "as needed" basis and corresponds to a procedure executable within a segmented or modular program. At any one time, there may be zero stack frames or one or more stacks frames. The total number of memory locations currently occupied by all of the operands in the existing stack frames comprises the current memory allocated C.

As will hereinafter be discussed, the stack mechanism of the instant invention includes the ability to extend and contract the length of a stack frame after it has been allocated and to address locations within a particular stack frame by addressing relative to either the top of the stack frame or the bottom of the stack frame. The length of a stack frame is dynamically changed by pushing an operand into the frame, popping or operand off the top of the stack frame or by the stack mechanism's modifying the number of memory locations allocated to the stack frame.

Each stack in memory includes a stack header comprising two words of main memory. These words are words N and N−1 of the stack and correspond to the previously mentioned maximum stack area length, M, and current frame allocated, C, respectively.

The stack mechanism of the instant invention will obtain a stack frame from memory responsive to the execution of an ACQUIRE (ACQ) instruction. In the ACQ instruction, the user specifies the length of the stack frame to be created. The stack mechanism will dynamically enlarge or reduce the size of a stack frame in response to a modify frame length (MFL) instruction. The stack mechanism will release a stack frame to memory in response to a RELINQUISH (RLQ) instruction.

The length of a stack frame can also be modified by this stack mechanism in response to push or pop address syllables.

In FIG. 10, the registers with comprised DRAM 11 and BRAM 12 are set forth in detail. The DRAM comprises four sets of registers with eight registers in each set. These sets are D0–D7, K0–K7, E0–E7, L0–L7. Registers E3 and E4 relates specifically to the stack mechanism of the instant invention. Register E3 is the stack array register (STKA) and it stores a designation of a memory address where an array of pointers to stacks existing in memory is stored. Register E4 is the stack pointer register (STKP) and it stores a designation of a memory address for storing the current number of allocated storage positions in the current stack.

The BRAM contains registers B0–B7 and A0–A7. Register A4 is the stack top register (STKT) and it stores a designation of the address of the top data word in the current stack frame. Similarly, register A5 is the stack bottom register (STKB) and it stores a designation of the address one below the first operand in the current stack frame.

FIGS. 11(a)–(e) illustrate five representative possible combinations of stack frames within a stack. The first two locations in an existing stack contain the M word for storing an indication of the maximum size of the stack and the C word for storing a designation of the number of stack locations currently allocated. An attempt to increase the number of currently allocated words to an amount greater than the maximum number of words permitted in the stack by either increasing the number of stack frames or by increasing the size of existing stack frames will result in a trap or error condition designated stack overflow.

The stack of FIG. 11(a) contains three frames, $F_0$, $F_1$, and $F_c$. Frame $F_0$ contains i entries and includes a b-word, $b_o$, for storing a designation of the number of entries in frame $F_0$.

Similarly, $F_1$ contains j entries and has associated with it a b-word, $b_1$ for storing a designation of the number of entries in $F_1$.

Frame $F_c$ is the current stack frame which means that it is the most recently established stack frame. As illustrated herein, $F_c$ contains K entries and the b-word associated with $f_c$ stores the amount K.

Frame $F_c$, being the current frame, dictates the values to be stored in the STKT register and the STKB register. Entries are made into the current stack frame $F_c$ such that the first entry in time is stored in location K (K=number of entries in the stack) the second entry in location K−1, and the third entry in location K−2, and the most recent entry in location O. The STKT register contains the address of location 0 of stack frame $F_c$ and the STKB register contains the address of location one below or greater than location K in $F_c$, i.e. the address of b-word, $b_1$. As illustrated herein, the total number allocated entries in the stack is less than the maximum stack size (M) and, therefore, no stack overflow exists and either stack $F_c$ can be dynamically increased or an additional stack frame can be added to the stack.

Figure 11:
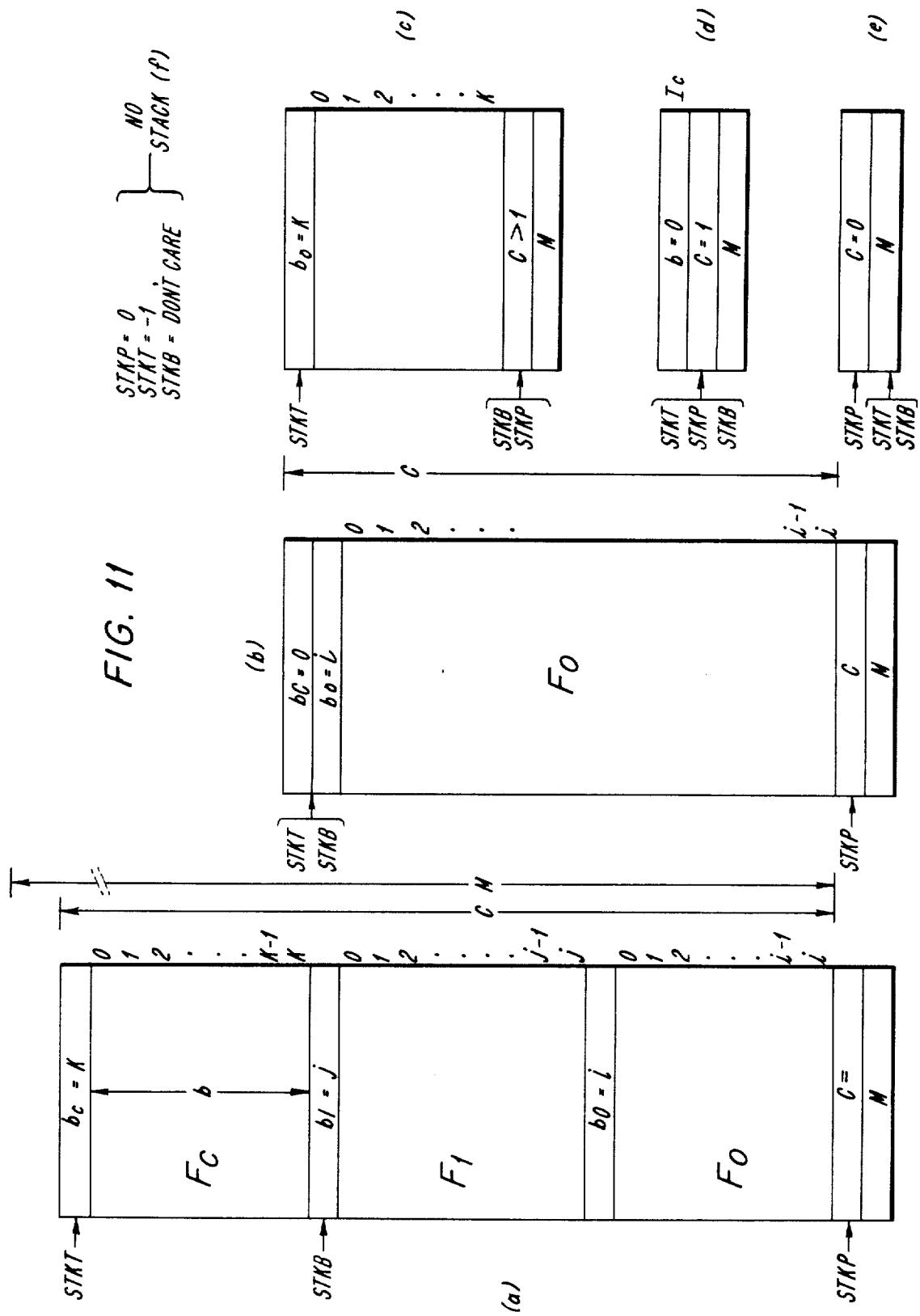
FIGS. 11(a)–(e) illustrate five stack conditions capable of being implemented by the stack registers of FIG. 10.

FIG. 11 (b) illustrates a stack containing two stack frames wherein stack frame $F_0$ contains i entries and the current stack frame $F_c$ contains zero stack entries. Thus, the b-word associated with stack frame $F_0$ is equal to i and the b-word associated with the current stack frame is equal to zero ($b_c$ equal to zero). Since there are no entries in the current stack frame, the addresses stored in STKT and STKB will be the same and equal to an address one less than the address of the b-word $b_c$ associated with the current stack frame $F_c$. Thus, STKT and STKB will contain the address of the b-word, $b_0$, associated with frame $F_0$.

FIG. 11(c) illustrates a stack containing one non-empty stack frame which is the current stack frame $F_c$. $F_c$ has K entries and, therefore the b-word associated with $F_c$ will store the value K. The STKT register of the stack mechanism stores the addresses of location 0 of the stack frame $F_c$ and STKB stores an address one greater than the location $b_c$ in stack, frame $F_c$. Thus, STKB stores the address of the C word and, therefore, will duplicate the contents of the STKP register.

FIG. 11(d) illustrates a stack wherein there is one stack frame allocated and that stack frame has the zero entries.

Finally, FIG. 11(e) illustrates a stack wherein there is no current stack frame and no stack frames an allocated. In this case, the contents of the c-word will be equal to zero, the STKP register will store a designation of the address of the c-word. The STKT and STKB registers will contain identical contents equal to the address of the M-word of the stack.

FIG. 11(f) illustrates a situation wherein there is no stack. In this case, the STKP register will contain a null address (=000000) and the STKT register an address of 1 (=000001).

Figures 12, 13:
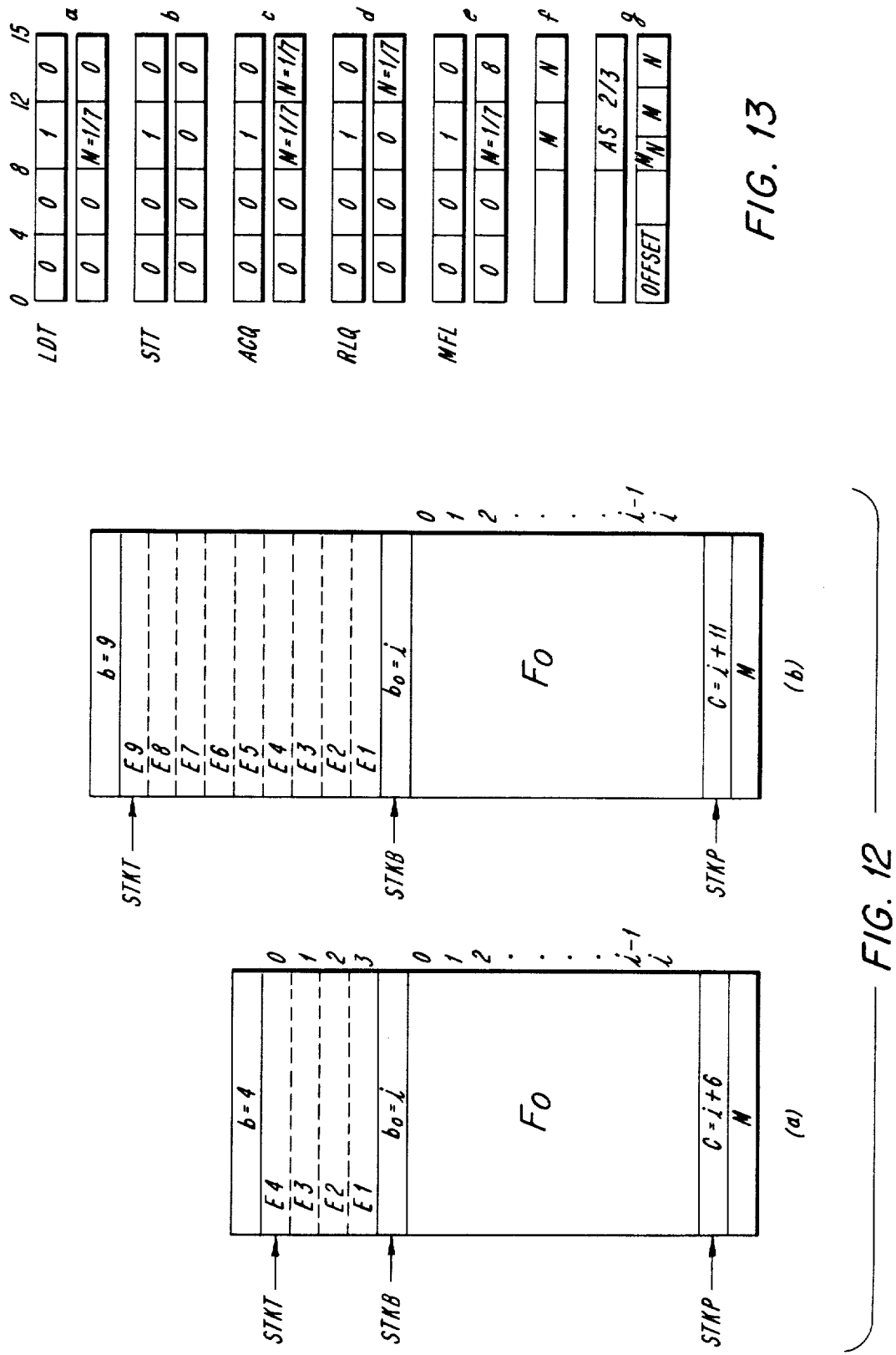
FIGS. 12(a) and 12(b) illustrate a stack before and after additional entries have been added thereto.
FIGS. 13(a)–13(f) illustrate formats for stack-related instructions executed by the stack mechanism of the invention.

FIGS. 12(a) and (b) illustrate a stack before and after additional elements have been added to it, i.e., before pushdowns. The stack of FIG. 12(a) includes two stack frames, frame $F_o$ and the current stack frame. Stack frame $F_o$ includes $b_o$ entries and the data stored in the b-word associated with frame $F_o$ will be equal to i. The current stack frame includes four entries E1–E4. E1 was the first entry in the current stack frame, E2 the second entry, etc. As indicated, entry E4 is stored in location zero of the current stack frame, E3 in location 1, E2 is location 2, and E1 in location 3. The STKT register stores the address of location zero in the current stack frame and STKB stores the address one below the highest location (location 3) in the current stack frame and, therefore, STKB will contain the address of the b-word of stack frame $F_o$. The b-word associated with stack frame $F_c$ contains the quantity 4 indicating that there are four entries in the current stack frame. The STKP register contains the address of the c-word for the stack. At that address, the quantity (i=6) will be stored reflecting the total number of entries in the stack.

FIG. 12(b) illustrates the stack of FIG. 12(a) with the addition of five entries into the current stack frame. The contents of STKP and STKB remain the same as does stack frame $F_o$ and the b-word associated therewith. In the current stack frame, however, five additional entries have been made, i.e., E5–E9. The STKT register stores the address of location zero in the current stack frame and the b-word associated with the current stack frame will store the value nine as an indication of the number of entries in the frame. Thus, FIG. 12(b) illustrates the dynamic expansion of the current stack frame from the state illustrated in FIG. 12(a).

The elements in the current stack frame of FIG. 12(b) are accessible by addressing relative to the address stored in the STKT register or the address stored in the STKB register. This addressing relative to the top or bottom of the stack frame is controlled by the sign of the displacement. As an example, entry E7 stored in location two of the current stack frame can be accessed from the top of the stack frame by displacing from the address stored in STKT by a positive 2. Similarly, entry E7 can be accessed relative to the bottom of the stack frame by displacing relative to the address stored in the STKB register, i.e., the address of the b-word by a negative 7. As will hereinafter be explained, the stack mechanism of the instant invention executes displacements within the current stack frame relative to the content of the STKT register of the STKB register depending upon whether the sign of the index quantity is positive or negative, respectively.

Considering FIGS. 11(a)–11(e) and FIGS. 12(a) and (b), it is evident that adding to or subtracting from the number of entries in the current stack frame and creating and deleting stack frames requires the constant updating of the addresses stored in the STKT register and the STKB register. Also, the quantities stored in the C word as addressed by the STKP register and the value stored in the b-word associated with the current top stack frame must be continually updated. Such updates are performed in the following manner.

3. Description of Stack-related Macroinstructions

The stack mechanism of the instant invention operates in response to five different stack macroistructions. These instructions are set forth as FIGS. 13(a)–13(e). Each of these instructions is two words in length with each word comprising 16 bits, i.e., bits 0–15. The first word for each instruction is identical, having hexadecimal value 0010. The second word in each of the instructions is·different and provides means for distinguishing among the macroinstructions.

FIG. 13(a) illustrates the format of the LDT macroinstruction. The function of LDT is to update the contents of the c-word and b-word of the current frame, reload the STKT register from the base register $B_m$, and the reload the STKT and STKB registers to point to the new top frame.

The store stack pointer macroinstruction (STT), illustrated in FIG. 13(b), causes the contents of STKP register to be transferred to register B7 in the BRAM.

FIG. 13(c) illustrates the instruction format for the acquire (ACQ) macroinstruction which creates a new stack frame having a certain number of entries. The M field specifies which B register in the BRAM stores an indication of the number of entries to be included in the acquired stack frame and the field N specifies which B register is to store an indication of the top of the newly-created stack. This B register, as specified in the N field, functions as a temporary STKT register. Together the M field and N field comprise what is designated an address syllable.

FIG. 13(d) illustrates the instruction format for the relinquish (RLQ) macroinstruction wherein the N field designates which B register within the BRAM stores the address of the top of the stack to be relinquished.

FIG. 13(e) illustrates the instruction format for the modify field length (MFL) macroinstruction which, when executed, causes the size of the current stack frame to be increased or decreased. The M field specifies the D register in DRAM which stores an indication of the number of words by which the frame size is to be modified. If the quantity in the D register is negative, the size of the current stack will be reduced, whereas if the quantity is positive the size of the current stack will be increased.

FIG. 13(f) relates to stack operations performed in response to different address syllables and the meanings of the format of FIG. 13(f) will be discussed further in this specification.

4. Detailed Description of System Operation

The following will describe in detail the operation of the stack mechanism to perform both indexing within a current stack frame and to execute the above-described macroinstructions. In the preferred embodiment, the control store 80 & 81 (FIG. 2) includes a sequence of firmware instrustion which are executed by the stack mechanism to perform stack indexing and macroinstruction execution. A listing of exemplar firmware for use by the stack mechanism is attached as an Appendix to this specification. In explaining the operation of the stack mechanism as illustrated by the flowcharts of FIGS. 14–23, the line numbers of the firmware instructions pertinent to the functional operations illustrated in the diagrammed steps of the flowcharts are written next to the flowchart boxes. This will enable one of ordinary skill in the art to practice the invention having been apprised of the structure of the stack mechanism by means of the foregoing description relevant to FIGS. 1–13.

Figure 14:
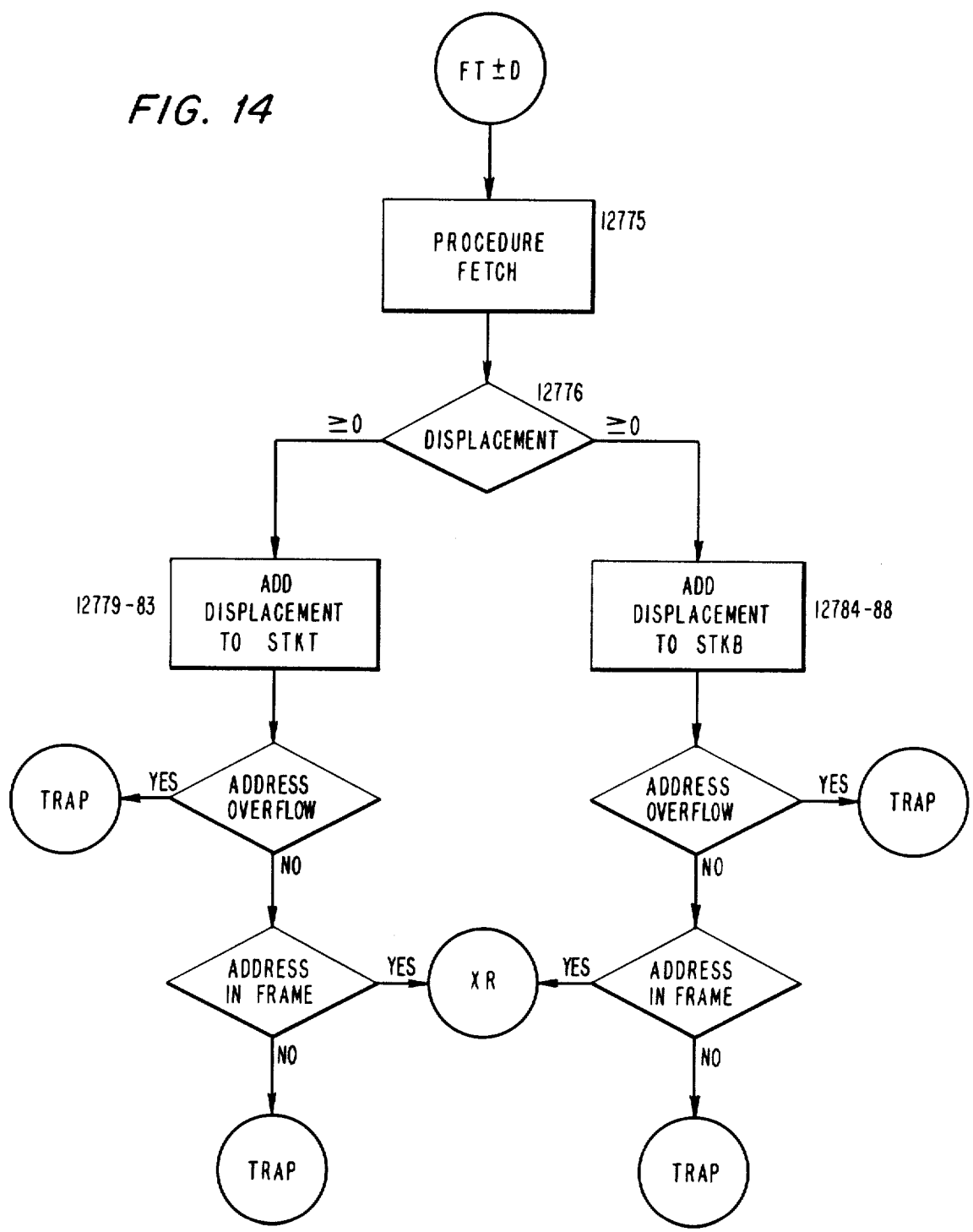
FIGS. 14–23 illustrate in a flowchart form the operation of the stack mechanism of the instant invention.
Figure 15:
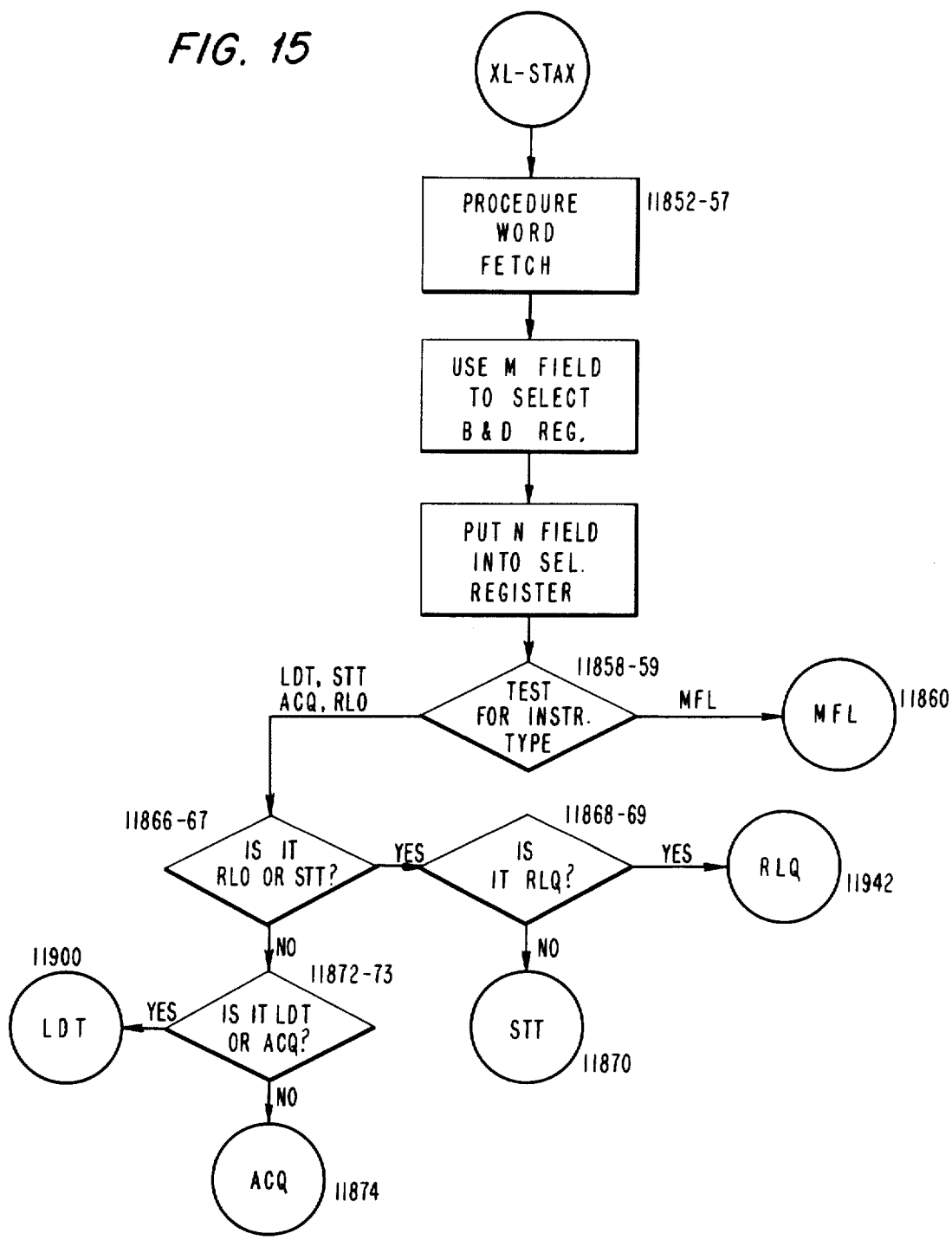

As discussed above, displacement within a current stack frame can be relative to either the top of the stack frame or the bottom of the stack frame. When indexing relative to the top of the stack frame, a positive displacement is added to the values stored in the STKT register and when indexing from the bottom of the stack frame, a negative value is added to the content of the STKB register. As illustrated in FIG. 14, displacement addressing within a stack frame is initiated by doing a one-word procedure fetch to obtain from memory the value of the displacement. The procedure word is transferred into the procedure data multiplexer 40, signed extended and admitted to the inner (I) bus. From the I bus, it is transferred via the DALU into register E0 (DRAM) where it is stored. During the transfer, bit 16 of the displacement, which is the sign bit, is tested for ONE or ZERO. A ZERO indicates a positive or zero displacement and the left branch of a flow diagram of FIG. 14 will be taken. If the displacement is negative, as indicated by the sign bit being equal to ONE, the right branch of FIG. 14 will be taken.

If the displacment is positive, then it must be added to the content of the STKT register. This is accomplished by adding the contents of E0 to the contents of STKT and storing the result in E0. An address overflow test is performed to see whether a carry resulted from addition (which would indicate that the resulting address had overflowed or lost significance). This is accomplished by the contents of the E0 register being enabled to the R bus and the contents of the STKT register being enabled to the I bus. An addition is performed in the DALU and the result is stored back into E0. A trap or firmware error routine will be executed if a carry occurred due to that addition.

If no carry occurred, then a test is performed to see whether the resulting address is stored within the current frame. This is accomplished by transferring the contents of the STKB register to the I bus, transferring the contents of register E0 to the R bus, and conditioning the DALU to subtract the I bus from the R bus. Once again, the carry bit is tested and if a carry occurred, then the address stored in E0 is larger than the address stored in the STKB register and an attempt has been made to reference out of the current stack frame. A trap will be performed under this condition.

If no carry occurred, then the contents of register E0 is transferred, via the R bus, W bus, and BALU, into the Y register and the next operand is read. The Y register serves as the read/write address register for the CPU of FIG. 2. It is transferred to the local bus 9 by means of the address multiplexer 25. If a carry has resulted, then the address in E0 must be compared to the address in the STKT register to make sure that reference is not being attempted outside of the current stack frame. This test is performed as follows. The contents of the STKT register is admitted to the I bus and the contents of the E0 is admitted to the R bus. The DALU is enabled to subtract the I bus from the R bus and the carry output is tested. If no carry has occurred, then the address stored in E0 is smaller than the address stored in the STKT register, and addressing will occur outside of the current stack frame. This will again cause the transfer to a firmware error routine. If a carry does occur, then the address in E0 is within the bounds of the current stack frame and will be admitted to the Y register by means of the R bus, W bus and BALU to provide the address for an operand read.

The following will be a description of the operation of the stack mechanism in response to the five macroinstructions set forth in FIGS. 13(a)-13(e). As illustrated in these figures, the generic instruction, i.e., the first word of each of the macroinstructions is identical and the instructions are distinguished from each other by means of the contents of the second instruction word. This process is accomplished by first initiating a procedure word fetch to acquire this second data word. A word of procedure is thereby retrieved from memory and transferred into register E1 of DRAM 11. Similtaneously, the contents of register E1 are enabled to R-bus 13, shifted right four positions, and transferred into the AS' register 42 by means of selector 20, O-bus 17, shifter 19, and Write (W) bus 84.

The contents of the AS' register are transferred to select-modify (SEL) unit 53 through register 38. The SEL register 53, therefore, contains bits 8-11 of the second word of the instruction. The contents of E1 are again transferred to the AS' register so that the AS' register contains bits 8-15 of the second word of the instruction. Next, the m field of the instruction as stored in the SEL register selects one of the B registers and the contents stored in the selected B register are transferred to the Y register. Simultaneously, the M field as stored in the SEL register is employed to select a D register and the DRAM. The contents of this register are transferred to Q register 50. In the case of an LDT macroinstruction SEL will be equal to 1-7 and, therefore, registers B1-B7 will be selected. Similarly, in the case of an ACQ instruction one of the registers D1-D7 will be selected. Registers D1-D7 are also employed by the MFL instruction.

Following the selection of the B and D registers indicated by the m field, the same procedure is performed using the n field to select BRAM and DRAM registers.

The next task is to determine what type of macroinstruction has just been read. First, the contents of register E1 are copied into register A0 and a logical AND is performed with the constant FF88 in the DALU. The result is stored in E1 and enabled through the write bus where it is zero tested. This zero test separates the MFL macroinstruction from the LDT, STT, ACQ, and RLQ because only the MFL instruction will have bit 12 equal to ONE.

If the identified instruction is an LDT, STT, ACQ, or RLQ, the constant FFF0 will be enabled to the D bus, the contents of register A0 will be enabled to the R bus, and the DALU will add the R bus and I bus together and store the contents in the A0 and Y registers. If no carry is generated, the instruction is either an RLQ or an STT. Finally, another check will be made of the SEL register for zero or non-zero. Since the n field of the STT instruction is always zero and the n field of the RLQ macroinstruction is always non-zero this test will identify whether an RLQ or an STT instruction has been read.

If a carry was generated, then the instruction just read is either an LDT or ACQ. The n field of an LDT macroinstruction is always equal to zero and the n field of an ACQ macroinstruction is always non-zero. Thus, a test of the SEL register will identify the instruction as either an LDT or an ACQ.

Figure 16:
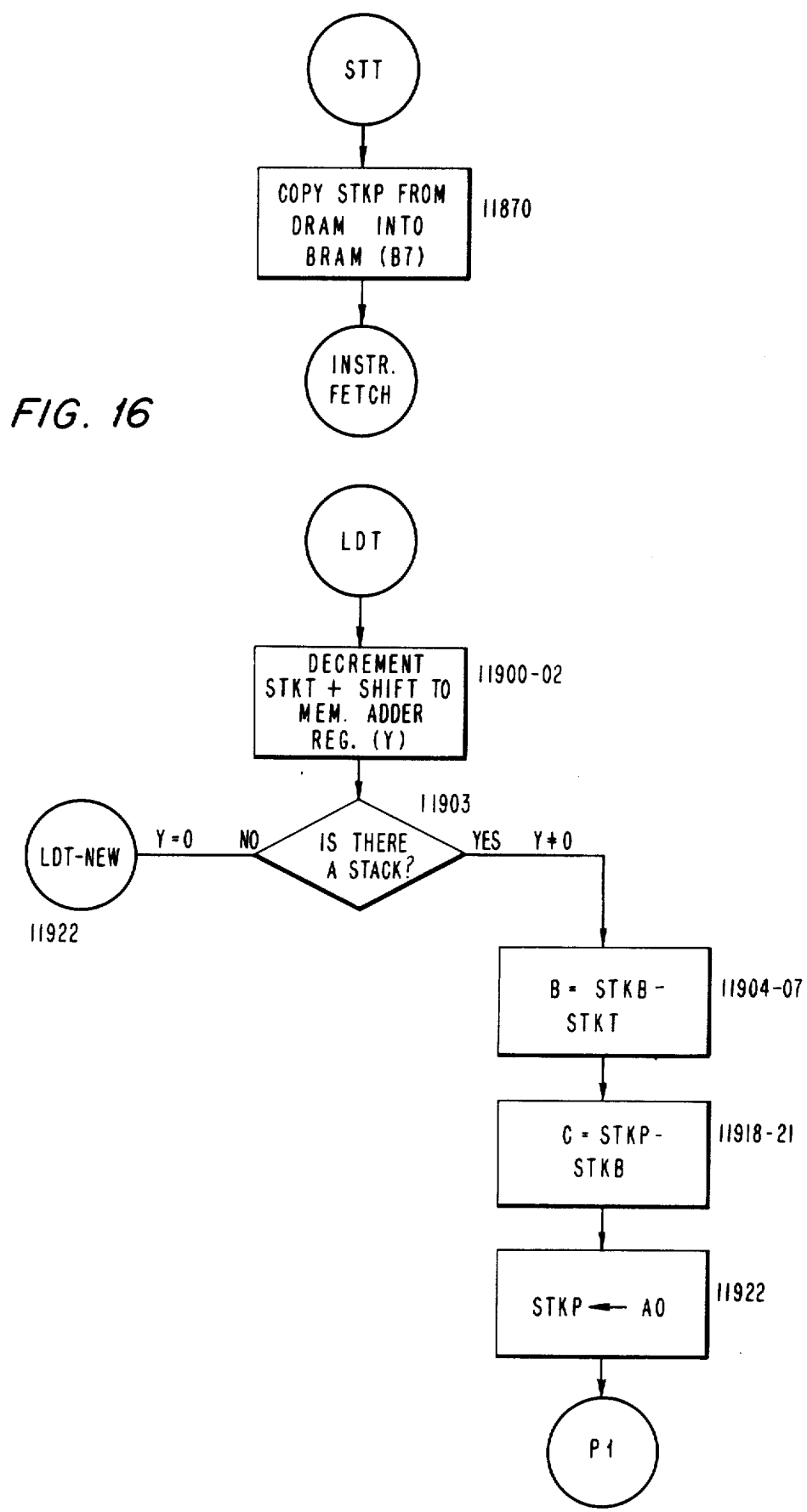

The top of FIG. 16 illustrates that the only step performed in response to an STT macroinstruction is to copy the contents of the STKP register from the DRAM into the BRAM register B7. After this operation, the next address will be calculated and a fetch of the next instruction will be performed.

The contents of the STKP register are transferred to the BRAM by enabling the contents of the STKP register to the R bus and the R bus to the Write bus 84. From the Write bus, the contents are transferred into register B7 of BRAM 12.

Figure 17:
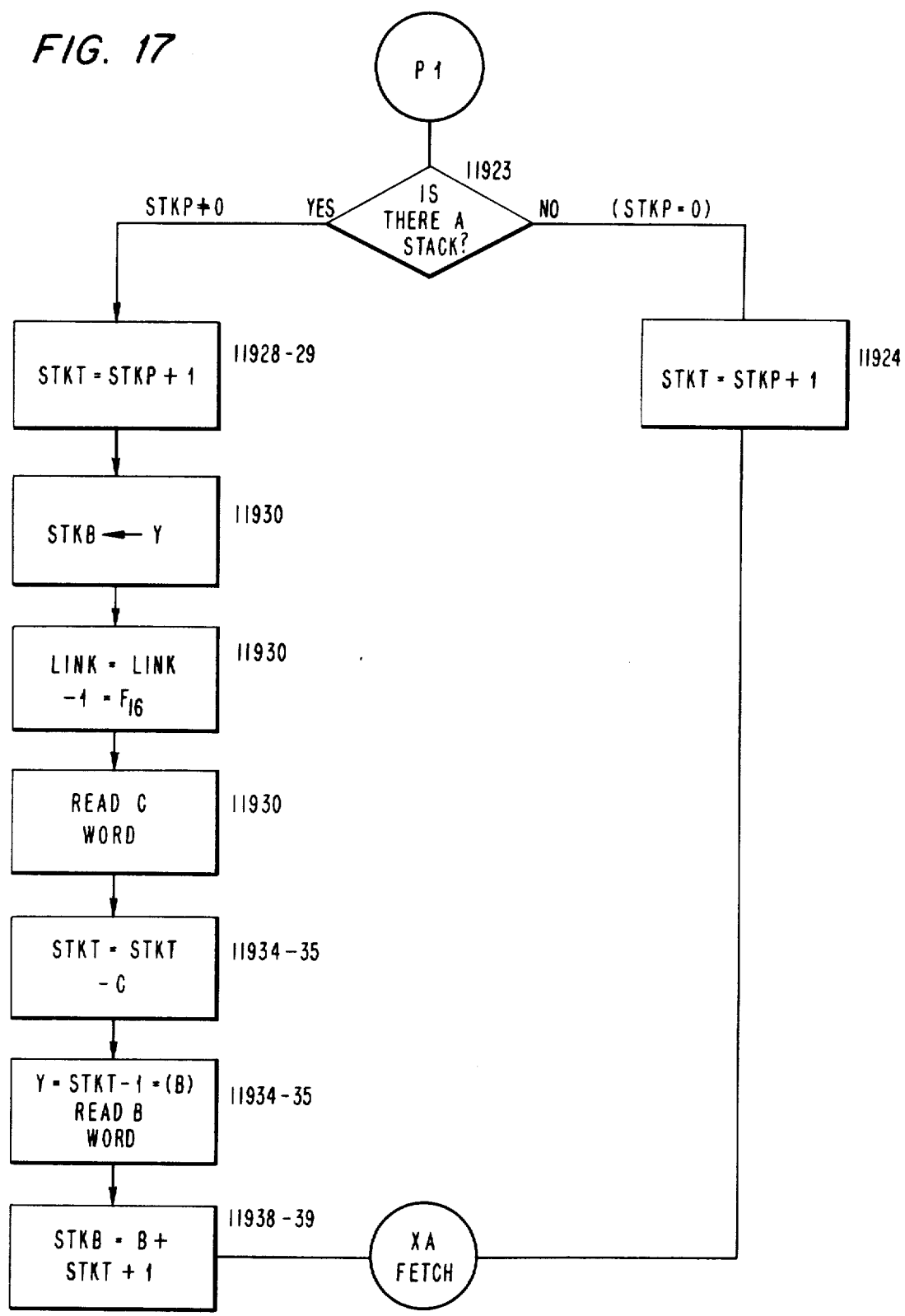

The functionality for performing an LDT macroinstruction is set forth in the procedure illustrated at the bottom of FIG. 16 and in FIG. 17. As stated above, the LDT macroinstruction necessitates an update of the c-word of the current stack, the b-word of the top frame of the current stack, the reloading of the STKP register, and the loading of new values, pointing to the new stack, into the STKT and STKB registers. The firmware instructions performed in response to an LDT macroinstruction begin at line number 11,900 and are common to three different macroinstructions. The LDT macroinstruction will enter this firmware with the n field and link field equal to zero, the LEV instruction, which does not comprise a part of this invention but is employed to monitor the loading of stacks, will have the n field equal to zero and link field equal to six, and the ACQ macroinstruction will have n equal to 1–7 and link equal to zero. The different values for the n field and link field cause each of these three macroinstructions to generate different results from the same firmware instructions.

In response to the LDT macroinstruction, the contents of the STKT register are enabled to the R bus and decremented and shifted, as indicated in FIG. 16, and if there is a stack, the operations in FIG. 16, and particularly in lines 11903–907 of the Appendix, are executed.

Next, the contents of the STKP register are copied into the Y register and the difference between the contents of the STKP register and the STKB register is calculated in the DALU and transferred to the write register through the R bus, O bus, and write bus. The contents of the write register then reflect the new value for the c-word of the old stack and the Y register contains the address of the c-word in memory. A memory write is performed and at this point the b-word and the c-word have been updated in the stack as stored in main memory.

Next, the contents of register A0, which contains the new stack pointer, are copied into the STKP register. Simultaneously, this value is transferred via the R bus to the O bus where it is tested for ZERO. This test is to determine whether or not there is a new stack as will be indicated by the new contents of the STKP register being zero or non-zero, respectively.

If no stack exists the contents of the STKP register are incremented by one and stored in the STKT register. The values of these two registers then reflect the no stack condition as shown in FIG. 11(f) and a branch is then made to the XA procedure for calculating the address of the next instruction.

If there is a stack, STKP will not be zero and the contents of the STKP register are copied into the Y register. In addition, the contents of the STKP register are incremented by one and stored in the STKT register. The Y register 24 now points to the c-word for the new stack.

Next, the stack mechanism, in executing an LDT macroinstruction, reads the new c-word. Simultaneously, the contents of the Y register are transferred into the STKB register and the value of the link field in register 38 is decremented by one. As previously explained, the link value for an LDT macroinstruction is initially zero and, therefore, decrementing it by one causes the link field in register 38 to be equal to a hexadecimal F (minus 1 modulo 16). A stall is then executed until the requested data is transferred from memory. The returning data is subtracted from the contents of the STKT register and stored as the new value for the STKT register. Since the STKT register contained the value of the stack pointer plus one, the difference between the contents of the STKT register and the just-read c-word is the correct value for addressing the new top frame of the new stack and, therefore, it is stored in the STKT register. At this point the STKP register and STKT register contain the correct contents for the new frame in the stack.

The new contents in the STKT register are decremented by ONE and stored in the Y register so that the Y register now contains the address of the b-word for the new stack. A read of the b-word is performed and the returning data is sign extended and enabled to the I bus. The contents of the STKB register is enabled through the R bus and is incremented by the sum of ONE and the value of the b-word on the I bus. The result is stored in the STKB register. Since the previous contents of the STKB register were equal to the contents of the STKT register, adding the returning b-word and ONE results in the new value stored in the STKB register being the address of the first location below the current frame in the stack. At this point, the contents of the STKP, STKT, and STKB registers have all been updated and the LDT macroinstruction fully performed.

Figure 18:
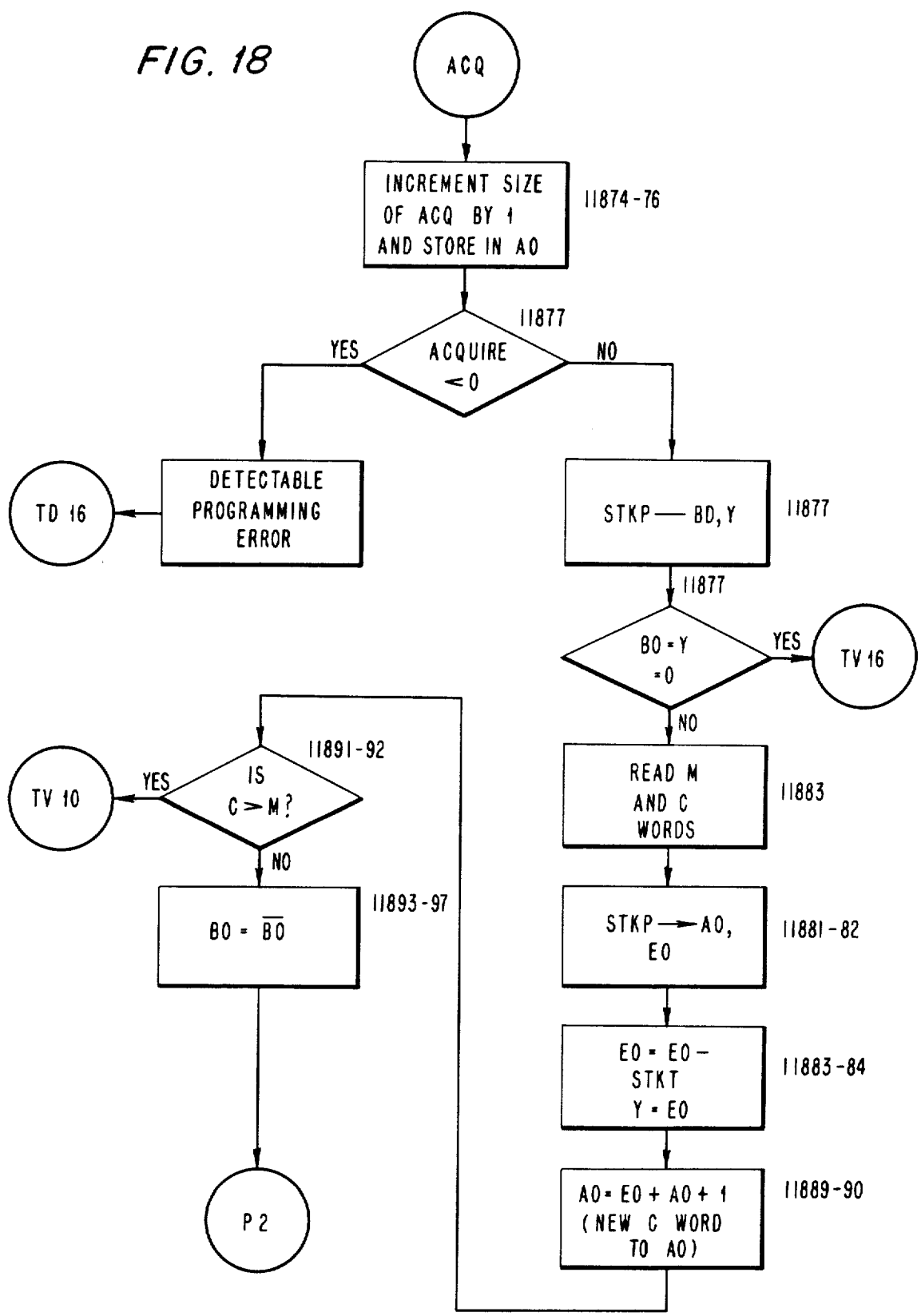
Figure 19:
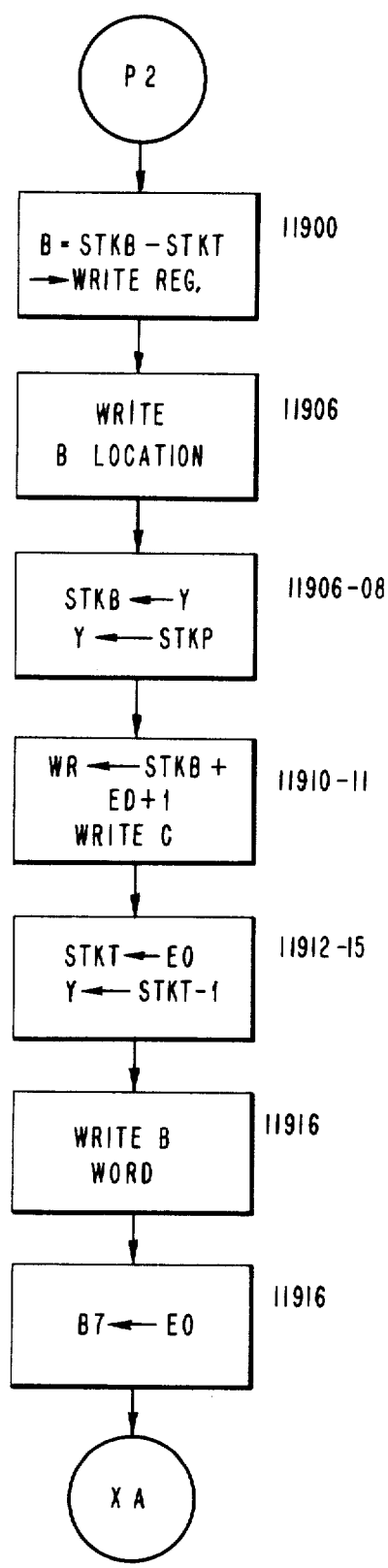
Figure 20:
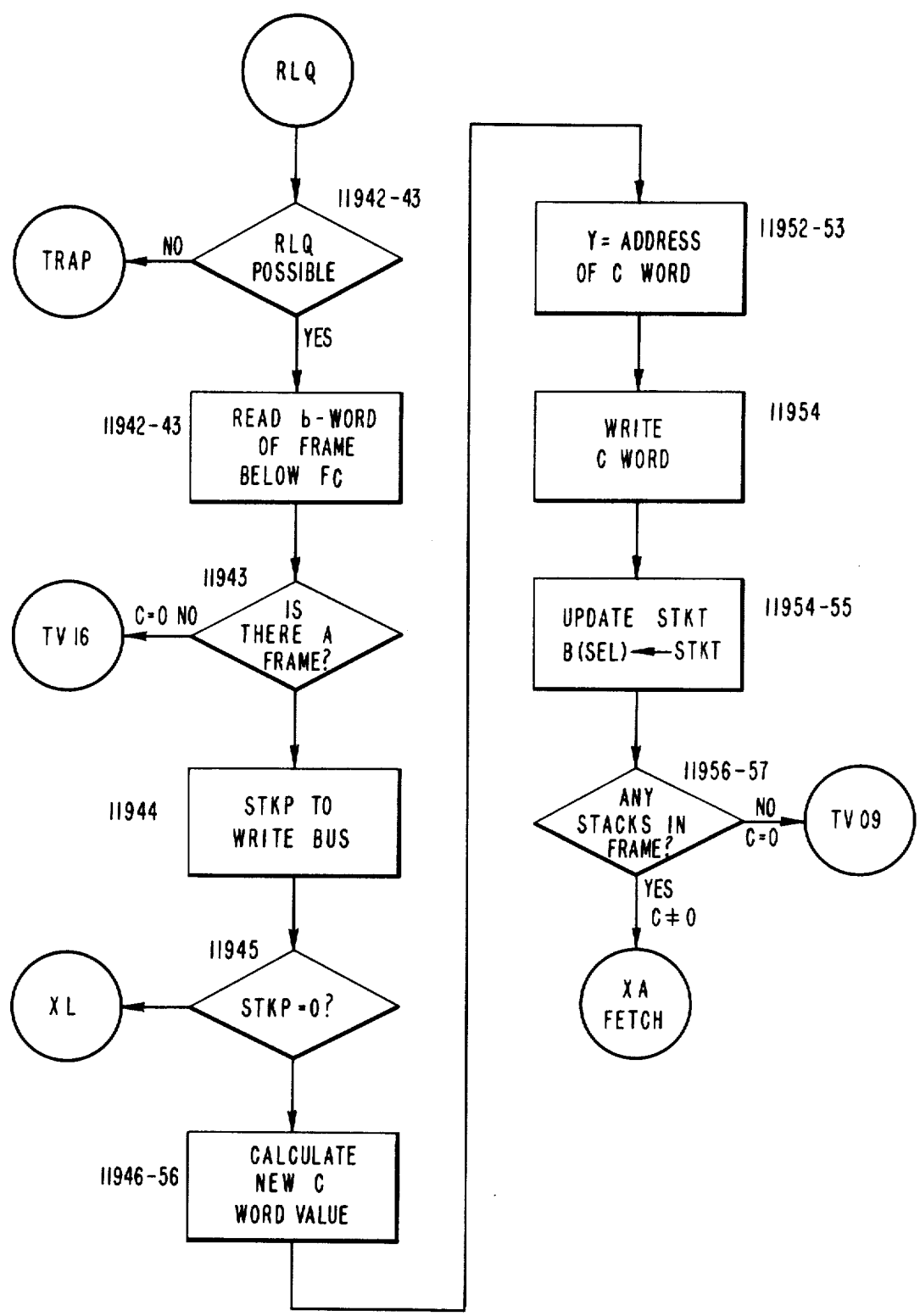

Referring to FIG. 18 and 19 the following firmware instructions are performed by the stack mechanism in response to an ACQ macroinstruction. First, the size of the frame to be acquired, as stored in register A0, is incremented by 1 and stored in the A0 register. Next, bit 16 of this incremented quantity is tested for 0. If it is not 0, then the quantity is negative and an attempt is being made to acquire a new stack frame with a negative number of locations. This is a detectable programming error and a forced branch is made to a firmware routine for reporting the error.

IF the size of the acquire was positive, i.e., a positive number of words has been designated for the size of the new current stack frame, a copy of the contents of the STKP register is stored in the B0 register and in the Y register. At the same time, the transferred value is tested for ZERO, and if it is ZERO, an acquire is being attempted for a non-existent stack. In such a case, a branch is made to the firmware routine for reporting a detectable programming error.

If the stack does exist, a memory read is initiated to obtain the C word and the M word for the current stack. Since the address register, Y, contains a copy of the contents of the STKP register, this read will return the C and M words.

It must be determined, when performing an acquire, whether the adding of the acquired frame to the stack will result in a stack overflow. This is accomplished by transferring the contents of the AO register to the EO register in the DRAM, storing the contents of the Y register into the AO register of the BRAM, and incrementing the value of Y. Register EO now conatins a value which is one more than the size of the acquire, register AO contains a copy of the contents of the STKP register, and the Y register stores the address one less than the address stored in the STKP register.

Next, the contents of the STKT register are enabled to the I bus and the contents of the EO register are enabled to the R bus. A subtraction of the I bus from the R bus is performed in the DALU and the contents are stored in the EO register. A stall is executed until the requested data is returned. Simultaneously, the contents of the AO and EO registers are added together and stored in the AO register. This places the new value of the C word into BRAM register AO.

The returning data is sign extended and admitted to the I bus. The contents of the AO register are admitted to the R bus and a substration of the I bus from the R bus is performed by the DALU. This is a comparison of the C word for the stack with the M word of the stack and, if the new c word is larger in value than the M word, a carry will occur in the substraction and a branch will be forced to a firmware trap routine to report a stack overflow. If no stack overflow occurs, then the C word is less than or equal to the M word and this acquire can be satisfactorily performed. The contents of the BO register are complemented and a branch is made to the previously explained firmware associated with the LDT macroinstruction.

As explained above, the performance of the firmware associated with a LDT macroinstruction will be different when it is being performed in response to an ACQ macroinstruction. When it is being performed in response to an ACQ macroinstruction, it is required to update the b-location for the current frame and the C word for the stack. The new b-word associated with the acquired stack frame must be written into memory. At the point of entry of the LDT firmware from the ACQ firmware, register EO contains the new value of the stack pointer to be stored in the STKT register.

Upon entering the LDT firmware, the contents of the STKT register are complemented and stored in the E2 register of the DRAM. This value is also decremented by 1 and copied into the Y register with the result that the contents of the Y register comprise the address of the b-word for the previous top frame. The value for the b-word of the previous top frame is then computed by subtracting from the contents of the STKB register the contents of the STKT register and storing the difference in the write data register 28. This is accomplished by enabling the contents of the STKB register to the I bus, enabling the contents of the E2 register (the complement of the contents of the STKT register) to the R bus, adding the R bus and the I bus together plus 1. This sum is enabled to the output data register 28 through the DALU and Write bus. A memory write is performed and the b-word of the previous top stack frame is updated.

Next, the C word of the stack must be updated. The C word takes on the value of the contents of the STKP register minus the contents of the BO register minus 1. This calculation is made in the following manner. After writing the b-word, the contents of the Y register are stored in the STKB register. The contents of the EO register are enabled to the R bus and decremented by 1 and stored back in EO. Next, assuming that the stack exists, the contents of the BO register are enabled to the I bus and the contents of the STKP register are enabled to the R bus. The I bus is subtracted from the R bus by the DALU and enabled through the Write bus to the output data register 28. Again, a memory write is performed and the address register (the Y register) contains the address of the C word in memory. Following the update of the b-word associated with the previous top stack frame and the C word for the stack, the b-word for the current stack frame just acquired must be written into memory. The b-word associated with this current stack frame is equal to the sum of the contents of the STKB register, the EO register and 1. Since EO contains the complement of the new contents of the STKT register, this calculation is in effect equal to one less than the difference between the contents of the STKB register and the STKT register.

The calculation is performed as follows. The contents of the STKB register are enabled to the I bus and the contents of EO are enabled to the R bus. The R bus and I bus are added together by the DALU and enabled to the Write bus. Next, the contents of the EO register are enabled to the R bus and complemented by the DALU. The output of the DALU is enabled to the Write bus and stored in the STKT register. Next, the BALU performs a subtraction of 1 from the value on the Write bus and the output of the BALU is transferred to the Y register and a memory write is performed. The contents of the EO register are enabled to the R bus and complemented by the DALU. The output of the DALU is enabled to the Write bus and stored in register B1-B7, as controlled by the contents of the FN register 38.

This ends the firmware instructions performed in response to an ACQ macroinstruction. The STKT register contains the address of the most recently stored operand in the current stack frame and the Y register contains the address of the b-word for the newly-acquired current stack frame.

The RLQ macroinstruction when performed by the stack mechanism of the instant invention, removes the current stack frame from the stack. This is performed as follows. First, with reference to FIG. 20, a memory read is performed to access the b-word of the frame below the current stack frame. At the same time, a test is conducted to see whether a frame exists in the stack. This is accomplished by calculating the difference between the contents of the stack pointer register STKP and the stack top pointer register, STKT. If no carry occurs from this subtraction, that means that the C value for the stack is 0 and no frames exist therein. Under such conditions a branch is made to a firmware trap routine. If a carry has occurred, then another test for 0 conducted to determine whether the stack exists. If the contents of the STKP register are 0, then the firmware instructions for updating the C word and the stack registers will not be executed.

Assuming that a stack does exist, the new value of the C word must be calculated and stored in the STKB register and the write register. This is accomplished by enabling the contents of the STKB register to the I bus and the contents of the STKB register to the R bus. A subtraction of the I bus from the R bus is conducted in the DALU and the output is enabled to the write bus and the Q register. The output of the write bus is transferred to the STKB register and to the data output register. Next, the data returned in response to the read request is sign extended and transferred to the I bus. This value is the b-word for the frame which was next to the current stack frame.

The received data word is transmitted to the I bus wherein it is added to the contents of the EO register by the DALU. The EO register contains the previous contents of the STKB register incremented by 1 so that the resultant sum is the new value to be stored in the STKB register. This is accomplished by enabling the output of the DALU to the STKB register in the BRAM by means of the O bus and the write bus.

Next, the address of the C word is copied from the STKP register into the Y register 24 and the newly calculated value of the C word is written into memory by means of a write instruction. Simultaneously, the contents of EO are transferred into the STKT register in the BRAM through the R bus, 0 bus, and Write bus. The same value is transferred to one of the B registers in the BRAM as selected by the n field of the RLQ macroinstruction.

The previously stored contents of the Q register are emitted to the Write bus through the I bus, DALU, and O bus and the value thereof is checked for 0. Since the contents of the Q register reflect the new value for the C word of the stack, if it is 0, then the last frame in the stack has been relinquised and a forced transfer to a firmware routine is executed to report the transferring of the last frame in the stack. If the last frame has not just been relinquished, then the address of the next operand is generated and a fetch of the next instruction is performed.

Figure 21:
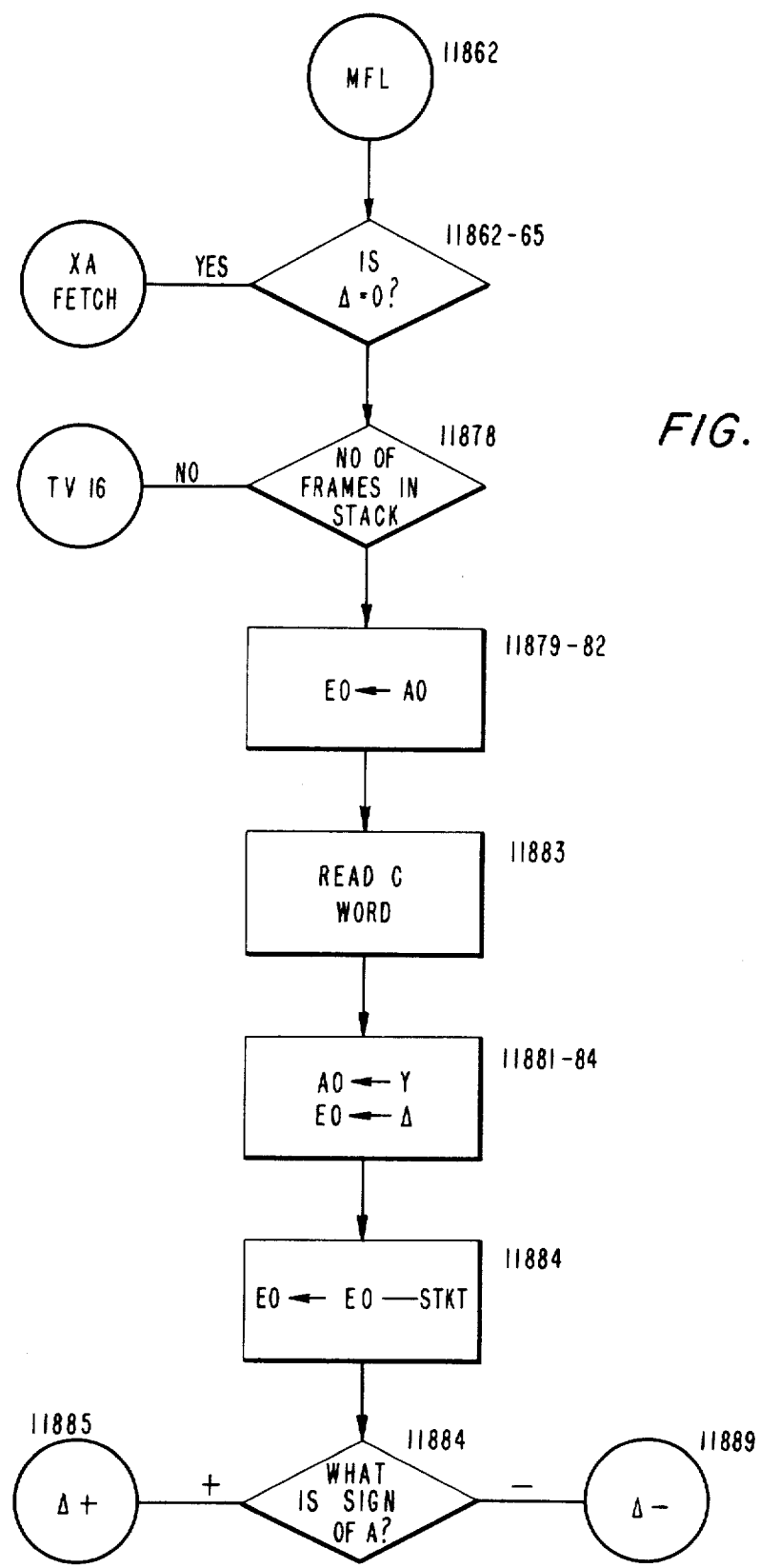
Figure 22:
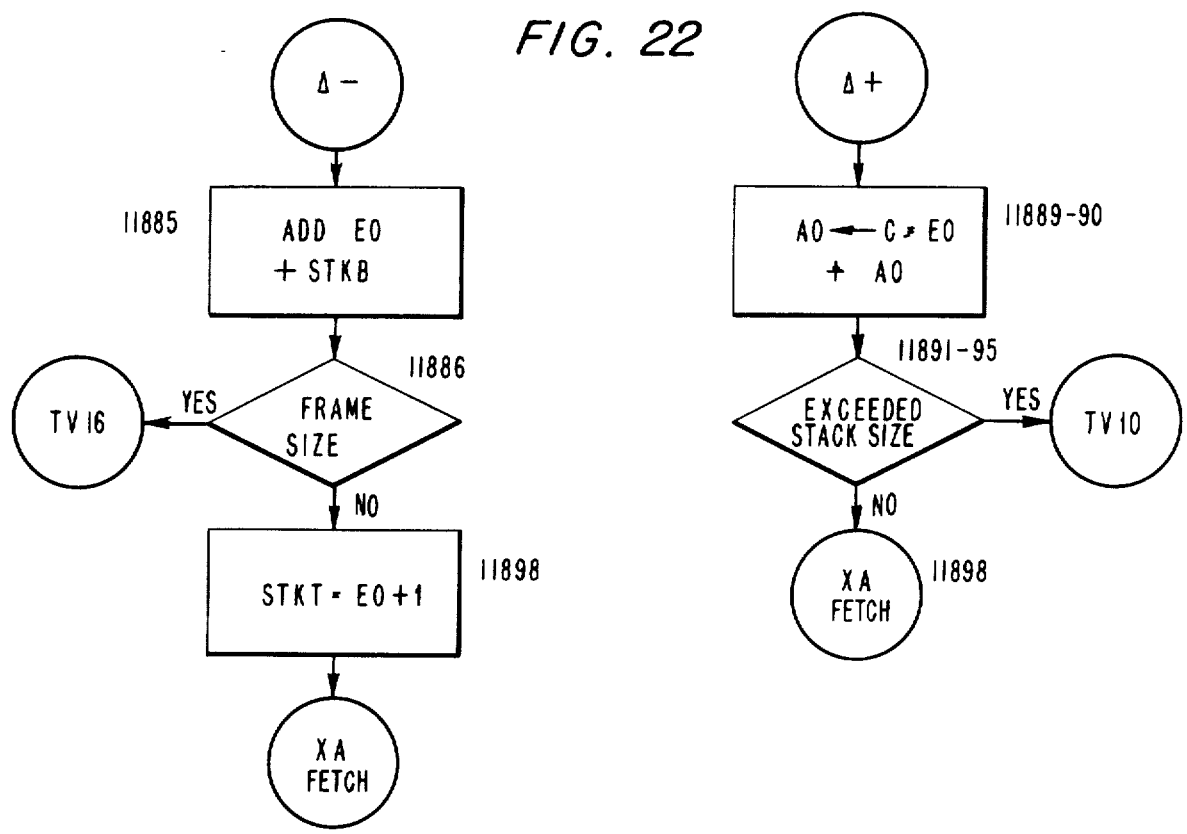

The operation of the stack mechanism of the instant invention is response to a MFL macroinstruction is illustrated in FIGS. 21 and 22. As stated above, the MFL macroinstruction can be employed to either increase or decrease the number of entries in the current stack frame. To implement the MFL macroinstruction, it must be first determined whether the change in frame size is positive, negative, or 0. If it is 0, then the instruction is treated as a no-op. If it is positive or negative, processing of the MFL macroinstruction continues.

Initially, the Q register specifies the number of words to be added or subtracted to the current stack frame. The contents of the Q register are enabled to the I bus and from the I bus to the DALU which implements their storing in the KO register. The contents of the KO register are then enabled to the R bus, W bus, and stored in the AO register. If the value transferred to the AO register is not equal to 0, then a positive or negative change in the frame size of the current stack frame is indicated.

Next, it is determined whether a stack containing at least one stack frame exists. This is performed by enabling the contents of the STKT register to the I bus and the STKP register to the R bus. The I bus is subtracted from the R bus by the DALU and the output of the DALU is enabled to the Write bus. From the Write bus it is enabled to the BALU and stored in the address register Y. If no carry occurs, then the contents of the STKT register have been determined to be greater than the contents of the STKP register which can only occur when either no stack or a stack with no frames exists. Such a situation results in a forced jump to a firmware trap routine.

If a carry did occur, then a stack with a frame exists and operation continues by setting the contents of the EO register equal to the contents of the AO register. Similarly, the contents of the Y register are enabled to the write bus and transferred to the AO register. The Y register is incremented and a memory read is performed. This memory read accesses the M word associated with the stack to enable a check to be made to determine whether a MFL macroinstruction increasing the size of the current stack has resulted in a stack overflow.

Meanwhile, the contents of the STKT register are enabled to the I bus and the contents of the EO register are enabled to the R bus. The DALU performs a subtraction of the I bus from the R bus and stores the result in the EO register. The effect of such an operation is to put the complement of the new contents of the STKT register into the EO register. A test is then performed to see whether the delta (change in size of the current stack frame) is positive (makes the stack frame layer) or negative (makes the stack frame smaller).

If the delta is negative, the contents of the STKB register are enabled to the I bus and the contents of the EO register are enabled to the R bus. The DALU adds the R bus and the I bus together and a test is conducted to see whether a carry has occurred. If a carry has occurred, then an attempt has been made to decrease the size of the current stack frame by an amount greater than its original size. This is an error and a forced branch is taken to a firmware error routine.

If a carry has occurred, the contents of EO are complemented by the DALU and stored back in the EO register the contents of the STKT register are copied into Y register 24, and the contents of the EO register are incremented by 1 and stored in the STKT register. The processing of the MFL macroinstruction to reduce the size of the current stack frame is then completed.

If the delta was positive, the contents of the AO register are enabled to the I bus and the contents of the EO register are enabled to the R bus. The DALU adds the I bus and the R bus together plus 1 and stores the result in the AO register by means of the Write bus. The returning data word is zero extended and transferred to the I bus and AO is enabled to the R bus. A subtraction of the I bus from the R bus minus 1 is performed in the DALU and a check is conducted for a carry. If a carry has occurred, then the MFL macroinstruction has caused a stack overflow and a forced branch is made to the firmware error routines. If no carry occurs, the contents of the EO register is enabled to the R bus and complemented by the DALU. The output of the DALU is enabled to the EO register and to the Write bus. The Write bus is then enabled to the BO register and the newly stored contents of the BO register are incremented by 1 by the BALU and stored in the Y register.

In sum, the MFL macroinstruction, when executed with a positive or negative delta that does not result in stack overflow or frame underflow, operates to change the value of the STKT register to address a different entry in the current stack frame.

Referring back to FIGS. 13(a)–13(g), the least significant seven bits of the first data word for each operation comprise the address syllable (ASI). Further, as illustrated in FIG. 13(g), if the seven bits of ASI 5C, then, bits 9–15 of the next data word contain a different address syllable, (AS2/3). Bit eight of the second data word selects between the two address syllables, AS2 and AS3.

Of particular interest to the instant invention is an address syllable format which is interpreted to control the operation of the stack mechanism. If the most significant seven bits of the first data words specify an m field of five and an n field of eight. If m equals five and n equals eight then a frame top push-pop operation is specified. If bits 9–15 of the first data word are the hexadecimal value 5C, and bits 8–15 of the next data word are $CC_{16}$, then an indirect frame top pop operation is specified.

A frame-top (FT) push-pop causes the stack mechanism to modify the content of the STKT register by the size of the current operand. If the operation specifies a read operation such as a Load or an Add, then a pop or removal of the operand from the current stack frame will take place after the operand has been read. If the operation specifies a write operation such as a Store or a Clear then a push or store of the operand will be performed by increasing the size of the current stack frame and adding the operand to the stack.

The indirect FT pop means that the top operand in the current stack frame is the address of a location containing the instruction operand in the current stack frame and that after accessing that operand, that address will be popped or removed from the stack frame.

Figure 23:
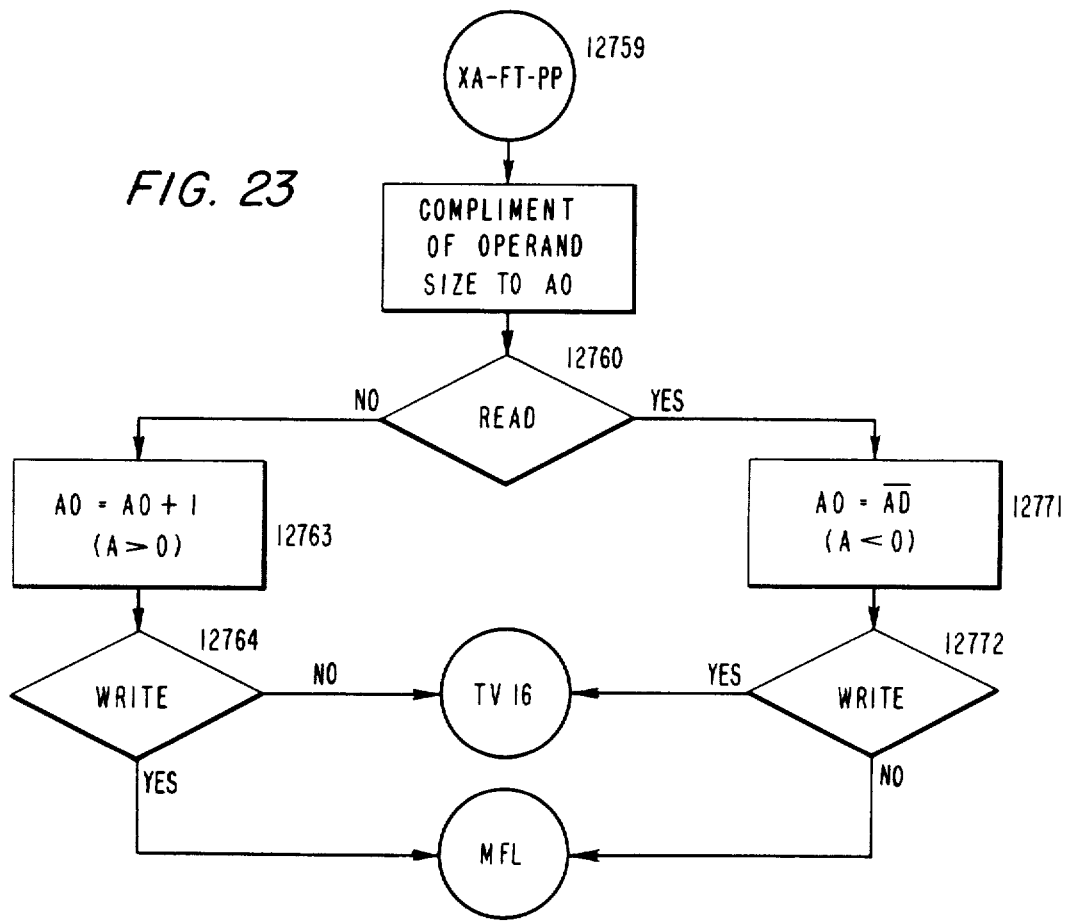
Figure 24:
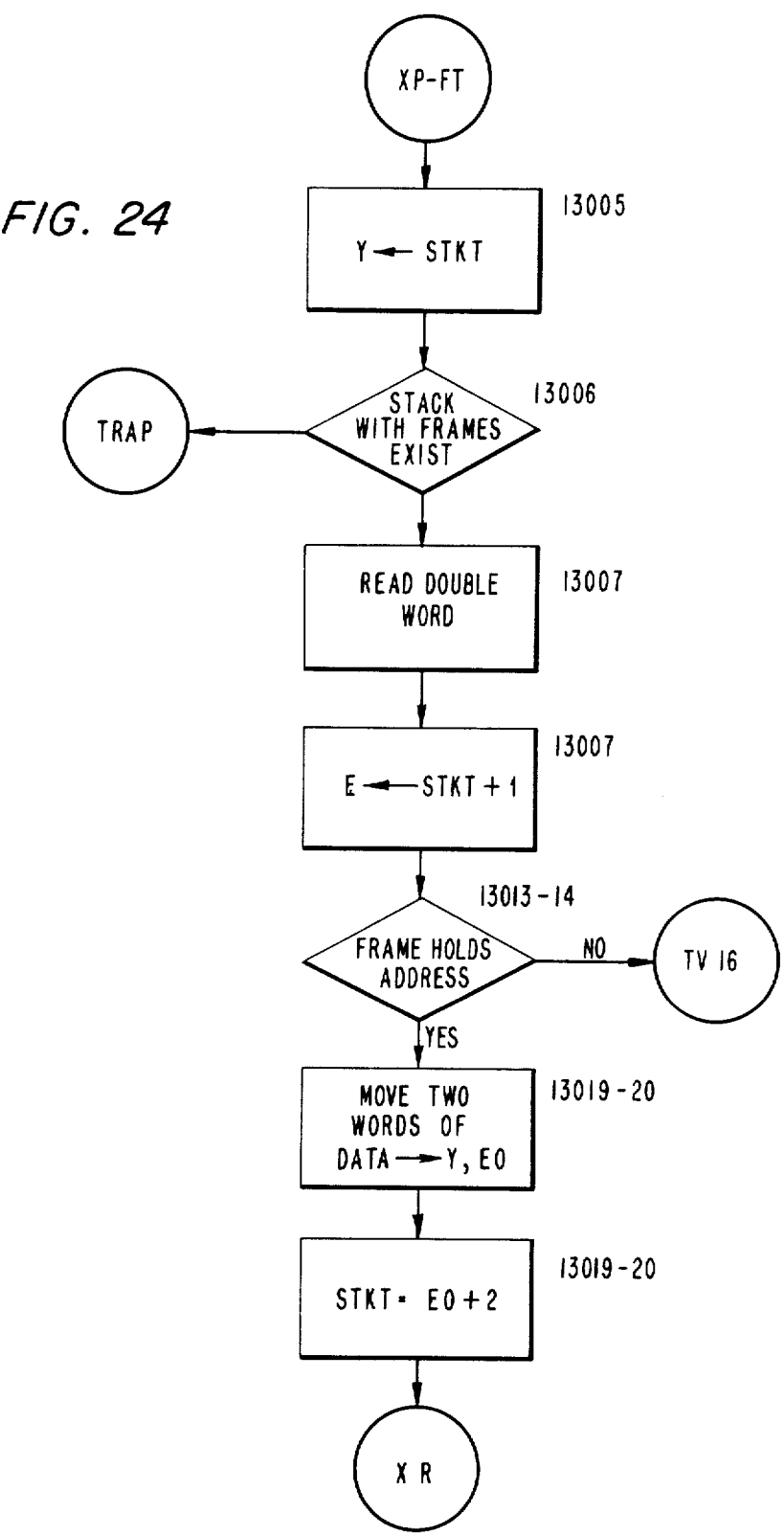

FIG. 23 illustrates the operation of the stack mechanism when the address syllable specifies an FT-push pop operation. In this operation, a three-bit code specifies the number of words required by the current operand. For example, the code is equal to 1 whenever the operands's size is less than or equal to one word, a double word operation is associated with the code value of 2 and a quad-word operation is associated with a code value of 4. The operand size code is one of the quantities emitted to the I bus as a result of the previously discussed I bus field in the control word.

The functionality of the operations performed by the stack mechanism of the instant invention is response to a FT push-pop address syllable is illustrated in FIG. 23. First, a complement of the operand's size is stored in the A0 register. This is performed by enabling the operand size, KWOS, to the I bus and complementing the I bus contents by the DALU. The DALU output is transferred to the W bus and stored in register A0. Next, it is determined whether the operand is a read or write by testing one of the two bits of the operation type outputs in the CPU. If it is a write operation the contents of A0 are incremented by one and stored in A0. If a read operation is specified then the complement of A0 is transmitted to A0. The effect of these operations is to make the operand size for a read operation negative and the sign of the operand size for a non-read operand positive.

If the operand was determined not to be a read, it is tested to see if it is a write operation. If it is a write operation then the stack mechanism performs the operations associated with the MFL macroinstructions. If it is not a read or write operation then a forced branch is made to a firmware error routine.

It if was a read operation then it is checked to see if it was a read/write operation. If it is, then it is a special class of operation which will push or pop 23 words on or off the stack, and the complement of 23 is stored in A0, after which the bit of the upcode distinguishing push from pop and the contents of A0 are either complemented or incremented before performing an MFL operation. If it is not a read/write operation then a branch is taken to perform the firmware operations associated with the MFL macroinstructions.

If a branch is made to the firmware associated with the MFL macroinstruction, then processing will be performed by the stack mechanism in the above-described manner. The stack mechanism will calculate a new value for the STKT register, a new value for the C word, increase or decrease the current stack frame size, and the occurrence of any of the previously explained error conditions such as trying to increase the size of the current stack frame beyond the maximum size for the stack will be recognized.

The only difference in the execution of the previously explained firmware corresponding to the MFL macroinstruction will be in the situation that the operand is not a read operand. Thus, at line 1189g of the attached firmware listing, the new value of the stack top pointer as stored in register EO will be incremented in the DALU and stored in the STKT register. The subsequent test for SEL bein equal to zero will be true and the XR branch will be taken to read the next operand.

If a read is specified by the operand then in line SEL will be found to be equal to zero and a branch will be taken to read the next operand. Upon exiting the firmware associated with the MFL macroinstructions when the FT push-pop is indicated, all of the stack registers will be updated and the Y register will contain the address of the next operand location to be read.

The frame size of the current stack frame is altered in response to the indirect FT pop in the following manner. The contents of the STKT register are copied into the Y register such that the Y register contains the address of the location that stores the indirect address, i.e., the address to be used to access the operand. Simultaneously, contents of the STKP register are transferred to the read bus and tested for zero. If zero then no stack exists and a forced jump is performed to the firmware error routine.

If not zero, the contents of STKT is incremented by one and copied to the EO register by means of the DALU and the I bus.

A test is then conducted to determine whether the currect stack frame is capable of containing an address (two data words). This is accomplished by computing the difference between the contents of the EO register and the STKB register in the DALU. If a carry occurs then the current stack frame does not contain entries sufficient to hold two words and a firmware error routine is executed.

If no carry occurs then the frame is large enough to contain a two-word address and both words of data coming through the data multiplexer 35 to the source bus 33 are transmitted to the I bus, the DALU, and the Y register. Again, placing the returning data in the Y or address register implements the indirect addressing mode. Simultaneously, the contents of EO+1 are enabled into the STKT register. Since the contents of EO contains the previous value of the STKT register incremented by one, this operation effectively puts the previous contents of the STKT register incremented by two back into the STKT register. The result is the removal of two words from the current stack frame. An operand fetch is then performed.

In sum, the preceding disclosure sets forth a stack mechanism capable of addressing entries in a current stack frame by indexing relative to the top or bottom entries in the stack frame. Also, the stack mechanism, as herein embodied, is capable of creating or deleting stack frames within a stack, creating or deleting stacks, and dynamically changing the size of a stack frame. Further, the stack mechanism is capable of increasing or decreasing the frame size of the current stack frame by amounts reflecting the size of operands being executed by the central processing unit.

It will be apparent, to those skilled in the art, that modifications and variations can be made in the preferred embodiment disclosed herein without departing from the scope or sphere of the invention. Thus, it is intended that the present invention include those modifications and variations which come within the scope of the appended claims and their equivalents.

```
                                           RTL/6000 FILE EDIT
                                              PARAMETER SECTION

LINE #
   1C001   PARAMETERS;
   1C002   MODEL CP6X-1779-12-11,"REV/54";
   1C003   ROMDEF MAIN,96,4096,0300000030000000004AF002F#,SSMCS  \
   1C004   -
   1C005   -    +--+--+--+--++++++++++++--+--+--+--+--+--+--+
   1C006   -    '          LB         '  CK  '          TC          '
```

```
                         RTL/6000 FILE EDIT
                          PARAMETER SECTION
LINE #
10007  -      +--+--+--+**********--+--+--+--+--+--+--+--+--+--+
10008  -       0        3          7          11         15
10009  -
10010  -      +********--+--+--+--+--+--+--+--+--+--+--+--+--+
10011  -      ' '    OR   '  'TP'              NA                '
10012  -      +********--+--+--+--+--+--+--+--+--+--+--+--+--+
10013  -       16       19         23         27         31
10014  -
10015  -      +--+--+--+--+--+--+--+--+--+--+--+--+--+--+--+--+
10016  -      '    F,CHN   '  FK,CMD,W '            K            '
10017  -      +--+--+--+--+--+--+--+--+--+--+--+--+--+--+--+--+
10018  -       32       35         39         43         47
10019  -
10020  -      +--+--+--+--+**************************+--+--+--+
10021  -      ' DW  'BW'    DS      ' DM ' BM '      BS         '
10022  -      +--+--+--+--+**************************+--+--+--+
10023  -       49       51         55         59         63
10024  -
10025  -      +--+--+--+--+--+--+--+--+--+--+--+--+--+--+--+--+
10026  -      ' '        GP         ' RB '        DA            '
10027  -      +--+--+--+--+--+--+--+--+--+--+--+--+--+--+--+--+
10028  -       64       67         71         75         79
10029  -
10030  -      +--+--+--+--+--+--+--+--+--+--+--+--+--+--+--+--+
10031  -      '    IB     '         SH         '        DA      '
10032  -      +--+--+--+--+--+--+--+--+--+--+--+--+--+--+--+--+
10033  -       80       83         87         91         95
10034  NOTES:
10035  -     FIELD, MICRO, & STEP NAMES ARE COMPOSED OF ALPHANUMERIC CHAR-
10036  -     ACTERS PLUS HYPHEN, COLON, & APOSTROPHE.  THE FIRST CHARACTER
10037  -     MUST BE ALPHABETIC.   IN GENERAL, THE HYPHEN HAS BEEN USED AS
10038  -     A WORD SEPARATOR, THE COLON AS AN "=" OR "<=" OPERATOR, & THE
10039  -     APOSTROPHE AS A CLAUSE SEPARATOR (I.E., BETWEEN DESCRIPTIONS
10040  -     OF SIMULTANEOUS &/OR INDEPENDENT ACTIONS).
10041  -
10042  -     IN THE SPECIAL CASE OF THE TEST-CONDITION MICRO'S (IF:...), A
10043  -     TERMINAL HYPHEN IS USED IN THE SENSE OF "NOT".   FOR EXAMPLE,
10044  -        "IF:SELZERO" BRANCHES IF THE SEL-COUNTER CONTENT IS ZERO,
10045  -        "IF:SELZERO-" BRANCHES IF THE CONTENT IS NOT ZERO.
10046  ;
10047  SKIP HOF;
10048  \                      PATCHES
10049  -
10050  **************************************************************
10051  * PAGE * A0  *  D0  *  D1  *  D2  *  D3  *  D4  *  D5  *
10052  *------+-----+------+------+------+------+------+------+------*
10053  *      *     *      *      *      *      *      *      *
10054  *      *     *      *      *      *      *      *      *
10055  *      *     *      *      *      *      *      *      *
10056  *      *     *      *      *      *      *      *      *
10057  *      *     *      *      *      *      *      *      *
10058  *------+-----+------+------+------+------+------+------+------*
10059  *      *     *      *      *      *      *      *      *
10060  *      *     *      *      *      *      *      *      *
10061  *      *     *      *      *      *      *      *      *
10062  *      *     *      *      *      *      *      *      *
10063  *      *     *      *      *      *      *      *      *
10064  *------+-----+------+------+------+------+------+------+------*
10065  *      *     *      *      *      *      *      *      *
10066  *      *     *      *      *      *      *      *      *
10067  *      *     *      *      *      *      *      *      *
10068  *      *     *      *      *      *      *      *      *
10069  *      *     *      *      *      *      *      *      *
10070  *------+-----+------+------+------+------+------+------+------*
10071  *      *     *      *      *      *      *      *      *
10072  *      *     *      *      *      *      *      *      *
10073  *      *     *      *      *      *      *      *      *
10074  *      *     *      *      *      *      *      *      *
10075  *      *     *      *      *      *      *      *      *
10076  *------+-----+------+------+------+------+------+------+------*
10077  *      *     *      *      *      *      *      *      *
10078  *      *     *      *      *      *      *      *      *
```

PATCHES

```
LINE #
10079    *     *     *     *     *     *     *     *     *
10080    *     *     *     *     *     *     *     *     *
10081    *     *     *     *     *     *     *     *     *
10082    *-----------------------------------------------*
10083    *     *     *     *     *     *     *     *     *
10084    *     *     *     *     *     *     *     *     *
10085    *     *     *     *     *     *     *     *     *
10086    *     *     *     *     *     *     *     *     *
10087    *     *     *     *     *     *     *     *     *
10088    *-----------------------------------------------*
10089    *     *     *     *     *     *     *     *     *
10090    *     *     *     *     *     *     *     *     *
10091    *     *     *     *     *     *     *     *     *
10092    *     *     *     *     *     *     *     *     *
10093    *     *     *     *     *     *     *     *     *
10094    *-----------------------------------------------*
10095    *     *     *     *     *     *     *     *     *
10096    *     *     *     *     *     *     *     *     *
10097    *     *     *     *     *     *     *     *     *
10098    *     *     *     *     *     *     *     *     *
10099    *     *     *     *     *     *     *     *     *
10100    ************************************************
10101    \
10102    SKIP HOF;
```

RTL/6000 FILE EDIT
PARAMETER SECTION

```
10103   CNSTFLD BA ,74/6                         \ BALU FUNCTION;
10104   CNSTFLD BM ,58/2                         \ BRAM ADDRESS SELECT MODIFY;
10105   CNSTFLD BR ,93/2,17/2,96/1               \ BRANCH TYPE;
10106   CNSTFLD BR2,97/1,17/2,97/2               \ BRANCH TYPE FOR "X2";
10107   PARITY EVEN,19,98/1,96/1                 \ "BRANCH TYPE" LSB;
10108   CNSTFLD BS ,60/4                         \ BRAM ADDRESS SELECT;
10109   ARGDEF  BSM(58/2,111/2,61/3)   NUM/47#    SEL/27#
10110   \                                BRAM ADDRESS SELECT & MODIFY;
10111   CNSTFLD BW ,50/1                         \ WRITE INTO BRAM;
10112   CNSTFLD CK , 8/2                         \ CLOCK SPEED;
10113   CNSTFLD CKR, 8/1                         \ LOCAL-BUS READ CONTROL;
10114   ARGDEF  CHN(33/2)                        \ LOCAL-BUS CHANNEL
10115   \                CPU/0     SIP/1    CIP/2     MMU/3;
10116   ARGDEF  CHNR(6/1,9/1,33/2)               \ LOCAL-BUS READ CHANNEL
10117   \                          SIP/5    CIP/6     MMU/8#;
10118   ARGDEF  CMD(35/5)                        \ LOCAL-BUS COMMAND CODE
10119   \        A/A#  B/B#  C/C#  D/D#  E/E#  F/F#;
10120   CNSTFLD DA ,90/6                         \ DALU FUNCTION;
10121   CNSTFLD DM ,56/2                         \ DRAM ADDRESS SELECT MODIFY;
10122   CNSTFLD DS ,51/5                         \ DRAM ADDRESS SELECT;
10123   CNSTFLD DW ,48/2                         \ WRITE INTO DRAM;
10124   CNSTFLD F  ,32/4                         \ LOAD F-REG FIELD(S);
10125   ARGDEF  FK (36/4)                        \ LOAD SEL,LINK WHEN F=9,A,B
10126   \        A/A#  B/B#  C/C#  D/D#  E/E#  F/F#
10127   \      ALSO USED WITH GP-MISC5:X0 TO CONTROL
10128   \               HOTM1/2   HOTM4/3   RING/4    QLT-PH/8
10129   \      AND WITH GP-MISC6:X0 TO SET/CLEAR BITS OF CONTROL REGISTER;
10130   \               END-SIP-GO/0             SIP-GO/8
10131   \\              MEMAD:ARM/1              MEMAD:1/9
10132   \\              DRV-YLC/C#               CLR-YLO/4
10133   ;
10134   CNSTFLD F6 ,38/1                         \ CONTROL FLINK:DEC;
10135   CNSTFLD FSEL,32/1,34/1                   \ ENABLE SEL DECREMENT;
10136   CNSTFLD GP ,65/7                         \ GENERAL PURPOSE;
10137   CNSTFLD IU ,60/4                         \ SELECT SOURCE FOR INPUT BUS;
10138   CNSTFLD ID0,80/1                         \ DIVERT K TO CONTROL I-REG;
10139   ARGDEF  K (40/8) REV/54#                 \ CONSTANT GEN'R, LOAD I-REG;
10140   CNSTFLD K7 ,47/1                         \ CONTROL TRAF,INDEXED FLOPS;
10141   CNSTFLD LB ,0/1,104/1,2/6                \ LOCAL BUS INTERFACE CONTROL;
10142   CNSTFLD LC ,1/1,108/1                    \ LOCAL BUS INTERFACE CONTROL;
10143   CNSTFLD LY ,108/1,C/8                    \ LOCAL BUS INTERFACE CONTROL;
10144   CNSTFLD LB0-7,C/7,104/1                  \ LOCAL BUS INTERFACE CONTROL;
10145   CNSTFLD LBR,2/4,104/1,7/1                \ LOCAL BUS READ CONTROL;
10146   SKIP HOF;
10147   BRCHFLD NAE,ABS,20/1,99/1,22/9,97/1\     "'ELS" ADDRESS IN LOWER BANK;
10148   BRCHFLD NAG,ABS,20/1,97/1                \ NEXT ADDRESS IN EITHER BANK;
10149   BRCHFLD NAK,ABS,20/1,100/1,22/9,97/1\    "XL" ADDRESS IN UPPER BANK;
```

RTL/6000 FILE EDIT
PARAMETER SECTION

```
LINE #
10150   BRCHFLD  NA2,ABS,20/1,99/1,22/9,98/1\   "X2" ADDRESS IN LOWER BANK;
10151   BRCHFLD  NA3,ABS,20/1,99/1,22/9,99/1\   "X3" ODD ADDRESS IN LOWER BANK;
10152   BRCHFLD  NAU,ABS,20/1,100/1,22/9,96/1\  "X2" ADDRESS IN UPPER BANK;
10153   CNSTFLD  NAX,20/1,100/1,22/2            \ QUADRANT FOR UNCOND'L SPLATTER;
10154   PARITY EVEN,31,97/2                     \ "NA" LSB;
10155   CNSTFLD  RB ,72/2                       \ SELECT SOURCE FOR RAM BUS;
10156   CNSTFLD  SH ,84/6,104/2                 \ SOURCE/SHIFT TO OUTPUT BUS, W-REG;
10157   CNSTFLD  TC ,10/6                       \ TEST CONDITION;
10158   CNSTFLD  TP ,21/1                       \ TEST POLARITY;
10159   CNSTFLD  TPL,100/1,21/1                 \ CONTROL FOR UNCOND'L XL SPLATTER;
10160   CNSTFLD  TPX,97/4,21/1                  \ CONTROL FOR UNCOND'L SPLATTER;
10161   ARGDEF   W  (38/2)                      \ PARTITION W-REG LOAD
10162   \           WA:40/3    WR:48/1   WW:48/2;
                              DICTIONARY SECTION

10163   DICTIONARY;
10164   MICRO  BALU:000000         (BA/2CH)     \ BALU = ALL ZERO'S;
10165   MICRO  BALU:FFFFFF         (BA/23H)     \ BALU = ALL ONE'S;
10166   MICRO  BALU:IB             (BA/25H)     \ BALU = IB;
10167   MICRO  BALU:IB-AND-NOT-WB  (BA/24H)     \ BALU = IB & (NOT WB);
10168   MICRO  BALU:IB-OR-NCT-WB   (BA/21H)     \ BALU = IB V (NOT WB);
10169   MICRO  BALU:NOT-IB         (BA/2AH)     \ BALU = NOT IB;
10170   MICRO  BALU:NOT-WB         (BA/20H)     \ BALU = NOT WB;
10171   MICRO  BALU:NOT-WB-NOR-IB  (BA/28H)     \ BALU = NOT (WB V IB);
10172   MICRO  BALU:WB             (BA/2FH)     \ BALU = WB;
10173   MICRO  BALU:WB-ADD-IB      (BA/19H)     \ BALU = WB + IB;
10174   MICRO  BALU:WB-ADD-WB      (BA/13H)     \ BALU = WB + WB;
10175   MICRO  BALU:WB-ADD1        (BA/00H)     \ BALU = WB + 1;
10176   MICRO  BALU:WB-ADD1-IB     (BA/09H)     \ BALU = WB + IB + 1;
10177   MICRO  BALU:WB-ADD1-WB     (BA/03H)     \ BALU = WB + WB + 1;
10178   MICRO  BALU:WB-AND-IB      (BA/2DH)     \ BALU = WB & IB;
10179   MICRO  BALU:WB-AND-NOT-IB  (BA/2EH)     \ BALU = WB & (NOT IB);
10180   MICRO  BALU:WB-IB-NCT      (BA/22H)     \ BALU = NOT (WB & IB);
10181   MICRO  BALU:WB-OR-IB       (BA/27H)     \ BALU = WB V IB;
10182   MICRO  BALU:WB-OR-NCT-IB   (BA/28H)     \ BALU = WB V (NOT IB);
10183   MICRO  BALU:WB-SUB-IB      (BA/06H)     \ BALU = WB - IB;
10184   MICRO  BALU:WB-SUB1        (BA/1FH)     \ BALU = WB - 1;
10185   MICRO  BALU:WB-SUB1-IB     (BA/16H)     \ BALU = WB - IB - 1;
10186   MICRO  BALU:WB-XNR-IB      (BA/29H)     \ BALU = WB <XOR> (NOT IB);
10187   MICRO  BALU:WB-XOR-IB      (BA/26H)     \ BALU = WB <XOR> IB;
10188   \\
10189   \\
10190   MICRO  BRAM0               (BS/0H,BM/0) \ SELECT BRAM[B0];
10191   \\
10192   \\
10193   MICRO  BRAMBI              (BA/38H)     \ SET BRAMBI FOR NEXT STEP;
10194   MICRO  BR-3WAY             (BA/34H)     \ NEXT-STEP LOWER-BANK NA-AND-FF&# IF
10195   -       MISC29, OR MISC7A[4JL] & Q30-, OR MISC7B[DIV] & (MISC1A=DALU08)-;
10196   SKIP HOF;
10197   MICRO  CIP-STALL           (LC/3)       \ WAIT IF/WHILE CIP BUSY;
10198   \\
10199   \\
10200   MICRO  CKHF                (CK/1)       \ CLOCK SPEED = HALF FAST;
10201   MICRO  CKHL                (CK/2)       \ CLOCK SPEED = HALF LONG;
10202   MICRO  CKVF                (CK/0)       \ CLOCK SPEED = VERY FAST;
10203   MICRO  CKVL                (CK/3)       \ CLOCK SPEED = VERY LONG;
10204   \\
10205   \\
10206   MICRO  DALU:000000         (DA/2CH)     \ DALU = ALL ZERO'S;
10207   MICRO  DALU:0'CARRY        (DA/0CH)     \ DALU = -1+1;
10208   MICRO  DALU:FFFFFF         (DA/23H)     \ DALU = ALL ONE'S;
10209   MICRO  DALU:IB             (DA/25H)     \ DALU = IB;
10210   MICRO  DALU:IB-AND-NOT-RB  (DA/24H)     \ DALU = IB & (NOT RB);
10211   MICRO  DALU:IB-OR-NCT-RB   (DA/21H)     \ DALU = IB V (NOT RB);
10212   MICRO  DALU:NOT-IB         (DA/2AH)     \ DALU = NOT IB;
10213   MICRO  DALU:NOT-RB         (DA/20H)     \ DALU = NOT RB;
10214   MICRO  DALU:NOT-RB-NOR-IB  (DA/28H)     \ DALU = NOT (RB V IB);
10215   MICRO  DALU:RB             (DA/2FH)     \ DALU = RB;
10216   MICRO  DALU:RB-ADD-IB      (DA/19H)     \ DALU = RB + IB;
10217   MICRO  DALU:RB-ADD-RB      (DA/13H)     \ DALU = RB + RB;
10218   MICRO  DALU:RB-ADD1        (DA/00H)     \ DALU = RB + 1;
10219   MICRO  DALU:RB-ADD1-IB     (DA/09H)     \ DALU = RB + IB + 1;
10220   MICRO  DALU:RB-ADD1-RB     (DA/03H)     \ DALU = RB + RB + 1;
10221   MICRO  DALU:RB-AND-IB      (DA/2DH)     \ DALU = RB & IB;
10222   MICRO  DALU:RB-AND-NOT-IB  (DA/2EH)     \ DALU = RB & (NOT IB);
10223   MICRO  DALU:RB-IB-NCT      (DA/22H)     \ DALU = NOT (RB & IB);
```

```
                           RTL/6000 FILE EDIT
        LINE #                DICTIONARY SECTION
        10224  MICRO DALU:RB-OR-IB      (DA/27#)         \ DALU = RB V IB;
        10225  MICRO DALU:RB-OR-NOT-IB  (DA/2B#)         \ DALU = RB V (NOT IB);
        10226  MICRO DALU:RB-SUB-IB     (DA/06#)         \ DALU = RB - IB;
        10227  MICRO DALU:RB-SUB1       (DA/1F#)         \ DALU = RB - 1;
        10228  MICRO DALU:RB-SUB1-IB    (DA/16#)         \ DALU = RB - IB - 1;
        10229  MICRO DALU:RB-XNR-IB     (DA/29#)         \ DALU = RB <XOR> (NOT IB);
        10230  MICRO DALU:RB-XOR-IB     (DA/26#)         \ DALU = RB <XOR> IB;
        10231  SKIP HOF;
        10232  \           BIT STRUCTURE OF F-MICRO'S IN F,FK FIELDS:
        10233  -                        LOAD SEL   1S0- KKKK
        10234  -                        LOAD LINK  1S-0 KKKK
        10235  -                        DEC LINK   11-1 --1-
        10236  -                        LOAD F(M)  11-- 1---
        10237  -                        LOAD AS'   11-- -1--
        10238  -                        LOAD F'    110- -1--
        10239  -                        CREEP      11-- -1-0
        10240  -                        RING-INIT  11-- -1-1
        10241  ;
        10242  MICRO FASP:WB'RING-IN    (F/F#,FK/5#)     \ AS'(8-15) <= WB(24-31)
        10243  -                                           RING-EFFECTIVE <= S(R);
        10244  MICRO FASP:WB'RING-OUT   (F/F#,FK/4#)     \ AS'(8-15) <= WB(24-31)
        10245  -                                           CREEP RING-EFFECTIVE;
        10246  MICRO FLINK:    (FK)     (F/A#)           \ LINK <= K;
        10247  MICRO FLINK:FB           (F/E#,FK/0#)     \ LINK <= FB(12-15);
        10248  MICRO FLINK:DEC          (F/F#,F6/1#)     \ LINK <= LINK-1;
        10249  MICRO FLOD-PF            (F/C#,FK/D#)     \ F(8-11),SEL <= FB(8-15)
        10250  -                                           LINK <= FB(12-15)
        10251  -                                           F'(4-8) <= WB(20-23),LB7
        10252  -                                           AS'(8-15) <= WB(24-31)
        10253  -                                           RING-EFFECTIVE <= S(R);
        10254  MICRO FM-SEL:FB          (F/D#,FK/9#)     \ F(8-11),SEL <= FB(8-15);
        10255  MICRO FPRM:WB'RING-IN    (F/D#,FK/5#)     \ SEL <= FB(12-15)
        10256  -                                           F'(4-8) <= WB(20-23),LB7
        10257  -                                           AS'(8-15) <= WB(24-31)
        10258  -                                           RING-EFFECTIVE <= S(R);
        10259  MICRO FPRM:WB'RING-OUT   (F/D#,FK/4#)     \ SEL <= FB(12-15)
        10260  -                                           F'(4-8) <= WB(20-23),LB7
        10261  -                                           AS'(8-15) <= WB(24-31)
        10262  -                                           CREEP RING-EFFECTIVE;
        10263  MICRO FSEL:     (FK)     (F/9#)           \ SEL <= K;
        10264  MICRO FSEL:FB            (F/D#,FK/C#)     \ SEL <= FB(12-15);
        10265  MICRO FSEL-LINK: (FK)    (F/3#)           \ LINK <= K
        10266  -                                           SEL <= K;
        10267  MICRO FSEL-LINK:FB       (F/C#,FK/0#)     \ LINK <= FB(12-15)
        10268  -                                           SEL <= FB(12-15);
        10269  SKIP HOF;
        10270  MICRO GO-TO    (NAG,NAG) (BR/0,TC/0)      \ UNCONDITIONAL XFR;
        10271  \\
        10272  \\
        10273  MICRO GP-ACK-REG-CHNG    (GP/77#)         \ PANEL: MPCHGR <= 0
        10274  -                                           XB <= QMUX(16-19);
        10275  MICRO GP-DISPL1-2        (GP/06#)         \ PANEL: DISPLAY 2 M.S.D.
        10276  -                                                  <= RB(24-31);
        10277  MICRO GP-DISPL3-6        (GP/16#)         \ PANEL: DISPLAY 4 L.S.D.
        10278  -                                                  <= RB(16-31);
        10279  MICRO GP-INIT            (GP/64#)         \ ALL MISC <= 0
        10280  -                                           XB <= 0;
        10281  MICRO GP-KOP             (GP/6B#)         \ MISC6A,B <= 1,1;
        10282  MICRO GP-LOAD:C'TRAF     (GP/67#)         \ PANEL: LOADMD <= 0
        10283  -                                                  RUN <= READY
        10284  -                                                  TRAF <= RUN
        10285  -                                           XB <= QMUX(16-19);
        10286  MICRO GP-LOAD:1          (GP/36#)         \ PANEL: LOADMD <= 1
        10287  -                                           XB <= 0;
        10288  MICRO GP-MISCO:00        (GP/08#)         \ MISC0A,B <= 0,0;
        10289  MICRO GP-MISCO:01        (GP/09#)         \ MISC0A,B <= 0,1;
        10290  MICRO GP-MISCO:0X        (GP/0C#)         \ MISC0A <= 0 (AR-CK ENB);
        10291  MICRO GP-MISCO:0X'XBLOAD (GP/0D#,K7/1)    \ MISC0A <= 0
        10292  -                                           XB <= QMUX(16-19)
        10293  -                                           INDEXED <= 1;
        10294  MICRO GP-MISCO:0X'XBOFFS (GP/0D#,K7/0)    \ MISC0A <= 0
        10295  -                                           XB <= QMUX(16-19)
        10296  -                                           INDEXED <= 0;
        10297  MICRO GP-MISCO:10        (GP/0A#)         \ MISC0A,B <= 1,0;
```

```
                              RTL/6000 FILE EDIT
       LINE #                 DICTIONARY SECTION
       10298  MICRO GP-MISC0:11        (GP/0B#)           \ MISC0A,B <= 1,1;
       10299  MICRO GP-MISC0:1X        (GP/0E#)           \ MISC0A <= 1 (AR-CK INH);
       10300  MICRO GP-MISC0:1X'XBLOAD (GP/0F#,K7/1)      \ MISC0A <= 1
       10301    -                                           XB <= QMUX(16-19)
       10302    -                                           INDEXED <= 1;
       10303  MICRO GP-MISC0:1X'XBOFFS (GP/0F#,K7/0)      \ MISC0A <= 1
       10304    -                                           XB <= QMUX(16-19)
       10305    -                                           INDEXED <= 0;
       10306  MICRO GP-MISC0:X0        (GP/02#)           \ MISC0B <= 0;
       10307  MICRO GP-MISC0:X0'CGPO   (GP/00#)           \ MISC0B <= 0
       10308    -                                           ;
       10309  MICRO GP-MISC0:X1        (GP/01#)           \ MISC0B <= 1;
       10310  SKIP HOF;
       10311  MICRO GP-MISC1:00        (GP/18#)           \ MISC1A,B <= 0,0;
       10312  MICRO GP-MISC1:01        (GP/19#)           \ MISC1A,B <= 0,1;
       10313  MICRO GP-MISC1:0X        (GP/1C#)           \ MISC1A <= 0;
       10314  MICRO GP-MISC1:0X'XBLOAD (GP/1D#,K7/1)      \ MISC1A <= 0
       10315    -                                           XB <= QMUX(16-19)
       10316    -                                           INDEXED <= 1;
       10317  MICRO GP-MISC1:0X'XBOFFS (GP/1D#,K7/0)      \ MISC1A <= 0
       10318    -                                           XB <= QMUX(16-19)
       10319    -                                           INDEXED <= 0;
       10320  MICRO GP-MISC1:10        (GP/1A#)           \ MISC1A,B <= 1,0;
       10321  MICRO GP-MISC1:11        (GP/1B#)           \ MISC1A,B <= 1,1;
       10322  MICRO GP-MISC1:1X        (GP/1E#)           \ MISC1A <= 1;
       10323  MICRO GP-MISC1:1X'XBLOAD (GP/1F#,K7/1)      \ MISC1A <= 1
       10324    -                                           XB <= QMUX(16-19)
       10325    -                                           INDEXED <= 1;
       10326  MICRO GP-MISC1:1X'XBOFFS (GP/1F#,K7/0)      \ MISC1A <= 1
       10327    -                                           XB <= QMUX(16-19)
       10328    -                                           INDEXED <= 0;
       10329  MICRO GP-MISC1:X0        (GP/12#)           \ MISC1B <= 0;
       10330  MICRO GP-MISC1:X0'ELSOLO (GP/10#)           \ MISC1B <= 0
       10331    -                                           ENABLE QLT SOLILOQUY;
       10332  MICRO GP-MISC1:X1        (GP/11#)           \ MISC1B <= 1;
       10333  MICRO GP-MISC2:00        (GP/28#)           \ MISC2A,B <= 0,0;
       10334  MICRO GP-MISC2:01        (GP/29#)           \ MISC2A,B <= 0,1;
       10335  MICRO GP-MISC2:0X        (GP/2C#)           \ MISC2A <= 0;
       10336  MICRO GP-MISC2:0X'XBLOAD (GP/2D#,K7/1)      \ MISC2A <= 0
       10337    -                                           XB <= QMUX(16-19)
       10338    -                                           INDEXED <= 1;
       10339  MICRO GP-MISC2:0X'XBOFFS (GP/2D#,K7/0)      \ MISC2A <= 0
       10340    -                                           XB <= QMUX(16-19)
       10341    -                                           INDEXED <= 0;
       10342  MICRO GP-MISC2:10        (GP/2A#)           \ MISC2A,B <= 1,0;
       10343  MICRO GP-MISC2:11        (GP/2B#)           \ MISC2A,B <= 1,1;
       10344  MICRO GP-MISC2:1X        (GP/2E#)           \ MISC2A <= 1;
       10345  MICRO GP-MISC2:1X'XBLOAD (GP/2F#,K7/1)      \ MISC2A <= 1
       10346    -                                           XB <= QMUX(16-19)
       10347    -                                           INDEXED <= 1;
       10348  MICRO GP-MISC2:1X'XBOFFS (GP/2F#,K7/0)      \ MISC2A <= 1
       10349    -                                           XB <= QMUX(16-19)
       10350    -                                           INDEXED <= 0;
       10351  MICRO GP-MISC2:X0        (GP/22#)           \ MISC2B <= 0;
       10352  MICRO GP-MISC2:X0'ENDREQ (GP/20#)           \ MISC2B <= 0
       10353    -                                           TERMINATE ELSOLO CYCLE;
       10354  MICRO GP-MISC2:X1        (GP/21#)           \ MISC2B <= 1;
       10355  SKIP HOF;
       10356  MICRO GP-MISC3:00        (GP/38#)           \ MISC3A,B <= 0,0;
       10357  MICRO GP-MISC3:01        (GP/39#)           \ MISC3A,B <= 0,1;
       10358  MICRO GP-MISC3:0X        (GP/3C#)           \ MISC3A <= 0;
       10359  MICRO GP-MISC3:0X'XBLOAD (GP/3D#,K7/1)      \ MISC3A <= 0
       10360    -                                           XB <= QMUX(16-19)
       10361    -                                           INDEXED <= 1;
       10362  MICRO GP-MISC3:0X'XBOFFS (GP/3D#,K7/0)      \ MISC3A <= 0
       10363    -                                           XB <= QMUX(16-19)
       10364    -                                           INDEXED <= 0;
       10365  MICRO GP-MISC3:10        (GP/3A#)           \ MISC3A,B <= 1,0;
       10366  MICRO GP-MISC3:11        (GP/3B#)           \ MISC3A,B <= 1,1;
       10367  MICRO GP-MISC3:1X        (GP/3E#)           \ MISC3A <= 1 (RMWF);
       10368  MICRO GP-MISC3:1X'XBLOAD (GP/3F#,K7/1)      \ MISC3A <= 1
       10369    -                                           XB <= QMUX(16-19)
       10370    -                                           INDEXED <= 1;
       10371  MICRO GP-MISC3:1X'XBOFFS (GP/3F#,K7/0)      \ MISC3A <= 1
```

RTL/60CC FILE EDIT
DICTIONARY SECTION

```
LINE #
10372    -                                                    XB <= QMUX(16-19)
10373    -                                                    INDEXED <= 0;
10374    MICRO GP-MISC3:X0           (GP/32#)                 \ MISC3B <= 0;
10375    MICRO GP-MISC3:X0'CGP3      (GP/30#)                 \ MISC3B <= 0
10376    -                                                    +;
10377    MICRO GP-MISC3:X1           (GP/31#)                 \ MISC3B <= 1
10378    -                           CONTROL FILL BIT TO W(0-7) WHEN WA:WB
10379    -                           SUBSTITUTE SYNDROME FOR ZS WHEN WB:ZS
10380    -                           NO CHECK OF BITS(0-7) WHEN LB:DA... & IB:SB...;
10381    MICRO GP-MISC4:00           (GP/48#)                 \ MISC4A,B <= 0,0
10382    -                           SAME AS    GP-SHIN:AR-24;
10383    MICRO GP-MISC4:01           (GP/49#)                 \ MISC4A,B <= 0,1
10384    -                           SAME AS    GP-SHIN:AR-32;
10385    MICRO GP-MISC4:0X           (GP/4C#)                 \ MISC4A <= 0;
10386    MICRO GP-MISC4:0X'XBLOAD    (GP/4D#,K7/1)            \ MISC4A <= 0
10387    -                                                    XB <= QMUX(16-19)
10388    -                                                    INDEXED <= 1;
10389    MICRO GP-MISC4:0X'XBOFFS    (GP/4D#,K7/0)            \ MISC4A <= 0
10390    -                                                    XB <= QMUX(16-19)
10391    -                                                    INDEXED <= 0;
10392    MICRO GP-MISC4:10           (GP/4A#)                 \ MISC4A,B <= 1,0
10393    -                           SAME AS    GP-SHIN:CIRC;
10394    MICRO GP-MISC4:11           (GP/4B#)                 \ MISC4A,B <= 1,1
10395    -                           SAME AS    GP-SHIN:OPEN;
10396    MICRO GP-MISC4:1X           (GP/4E#)                 \ MISC4A <= 1;
10397    MICRO GP-MISC4:1X'XBLOAD    (GP/4F#,K7/1)            \ MISC4A <= 1
10398    -                                                    XB <= QMUX(16-19)
10399    -                                                    INDEXED <= 1;
10400    MICRO GP-MISC4:1X'XBOFFS    (GP/4F#,K7/0)            \ MISC4A <= 1
10401    -                                                    XB <= QMUX(16-19)
10402    -                                                    INDEXED <= 0;
10403    MICRO GP-MISC4:X0           (GP/42#)                 \ MISC4B <= 0;
10404    MICRO GP-MISC4:X0'CGP4      (GP/40#)                 \ MISC4B <= 0
10405    -                                                    +;
10406    MICRO GP-MISC4:X1           (GP/41#)                 \ MISC4B <= 1;
10407    SKIP HOF;
10408    MICRO GP-MISC5:00           (GP/58#)                 \ MISC5A,B <= 0,0;
10409    MICRO GP-MISC5:01           (GP/59#)                 \ MISC5A,B <= 0,1;
10410    MICRO GP-MISC5:0X           (GP/5C#)                 \ MISC5A <= 0;
10411    MICRO GP-MISC5:0X'XBLOAD    (GP/5D#,K7/1)            \ MISC5A <= 0
10412    -                                                    XB <= QMUX(16-19)
10413    -                                                    INDEXED <= 1;
10414    MICRO GP-MISC5:0X'XBOFFS    (GP/5D#,K7/0)            \ MISC5A <= 0
10415    -                                                    XB <= QMUX(16-19)
10416    -                                                    INDEXED <= 0;
10417    MICRO GP-MISC5:10           (GP/5A#)                 \ MISC5A,B <= 1,0 (NOBOOT)
10418    -                           & CONTROL RING-EFFECTIVE DURING CIP-DRIVER FW;
10419    MICRO GP-MISC5:11           (GP/5B#)                 \ MISC5A,B <= 1,1;
10420    MICRO GP-MISC5:1X           (GP/5E#)                 \ MISC5A <= 1;
10421    MICRO GP-MISC5:1X'XBLOAD    (GP/5F#,K7/1)            \ MISC5A <= 1
10422    -                                                    XB <= QMUX(16-19)
10423    -                                                    INDEXED <= 1;
10424    MICRO GP-MISC5:1X'XBOFFS    (GP/5F#,K7/0)            \ MISC5A <= 1
10425    -                                                    XB <= QMUX(16-19)
10426    -                                                    INDEXED <= 0;
10427    MICRO GP-MISC5:X0           (GP/52#)                 \ MISC5B <= 0;
10428    MICRO GP-MISC5:X0'(FK)      (GP/50#)                 \ MISC5B <= 0
10429    -                                           AND      HOTM <= WB(8)
10430    -                                           OR       HOTM <= WB(11,13,15)
10431    -                                           AND/OR   S(R) <= WB(17-18)
10432    -                                           AND/OR   QLT-PHASE <= WB(26-31);
10433    MICRO GP-MISC5:X1           (GP/51#)                 \ MISC5B <= 1;
10434    MICRO GP-MISC6:00           (GP/68#)                 \ MISC6A,B <= 0,0;
10435    MICRO GP-MISC6:01           (GP/69#)                 \ MISC6A,B <= 0,1;
10436    MICRO GP-MISC6:0X           (GP/6C#)                 \ MISC6A <= 0;
10437    MICRO GP-MISC6:0X'XBLOAD    (GP/6D#,K7/1)            \ MISC6A <= 0
10438    -                                                    XB <= QMUX(16-19)
10439    -                                                    INDEXED <= 1;
10440    MICRO GP-MISC6:0X'XBOFFS    (GP/6D#,K7/0)            \ MISC6A <= 0
10441    -                                                    XB <= QMUX(16-19)
10442    -                                                    INDEXED <= 0;
10443    MICRO GP-MISC6:10           (GP/6A#)                 \ MISC6A,B <= 1,0
10444    MICRO GP-MISC6:11           (GP/6B#)                 \ MISC6A,B <= 1,1
10445    -                           SAME AS    GP-KOP;
10446    MICRO GP-MISC6:1X           (GP/6E#)                 \ MISC6A <= 1;
```

```
LINE #                          RTL/6000 FILE EDIT
                                DICTIONARY SECTION

10447  MICRO GP-MISC6:1X'XBLOAD  (GP/6F#,K7/1)      \ MISC6A <= 1
10448   -                                             XB <= QMUX(16-19)
10449   -                                             INDEXED <= 1;
10450  MICRO GP-MISC6:1X'XBOFFS  (GP/6F#,K7/0)      \ MISC6A <= 1
10451   -                                             XB <= QMUX(16-19)
10452   -                                             INDEXED <= 0;
10453  MICRO GP-MISC6:X0         (GP/62#)           \ MISC6B <= 0;
10454  MICRO GP-MISC6:X0'(FK)    (GP/60#)           \ MISC6B <= 0
10455   -                                     AND     CONTROL SIP-GO
10456   -                                     OR      ENB/INH REGAD BIT IN ZS
10457   -                                     OR      CONTROL YELLOW TO BUS;
10458  MICRO GP-MISC6:X1         (GP/61#)           \ MISC6B <= 1;
10459  SKIP HOF;                               15
10460  MICRO GP-MISC7:00         (GP/78#)           \ MISC7A,B <= 0,0
10461   -                                SAME AS  GP-AS1;
10462  MICRO GP-MISC7:01         (GP/79#)           \ MISC7A,B <= 0,1
10463   -                                SAME AS  GP-AS3;
10464  MICRO GP-MISC7:0X         (GP/7C#)           \ MISC7A <= 0;
10465  MICRO GP-MISC7:0X'XBLOAD  (GP/7D#,K7/1)      \ MISC7A <= 0
10466   -                                             XB <= QMUX(16-19)
10467   -                                             INDEXED <= 1;
10468  MICRO GP-MISC7:0X'XBOFFS  (GP/7D#,K7/0)      \ MISC7A <= 0
10469   -                                             XB <= QMUX(16-19)
10470   -                                             INDEXED <= 0;
10471  MICRO GP-MISC7:10         (GP/7A#)           \ MISC7A,B <= 1,0
10472   -                                SAME AS  GP-AS2;
10473  MICRO GP-MISC7:11         (GP/7B#)           \ MISC7A,B <= 1,1;
10474  MICRO GP-MISC7:1X         (GP/7E#)           \ MISC7A <= 1;
10475  MICRO GP-MISC7:1X'XBLOAD  (GP/7F#,K7/1)      \ MISC7A <= 1
10476   -                                             XB <= QMUX(16-19)
10477   -                                             INDEXED <= 1;
10478  MICRO GP-MISC7:1X'XBOFFS  (GP/7F#,K7/0)      \ MISC7A <= 1
10479   -                                             XB <= QMUX(16-19)
10480   -                                             INDEXED <= 0;
10481  MICRO GP-MISC7:X0         (GP/72#)           \ MISC7B <= 0;
10482  MICRO GP-MISC7:X0'PFI-ACK (GP/70#)           \ MISC7B <= 0
10483   -                                             CLEAR PFI FLOP;
10484  MICRO GP-MISC7:X1         (GP/71#)           \ MISC7B <= 1;
10485  MICRO GP-QLTA:C           (GP/26#)           \ PANEL: MPQLTA <= 0
10486   -                                             XB <= 0;
10487  MICRO GP-REINIT           (GP/24#)           \ XB <= 0;
10488  MICRO GP-SHIN:AR-24       (GP/46#)           \ MISC4A,B <= 0,0;
10489  MICRO GP-SHIN:AR-32       (GP/49#)           \ MISC4A,B <= 0,1;
10490  MICRO GP-SHIN:CIRC        (GP/4A#)           \ MISC4A,B <= 1,0
10491   -                                             INDEXED <= 1;
10492  MICRO GP-SHIN:OPEN        (GP/4B#)           \ MISC4A,B <= 1,1
10493   -                                             INDEXED <= 1;
10494  MICRO GP-TRAF:0'RUN:1     (GP/57#,K7/0)      \ PANEL: TRAF <= 0
10495   -                                                    RUN <= 1
10496   -                                             XB <= QMUX(16-19);
10497  MICRO GP-TRAF:1'RUN:1     (GP/57#,K7/1)      \ PANEL: TRAF <= 1
10498   -                                                    RUN <= 1
10499   -                                             XB <= QMUX(16-19);
10500  MICRO GP-XBLOAD           (GP/05#,K7/1)      \ XB <= QMUX(16-19)
10501   -                                             INDEXED <= 1;
10502  MICRO GP-XBLOAD-OFFSET    (GP/05#,K7/0)      \ XB <= QMUX(16-19)
10503   -                                             INDEXED <= 0;
10504  SKIP HOF;
10505  MICRO IB:0000   (K)       (IB/C#)            \ IB = 0000KK
10506   -                                DO NOT USE IN FIRST STEP OF XA OR XB;
10507  MICRO IB:00FF   (K)       (IB/F#)            \ IB = 00FFKK
10508   -                                DO NOT USE IN FIRST STEP OF XA OR XB;
10509  MICRO IB:A0               (IB/0,BS/8#)       \ IB = BRAM[A0];
10510  MICRO IB:A1               (IB/0,BS/9#,BA/0)  \ IB = BRAM[A1];
10511  MICRO IB:A2               (IB/0,BS/A#,BA/0)  \ IB = BRAM[A2];
10512  MICRO IB:A3               (IB/0,BS/B#,BA/0)  \ IB = BRAM[A3];
10513  MICRO IB:A4               (IB/0,BS/C#,BA/0)  \ IB = BRAM[A4];
10514  MICRO IB:A5               (IB/0,BS/D#,BA/0)  \ IB = BRAM[A5];
10515  MICRO IB:A6               (IB/0,BS/E#,BA/0)  \ IB = BRAM[A6];
10516  MICRO IB:A7               (IB/0,BS/F#,BA/0)  \ IB = BRAM[A7];
10517  MICRO IB:A7SEL            (IB/0,BS/F#,BA/1)  \ IB = BRAM[A(SEL1-3)];
10518  MICRO IB:B0               (IB/0,BS/0#)       \ IB = BRAM[B0];
10519  MICRO IB:B1               (IB/0,BS/1#,BA/0)  \ IB = BRAM[B1];
10520  MICRO IB:B2               (IB/0,BS/2#,BA/0)  \ IB = BRAM[B2];
```

| LINE # | | | RTL/6000 FILE EDIT |  |
|---|---|---|---|---|
| | | | DICTIONARY SECTION | |
| 10521 | MICRO | IB:B3 | (IB/0,BS/3#,BM/0) | \ IB = BRAM[B3]; |
| 10522 | MICRO | IB:B3NUM | (IB/0,BS/3#,BM/2) | \ IB = BRAM[B(F2-3)]; |
| 10523 | MICRO | IB:B3SEL | (IB/0,BS/3#,BM/1) | \ IB = BRAM[B(SEL2-3)]; |
| 10524 | MICRO | IB:B4 | (IB/0,BS/4#,BM/0) | \ IB = BRAM[B4]; |
| 10525 | MICRO | IB:B5 | (IB/0,BS/5#,BM/0) | \ IB = BRAM[B5]; |
| 10526 | MICRO | IB:B6 | (IB/0,BS/6#,BM/0) | \ IB = BRAM[B6]; |
| 10527 | MICRO | IB:B7 | (IB/0,BS/7#,BM/0) | \ IB = BRAM[B7]; |
| 10528 | MICRO | IB:B7NUM | (IB/0,BS/7#,BM/2) | \ IB = BRAM[B(F1-3)]; |
| 10529 | MICRO | IB:B7SEL | (IB/0,BS/7#,BM/1) | \ IB = BRAM[B(SEL1-3)]; |
| 10530 | MICRO | IB:F-DSP | (IB/A#) | \ IB = F(9...9,9-15); |
| 10531 | MICRO | IB:F-VAL | (IB/B#) | \ IB = F(8...8,8-15); |
| 10532 | MICRO | IB:FFFF (K) | (IB/E#) | \ IB = FFFFKK |
| 10533 | - | | DO NOT USE IN FIRST STEP OF XA OR XB; | |
| 10534 | MICRO | IB:KWOS | (IB/C#) | \ IB = # WORDS IN ODSIZE |
| 10535 | - | | USE ONLY IN FIRST STEP OF XA OR XB; | |
| 10536 | MICRO | IB:Q | (IB/3#) | \ IB = QZEX; |
| 10537 | MICRO | IB:QZEX | (IB/3#) | \ IB = Q, ZERO-EXT'D; |
| 10538 | MICRO | IB:RDBR | (IB/0,BS/8#,BM/0) | \ IB = BRAM[A3]; |
| 10539 | MICRO | IB:SB | (IB/4#) | \ IB = SB; |
| 10540 | MICRO | IB:SBSEX | (IB/6#) | \ IB = SB, SIGN-EXT'D; |
| 10541 | MICRO | IB:SBZEX | (IB/7#) | \ IB = SB, ZERO-EXT'D; |
| 10542 | MICRO | IB:STK9 | (IB/0,BS/D#,BM/0) | \ IB = BRAM[A5]; |
| 10543 | MICRO | IB:STKT | (IB/0,BS/C#,BM/0) | \ IB = BRAM[A4]; |
| 10544 | SKIP HOF; | | | |
| 10545 | MICRO | IF:17 | (TC/0F#,TP/1) | \ OPTYP1=1; |
| 10546 | MICRO | IF:17- | (TC/0F#,TP/0) | \ -; |
| 10547 | MICRO | IF:30 | (TC/18#,TP/1) | \ F(1-3)=0; |
| 10548 | MICRO | IF:30- | (TC/18#,TP/0) | \ -; |
| 10549 | \ | | | -> UPPER BANK IF: \ |
| 10550 | MICRO | IF:ASMAP2 | (TC/26#,TP/1) | \ MISC7A=1; |
| 10551 | MICRO | IF:ASMAP2- | (TC/26#,TP/0) | \ -; |
| 10552 | MICRO | IF:ASMAP3 | (TC/27#,TP/1) | \ MISC7B=1; |
| 10553 | MICRO | IF:ASMAP3- | (TC/27#,TP/0) | \ -; |
| 10554 | MICRO | IF:BRANCHOP | (BM/3,TP/0) | \ BRANCH OP SATISFIED |
| 10555 | - | FUNCTION OF F(4-8),NUMZERO,I-REG,DCARRY8,RBUS08,RBUS31; | | |
| 10556 | MICRO | IF:BRANCHZ | (BM/3,TP/0) | \ BRANCH OP SATISFIED |
| 10557 | - | FUNCTION OF F(4-3),NUMZERO,DCARRY3; | | |
| 10558 | MICRO | IF:BUS-ACK | (TC/10#,TP/1) | \ MEGABUS ACKNOWLEDGE; |
| 10559 | MICRO | IF:BUS-ACK- | (TC/10#,TP/0) | \ -; |
| 10560 | MICRO | IF:CIP-PRESENT | (TC/0A#,TP/0) | \ CIP INSTALLED; |
| 10561 | MICRO | IF:CIP-PRESENT- | (TC/0A#,TP/1) | \ -; |
| 10562 | MICRO | IF:CIP-SIP-BRANCH | (TC/0B#,TP/1) | \ EXT. BRANCH SATISFIED; |
| 10563 | MICRO | IF:CIP-SIP-BRANCH- | (TC/0B#,TP/0) | \ -; |
| 10564 | MICRO | IF:CIP-SIP-BUSY | (TC/08#,TP/1) | \ EITHER CIP OR SIP BUSY; |
| 10565 | MICRO | IF:CIP-SIP-BUSY- | (TC/08#,TP/0) | \ -; |
| 10566 | MICRO | IF:CIPTRAP | (TC/09#,TP/0,LC/3) | \ CIP TRAP PENDING |
| 10567 | - | | ALSO STALL IF CIP BUSY; | |
| 10568 | MICRO | IF:CIPTRAP- | (TC/09#,TP/1,LC/3) | \ -; |
| 10569 | MICRO | IF:CMB'CMN | (TC/0E#,TP/1) | \ OPTYP2=1; |
| 10570 | MICRO | IF:CMB'CMN- | (TC/0E#,TP/0) | \ -; |
| 10571 | MICRO | IF:DALU (BSM) | (TC/3C#,TP/0) | \ DALU(24+BRAM ADDR)=1; |
| 10572 | MICRO | IF:DALU- (BSM) | (TC/3C#,TP/1) | \ -; |
| 10573 | MICRO | IF:DCARRY16 | (TC/38#,TP/0) | \ CARRY FROM DALU(16); |
| 10574 | MICRO | IF:DCARRY16- | (TC/38#,TP/1) | \ -; |
| 10575 | MICRO | IF:DCARRY8 | (TC/23#,TP/0) | \ CARRY FROM DALU(8); |
| 10576 | MICRO | IF:DCARRY8- | (TC/23#,TP/1) | \ -; |
| 10577 | MICRO | IF:DOVFL | (TC/3A#,TP/1) | \ DALU(16) <NE> DALU(8); |
| 10578 | MICRO | IF:DOVFL- | (TC/3A#,TP/0) | \ -; |
| 10579 | MICRO | IF:EXECUTE | (TC/28#,TP/0) | \ EXECUTE BUTTON ACTIVATED; |
| 10580 | MICRO | IF:EXECUTE- | (TC/28#,TP/1) | \ -; |
| 10581 | MICRO | IF:FALSE | (TC/00#,TP/0) | \ BLACK = WHITE; |
| 10582 | MICRO | IF:FPR#7 | (TC/21#,TP/1) | \ F'(7)=1; |
| 10583 | MICRO | IF:FPR#7- | (TC/21#,TP/0) | \ -; |
| 10584 | MICRO | IF:FREG0 | (TC/1C#,TP/1) | \ F(0)=1; |
| 10585 | MICRO | IF:FREG0- | (TC/1C#,TP/0) | \ -; |
| 10586 | MICRO | IF:FREG4 | (TC/06#,TP/1) | \ F(4)=1; |
| 10587 | MICRO | IF:FREG4- | (TC/06#,TP/0) | \ -; |
| 10588 | SKIP HOF; | | | |
| 10589 | MICRO | IF:IBUS16 | (TC/35#,TP/0) | \ IB(16)=1; |
| 10590 | MICRO | IF:IBUS16- | (TC/35#,TP/1) | \ -; |
| 10591 | MICRO | IF:IB19-23:ZERO | (TC/39#,TP/0) | \ IB(19-23)=0; |
| 10592 | MICRO | IF:IB19-23:ZERO- | (TC/39#,TP/1) | \ -; |
| 10593 | MICRO | IF:IBUS24 | (TC/37#,TP/0) | \ IB(24)=1; |
| 10594 | MICRO | IF:IBUS24- | (TC/37#,TP/1) | \ -; |
| 10595 | MICRO | IF:IBUS31 | (TC/30#,TP/0) | \ IB(31)=1; |

```
LINE #                                 RTL/6000 FILE EDIT
                                       DICTIONARY SECTION
10596   MICRO IF:IBUS31-       (TC/3D#,TP/1)        \ XBREG HAS BEEN LOADED;
10597   MICRO IF:INDEXED       (TC/33#,TP/1)        \ -;
10598   MICRO IF:INDEXED-      (TC/33#,TP/0)        \ -;
10599   MICRO IF:LAFMODE       (TC/2C#,TP/1)        \ LAF;
10600   MICRO IF:LAFMODE-      (TC/2C#,TP/0)        \ -;
10601   MICRO IF:LOADMODE      (TC/2B#,TP/0)        \ PANEL-LOAD=1;
10602   MICRO IF:LOADMODE-     (TC/2B#,TP/1)        \ -;
10603   MICRO IF:MISC0B        (TC/29#,TP/1)        \ MISC0=X1
10604   -                        ALSO    SHIFT CIP RING-EFFECTIVE;
10605   MICRO IF:MISC0B-       (TC/29#,TP/0)        \ -;
10606   MICRO IF:MISC1A        (TC/2E#,TP/1)        \ MISC1=1X;
10607   MICRO IF:MISC1A-       (TC/2E#,TP/0)        \ -;
10608   MICRO IF:MISC1B        (TC/2F#,TP/1)        \ MISC1=X1;
10609   MICRO IF:MISC1B-       (TC/2F#,TP/0)        \ -;
10610   MICRO IF:MISC2A        (TC/31#,TP/1)        \ MISC2=1X;
10611   MICRO IF:MISC2A-       (TC/31#,TP/0)        \ -;
10612   MICRO IF:MISC2B        (TC/36#,TP/1)        \ MISC2=X1;
10613   MICRO IF:MISC2B-       (TC/36#,TP/0)        \ -;
10614   MICRO IF:MISC3A        (TC/1E#,TP/1)        \ MISC3=1X;
10615   MICRO IF:MISC3A-       (TC/1E#,TP/0)        \ -;
10616   MICRO IF:MISC6B        (TC/1D#,TP/1)        \ MISC6=X1;
10617   MICRO IF:MISC6B-       (TC/1D#,TP/0)        \ -;
10618   MICRO IF:HPQLTA        (TC/2D#,TP/1)        \ QLT = 1 (VOLMEM);
10619   MICRO IF:HPQLTA-       (TC/2D#,TP/0)        \ -;
10620   MICRO IF:NUM7-         (TC/1B#,TP/0)        \ F(1-3)=7;
10621   MICRO IF:NUM7-         (TC/1B#,TP/1)        \ -;
10622   MICRO IF:OB10-21:ZERO  (TC/32#,TP/0)        \ OB(10-21)=0;
10623   MICRO IF:OB10-21:ZERO- (TC/32#,TP/1)        \ -;
10624   MICRO IF:OBUS-ZERO     (TC/3B#,TP/1)        \ OB(3-31)=0;
10625   MICRO IF:OBUS-ZERO-    (TC/3B#,TP/0)        \ -;
10626   MICRO IF:ODADDR        (TC/17#,TP/1)        \ OPERAND IS A POINTER;
10627   MICRO IF:ODADDR-       (TC/17#,TP/0)        \ -;
10628   MICRO IF:ODLEWD        (TC/1A#,TP/1)        \ OPERAND<17 BITS;
10629   MICRO IF:ODLEWD-       (TC/1A#,TP/0)        \ -;
10630   MICRO IF:ODSIZ1        (TC/16#,TP/1)        \ OPERAND=1,8,32  BITS;
10631   MICRO IF:ODSIZ1-       (TC/16#,TP/0)        \ -;
10632   MICRO IF:ODSIZ2        (TC/15#,TP/1)        \ OPERAND=4,8,64 BITS;
10633   MICRO IF:ODSIZ2-       (TC/15#,TP/0)        \ -;
10634   MICRO IF:ODSIZ4        (TC/14#,TP/1)        \ OPERAND=16,32,64 BITS;
10635   MICRO IF:ODSIZ4-       (TC/14#,TP/0)        \ -;
10636   SKIP HUF;
10637   MICRO IF:OP-READ       (TC/0D#,TP/1)        \ OPTYP4=1;
10638   MICRO IF:OP-READ-      (TC/0D#,TP/0)        \ -;
10639   MICRO IF:OP-WRITE      (TC/0C#,TP/1)        \ OPTYP8=1;
10640   MICRO IF:OP-WRITE-     (TC/0C#,TP/0)        \ -;
10641   MICRO IF:OVMASK        (TC/34#,TP/1)        \ RBUS(08+W);
10642   MICRO IF:OVMASK-       (TC/34#,TP/0)        \ -;
10643   MICRO IF:PANEL-LOCK    (TC/2A#,TP/1)        \ PANEL LOCKED;
10644   MICRO IF:PANEL-LOCK-   (TC/2A#,TP/0)        \ -;
10645   MICRO IF:PF-TESTS      (TC/07#,TP/1)        \ 'RUPT, TICK, OR EXTRAP;
10646   MICRO IF:PF-TESTS-     (TC/07#,TP/0)        \ -;
10647   MICRO IF:PFI           (TC/25#,TP/0)        \ POWER FAILING;
10648   MICRO IF:PFI-          (TC/25#,TP/1)        \ -;
10649   MICRO IF:PRIVILEGED    (TC/12#,TP/1)        \ RING=0 OR 1;
10650   MICRO IF:PRIVILEGED-   (TC/12#,TP/0)        \ -;
10651   MICRO IF:RBUS16        (TC/30#,TP/0)        \ RB(16)=1;
10652   MICRO IF:RBUS16-       (TC/30#,TP/1)        \ -;
10653   MICRO IF:REMAINDER-OK  (TC/3E#,TP/0)        \ RB(8)=MISC1B;
10654   MICRO IF:REMAINDER-OK- (TC/3E#,TP/1)        \ -;
10655   MICRO IF:REMOTE-AS     (TC/1F#,TP/1)        \ RING-IN FLOP = 0;
10656   MICRO IF:REMOTE-AS-    (TC/1F#,TP/0)        \ -;
10657   MICRO IF:RI-CARRY      (TC/20#,TP/1)        \ I(C)=1;
10658   MICRO IF:RI-CARRY-     (TC/20#,TP/0)        \ -;
10659   MICRO IF:RI-OVFL       (TC/22#,TP/1)        \ I(OV)=1;
10660   MICRO IF:RI-OVFL-      (TC/22#,TP/0)        \ -;
10661   MICRO IF:RING0         (TC/13#,TP/1)        \ RING=0;
10662   MICRO IF:RING0-        (TC/13#,TP/0)        \ -;
10663   MICRO IF:RUPT          (TC/24#,TP/0)        \ EXTERNAL INTERRUPT ACK'D;
10664   MICRO IF:RUPT-         (TC/24#,TP/1)        \ -;
10665   MICRO IF:SCISTR        (TC/03#,TP/1)        \ OP=SST OR SSJ;
10666   MICRO IF:SCISTR-       (TC/03#,TP/0)        \ -;
10667   MICRO IF:SELZERO       (TC/19#,TP/0,F/0)    \ SEL=0;
10668   MICRO IF:SELZERO'DEC   (TC/19#,TP/0,FSEL/3) \ SEL=0
10669   -                        ALSO    SEL <= SEL-1;
10670   MICRO IF:SELZERO-      (TC/19#,TP/1,F/0)    \ -;
```

```
LINE #                              RTL/6000 FILE EDIT
                                    DICTIONARY SECTION
10671  MICRO IF:SELZERO-'DEC    (TC/19#,TP/1,FSEL/3)\ -;
10672  MICRO IF:SIP-PRESENT     (TC/02#,TP/0)      \ SIP INSTALLED;
10673  MICRO IF:SIP-PRESENT-    (TC/02#,TP/1)      \ -;
10674  MICRO IF:SIPTRAP         (TC/01#,TP/0)      \ SIP TRAP PENDING
10675  -                              ALSO    STALL IF SIP BUSY;
10676  MICRO IF:SIPTRAP-        (TC/01#,TP/1)      \ -;
10677  MICRO IF:TICK            (TC/05#,TP/0)      \ 120HZ SERVICE REQ'D;
10678  MICRO IF:TICK-           (TC/05#,TP/1)      \ -;
10679  MICRO IF:TRACE           (TC/04#,TP/0)      \ M1(0)=1;
10680  MICRO IF:TRACE-          (TC/04#,TP/1)      \ -;
10681  MICRO IF:TRUE            (TC/00#,TP/1)      \ UNCONDITIONALLY;
10682  MICRO IF:XBREG0          (TC/3F#,TP/1)      \ XB(0)=1;
10683  MICRO IF:XBREG0-         (TC/3F#,TP/0)      \ -;
10684  MICRO IF:YELLOW          (TC/11#,TP/1)      \ MEM. YELLOW TO BE LOGGED
10685  -                              ALSO    YELLOW,SNAPER <= 0,0;
10686  MICRO IF:YELLOW-         (TC/11#,TP/0)      \ -;
10687  SKIP HOF;
10688  MICRO LB-BR-NXINST       (LB/A7#)           \ P <= P+0, CTR <= 1
10689  -                                           F <= NEXT PROC. WORD
10690  -                                           IF < 2, PRE-FETCH 2 MORE;
10691  MICRO LB-DA      (W)     (LB/13#)           \ SB <= DATA ADDRESS
10692  -                                           OPTIONAL W <= WB;
10693  MICRO LB-DA'WA:WB        (LB/13#,W/3)       \ SB <= DATA ADDRESS
10694  -                                           W(0-7) <= MISC3B
10695  -                                           W(8-31) <= WB(8-31);
10696  MICRO LB-DA'NXINST       (LB/97#)           \ SB <= DATA ADDRESS
10697  -                                           P <= P+1, CTR <= 1
10698  -                                           F <= NEXT PROC. WORD
10699  -                                           IF < 2, PRE-FETCH 2 MORE;
10700  MICRO LB-DA'RD-MEM-D (W) (LB/1B#)           \ WAIT DURING REQUEST
10701  -                                           SB <= DATA ADDRESS
10702  -                                           REQUEST 2 DATA WORDS
10703  -                                           OPTIONAL W <= WB;
10704  MICRO LB-DA'RD-MEM-S     (LB/03#)           \ WAIT DURING REQUEST
10705  -                                           SB <= DATA ADDRESS
10706  -                                           REQUEST 2 WORDS FOR SIP;
10707  MICRO LB-DA'Y:BALU       (LY/23#)           \ SB <= DATA ADDRESS
10708  -                                           Y <= BALU;
10709  MICRO LB-DA'Y:BALW       (LY/63#)           \ SB <= DATA ADDRESS
10710  -                                           Y <= BALU(CHECK WRAP);
10711  MICRO LB-DA'YINC2        (LB/33#)           \ SB <= DATA ADDRESS
10712  -                                           Y <= Y+2;
10713  MICRO LB-DW      (W)     (LB/02#)           \ SB(16-31) <= DATA WORD
10714  -                                           OPTIONAL W <= WB;
10715  MICRO LB-DW'WBYTE        (LB/02#,FK/7)      \ SB(16-31) <= DATA WORD
10716  -                                           W <= 0(0-7),0B(8),WB(8-31);
10717  MICRO LB-DW'WW:WB        (LB/02#,W/2)       \ SB(16-31) <= DATA WORD
10718  -                                           W(0-15) <= WB(16-31);
10719  MICRO LB-DW'NXINST       (LB/96#)           \ SB(16-31) <= DATA WORD
10720  -                                           P <= P+1, CTR <= 1
10721  -                                           F <= NEXT PROC. WORD
10722  -                                           IF < 2, PRE-FETCH 2 MORE;
10723  MICRO LB-DW'RD-MEM-W (W) (LB/1A#)           \ WAIT DURING REQUEST
10724  -                                           SB(16-31) <= DATA WORD
10725  -                                           REQUEST 1 DATA WORD
10726  -                                           OPTIONAL W <= WB;
10727  MICRO LB-DW'Y:BALU       (LY/22#)           \ SB(16-31) <= DATA WORD
10728  -                                           Y <= BALU;
10729  MICRO LB-DW'Y:BALW       (LY/62#)           \ SB(16-31) <= DATA WORD
10730  -                                           Y <= BALU(CHECK WRAP);
10731  MICRO LB-DW'YINC1        (LB/12#)           \ SB(16-31) <= DATA WORD
10732  -                                           Y <= Y+1;
10733  MICRO LB-DW'YINC2        (LB/32#)           \ SB(16-31) <= DATA WORD
10734  -                                           Y <= Y+2;
10735  SKIP HOF;
10736  MICRO LB-PA              (LB/9D#)           \ SB <= PROC. ADDRESS
10737  -                                           P <= P+2, CTR <= CTR+2
10738  -                                           PRE-FETCH 2 MORE WORDS;
10739  MICRO LB-PA'NONPROC (W)  (LB/3D#)           \ SB <= PROC. ADDRESS
10740  -                                           MMU ONLY CHECKS READ PERM.
10741  -                                           P <= P+2, CTR <= CTR+2
10742  -                                           IF < 2, PRE-FETCH 2 MORE
10743  -                                           OPTIONAL W <= WB;
10744  MICRO LB-PA'Y:BALU       (LY/8D#)           \ SB <= PROC. ADDRESS
10745  -                                           P <= P+2, CTR <= CTR+2
```

```
LINE #                    RTL/6000 FILE EDIT
                          DICTIONARY SECTION
10746   -                                              PRE-FETCH 2 MORE WORDS
10747   -                                              Y <= BALU;
10748   MICRO LB-PA'Y:BALW         (LY/CD#)            \ SB <= PROC. ADDRESS
10749   -                                              P <= P+2, CTR <= CTR+2
10750   -                                              PRE-FETCH 2 MORE WORDS
10751   -                                              Y <= BALU(CHECK WRAP);
10752   MICRO LB-P:Y'NONPROC       (LB/30#)            \ P <= Y, PF <= Y
10753   -                                              START FRESH PRE-FETCH, BUT
10754   -                                              MMU ONLY CHECKS READ PERM.;
10755   MICRO LB-P:Y'PREFETCH      (LB/A0#)            \ P <= Y, PF <= Y
10756   -                                              START FRESH PRE-FETCH;
10757   MICRO LB-PW                (LB/95#)            \ SB(16-31) <= PROC. WORD
10758   -                                              P <= P+1, CTR <= CTR+1
10759   -                                              IF < 2, PRE-FETCH 2 MORE;
10760   MICRO LB-PW'NONPROC (W)    (LB/35#)            \ SB(16-31) <= PROC. WORD
10761   -                                              MMU ONLY CHECKS READ PERM.
10762   -                                              OPTIONAL W <= WB
10763   -                                              P <= P+1, CTR <= CTR+1
10764   -                                              IF < 2, PRE-FETCH 2 MORE;
10765   MICRO LB-PW'Y:BALU         (LY/85#)            \ SB(16-31) <= PROC. WORD
10766   -                                              P <= P+1, CTR <= CTR+1
10767   -                                              IF < 2, PRE-FETCH 2 MORE
10768   -                                              Y <= BALU;
10769   MICRO LB-PW'Y:BALW         (LY/C5#)            \ SB(16-31) <= PROC. WORD
10770   -                                              P <= P+1, CTR <= CTR+1
10771   -                                              IF < 2, PRE-FETCH 2 MORE
10772   -                                              Y <= BALU(CHECK WRAP);
10773   MICRO LB-RD-IO             (LB/0A#,F/6,CK/0)   \ WAIT DURING REQUEST
10774   -                                              READ I-O WORD;
10775   MICRO LB-RD-LOCAL (CHNR,CMD) (LBR/28#,CKR/1)   \ WAIT DURING REQUEST
10776   -                                              SEND READ CMD ON LOCAL BUS;
10777   MICRO LB-RD-MEM-W'LOCK     (LB/3A#)            \ WAIT DURING REQUEST
10778   -                                              REQUEST 1 DATA WORD
10779   -                                              (UN)LOCK MEMORY;
10780   MICRO LB-STALL             (LB/00#)            \ WAIT DURING REQUEST;
10781   MICRO LB-STALL'P:Y         (LB/31#)            \ WAIT DURING REQUEST
10782   -                                              P (NOT PF) <- Y
10783   -                                              DO NOT START PRE-FETCH;
10784   MICRO LB-STALL'WA:WB       (LB/11#,W/3)        \ WAIT DURING REQUEST
10785   -                                              W(0-7) <= MISC3B
10786   -                                              W(8-31) <= WB(8-31);
10787   MICRO LB-STALL'WBYTE       (LB/01#,FK/7)       \ WAIT DURING REQUEST
10788   -                                              W <= 0(0-7),OB(8),WB(8-31);
10789   MICRO LB-STALL'WW:WB       (LB/01#,W/2)        \ WAIT DURING REQUEST
10790   -                                              W(0-15) <= WB(16-31);
10791   SKIP HDF;
10792   MICRO LB-STALL'Y:BALU      (LY/21#)            \ WAIT DURING REQUEST
10793   -                                              Y <= BALU;
10794   MICRO LB-STALL'Y:BALW      (LY/61#)            \ WAIT DURING REQUEST
10795   -                                              Y <= BALU(CHECK WRAP);
10796   MICRO LB-STALL'YINC1       (LB/10#)            \ WAIT DURING REQUEST
10797   -                                              Y <= Y+1;
10798   MICRO LB-STALL'YINC2       (LB/30#)            \ WAIT DURING REQUEST
10799   -                                              Y <= Y+2;
10800   MICRO LB-WR-IO-H           (LB/8,F/6,CK/2)     \ WAIT DURING REQUEST
10801   -                                              WRITE I-O HALF-WORD
10802   -                                              WAIT DURING REQUEST;
10803   MICRO LB-WR-IO-RSVF        (LB/8,F/6,CK/3)     \ WAIT DURING REQUEST
10804   -                                              WRITE I-O WORD
10805   -                                              WAIT FOR REPLY;
10806   MICRO LB-WR-IO-W           (LB/8,F/6,CK/0)     \ WAIT DURING REQUEST
10807   -                                              WRITE I-O WORD
10808   -                                              WAIT DURING REQUEST;
10809   MICRO LB-WR-LOCAL (CHN,CMD) (LB/28#,CK/2)      \ WAIT DURING REQUEST
10810   -                                              SEND CMD,DATA ON LOCAL BUS
10811   -                                              WAIT DURING REQUEST;
10812   MICRO LB-WR-MEM-0          (LB/19#,CK/0)       \ WAIT DURING REQUEST
10813   -                                              WRITE 2 WORDS
10814   -                                              WAIT DURING REQUEST;
10815   MICRO LB-WR-MEM-0'YINC2 (W) (LB/09#,CK/0)      \ WAIT DURING REQUEST
10816   -                                              WRITE 2 WORDS
10817   -                                              WAIT DURING REQUEST
10818   -                                              OPTIONAL W <= WB
10819   -                                              Y <= Y+2;
10820   MICRO LB-WR-MEM-0'YINC2'WBYTE (LB/9,CK/0,FK/7) \ WAIT DURING REQUEST
10821   -                                              WRITE 2 WORDS
```

```
LINE #                                              RTL/6000 FILE EDIT
                                                    DICTIONARY SECTION
10822   -                                                            WAIT DURING REQUEST
10823   -                                                            W <= O(0-7),OB(8),WB(8-31)
10824   -                                                            Y <= Y+2;
10825   MICRO LB-WR-MEM-H'YINC1 (W) (LB/18#,CK/2)   \ WAIT DURING REQUEST
10826   -                                                            WRITE HALF-WORD
10827   -                                                            WAIT DURING REQUEST
10828   -                                                            OPTIONAL W <= WB
10829   -                                                            Y <= Y+1;
10830   MICRO LB-WR-MEM-W'UNLOCK (LB/38#,CK/0)      \ WAIT DURING REQUEST
10831   -                                                            WRITE 1 WORD
10832   -                                                            (UN)LOCK MEMORY
10833   -                                                            WAIT DURING REQUEST;
10834   MICRO LB-WR-MEM-W'YINC1 (W) (LB/18#,CK/0)   \ WAIT DURING REQUEST
10835   -                                                            WRITE 1 WORD
10836   -                                                            WAIT DURING REQUEST
10837   -                                                            OPTIONAL W <= WB
10838   -                                                            Y <= Y+1;
10839   MICRO LB-WR-MEM-W'YINC1'WBYTE (LB/18#,CK/0,FK/7) \ WAIT DURING REQUEST
10840   -                                                            WRITE 1 WORD
10841   -                                                            WAIT DURING REQUEST
10842   -                                                            W <= O(0-7),OH(8),WB(8-31)
10843   -                                                            Y <= Y+1;
10844   SKIP HOF;
10845   MICRO RB:A0              (RB/2,BS/8#)           \ RB = BRAM[A0];
10846   MICRO RB:A1              (RB/2,BS/9#,BM/0)      \ RB = BRAM[A1];
10847   MICRO RB:A2              (RB/2,BS/A#,BM/0)      \ RB = BRAM[A2];
10848   MICRO RB:A3              (RB/2,BS/B#,BM/0)      \ RB = BRAM[A3];
10849   MICRO RB:A3SEL           (RB/2,BS/B#,BM/1)      \ RB = BRAM[A(SEL2-3)];
10850   MICRO RB:A4              (RB/2,BS/C#,BM/0)      \ RB = BRAM[A4];
10851   MICRO RB:A5              (RB/2,BS/D#,BM/0)      \ RB = BRAM[A5];
10852   MICRO RB:A6              (RB/2,BS/E#,BM/0)      \ RB = BRAM[A6];
10853   MICRO RB:A7              (RB/2,BS/F#,BM/0)      \ RB = BRAM[A7];
10854   MICRO RB:A7SEL           (RB/2,BS/F#,BM/1)      \ RB = BRAM[A(SEL1-3)];
10855   MICRO RB:B0              (RB/2,BS/0#)           \ RB = BRAM[B0];
10856   MICRO RB:B1              (RB/2,BS/1#,BM/0)      \ RB = BRAM[B1];
10857   MICRO RB:B2              (RB/2,BS/2#,BM/0)      \ RB = BRAM[B2];
10858   MICRO RB:B3              (RB/2,BS/3#,BM/0)      \ RB = BRAM[B3];
10859   MICRO RB:B3NUM           (RB/2,BS/3#,BM/2)      \ RB = BRAM[B(F2-3)];
10860   MICRO RB:B3SEL           (RB/2,BS/3#,BM/1)      \ RB = BRAM[B(SEL2-3)];
10861   MICRO RB:B4              (RB/2,BS/4#,BM/0)      \ RB = BRAM[B4];
10862   MICRO RB:B5              (RB/2,BS/5#,BM/0)      \ RB = BRAM[B5];
10863   MICRO RB:B6              (RB/2,BS/6#,BM/0)      \ RB = BRAM[B6];
10864   MICRO RB:B7              (RB/2,BS/7#,BM/0)      \ RB = BRAM[B7];
10865   MICRO RB:B7NUM           (RB/2,BS/7#,BM/2)      \ RB = BRAM[B(F1-3)];
10866   MICRO RB:B7SEL           (RB/2,BS/7#,BM/1)      \ RB = BRAM[B(SEL1-3)];
10867   MICRO RB:D0              (RB/1,DS/00#)          \ RB = DRAM[D0];
10868   MICRO RB:D1              (RB/1,DS/01#,DM/0)     \ RB = DRAM[D1];
10869   MICRO RB:D2              (RB/1,DS/02#,DM/0)     \ RB = DRAM[D2];
10870   MICRO RB:D3              (RB/1,DS/03#,DM/0)     \ RB = DRAM[D3];
10871   MICRO RB:D3NDX           (RB/1,DS/03#,DM/2)     \ RB = DRAM[D(F10-11)]
10872   -                                            USE ONLY IN FIRST STEP OF XA OR XB;
10873   MICRO RB:D3NUM           (RB/1,DS/03#,DM/2)     \ RB = DRAM[D(F2-3)]
10874   -                                            DO NOT USE IN FIRST STEP OF XA OR XB;
10875   MICRO RB:D3SEL           (RB/1,DS/03#,DM/1)     \ RB = DRAM[D(SEL2-3)];
10876   MICRO RB:D4              (RB/1,DS/04#,DM/0)     \ RB = DRAM[D4];
10877   MICRO RB:D5              (RB/1,DS/05#,DM/0)     \ RB = DRAM[D5];
10878   MICRO RB:D6              (RB/1,DS/06#,DM/0)     \ RB = DRAM[D6];
10879   MICRO RB:D6NUM           (RB/1,DS/06#,DM/2)     \ RB = DRAM[D(F1-2)]
10880   -                                            DO NOT USE IN FIRST STEP OF XA OR XB;
10881   MICRO RB:D6SEL           (RB/1,DS/06#,DM/1)     \ RB = DRAM[D(SEL1-2)];
10882   MICRO RB:D7              (RB/1,DS/07#,DM/0)     \ RB = DRAM[D7];
10883   MICRO RB:D7NDX           (RB/1,DS/07#,DM/2)     \ RB = DRAM[D(F9-11)]
10884   -                                            USE ONLY IN FIRST STEP OF XA OR XB;
10885   MICRO RB:D7NUM           (RB/1,DS/07#,DM/2)     \ RB = DRAM[D(F1-3)]
10886   -                                            DO NOT USE IN FIRST STEP OF XA OR XB;
10887   MICRO RB:D7SEL           (RB/1,DS/07#,DM/1)     \ RB = DRAM[D(SEL1-3)];
10888   MICRO RB:E0              (RB/1,DS/10#)          \ RB = DRAM[E0];
10889   MICRO RB:E1              (RB/1,DS/11#,DM/0)     \ RB = DRAM[E1];
10890   MICRO RB:E2              (RB/1,DS/12#,DM/0)     \ RB = DRAM[E2];
10891   MICRO RB:E3              (RB/1,DS/13#,DM/0)     \ RB = DRAM[E3];
10892   MICRO RB:E3SEL           (RB/1,DS/13#,DM/1)     \ RB = DRAM[E(SEL2-3)];
10893   MICRO RB:E4              (RB/1,DS/14#,DM/0)     \ RB = DRAM[E4];
10894   MICRO RB:E5              (RB/1,DS/15#,DM/0)     \ RB = DRAM[E5];
10895   MICRO RB:E6              (RB/1,DS/16#,DM/0)     \ RB = DRAM[E6];
10896   MICRO RB:E7              (RB/1,DS/17#,DM/0)     \ RB = DRAM[E7];
10897   MICRO RB:E7SEL           (RB/1,DS/17#,DM/1)     \ RB = DRAM[E(SEL1-3)];
10898   SKIP HOF;
```

```
LINE #                              RTL/6000 FILE EDIT
                                    DICTIONARY SECTION

10899  MICRO RB:IV          (RB/1,DS/15#,DM/0)    \ RB = DRAM[E5];
10900  MICRO RB:K0          (RB/1,DS/08#)         \ RB = DRAM[K0] MSH;
10901  MICRO RB:K1          (RB/1,DS/09#,DM/0)    \ RB = DRAM[K1] MSH;
10902  MICRO RB:K2          (RB/1,DS/0A#,DM/0)    \ RB = DRAM[K2] MSH;
10903  MICRO RB:K3          (RB/1,DS/0B#,DM/0)    \ RB = DRAM[K3] MSH;
10904  MICRO RB:K3NDX       (RB/1,DS/0B#,DM/2)    \ RB = DRAM[K(F10-11)] MSH
10905  -                                          USE ONLY IN FIRST STEP OF XA OR XB;
10906  MICRO RB:K4          (RB/1,DS/0C#,DM/0)    \ RB = DRAM[K4] MSH;
10907  MICRO RB:K5          (RB/1,DS/0D#,DM/0)    \ RB = DRAM[K5] MSH;
10908  MICRO RB:K6          (RB/1,DS/0E#,DM/0)    \ RB = DRAM[K6] MSH;
10909  MICRO RB:K7          (RB/1,DS/0F#,DM/0)    \ RB = DRAM[K7] MSH;
10910  MICRO RB:K7NDX       (RB/1,DS/0F#,DM/2)    \ RB = DRAM[K(F9-11)] MSH
10911  -                                          USE ONLY IN FIRST STEP OF XA OR XB;
10912  MICRO RB:K7NUM       (RB/1,DS/0F#,DM/2)    \ RB = DRAM[K(F1-3)] MSH
10913  -                                          DO NOT USE IN FIRST STEP OF XA OR XB;
10914  MICRO RB:K7SEL       (RB/1,DS/0F#,DM/1)    \ RB = DRAM[K(SEL1-3)] MSH;
10915  MICRO RB:L0          (RB/1,DS/18#)         \ RB = DRAM[K0] LSH;
10916  MICRO RB:L1          (RB/1,DS/19#,DM/0)    \ RB = DRAM[K1] LSH;
10917  MICRO RB:L2          (RB/1,DS/1A#,DM/0)    \ RB = DRAM[K2] LSH;
10918  MICRO RB:L3          (RB/1,DS/1B#,DM/0)    \ RB = DRAM[K3] LSH;
10919  MICRO RB:L3NDX       (RB/1,DS/1B#,DM/2)    \ RB = DRAM[K(F10-11)] LSH
10920  -                                          USE ONLY IN FIRST STEP OF XA OR XB;
10921  MICRO RB:L4          (RB/1,DS/1C#,DM/0)    \ RB = DRAM[K4] LSH;
10922  MICRO RB:L5          (RB/1,DS/1D#,DM/0)    \ RB = DRAM[K5] LSH;
10923  MICRO RB:L6          (RB/1,DS/1E#,DM/0)    \ RB = DRAM[K6] LSH;
10924  MICRO RB:L7          (RB/1,DS/1F#,DM/0)    \ RB = DRAM[K7] LSH;
10925  MICRO RB:L7NDX       (RB/1,DS/1F#,DM/2)    \ RB = DRAM[K(F10-11)] LSH
10926  -                                          USE ONLY IN FIRST STEP OF XA OR XB;
10927  MICRO RB:L7NUM       (RB/1,DS/1F#,DM/2)    \ RB = DRAM[K(F1-3)] LSH
10928  -                                          DO NOT USE IN FIRST STEP OF XA OR XB;
10929  MICRO RB:L7SEL       (RB/1,DS/1F#,DM/1)    \ RB = DRAM[K(SEL1-3)] LSH;
10930  MICRO RB:M0          (RB/1,DS/18#)         \ RB = DRAM[M0];
10931  MICRO RB:M1          (RB/1,DS/19#,DM/0)    \ RB = DRAM[M1];
10932  MICRO RB:M2          (RB/1,DS/1A#,DM/0)    \ RB = DRAM[M2];
10933  MICRO RB:M3          (RB/1,DS/1B#,DM/0)    \ RB = DRAM[M3];
10934  MICRO RB:M4          (RB/1,DS/1C#,DM/0)    \ RB = DRAM[M4];
10935  MICRO RB:M5          (RB/1,DS/1D#,DM/0)    \ RB = DRAM[M5];
10936  MICRO RB:M6          (RB/1,DS/1E#,DM/0)    \ RB = DRAM[M6];
10937  MICRO RB:M6SEL       (RB/1,DS/1E#,DM/1)    \ RB = DRAM[M(SEL1-2)];
10938  MICRO RB:M7          (RB/1,DS/1F#,DM/0)    \ RB = DRAM[M7];
10939  MICRO RB:M7NUM       (RB/1,DS/1F#,DM/2)    \ RB = DRAM[M(F1-3)]
10940  -                                          DO NOT USE IN FIRST STEP OF XA OR XB;
10941  MICRO RB:M7SEL       (RB/1,DS/1F#,DM/1)    \ RB = DRAM[M(SEL1-3)];
10942  MICRO RB:PANEL       (RB/0)                \ RB = PANEL MESSAGE;
10943  MICRO RB:PANEL'STROBE  (RB/0,IB/C#,K/20#)  \ RB = PANEL MESSAGE
10944  -              DATA,RUN-,OPDF,INCR-,CHGR-,CDEF,WRIT-0,MEMA,ADEF,SELECT
10945  -              16-19 20    21    22    23    24  25     27  28  29-31;
10946  MICRO RB:PCIP        (RB/1,DS/17#,DM/0)    \ RB = DRAM[E7];
10947  MICRO RB:PSIP        (RB/1,DS/16#,DM/0)    \ RB = DRAM[E6];
10948  MICRO RB:RDBR        (RB/2,DS/B#,DM/0)     \ RB = DRAM[A3];
10949  MICRO RB:STKA        (RB/1,DS/13#,DM/0)    \ RB = DRAM[E3];
10950  MICRO RB:STKB        (RB/2,DS/D#,DM/0)     \ RB = DRAM[A5];
10951  MICRO RB:STKP        (RB/1,DS/14#,DM/0)    \ RB = DRAM[E4];
10952  MICRO RB:STKT        (RB/2,DS/C#,DM/0)     \ RB = DRAM[A4];
10953  SKIP HDF;
10954  MICRO RIB:OB-NZ      (K/96#,IB0/0)         \ I(B) <= [OB NOT ZERO];
10955  MICRO RIC:0          (K/80#,IB0/0)         \ I(C) <= 0;
10956  MICRO RIC:DCARRY8    (K/81#,IB0/0)         \ I(C) <= DCARRY(8);
10957  MICRO RIGLU:CMP      (K/C6#,IB0/0)         \ I(G) <= DCARRY(8)<AND>
10958  -                                                  [OB NOT ZERO]
10959  -                                            I(L) <= <NOT>DCARRY(8)
10960  -                                            I(U) <= IBUS(15)<XOR>
10961                                                     RBUS(16);
10962  MICRO RII:BSACK      (K/8E#,IB0/0)         \ I(I) <= BUS ACK;
10963  MICRO RILOAD:WB      (K/FF#,IB0/0)         \ I(0-7) <= WB(24-31);
10964  MICRO RIO:0          (K/32#,IB0/0)         \ I(OV) <= 0;
10965  MICRO RIO:1          (K/33#,IB0/0)         \ I(OV) <= 1;
10966  MICRO RIOC:ADD       (K/84#,IB0/0)         \ I(OV) <= DALU(16<XOR>8)
10967  -                                            I(C) <= DCARRY(8);
10968  MICRO RIOC:SHFT      (K/85#,IB0/0)         \ IND'RS FOR SHIFTS, I.E.,
10969  -              ARITH-LEFT                  I(OV) <= WB(12-16)<NE>00,1F
10970  -              OPEN-LEFT                   I(C) <= WB(15)
10971  -              ARITH-RIGHT                 I(C) <= Q(32)
10972  -              OPEN-RIGHT                  I(C) <= Q(32);
```

RTL/6000 FILE EDIT
DICTIONARY SECTION

```
LINE #
10973   MICRO RIOC3:INC         (K/A4#,I30/0)           \ I(OV) <= DALU(16<XOR>8)
10974   -                                                 I(C)  <= DCARRY(8)
10975   -                                                 I(B)  <= BALU(16)];
10976   SKIP HOF;
10977   \                                               STORE:     INTO:        \
10978   MICRO ST-A0:WB          (BW/1,BS/8#)            \ WB        BRAM[A0];
10979   MICRO ST-A1:WB          (BW/1,BS/9#,BM/0)       \ WB        BRAM[A1];
10980   MICRO ST-A2:WB          (BW/1,BS/A#,BM/0)       \ WB        BRAM[A2];
10981   MICRO ST-A3:WB          (BW/1,BS/B#,BM/0)       \ WB        BRAM[A3];
10982   MICRO ST-A4:WB          (BW/1,BS/C#,BM/0)       \ WB        BRAM[A4];
10983   MICRO ST-A5:WB          (BW/1,BS/D#,BM/0)       \ WB        BRAM[A5];
10984   MICRO ST-A6:WB          (BW/1,BS/E#,BM/0)       \ WB        BRAM[A6];
10985   MICRO ST-A7:WB          (BW/1,BS/F#,BM/0)       \ WB        BRAM[A7];
10986   MICRO ST-A7SEL:WB       (BW/1,BS/F#,BM/1)       \ WB        BRAM[A(SEL1-3)];
10987   MICRO ST-B0:WB          (BW/1,BS/0#)            \ WB        BRAM[B0];
10988   MICRO ST-B1:WB          (BW/1,BS/1#,BM/0)       \ WB        BRAM[B1];
10989   MICRO ST-B2:WB          (BW/1,BS/2#,BM/0)       \ WB        BRAM[B2];
10990   MICRO ST-B3:WB          (BW/1,BS/3#,BM/0)       \ WB        BRAM[B3];
10991   MICRO ST-B3NUM:WB       (BW/1,BS/3#,BM/2)       \ WB        BRAM[B(F2-3)];
10992   MICRO ST-B3SEL:WB       (BW/1,BS/3#,BM/1)       \ WB        BRAM[B(SEL2-3)];
10993   MICRO ST-B4:WB          (BW/1,BS/4#,BM/0)       \ WB        BRAM[B4];
10994   MICRO ST-B5:WB          (BW/1,BS/5#,BM/0)       \ WB        BRAM[B5];
10995   MICRO ST-B6:WB          (BW/1,BS/6#,BM/0)       \ WB        BRAM[B6];
10996   MICRO ST-B7:WB          (BW/1,BS/7#,BM/0)       \ WB        BRAM[B7];
10997   MICRO ST-B7NUM:WB       (BW/1,BS/7#,BM/2)       \ WB        BRAM[B(F1-3)];
10998   MICRO ST-B7SEL:WB       (BW/1,BS/7#,BM/1)       \ WB        BRAM[B(SEL1-3)];
10999   MICRO ST-D0:DALU        (DW/3,DS/00#)           \ DALU      DRAM[D0];
11000   MICRO ST-D1:DALU        (DW/3,DS/01#,DM/0)      \ DALU      DRAM[D1];
11001   MICRO ST-D2:DALU        (DW/3,DS/02#,DM/0)      \ DALU      DRAM[D2];
11002   MICRO ST-D3:DALU        (DW/3,DS/03#,DM/0)      \ DALU      DRAM[D3];
11003   MICRO ST-D3NDX:DALU     (DW/3,DS/03#,DM/2)      \ DALU      DRAM[D(F10-11)]
11004   -                       USE ONLY IN FIRST STEP OF XA OR XB;
11005   MICRO ST-D3NUM:DALU     (DW/3,DS/03#,DM/2)      \ DALU      DRAM[D(F2-3)]
11006   -                       DO NOT USE IN FIRST STEP OF XA OR XB;
11007   MICRO ST-D3SEL:DALU     (DW/3,DS/03#,DM/1)      \ DALU      DRAM[D(SEL2-3)];
11008   MICRO ST-D4:DALU        (DW/3,DS/04#,DM/0)      \ DALU      DRAM[D4];
11009   MICRO ST-D5:DALU        (DW/3,DS/05#,DM/0)      \ DALU      DRAM[D5];
11010   MICRO ST-D6:DALU        (DW/3,DS/06#,DM/0)      \ DALU      DRAM[D6];
11011   MICRO ST-D6NUM:DALU     (DW/3,DS/06#,DM/2)      \ DALU      DRAM[D(F1-2)]
11012   -                       DO NOT USE IN FIRST STEP OF XA OR XB;
11013   MICRO ST-D6SEL:DALU     (DW/3,DS/06#,DM/1)      \ DALU      DRAM[D(SEL1-2)];
11014   MICRO ST-D7:DALU        (DW/3,DS/07#,DM/0)      \ DALU      DRAM[D7];
11015   MICRO ST-D7NDX:DALU     (DW/3,DS/07#,DM/2)      \ DALU      DRAM[D(F9-11)]
11016   -                       USE ONLY IN FIRST STEP OF XA OR XB;
11017   MICRO ST-D7NUM:DALU     (DW/3,DS/07#,DM/2)      \ DALU      DRAM[D(F1-3)]
11018   -                       DO NOT USE IN FIRST STEP OF XA OR XB;
11019   MICRO ST-D7SEL:DALU     (DW/3,DS/07#,DM/1)      \ DALU      DRAM[D(SEL1-3)];
11020   MICRO ST-E0:DALU        (DW/3,DS/10#)           \ DALU      DRAM[E0];
11021   MICRO ST-E1:DALU        (DW/3,DS/11#,DM/0)      \ DALU      DRAM[E1];
11022   MICRO ST-E2:DALU        (DW/3,DS/12#,DM/0)      \ DALU      DRAM[E2];
11023   MICRO ST-E3:DALU        (DW/3,DS/13#,DM/0)      \ DALU      DRAM[E3];
11024   MICRO ST-E4:DALU        (DW/3,DS/14#,DM/0)      \ DALU      DRAM[E4];
11025   MICRO ST-E5:DALU        (DW/3,DS/15#,DM/0)      \ DALU      DRAM[E5];
11026   MICRO ST-E6:DALU        (DW/3,DS/16#,DM/0)      \ DALU      DRAM[E6];
11027   MICRO ST-E7:DALU        (DW/3,DS/17#,DM/0)      \ DALU      DRAM[E7];
11028   MICRO ST-E7SEL:DALU     (DW/3,DS/17#,DM/1)      \ DALU      DRAM[E(SEL1-3)];
11029   SKIP HOF;
11030   MICRO ST-IV:DALU        (DW/3,DS/15#,DM/0)      \ DALU      DRAM[E5];
11031   MICRO ST-K0:DALU        (DW/3,DS/08#)           \ DALU      DRAM[K0];
11032   MICRO ST-K1:DALU        (DW/3,DS/09#,DM/0)      \ DALU      DRAM[K1];
11033   MICRO ST-K2:DALU        (DW/3,DS/0A#,DM/0)      \ DALU      DRAM[K2];
11034   MICRO ST-K3:DALU        (DW/3,DS/0B#,DM/0)      \ DALU      DRAM[K3];
11035   MICRO ST-K3NDX:DALU     (DW/3,DS/0B#,DM/2)      \ DALU      DRAM[K(F10-11)]
11036   -                       USE ONLY IN FIRST STEP OF XA OR XB;
11037   MICRO ST-K4:DALU        (DW/3,DS/0C#,DM/0)      \ DALU      DRAM[K4];
11038   MICRO ST-K5:DALU        (DW/3,DS/0D#,DM/0)      \ DALU      DRAM[K5];
11039   MICRO ST-K6:DALU        (DW/3,DS/0E#,DM/0)      \ DALU      DRAM[K6];
11040   MICRO ST-K7:DALU        (DW/3,DS/0F#,DM/0)      \ DALU      DRAM[K7];
11041   MICRO ST-K7NDX:DALU     (DW/3,DS/0F#,DM/2)      \ DALU      DRAM[K(F9-11)]
11042   -                       USE ONLY IN FIRST STEP OF XA OR XB;
11043   MICRO ST-K7NUM:DALU     (DW/3,DS/0F#,DM/2)      \ DALU      DRAM[K(F1-3)]
11044   -                       DO NOT USE IN FIRST STEP OF XA OR XB;
11045   MICRO ST-K7SEL:DALU     (DW/3,DS/0F#,DM/1)      \ DALU      DRAM[K(SEL1-3)];
11046   MICRO ST-L0:DALU        (DW/1,DS/18#)           \ DALU      DRAM[L0];
11047   MICRO ST-L1:DALU        (DW/1,DS/19#,DM/0)      \ DALU      DRAM[L1];
```

```
LINE #                              RTL/6000 FILE EDIT
                                     DICTIONARY SECTION
11043  MICRO ST-L2:DALU        (DW/1,DS/1AH,DM/0)  \ DALU     DRAM[L2];
11048  MICRO ST-L3:DALU        (DW/1,DS/1BH,DM/0)  \ DALU     DRAM[L3];
11050  MICRO ST-L3NDX:DALU     (DW/1,DS/1BH,DM/2)  \ DALU     DRAM[L(F10-11)]
11051  -                       USE ONLY IN FIRST STEP OF XA OR XB;
11052  MICRO ST-L4:DALU        (DW/1,DS/1CH,DM/0)  \ DALU     DRAM[L4];
11053  MICRO ST-L5:DALU        (DW/1,DS/1DH,DM/0)  \ DALU     DRAM[L5];
11054  MICRO ST-L6:DALU        (DW/1,DS/1EH,DM/0)  \ DALU     DRAM[L6];
11055  MICRO ST-L7:DALU        (DW/1,DS/1FH,DM/0)  \ DALU     DRAM[L7];
11056  MICRO ST-L7NDX:DALU     (DW/1,DS/1FH,DM/2)  \ DALU     DRAM[L(F9-11)]
11057  -                       USE ONLY IN FIRST STEP OF XA OR XB;
11058  MICRO ST-L7NUM:DALU     (DW/1,DS/1FH,DM/2)  \ DALU     DRAM[L(F1-3)]
11059  -                       DO NOT USE IN FIRST STEP OF XA OR XB;
11060  MICRO ST-L7SEL:DALU     (DW/1,DS/1FH,DM/1)  \ DALU     DRAM[L(SEL1-3)];
11061  MICRO ST-ML7SEL:DALU    (DW/3,DS/1FH,DM/1)  \ DALU     DRAM[ML(SEL1-3)];
11062  MICRO ST-M0:DALU        (DW/2,DS/18H)       \ DALU     DRAM[M0];
11063  MICRO ST-M1:DALU        (DW/2,DS/19H,DM/0)  \ DALU     DRAM[M1];
11064  MICRO ST-M2:DALU        (DW/2,DS/1AH,DM/0)  \ DALU     DRAM[M2];
11065  MICRO ST-M3:DALU        (DW/2,DS/1BH,DM/0)  \ DALU     DRAM[M3];
11066  MICRO ST-M4:DALU        (DW/2,DS/1CH,DM/0)  \ DALU     DRAM[M4];
11067  MICRO ST-M5:DALU        (DW/2,DS/1DH,DM/0)  \ DALU     DRAM[M5];
11068  MICRO ST-M6:DALU        (DW/2,DS/1EH,DM/0)  \ DALU     DRAM[M6];
11069  MICRO ST-M7:DALU        (DW/2,DS/1FH,DM/0)  \ DALU     DRAM[M7];
11070  MICRO ST-M7NUM:DALU     (DW/2,DS/1FH,DM/2)  \ DALU     DRAM[M(F1-3)]
11071  -                       DO NOT USE IN FIRST STEP OF XA OR XB;
11072  MICRO ST-M7SEL:DALU     (DW/2,DS/1FH,DM/1)  \ DALU     DRAM[M(SEL1-3)];
11073  MICRO ST-PCIP:DALU      (DW/3,DS/17H,DM/0)  \ DALU     DRAM[E7];
11074  MICRO ST-PSIP:DALU      (DW/3,DS/16H,DM/0)  \ DALU     DRAM[E6];
11075  MICRO ST-RDBR:WB        (BW/1,BS/BH,BM/0)   \ WB       BRAM[A3];
11076  MICRO ST-STKA:DALU      (DW/3,DS/13H,DM/0)  \ DALU     DRAM[E3];
11077  MICRO ST-STKB:WB        (BW/1,BS/DH,BM/0)   \ WB       BRAM[A5];
11078  MICRO ST-STKP:DALU      (DW/3,DS/14H,DM/0)  \ DALU     DRAM[E4];
11079  MICRO ST-STKT:WB        (BW/1,BS/CH,BM/0)   \ WB       BRAM[A4];
11080  \\
11081  \\
11082  MICRO VL                (CK/3)              \ FORCE CKVL;
11083  SKIP HOF;
11084  MICRO WB'Q:RB'Q-SH1     (SH/6CH,DM/3)       \ WB,Q <= RB,Q SHIFTED 1
11085  -                                           LEFT/RIGHT IF FREG09=0/1;
11086  MICRO WB'Q:RB'Q-SH2     (SH/68H,DM/3)       \ WB,Q <= RB,Q SHIFTED 2
11087  -                                           LEFT/RIGHT IF FREG09=0/1;
11088  MICRO WB'Q:RB'Q-SH4     (SH/64H,DM/3)       \ WB,Q <= RB,Q SHIFTED 4
11089  -                                           LEFT/RIGHT IF FREG09=0/1;
11090  MICRO WB:DALU           (SH/80H)            \ WB = DALU;
11091  MICRO WB:DALU'Q:DALU    (SH/F0H)            \ WB = DALU
11092  -                                           Q <= DALU(16-31);
11093  MICRO WB:DALU-SW'Q:HEXB (SH/E0H)            \ WB = DALU(24-31,24-31,16-23)
11094  -                                           Q <= HEX-DECODE[XB]
11095  -                       A WORD OF [XB]0'S, A SINGLE 1, & [15-XB]0'S;
11096  MICRO WB:DALU'Q:J-SCALED (SH/DCH)           \ WB,Q <= SCALED 32-BIT VALUE;
11097  MICRO WB:DALU-SCALED    (SH/D8H)            \ WB = DALU SCALED TO OD SIZE;
11098  MICRO WB:DALU-SL1       (SH/B4H)            \ WB <=SL1= DALU,0;
11099  MICRO WB:DALU-SL1'Q:QSL1 (SH/F4H)           \ WB,Q <=SL1= DALU,Q,*;
11100  MICRO WB:DALU-SL2       (SH/B8H)            \ WB <=SL2= DALU,0;
11101  MICRO WB:DALU-SL2'Q:QSL2 (SH/F8H)           \ WB,Q <=SL2= DALU,Q,*;
11102  MICRO WB:DALU-SL4       (SH/BCH)            \ WB <=SL4= DALU,0;
11103  MICRO WB:DALU-SL4'Q:QSL4 (SH/FCH)           \ WB,Q <=SL4= DALU,Q,*;
11104  MICRO WB:DALU-SR1       (SH/ACH)            \ WB <=SR1= *,DALU;
11105  MICRO WB:DALU-SR1'Q:QSR1 (SH/ECH)           \ WB,Q <=SR1= *,DALU,Q;
11106  MICRO WB:DALU-SR2       (SH/A8H)            \ WB <=SR2= *,DALU;
11107  MICRO WB:DALU-SR2'Q:QSR2 (SH/E8H)           \ WB,Q <=SR2= *,DALU,Q;
11108  MICRO WB:DALU-SR4       (SH/A4H)            \ WB <=SR4= *,DALU;
11109  MICRO WB:DALU-SR4'Q:QSR4 (SH/E4H)           \ WB,Q <=SR4= *,DALU,Q;
11110  MICRO WB:DALU-SW        (SH/A0H)            \ WB = DALU(24-31,24-31,16-23);
11111  MICRO WB:DALU-TW        (SH/88H)            \ WB = DALU(24-31,24-31,24-31);
11112  MICRO WB:P              (SH/10H)            \ WB = P;
11113  MICRO WB:P-SL1          (SH/14H)            \ WB <=SL1= P;
11114  MICRO WB:RB             (SH/30H)            \ WB = RB;
11115  MICRO WB:RB-SW'Q:HEXB   (SH/60H)            \ WB = RB(24-31,24-31,16-23)
11116  -                                           Q <= HEX-DECODE[XB]
11117  -                       A WORD OF [XB]0'S, A SINGLE 1, & [15-XB]0'S;
11118  MICRO WB:RB'Q:RB        (SH/70H)            \ WB = RB
11119  -                                           Q <= RB(16-31);
11120  MICRO WB:RB'Q:Q-SCALED  (SH/5CH)            \ WB,Q <= SCALED 32-BIT VALUE;
11121  MICRO WB:RB-SCALED      (SH/58H)            \ WB = RB SCALED TO OD SIZE;
```

```
LINE #                            RTL/6000 FILE EDIT
                                   DICTIONARY SECTION

11122   MICRO WB:RB-SL1          (SH/34#)      \ WB <=SL1= RB,0;
11123   MICRO WB:RB-SL1'Q:QSL1   (SH/74#)      \ WB,Q <=SL1= RB,Q,*;
11124   MICRO WB:RB-SL2          (SH/38#)      \ WB <=SL2= RB,0;
11125   MICRO WB:RB-SL2'Q:QSL2   (SH/78#)      \ WB,Q <=SL2= RB,Q,*;
11126   MICRO WB:RB-SL4          (SH/3C#)      \ WB <=SL4= RB,0;
11127   MICRO WB:RB-SL4'Q:QSL4   (SH/7C#)      \ WB,Q <=SL4= RB,Q,*;
11128   MICRO WB:RB-SR1          (SH/2C#)      \ WB <=SR1= *,RB;
11129   MICRO WB:RB-SR1'Q:QSR1   (SH/6C#)      \ WB,Q <=SR1= *,RB,Q;
11130   MICRO WB:RB-SR2          (SH/28#)      \ WB <=SR2= *,RB;
11131   MICRO WB:RB-SR2'Q:QSR2   (SH/68#)      \ WB,Q <=SR2= *,RB,Q;
11132   MICRO WB:RB-SR4          (SH/24#)      \ WB <=SR4= *,RB;
11133   MICRO WB:RB-SR4'Q:QSR4   (SH/64#)      \ WB,Q <=SR4= *,RB,Q;
11134   SKIP HOF;
11135   \      * RIGHT-SHIFT END-EFFECTS:
11136   -                         WB08-11 <=     WB16-19 <=      Q16-19 <=
11137   - WHEN SHIN2,1=           ----------     ----------      ----------
11138   -    OPEN  - - - - - -    0B8,8,8,8      0,0,0,0         0B28-31
11139   -    CIRC  - - - - - -    0B8,8,8,8      Q28-31          0B28-31
11140   -    AR32  - - - - - -    0B8,8,8,8      0B12-15         0B28-31
11141   -    AR24  - - - - - -    0B8,8,8,8      0B12-15         0B28-31
11142   -
11143   -
11144   -          LEFT-SHIFT END-EFFECTS:
11145   -                         WB08-11 <=     WB28-31 <=      Q28-31 <=
11146   - WHEN SHIN2,1=           ----------     ----------      ----------
11147   -    OPEN  - - - - - -    0,0,0,0        Q16-19          0,0,0,0
11148   -    CIRC  - - - - - -    Q28-31         Q16-19          0B16-19
11149   -    AR32  - - - - - -    0B12-15        Q16-19          0,0,0,0
11150   -    AR24(NO Q SHIFT) -   0B12-15        0,0,Q18,Q19     -
11151   -    AR24(Q SHIFTING) -   0B12-15        Q16-19          QQ0BIT,0,0,0
11152   -
11153   - WHERE         QQ0BIT=1  IF AND ONLY IF   DALU08=MISC1A
11154   ;
11155   MICRO WB:RB-SW           (SH/20#)      \ WB = RB(24-31,24-31,16-23);
11156   MICRO WB:RB-TW           (SH/08#)      \ WB = RB(24-31,24-31,24-31);
11157   MICRO WB:RI-TW           (SH/80#)      \ WB = I(0-7,0-7,0-7);
11158   MICRO WB:Y               (SH/90#)      \ WB = Y;
11159   MICRO WB:Y-SL1           (SH/94#)      \ WB <=SL1= Y;
11160   MICRO WB:ZS              (SH/04#)      \ WB = ZS =
11161   -    QLT-KEY,CPID,0,JLTA,REGA,0,0,0,XB(0-3),S(1-2),0,0,CTR(0-3)
11162   -       8-11 12-13   15   16            20-23    24-25   8-31
11163   -EXCEPT, IF MISC30=1, THEN BITS 16-31 REPLACED BY DSASTR SYNDROME:
11164   -    LEFT,0,0,0,0,PROC,UARW,MEM,DTER,MCLR-,PROV,DRTY,RED,UAR-,Y+2,Y+1
11165   -     16   17-20   21   22  23   24   25   26   27   28   29   30 31;
11166   \\
11167   \\
11168   MICRO XA                 (BR/2,TPX/2,NAL/8     \ LOAD F, START NEXT INST'N
11169   \                        ,TC/7,F/C#,FK/D#      \ CLEARING WORK FLOPS,
11170   \                        ,GP/64#,LB0-7/96#)    \ CHECKING FOR RUPTS, ETC;
11171   MICRO XAJ                (BR/2,TPX/2,NAL/8     \ SAME AS "XA", BUT
11172   \                        ,TC/7,F/C#,FK/D#      \ DO NOT INCREMENT
11173   \                        ,GP/64#,LB/A7#)       \ "P" NOR "CTR";
11174   MICRO XA-AUX    (JAX)    (BR/2,TPX/3,TC/0)    \ UNCOND'L XA SPLATTER;
11175   MICRO XA'ELS    (NAE)    (BR/2)                \ COND'L XA SPLATTER;
11176   MICRO XB        (JAX)    (BR/3,TPX/3,TC/0)    \ UNCOND'L XB SPLATTER;
11177   MICRO XB'ELS    (NAE)    (BR/3)                \ COND'L XB SPLATTER;
11178   MICRO XE        (NAX)    (BR/4,TPX/3,TC/0)    \ UNCOND'L XE SPLATTER;
11179   MICRO XE'ELS    (NAE)    (BR/4)                \ COND'L XE SPLATTER;
11180   MICRO XL        (JAK)    (BR/5,TPL/3,TC/0)    \ UNCOND'L LINK BRANCH;
11181   MICRO XL'ELS  (NAE,NA3)  (BR/5)                \ COND'L LINK BRANCH;
11182   MICRO XR        (JAX)    (BR/6,TPX/3,TC/0)    \ UNCOND'L XR SPLATTER;
11183   MICRO XR'ELS    (NAE)    (BR/6)                \ COND'L XR SPLATTER;
11184   MICRO XW        (NAX)    (BR/7,TPX/3,TC/0)    \ UNCOND'L XW SPLATTER;
11185   MICRO XW'ELS    (JAE)    (BR/7)                \ COND'L XW SPLATTER;
11186   MICRO X2 (NAU,NAL,NA3)   (BR2/1)               \ COND'L NA PAIR(TRIO);
11187   SKIP HOF;
11188   \          8         16                 31
11189   .          ----------------------------
11190   .DRAM00   :SIGN-EXT:     D0          :
11191   .DRAM01   :SIGN-EXT:     D1          :
11192   .DRAM02   :SIGN-EXT:     D2          :
11193   .DRAM03   :SIGN-EXT:     D3          :
11194   .DRAM04   :SIGN-EXT:     D4          :
11195   .DRAM05   :SIGN-EXT:     D5          :
```

```
LINE #                              RTL/6000 FILE EDIT
                                    DICTIONARY SECTION
11196   .DRAM06  :SIGN-EXT:          D6           :
11197   .DRAM07  :SIGN-EXT:          D7           :
11198   .DRAM08  :SIGN-EXT:          K0           :
11199   .DRAM09  :SIGN-EXT:          K1           :
11200   .DRAM0A  :SIGN-EXT:          K2           :
11201   .DRAM0B  :SIGN-EXT:          K3           :
11202   .DRAM0C  :SIGN-EXT:          K4           :
11203   .DRAM0D  :SIGN-EXT:          K5           :
11204   .DRAM0E  :SIGN-EXT:          K6           :
11205   .DRAM0F  :SIGN-EXT:          K7           :
11206   .DRAM10  :                   E0           :
11207   .DRAM11  :                   E1           :
11208   .DRAM12  :                   E2           :
11209   .DRAM13  :                   E3=STKA      :
11210   .DRAM14  :                   E4=STKP      :
11211   .DRAM15  :                   E5=IV        :
11212   .DRAM16  :                   E6=PSIP      :
11213   .DRAM17  :                   E7=PCIP      :
11214   .DRAM18  :       M0*:        L0           :   * M0(0-2)=0
11215   .DRAM19  :       M1 :        L1           :     M0(3)=WDTN
11216   .DRAM1A  :       M2 :        L2           :     M0(4)=RTCN
11217   .DRAM1B  :       M3 :        L3           :     M0(5-7)=NATSAP#
11218   .DRAM1C  :       M4 :        L4           :
11219   .DRAM1D  :       M5 :        L5           :
11220   .DRAM1E  :       M6 :        L6           :
11221   .DRAM1F  :       M7 :        L7           :
11222   .        -------------------
11223   \\
11224   .        -------------------
11225   .BRAM 0  :                   B0           :
11226   .BRAM 1  :                   B1           :
11227   .BRAM 2  :                   B2           :
11228   .BRAM 3  :                   B3           :
11229   .BRAM 4  :                   B4           :
11230   .BRAM 5  :                   B5           :
11231   .BRAM 6  :                   B6           :
11232   .BRAM 7  :                   B7           :
11233   .BRAM 8  :                   A0           :
11234   .BRAM 9  :                   A1           :
11235   .BRAM A  :                   A2=ZSAV**    :
11236   .BRAM B  :                   A3=RDBR      :
11237   .BRAM C  :                   A4=STKT      :
11238   .BRAM D  :                   A5=STKB      :
11239   .BRAM E  :                   A6=PCPU**    :   ** IF MISC1A=1
11240   .BRAM F  :                   A7           :
11241   .        -----------------------\
11242   SKIP HUF;
```

MODEL: CP6X-1979-12-11
REVISION: DOC.UC

RTL/6000 FILE EDIT
MICROPROGRAM SECTION

SEQUENCE: $$MCS

| LINE # | | | ADDRESS (HEX) | IMAGE (HEX) |
|---|---|---|---|---|
| 11243 | MICROPROGRAM: | | | |
| 11244 | $$MCS; | | | |
| 11245 | \ THE "DSASTR" ROUTINE AT LOCATION 7FF IS ENTERED WHENEVER | | | |
| 11246 | \ A MASTER-CLEAR, UNAVAILABLE-RESOURCE, OR MEMORY-RED IS DETECTED. | | | |
| 11247 | \ THE ROUTINE ANALYZES THE STORED SYNDROME TO GENERATE THE | | | |
| 11248 | \ APPROPRIATE TRAP OR TC PROCEED WITH THE INITIALIZATION OF THE CSS; | | | |
| 11249 | $DSASTR | (7FFH) WB:P ST-A1:WB GP-MISC3:X1 | 7FF | 0300 C110 3000 2009 31AF 012F |
| 11250 | \\ | GO-TO(110H); | | |
| 11251 | \\ | (110H) RB:A1 DALU:RB-ADD1 ST-E0:DALU WB:ZS ST-A1:WB | 110 | 0540 C172 3C00 F009 12AF 0040 |
| 11252 | \\ | CKHF GP-MISC1:X0 GO-TO(172H); | | |
| 11253 | \\ | (172H) IB:3000(03H) RB:A1 DALU:RU-AND-IH WB:DALU'Q:DALU | 172 | 0300 CC81 3C03 0009 0EAF CF2D |
| 11254 | \\ | GP-MISC0:1X GO-TO(081H); | | |
| 11255 | \\ | (081H) RB:A1 DALU:RB ST-E1:DALU WB:RB-SR4 ST-A1:WB | 081 | 03FC C174 3C00 F109 32AF 026F |
| 11256 | \\ | CKVL GP-MISC3:X0 IF:DALU(25\MCLR\) X2(574H,$MCLR) | | |
| 11257 | \\ | (574H) WB:Y ST-A0:WB RB:E1 DALU:RH GP-MISC6:X0'(MEMAD:1) | 574 | 03FC C570 3900 3108 606F 092F |
| 11258 | \\ | CKVL IF:DALU-(24\DATA ERROR\) X2(570H,170H); | | |
| 11259 | \\ | (570H) RB:E0 WB:RB ST-A0:WB FLINK:(E) | 570 | 031E C4C9 AE00 3008 046F 032F |
| 11260 | \\ | IF:MISC3A X2(409H,009H); | | |
| 11261 | \\ | (170H) IB:92EX RB:A0 DALU:RB-SUB-IB WB:DALU ST-A0:WB | 170 | 039E C4C9 AE00 2008 04AF 3B06 |
| 11262 | \\ | CKHL FLINK:(E) IF:MISC5A X2(409H,009H); | | |
| 11263 | \\ | (409H) LB-RD-MEM-W'LOCK | 409 | 3A00 CCC9 3000 0000 04AF 0B2F |
| 11264 | \\ | GO-TO(009H); | | |
| 11265 | \\ | (009H) IB:0000(00H) DALU:IB WB:DALU LB-STALL'WA:WB RB:E1 | 009 | 1180 1373 3308 1100 046F CB25 |
| 11266 | \\ | CKHL IF:RBUS16 X2(772H,373H); | | |
| 11267 | \\ | (373H) RB:A0 DALU:RH-ADD1 WB:DALU ST-A0:WB | 373 | 0380 C772 3000 2008 04AF 0B00 |
| 11268 | \\ | CKHL GO-TO(772H); | | |
| 11269 | \\ | (772H) IB:A0 HALU:IB LB-DA'Y:DALU RB:M0 DALU:RU-ADD-RB | 772 | 23E3 5789 3000 1808 0465 0B13 |
| 11270 | \\ | CKVL XL'ELS($SUPERHALT); | | |
| 11271 | $XL:SHLT:DSAST | (70EH) RB:E1 DALU:RB IF:DCARRY8- | 70E | 03FC 5720 3C00 1105 046F 0B2F |
| 11272 | \\ | CKVL IF:DALU-(29\UAR\) XL'ELS(320H); | | |
| 11273 | \\ | (320H) RB:E1 DALU:RB | 320 | 03FC 5327 3C00 1103 046F 0B2F |
| 11274 | \\ | CKVL IF:DALU(27\DRTY\) XL'ELS(327H); | | |
| 11275 | \\ | (327H) RB:E1 DALU:RB | 327 | 03FC C338 3000 1102 046F 0B2F |
| 11276 | \\ | CKVL IF:DALU(26\PROV\) X2($TV14,$TV17); | | |
| 11277 | $TV17 | (338H) \RED\ LB-WR-LOCAL(MMU,7) IB:0000(2FH) DALU:IB | 338 | 2380 CCC2 672F D000 04AF CB25 |
| 11278 | \\ | ST-E0:DALU GO-TO($TRAP); | | |
| 11279 | $TV14 | (738H) \PROV\ IB:0000(32H) DALU:IB ST-E0:DALU | 738 | 0300 CCC2 3C32 D000 04AF CB25 |
| 11280 | \\ | GO-TO($TRAP); | | |
| 11281 | $XL:TV15 | (72EH) \UAR\ IB:0000(31H) DALU:IB ST-E0:DALU GP-MISC1:X0 | 72E | 0300 CCC2 3C31 D000 12AF CB25 |
| 11282 | \\ | GO-TO($TRAP); | | |
| 11283 | SKIP HOF; | | | |

MODEL: CP6X-1979-12-11
REVISION: OCC.OC

RTL/6000 FILE EDIT
MICROPROGRAM SECTION

```
LINE #                        SEQUENCE: $$MCS                                                         ADDRESS   IMAGE
                                                                                                      (HEX)     (HEX)
11284   $MCLR     (174#) DALU:000000 ST-D0:DALU RB:A1 WB:RH-SW ST-A1:WB                                174       0311 0573 9700 E009 64AF 022C
11285   \\                 FSEL:(7) GP-IJIT          IF:YELLOW X2(573#,173#)
11286   $                (573#) ID:0000(C0#) RB:A1 DALU:RB-AJD-1D WB:DALU-SL2                          573       0340 C175 30C0 2009 70AF CBAD
11287   \\                 CKHF ST-A1:WB GP-MISC7:X0'PFI-ACK         GO-TO($M:0);
11288   $                (173#) ID:0000(C0#) RB:A1 DALU:RH-AND-1D WB:DALU-SL2                          173       0340 C175 30C0 2009 70AF CBAD
11289   \\                 CKHF ST-A1:WB GP-MISC7:X0'PFI-ACK         GO-TO($M:0);
11290   $M:0             (175#) DALU:000000 ST-M7SEL:DALU                                              175       0319 C175 BC00 9F40 04AF 0B2C
11291   \\                                          IF:SELZERO' X2(STRIV,$M:0);
11292   $TRIV            (575#) ID:FFFF(01#) DALU:1B WB:DALU-SW LB-STALL'WA:WB                         575       1100 C2F0 3301 0000 04AF EA25
11293   \\                                                          GO-TO($F0#);
11294   $                (3F0#) ID:0000(80#) DALU:1B WB:DALU-SW LB-STALL'WW:WB                         3F0       0140 0189 3280 2008 04AF CA25
11295   \\                 CKHF ST-A0:WB                             GO-TO(189#);
11296   $                (189#) ID:0000(FF#) RB:D0 DALU:RB-ADD1-1D WB:DALU'Q:DALU                      189       2380 C18A 3CFF 200F 046C CF09
11297   \\                 CKHL ST-A7:WB BALU:000000 LB-DA'Y:DALU    GO-TO(18A#);
11298   $                (18A#) ID:0000(10#) DALU:1B ST-K0:DALU RB:A7 WB:RB-SL4                        18A       0300 C5EF 9F10 E80F 21AF C3E5
11299   \\                 ST-A7:WB FSEL:(F) GP-MISC2:X1 GO-TO($MMU-INIT);
11300   $MMU-INIT        (5EF#) LB-WR-LOCAL('MU,3)                                                     5EF       2880 C192 6300 0000 04AF 0B2F
11301   \\                                                          GO-TO(192#);
11302   $                (192#) IB:A0 RU:K0 DALU:RU-ADD-1B WB:DALU ST-A0:WB                            192       0180 C10A 3200 2808 046F 0B19
11303   \\                 CKHL LB-STALL'WW:WB                       GO-TO(10A#);
11304   $                (10A#) IB:Y IB:A7 BALU:W3-ADD-1D LB-STALL'Y:BALU                              10A       2119 C5EF 8000 000F 0499 092F
11305   \\                                          IF:SELZERO' X2($MMU-INIT,1EF#);
11306   \\               (1EF#)                                                                        1EF       0336 C179 3000 0000 04AF 0B2F
11307   \\                                          IF:MISC2B' X2(579#,179#);
11308   $                (179#) IB:Q2EX DALU:1B ST-K0:DALU RB:A7 WB:RD-SL4                             179       0300 C5EF 9E00 E80F 22AF 33E5
11309   \\                 ST-A7:WB FSEL:(E) GP-MISC2:X0 GO-TO($MMU-INIT);
11310   $                (579#) ID:0000(08#) DALU:1B WB:DALU GP-MISC5:X0'(HOTM1)                       579       132E C6C0 AF08 0000 04AF CB25
11311   \\                                 FLINK:(F)              DALU:000000 ST-STKP:DALU
11312   $CACHE-INIT      (2C8#) LB-WR-LOCAL(MMU,7) IB:0000(80#) RB:A1                                  2C8       2380 C193 6780 0509 04AF CB27
11313   \\                 DALU:RB-OR-1B ST-1V:DALU
11314   $                (193#) IB:0000(0C#) DALU:1B WB:DALU LB-STALL'WA:WB                            193       1100 C18E 330C 0000 50AF CB25
11315   \\                 GP-MISC5:X0'(HOTM4)                       GO-TO(18E#);
11316   $                (18E#) L9-WR-LOCAL(MMU,7) WB:2S ST-B0:WB                                      18E       28AC C788 6700 2000 04AF 006F
11317   \\                                          IF:LAFMODE X2($STS-LAF,$STS-SAF);
11318   $XL:STS:MCLR     (60F#) ID:00FF(E0#) DALU:1B WB:DALU-SR4 ST-A0:WB BALU:WB                      60F       2340 C190 32E0 2008 50AF FA65
11319   \\                 CKHF LB-DA'Y:BALU GP-MISC5:X0'(HOTM1)     GO-TO(190#);
11320   $                (190#) L9-DA'RD-MEM-D(JA:WB) DALU:000000 ST-STKP:DALU                         190       1BFB C523 3300 D408 04AF 032C
11321   \\                 CKVL RB:A0 WB:RB
11322   $                (123#) IB:0000(02#) RB:A0 DALU:RU-SUB-1B WB:DALU ST-A0:WB                     123       2180 C190 3002 2008 04AF CB06
11323   \\                 CKHL BALU:WB L3-STALL'Y:BALU              GO-TO(190#);
11324   $                (523#) LB-WR-LOCAL(MMU,7)                                                     523       2880 C194 6700 0000 04AF 0B2F
11325   \\                                                          GO-TO(194#);
11326   $                (194#) IB:0000(04#) DALU:1B WE:DALU LB-STALL'WA:WB                            194       1100 C191 3304 0000 04AF CB25
11327   \\                                                          GO-TO(191#);
11328   $                (191#) L9-WR-LOCAL(MMU,7) RB:B0 DALU:RB ST-L0:DALU WB:P                       191       2880 C195 6700 7800 04AF 012F
11329   \\                 ST-B0:WB                                  GO-TO(195#);
11330   \\               (195#) LD-P:Y'PREFETCH DALU:FFFFFF WB:DALU                                    195       A8C0 C25E 3400 0000 50AF 0B23
11331   \\                 CKVL GP-MISC5:X0'(RING)
11332   SKIP hOF;                                                    GO-TO($PANEL);
```

```
RTL/6000 FILE EDIT
MICROPROGRAM SECTION

ADDRESS   IMAGE
                                                                              (HEX)     (HEX)
LINE #
11333           SEQUENCE: $$MCS
11334  $GOODBY    (008H) WB:ZS ST-A2;WB FLINK:(0)                             008       0301 0160 AC00 200A 04AF 006F
11335   \\                            IF:SIPTRAP X2(560H,160H);
11336   $  \\   (560H) IB:FFFF(F0H) RB:A2 DALU:RB-AND-IB WB:DALU ST-A2;WB     560       0342 1160 30F0 200A 2EAF EB2D
11337   $  \\     CKHF GP-MISC2:1X   IF:SIP-PRESENT X2(SSIP-TV,160H);
11338   $  \\   (160H) IB:FFFF(F0H) RB:A2 DALU:RB-AND-IB WB:DALU ST-A2;WB     160       0364 C420 30F0 207A 2CAF EB2D
11339   $  \\     CKHF GP-MISC2:0X   IF:RUPTI X2(420H,$RUPTI);
11340   $  \\   (420H) RB:M0 WB:RB-SR4 ST-A7;WB GP-MISC0:1X                   420       0305 1162 3000 380F 0E6F 026F
11341   \\                            IF:TICK X2($TICK,162H);
11342  $TICK    (563H) IB:0000(1FH) DALU:IB LB-STALL`Y:DALU                   563       2111 C565 301F 0000 04A5 CB2F
11343  $YELLOW  (565H) LB-DW`RD-MEM-W            IF:YELLOW X2($YELLOW,$ISM-H);
11344   \\                                                                    565       1A0C CC98 3000 0000 04AF 0B2F
11345   \\                                       GO-TO(098H)
11346   \\     (098H) L3-STALL IB:0000(01H) DALU:IB WB:DALU ST-A0;WB          098       0C40 CC99 3001 2008 04AF CB25
11347   $  \\     CKHF                           GO-TO(099H);
11348   $  \\   (099H) LB-DW(WW:WB) IB:SU RB:A0 DALU:WB-ADD-IB WB:DALU         099       0280 C124 3200 0008 04AF 4B19
11349   $  \\     CKHL                           GO-TO(124H);
11350   \\     (124H) LB-WR-MEM-W`YINC1                                       124       1800 C165 3000 0000 04AF 0B2F
11351  $ISM-H   (165H) RB:M0 WB:RB-SL1 LB-DA(WA:WB)                           165       1300 CCD2 3300 1800 046F 036F
11352   \\                                                                            GO-TO($ISM-H);
11353   \\     (0D2H) LH-WR-LOCAL(CPU)                                        0D2       2880 5680 1C00 0000 04AF 0B2F
11354   \\                                       GO-TO(0D2H);
11355  $XL:ISM-H:TICK (680H) L3-DW IB:SB DALU:IB                XL($XL:ISM-H:TICK);  680       02FC 0162 3000 0000 04AF 4B25
11356   $  \\     CKVL                           IF:DALU(24) X2(562H,162H);
11357   $  \\   (562H) IB:0000(FFH) RB:IV DALU:RB-AND-NOT-IB WB:DALU           562       0340 0048 30FF 3508 046F CB2E
11358   $  \\     CKHF ST-A0;WB                  GO-TO(048H)
11359   $  \\   (162H) IB:0000(FFH) RB:IV DALU:RU-AND-NOT-IB WB:DALU           162       4349 0C48 30FF 3508 046F CB2E
11360   $  \\     CKHF ST-A0;WB CIP-STALL        IF:CIPTRAP X2(44BH,04BH);
11361   $  \\   (44EH) IB:0000(14H) WB:A0 WB:RB DALU:WB-OR-IB                  448       210A C568 3014 0008 04A7 C32F
11362   \\                            LB-STALL`Y:DALU
11363   \\                                       IF:CIP-PRESENT- X2(568H,$CIP-TV);
11364   \\     (04EH) IB:0000(14H) WB:A0 WB:RB BALU:WB-OR-1B                  048       2100 C568 3C14 0008 04A7 C32F
11365                                                      GO-TO(563H)
11366  $CIP-TV  (168H) LB-RD-LOCAL(CIP,2) RB:PCIP WB:RB ST-A0;WB               168       28C0 C126 4200 3708 316F 032F
11367   $  \\     GP-MISC3:X1                    GO-TO(126H);
11368  $SIP-TV  (561H) LB-RD-LOCAL(SIP,2) RB:PSIP DALU:RB-ADD1 WB:DALU         561       28C0 C126 2200 3608 316F 0800
11369   $  \\     ST-A0;WB GP-MISC0:X1           GO-TO(126H)
11370   \\     (126H) LB-DA IB:SBZEX DALU:1B ST-E0:DALU WB:P ST-A6;WB         126       1300 C120 3C00 F00E 1EAF 7125
11371   $  \\     GP-MISC1:1X                    GO-TO(12DH);
11372   \\     (12DH) RB:A6 DALU:RB-SU01 WE:DALU ST-A6;WB                     12D       0380 CCC2 3C00 200E 04AF 0B1F
11373   \\                            CKHL                       GO-TO($TRAP);
11374  SKIP HOF;
11375   \\     (568H) LB-DA`RD-MEM-D R3:A7 DALU:RB ST-E0:DALU WB:RU-SR1       568       1800 0367 3000 F00F 31AF 02EF
11376   $  \\     ST-A7;WB GP-MISC5:X1                                                 GO-TO(567H);
11377  $  \\   (567H) L3-STALL`YINC1 DALU:FFFFFF WB:DALU ST-A0;WB RB:E0        367       10B0 C56A 3000 3008 046F 0823
11378   $  \\     CKHL                           IF:RBUS16- X2(56AH,$RTC);
11379   \\     (56AH) LB-DW`YINC1                                             56A       1200 C16F 3000 0000 04AF 0B2F
11380   \\                                                                            GO-TO(16FH);
```

```
                              RTL/6000 FILE EDIT
                             MICROPROGRAM SECTION

SEQUENCE: S$MCS
                                                  ADDRESS    IMAGE
                                                  (HEX)      (HEX)
LINE #
11381  SRTC                                       16A    13F8 C56B 3200 0008 04AF 7819
11382    \\   (16AH) L3-DA(JW:WB) IB:SBZEX RB:A0 DALU:RB-ADD-IB WB:DALU
                    CKVL
11383    b   (56EH) LB-DW(JW:WB) IB:SB DALU:1B WB:DALU      56B   0200 C16B 3200 0000 21AF 4B25
11384    \\                                IF:OBUS-ZERO X2(56DH,16BH);
11385    \\                  GP-MISC2:X1                 GO-TO(16BH);
11386    b   (16BH) LB-WR-MEM-W*MEM-D                    168   180C C16F 3C00 0000 04AF 0B2F
11387    \\                                              GO-TO(16FH);
11388    \\  (16FH) LB-DA*RD-MEM-D                        16F   180D C161 3C00 0000 04AF 0B2F
11389    \\                                              GO-TO(161H);
11390    \\  (161H) LB-STALL IB:0000(3FH) DALU:1B ST-E2:DALU 161   0036 056C 303F D200 04AF C825
11391    \\                              IF:MISC2B X2(56CH,16CH);
11392    b   (56CH) LB-DW IB:SB RB:E2 DALU:RB-AND-IB ST-E2:DALU   56C   0200 C16C 3000 D200 046F 4B2D
11393    \\                                              GO-TO(16CH);
11394    \\  (16CH) LB-DW*YINC1 RB:A7                    16C   1280 3000 000F 04AF 0B2F
               CKHL
11395  SWDT (56FH) LB-DA(JW:WD) IB:SBZEX RB:A0 DALU:RD-ADD-1B     56F   138C C16D 3200 D108 04AF 7819
11396    \\      CKHL ST-E1:DALU WB:DALU                  GO-TO(16DH);
11397    b   (16DH) LB-WR-MEM-W*YINC1 RB:E1 WB:RD         16D   1838 C56E 3000 1100 046F 032F
11398    \\                              IF:OBUS-ZERO X2(56EH,16EH);
11399    \\  (56EH) GP-MISC2:X1 IB:0000(08H) WB:Y BALU:WH-ADD-1B   56E   2100 C0E0 3008 0000 2199 C92F
11400    \\        LB-STALL*Y:BALU                       GO-TO(0E0H);
11401    b   (0E0H) LB-RD-MEM-W*LOCK IB:0000(40H) DALU:1B WB:DALU-SW  0E0   3A40 CCE1 3040 2008 04AF CA25
11402    \\        CKHF ST-A0:WB                          GO-TO(0E1H);
11403    \\  (0E1H) LB-STALL                              0E1   0000 C13A 3C00 0000 04AF 0B2F
11404    \\                                              GO-TO(13AH);
11405    \\  (13AH) LB-DW(JW:WB) IB:SB RB:A0 DALU:RB-OR-1B WB:DALU  13A   0200 013B 3200 0008 04AF 4B27
11406    \\                                              GO-TO(13BH);
11407    b   (13BH) LB-WR-MEM-W*UNLOCK                    13B   380C C16E 3C00 0000 04AF 0B2F
11408    \\                                              GO-TO(16EH);
11409    \\  (16EH) WD:P BALU:WB LB-STALL*Y:DALU          16E   211D C464 3C00 0000 04AF 012F
11410    \\                              IF:MISC6B X2(464H,064H);
11411    \\  (064H) LB-DW*RD-MEM-W GP-MISC5:00            064   1A00 C56D 3C00 0000 58AF 0B2F
11412    \\                                              GO-TO(56DH);
11413    b   (56DH) LB-STALL*YINC1 GP-MISC3:00            56D   1000 CC79 3000 0000 38AF 0B2F
11414    \\                                              GO-TO(079H);
11415    \\  (079H) LB-DW IB:SB DALU:1B ST-D0:DALU         079   0200 C464 3CC0 C000 04AF 4B25
11416    \\                                              GO-TO(464H);
11417    \\  (464H) LB-STALL*P:Y                          464   310C C25E 3CC0 0000 04AF 0B2F
11418    \\                                              GO-TO(SPANEL);
11419  SKIP HUF;
11420  SPANEL (25EH) WD:Y ST-A0:WB RB:PANEL GP-MISC6:1X   25E   0300 C251 3C00 2008 6E2F 092F
11421    \\                                              GO-TO(251H);
11422    -        DATA,RU4-,980F,INCR-,CHGR-,CDEF,WRIT,U,MEMA,ADEF,SELECT
11423    -              18-19  20  21  22  23  24  25  26  27  28  29-31
11424    \\  (251H) RB:PANEL*STROBE DALU:RB ST-K0:DALU WB:RB'Q:RB   251   0300 C260 F520 C800 042F C72F
11425    \\                   FASP:WD*RING-IN              GO-TO(260H);
11426    b   (26CH) RB:PANEL WD:RB-SW ST-A6:WB FSEL:FB GP-SHIN:AR-24   260   0328 G62B D000 200E 482F 022F
11427    \\                              IF:EXECUTE- X2(62BH,&EXECUTE);
```

```
RTL/6000 FILE EDIT
MICROPROGRAM SECTION

ADDRESS   IMAGE
                                                                              (HEX)     (HEX)
                SEQUENCE: $SMCS
         (62EH) IB:A6 DALU:IB ST-E0:DALU GP-MISC0:X0                          628       0385 C22D 3C00 D00E 02AF 0B25
  $ //              CKHL          IF:IBUS16 X2(62DH,220H);
  $ //   (22DH) RB:K0 DALU:RB                                                 22D       03FC C255 3C00 0804 046F 0B2F
  $ //              CKVL
  $ //   (62CH) RJ:K0 DALU:RB     IF:DALU(28) X2(655H,255H);                  62D       03FC C256 3C00 0804 046F 0B2F
  $ //              CKVL
  $ //   (255H) RB:E0 DALU:RB GP-MISC1:00 FLINK:FB                            255       03FC C23E E000 1005 186F 0B2F
  $ //              CKVL          IF:DALU(28) X2(656H,256H);
  $ //   (655H) RB:E0 DALU:RB GP-MISC1:01 FLINK:0                             655       03FC C23F A000 1005 196F 0B2F
  $ //              CKVL          IF:DALU(29) X2($PNL-9,$PNL-8);
  $ //   (256H) RB:E0 DALU:RB GP-MISC1:10 FLINK:1                             256       03FC C258 A100 1005 1A6F 0B2F
  $ //              CKVL          IF:DALU(29) X2($PNL-B,$PNL-A);
  $ //   (656H) RB:E0 DALU:RB GP-MISC1:11 FLINK:3                             656       03FC C259 A300 1005 186F 0B2F
  $ //              CKVL          IF:DALU(29) X2($PNL-D,$PNL-C);
  $PNL-8 (23EH) IB:0000(90H) RB:K0 DALU:RB-OR-1B ST-K0:DALU                   23E       03FC 5760 3090 C805 2E6F CB27
  $ //              CKVL GP-MISC2:1X      IF:DALU(29) XL'ELS(36OH);
  $XL:PNL-CI (76CH) GP-MISC3:X1 CIP-STALL                                     760       4309 541F 3000 0000 31AF 0B2F
  $ //                                    IF:SIPTRAP- XL'ELS($PNL-LP);
  $XL:PNL-CI-2 (410H) LB-RD-LOCAL(CIP,18H)                                    410       28C0 C2BA 5800 0000 04AF 0B2F
  $ //                            GO-TO(28AH);
  $XL:PNL-SI (761H) GP-MISC3:X1                                               761       0301 541F 3000 0000 31AF 0B2F
  $ //                                    IF:SIPTRAP- XL'ELS($PNL-LP);
  $XL:PNL-SI-2 (411H) LB-RD-LOCAL(SIP,18H)                                    411       28C0 C2EA 3800 0000 04AF 0B2F
  $ //                            GO-TO(28AH);
  $XL:PNL-PCIP (762H) R3:PCIP WB:RB ST-A1:WB                                  762       0300 C039 3C00 3709 046F 032F
  $ //                            GO-TO($DISPLAY-A1);
  $XL:PNL-PSIP (763H) R9:PSIP DALU:RB-ADD1 WB:DALU ST-A1:WR                   763       0380 C039 3000 3609 2E6F 0B00
  $ //              CKHL          GO-TO($DISPLAY-A1);
  $ //   (63EH) IB:0000(98H) RB:K0 DALU:RB-OR-1B ST-K0:DALU                   63E       03FC C360 3C98 C800 2E6F CB27
  $ //                            GO-TO(360H);
  $ //   (360H) RR:K0 DALU:RB-AND-IB WB:DALU ST-A7:WB                         360       0342 C0C4 309F 280F 046F CB2D
  $ //              CKHL          IF:SIP-PRESENT X2(404H,$DISPLAY);
  $ //   (404H) IB:0FF(00H) RB:IV DALU:RB-AND-WB LB-DA*Y:BALU                 404       2380 C2E8 3C00 1500 0453 FA6D
  $ //              CKHL JALU:WB-ADD-WB LB-DA*Y:BALU   GO-TO(288H);
  $ //   (288H) IB:A7 WU:Y BALU:4B-OR-IB LB-DA*Y:BALU                         288       08C0 C2BA 6000 000F 04A7 092F
  $ //                            GO-TO(289H);
  $ //   (289H) L3-WR-IO-MSVP GP-MISC5:X1                                     289       2300 CCC4 3C00 D108 04AF 7325
  SKIP HOF:
  $PNL-A (28AH) L1-DA'Y:DALU IB:SBZEX DALU:IB ST-E1:DALU RB:A0                28A
  $ //              CKVL          GO-TO($DISPLAY);
  $ //   (23FH) IO:0000(7FH) DALU:IB GP-MISC0:00                              23F       03FC 065C 307F 0017 18AF C825
  $ //              CKVL          IF:DALU-(SEL) X2(65CH,25CH);
  $ //   (65CH) GP-MISC2:0X                                                   65C       030C CE5B 3C00 0000 01AF 0B2F
  $ //                            GO-TO(65BH);
  $ //   (25CH) LB-RD-LOCAL(AMU,0) \SEG DESC\ RB:STKP WU:RB                   25C       2A80 C276 6C00 340A 046F 032F
  $ //              ST-A2:WB       GO-TO(276H);
```

```
                    HTL/6000 FILE EDIT
                    MICROPROGRAM SECTION

SEQUENCE: $$MCS                                          ADDRESS    IMAGE
                                                                             (HEX)      (HEX)
LINE #
11475   $           (276H) LJ-STALL                          GO-TO(25AH);    276   000C C25A 3000 0000 04AF 0B2F
11476   //                                                                   25A   0200 C25B 3000 0000 31AF 4F25
11477   //          (25AH) LJ-DW IB:SB DALU:IB WB:DALU'Q:DALU GP-MISC3:X1
11478   //                                                   GO-TO(25BH);
11479   //          (25BH) LJ-DA IU:SB DALU:IB WB:DALU-SR4'Q:QSR4 ST-A6:WB   25B   1340 C016 3C00 200E 32AF 4E65
11480   //          CKHF GP-MISC5:X0                          GO-TO(016H);
11481   //          (016H) RB:A6 JO:RO-SR4'Q:QSR4 ST-A6:WB                   016   0300 C02A 3000 200E 04AF 066F
11482   //                                                   GO-TO(02AH);
11483   //          (02AH) IB:QZEX DALU:IB JO:DALU ST-A7:WB                  02A   0340 C65B 3000 200F 04AF 3B25
11484   //          CKHF                                     GO-TO(65BH);
11485   //          (65BH) RJ:A7SEL DALU:RB ST-E1:DALU                       65B   0300 CC04 3000 D11F 04AF 0B2F
11486   //                                                   GO-TO($DISPLAY);
11487   $PNL-B      (63FH) RJ:J7SEL DALU:RB ST-E1:DALU GP-MISCO:X1           63F   0300 CC04 3000 D117 01AF 0B2F
11488   //                                                   GO-TO($DISPLAY);
11489   $PNL-C      (258H) RJ:A7SEL WB:RB LJ-STALL'WA:WB GP-MISC5:10         258   0300 C22F 0300 1F40 5A6F 032F
11490   //          CKHF                   IF:SELZERO X2(262FH,22FH);
11491   //          (22FH) LJ-WR-LOCAL(CPU) WB:RI-TW ST-A1:WB                22F   2880 0662 1000 2009 04AF 082F
11492   //                                                   GO-TO(662H);
11493   //          (662H) IB:00FF(00H) RB:A1 DALU:RB-AND-IB WB:DALU ST-A1:WB 662   0340 C261 3000 2009 04AF FB2D
11494   //          CKHF                                     GO-TO(261H);
11495   //          (261H) LJ-DW IU:SB RB:A1 DALU:RO-OR-IB ST-E1:DALU        261   0200 CC04 3000 D109 04AF 4B27
11496   //                                                   GO-TO($DISPLAY);
11497   $           (62FH) JO:ZS ST-BO:WB FLINK:(B)                          62F   032C 0788 A800 2000 04AF 006F
11498   //                            IF:LAFMODE X2($STS-LAF,$STS-SAF);
11499   $XL:STS:PNL (608H) RB:BO DALU:RB ST-LO:DALU                          608   0300 C18F 3000 5800 04AF 0B2F
11500   //                                                   GO-TO(18FH);
11501   //          (18FH) RB:MONJ LON WB:RO ST-A1:WB                        18F   0300 0C39 3000 3809 046F 032F
11502   //                                                   GO-TO($DISPLAY-A1);
11503   $PNL-D      (658H) RJ:D7SEL WB:RB ST-A1:WB GP-MISCO:X1               658   0300 CC39 3000 2749 016F 032F
11504   //                                                   GO-TO($DISPLAY-A1);
11505   $PNL-E      (259H) IJ:0000(7FH) DALU:IB FLINK:(2) GP-MISC0:X1        259   03FC 026A A27F 0017 01AF C825
11506   //                            IF:DALU(SEL) X2(66AH,26AH);
11507   //          (66AH) RJ:K7SEL WB:RB ST-A1:WB GP-MISC1:0X               66A   0300 C039 3000 2F49 1C6F 032F
11508   //                                                   GO-TO($DISPLAY-A1);
11509   $           (26AH) WB:P ST-A1:WB GP-MISCO:X1                         26A   0300 CC39 3000 2009 1EAF 012F
11510   //                                                   GO-TO($DISPLAY-A1);
11511   $PNL-F      (659H) IB:00FF(FFH) RU:L7SEL DALU:RB-AND-IB WB:DALU      659   0340 CC39 30FF 3F49 016F FB2D
11512   //          CKHF ST-A1:WB GP-MISCO:X1                GO-TO($DISPLAY-A1);
11513   SKIP HOF;
11514   $DISPLAY    (039H) RB:A1 DALU:RB ST-E1:DALU                          039   0300 CC04 3000 D109 04AF 0B2F
11515   //                                                   GO-TO($DISPLAY);
11516   //          (004H) VL RB:E1 GP-DISPL3-6 WB:RB-SR4 ST-A1:WB            004   03C0 CCC5 3C00 3109 166F 026F
11517   //          CKVL                                     GO-TO(005H);
11518   //          (005H) RB:E1 IB:A1 DALU:IB WB:DALU-SR4 ST-A1:WB           005   0340 CCC6 3C00 3109 046F 0A65
11519   //          CKHF                                     GO-TO(006H);
11520   //          (006H) RB:A1 JO:RB-SW ST-A1:WB GP-MISC5:00                006   0300 CCC7 3C00 2009 58AF 022F
11521   //          CKHF                                     GO-TO(007H);
```

RTL/6000 FILE EDIT
MICROPROGRAM SECTION

SEQUENCE: $SMCS

| LINE # | | | | ADDRESS (HEX) | IMAGE (HEX) | | | | |
|---|---|---|---|---|---|---|---|---|---|
| 11522 | $ | (0007#) VL RB:A1 GP-DISPL1-2 | | 007 | 03C0 | C167 | 3000 | 0009 | 06AF | 0B2F |
| 11523 | $ | \\ CKVL GO-TO(167#); | | | | | | | | |
| 11524 | $ | (167#) RB:A1 | | 167 | 0300 | CC14 | 3C00 | 0009 | 04AF | 0B2F |
| 11525 | $ | \\ CKVL GO-TO(014#); | | | | | | | | |
| 11526 | $ | (014#) RB:E0 DALU:RB | | 014 | 03FC | 1359 | 3C00 | 1004 | 046F | 0B2F |
| 11527 | $ | \\ CKVL | | | | | | | | |
| 11528 | $ | (758#) R3:E0 DALU:RB IF:DALU-(31) X2(758#,$RUN); | | 758 | 03FC | 165E | 3C00 | 1007 | 046F | 072F |
| 11529 | $ | \\ CKVL | | | | | | | | |
| 11530 | $CHANGE | (65F#) GP-ACK-REG-CHNG RB:KG WB:RB'J:RB | | 65F | 0329 | C65E | 3C00 | 0800 | 046F | D7EF |
| 11531 | $ | \\ IF:MISC0B X2(65E#,$PANEL); | | | | | | | | |
| 11532 | $ | (65E#) RB:E1 WB:RB-SL4'0:QSL4 ST-A1:WB XL($XL:CHG-AB) | | 65E | 0300 | 5780 | 3C00 | 3109 | 046F | D7EF |
| 11533 | $ | | | | | | | | | |
| 11534 | $XL:CHG-AB | (780#) RB:A1 DALU:RB ST-E1:DALU | | 780 | 032F | C422 | 3C00 | D109 | 04AF | 0B2F |
| 11535 | $ | \\ IF:MISC1B X2(422#,022#); | | | | | | | | |
| 11536 | $ | (022#) | | 022 | 2100 | C25E | 3000 | 0009 | 04A5 | 0B2F |
| 11537 | $ | \\ GO-TO($PANEL); | | | | | | | | |
| 11538 | $ | (422#) RB:E1 WB:RB ST-B7SEL:WB | | 422 | 0300 | C25E | 3000 | 3117 | 046F | 032F |
| 11539 | $ | \\ GO-TO($PANEL); | | | | | | | | |
| 11540 | $XL:CHG-D | (781#) RB:A1 DALU:RB ST-D7SEL:DALU | | 781 | 0300 | C25E | 3C00 | C749 | 04AF | 0B2F |
| 11541 | $ | | | | | | | | | |
| 11542 | $XL:CHG-E | (782#) IB:A1 DALU:IB ST-K7SEL:DALU BALU:IB LB-DA Y:DALU | | 782 | 232E | 541F | 3000 | EF49 | 62A5 | 0925 |
| 11543 | $ | \\ WB:Y ST-A1:WB GP-MISC6:X0 | | | | | | | | |
| 11544 | $ | | | | | | | | | |
| 11545 | $ | (412#) LB-STALL'P:Y GP-MISC1:0X | | 412 | 3100 | C782 | 3C00 | 0000 | 1CAF | 0B2F |
| 11546 | $ | \\ GO-TO($XL:CHG-E); | | | | | | | | |
| 11547 | $XL:CHG-F | (783#) IB:A1 DALU:IB ST-L7SEL:DALU | | 783 | 0300 | C25E | 3C00 | 5F49 | 04AF | 0B25 |
| 11548 | $ | | | | | | | | | |
| 11549 | $PNL-LP | (01F#) | | 01F | 0300 | C25E | 3000 | 0000 | 04AF | 0B2F |
| 11550 | $ | \\ GO-TO($PANEL); | | | | | | | | |
| 11551 | SKIP HOF; | | | | | | | | | |
| 11552 | $EXECUTE | (22B#) RB:K0 DALU:RB | | 22B | 03FC | C359 | 3C00 | 0803 | 046F | 0B2F |
| 11553 | $ | \\ IF:DALU(27) X2(MEMAC,$RUN); | | | | | | | | |
| 11554 | $MEMAC | (759#) LB-RD-LOCAL(IMU,6) RB:EQ DALU:RB GP-ACK-REG-CHNG | | 759 | 2ABC | C65D | 6600 | 1006 | 776F | 0B2F |
| 11555 | $ | \\ IF:DALU-(5D) X2(65D#,25D#); | | | | | | | | |
| 11556 | $ | (65D#) LB-DW'YINC1 | | 65D | 1200 | C25D | 3C00 | 0000 | 04AF | 0B2F |
| 11557 | $ | \\ CKHF GO-TO(25D#); | | | | | | | | |
| 11558 | $ | (25D#) LB-STALL IB:0C00(30#) DALU:IB WB:DALU ST-A7:WB | | 25D | 0040 | C252 | 3030 | 200F | 04AF | CB25 |
| 11559 | $ | \\ GO-TO(252#); | | | | | | | | |
| 11560 | $ | (252#) LB-DA IB:50 RB:A7 DALU:RB-AND-IB WB:DALU-SR4 | | 252 | 1300 | C253 | F500 | 000F | 04AF | 4A6D |
| 11561 | $ | \\ FASP:WU'RING-IN GO-TO(253#); | | | | | | | | |
| 11562 | $ | (253#) IB:0000(09#) DALU:IB WB:DALU LB-DA(WA:WU) | | 253 | 1329 | 565E | 3309 | 0000 | 04AF | CB25 |
| 11563 | $ | \\ IF:MISC0B XL'ELS($PANEL) | | | | | | | | |
| 11564 | $XL:MEMA | (65C#) IB:0000(23#) DALU:IB WB:DALU LB-DA(WA:WB) | | 65C | 0340 | C41E | 3023 | 2009 | 04AF | CBE5 |
| 11565 | $ | \\ GO-TO(41E#); | | | | | | | | |
| 11566 | $XL:MEMA1 | (651#) IB:0000(2B#) DALU:IB WB:DALU-SL4 ST-A1:WB | | 651 | 0340 | 041E | 302B | 2009 | 04AF | CBE5 |
| 11567 | $ | \\ CKHF GO-TO(41E#); | | | | | | | | |
| 11568 | $XL:MEMA2 | (652#) IB:0000(A3#) DALU:IB WB:DALU-SL4 ST-A1:WB | | 652 | 0369 | 101F | 3CA3 | 2009 | 04AF | CBE5 |

RTL/6000 FILE EDIT
MICROPROGRAM SECTION

SEQUENCE: $$MCS

| LINE # | | | ADDRESS (HEX) | IMAGE (HEX) | | | | | |
|---|---|---|---|---|---|---|---|---|---|
| 11569 | $XL:MEMA3 | CKHF | | | | | | | |
| 11570 | \\ | IF:MISCOB- X2(41E#,$PNL-LP); | 653 | 0340 | C41E | 3CAB | 2009 | 04AF | CBE5 |
| 11571 | \\ | CKHF | | | | | | | |
| 11572 | \\ | (653#) IB:0000(ABM) DALU:IB WB:00FF(F0#) R0:A1 ST-A1:WB | | | | | | | |
| 11573 | \\ | GO-TO(41E#) | | | | | | | |
| 11574 | \\ | (41E#) L0-WR-LOCAL(MAU,7) IB:00FF(F0#) R0:A1 | 41E | 2888 | C40C | 67F0 | 2009 | 04AF | FA6D |
| 11575 | \\ | DALU:RD-AND-IB WB:DALU-SR4 ST-A1:WB | | | | | | | |
| 11576 | \\ | IF:0BUS-ZERO X2(40C#,00C#); | | | | | | | |
| 11577 | \\ | (00C#) IB:0000(0F#) R8:A1 DALU:R8-AND-IB WB:DALU | 00C | 1300 | C41E | 330F | 0009 | 04AF | CB2D |
| 11578 | \\ | L0-DA(WA:WB) GO-TO(41E#); | | | | | | | |
| 11579 | \\ | (40C#) | 40C | 0329 | C41F | 3C00 | 0000 | 04AF | 082F |
| 11580 | \\ | (41F#) GP-MISC0:X0 R8:K0 DALU:R8 | 41F | 03FC | 000D | 3000 | 0801 | 026F | 082F |
| 11581 | \\ | IF:MISC0B X2(41F#,$PNL-LP); | | | | | | | |
| 11582 | \\ | CKVL | | | | | | | |
| 11583 | \\ | (40D#) R0:E1 WB:R8 L0-DJ(WW:W3) IF:DALU(25) X2(40D#,00D#); | 40D | 0200 | CC17 | 320C | 1100 | 046F | 032F |
| 11584 | \\ | (017#) L0-MR-MEM-W'UNLOCK FLINK:F0 GO-TO(017#); | 017 | 3800 | CC87 | E000 | 0000 | 04AF | 082F |
| 11585 | \\ | (00D#) L0-DJ'RD-MEM-W GO-TO(087#); | 00D | 1A00 | CC15 | 3CC0 | 0000 | 04AF | 082F |
| 11586 | \\ | (015#) L3-STALL GO-TO(015#); | 015 | 0000 | 5660 | 3000 | 0000 | 04AF | 082F |
| 11587 | \\ | XL($XL:READ-8); | | | | | | | |
| 11588 | $XL:READ-H | (66C#) L0-DW IB:SBZEX DALU:IB WB:DALU ST-B7SEL:WB | 660 | 0240 | C087 | E000 | 2017 | 04AF | 7825 |
| 11589 | \\ | CKHF FLINK:FB GO-TO(087#); | | | | | | | |
| 11590 | \\ | (661#) L0-DW IB:S0ZEX DALU:IB ST-D7SEL:DALU FLINK:FB | 661 | 0200 | CC87 | EC00 | C740 | 04AF | 7825 |
| 11591 | $XL:READ-D | GO-TO(087#); | | | | | | | |
| 11592 | \\ | (663#) L0-DW IH:SBZEX DALU:IB ST-L7SEL:DALU FLINK:FW | 663 | 0200 | CC87 | EC00 | 5F40 | 04AF | CB25 |
| 11593 | $XL:READ-F | GO-TO(087#); | | | | | | | |
| 11594 | \\ | (087#) IB:0000(01#) DALU:IB WB:DALU L0-DA(WA:WB) | 087 | 1300 | 5650 | 3301 | 0000 | 04AF | CB25 |
| 11595 | \\ | XL($XL:MEMA); | | | | | | | |
| 11596 | \\ | | | | | | | | |
| 11597 | SKIP HOF: | (355#) WH:P ST-A6:WB DALU:WB-SUB1 L8-STALL'Y:BALU | 355 | 2136 | C525 | A000 | 200E | 6E9F | 012F |
| 11598 | $RUN | GP-MISC6:1X FLINK:(D) IF:MISC2B X2(525#,125#); | | | | | | | |
| 11599 | \\ | (525#) R8:E2 WB:R8 ST-A0:WB GP-ACK-REG-CHNG | 525 | 031D | CED7 | 3C00 | 3208 | 776F | 032F |
| 11600 | \\ | IF:MISC60 X2(6D7#,207#); | | | | | | | |
| 11601 | \\ | (207#) WB:Y ST-A6:WB GO-TO(6D7#); | 2D7 | 0300 | C4C7 | 3C00 | 200E | 04AF | 092F |
| 11602 | \\ | (6D7#) IB:00FF(00#) R8:IV DALU:R8-AND-IB WB:DALU ST-80:WB | 6D7 | 0340 | D150 | 82C0 | 3500 | 646F | FB2D |
| 11603 | \\ | CKHF GP-INIT FSEL-LINK:(2) | | | | | | | |
| 11604 | \\ | (15D#) R8:40 DALU:R0 ST-D0:CALU WB:RE-SR4 ST-A0:WB | 15D | 0300 | C55B | 3C00 | E008 | 05AF | 026F |
| 11605 | \\ | GP-XHLOAD-OFFSET GO-TO($LEV2); | | | | | | | |
| 11606 | \\ | (125#) L0-DW'YINC1 R0:D0 WB:R8 FPRM:W0'RING-IN | 125 | 121D | 53B9 | D5C0 | 0000 | 2C6F | 032F |
| 11607 | \\ | IF:MISC6H- XL'ELS($SUPERHALT); | | | | | | | |
| 11608 | \\ | (78D#) FSEL-LINK:FB GP-MISC3:00 IF:EXECUTE X2(41A#,01A#); | 78D | 0328 | CC1A | CC00 | 0000 | 38AF | 082F |
| 11609 | \\ | (41A#) L3-P:Y'PREFETCH GP-ACK-REG-CHNG GO-TO(024#); | 41A | ABC0 | CC24 | 3000 | 0000 | 77AF | 082F |
| 11610 | $XL:SHLT:RUN | CKVL | | | | | | | |
| 11611 | \\ | (024#) BALU:000000 L0-STALL'Y:BALU GP-MISC6:00 | 024 | 2100 | CC26 | 3C00 | 0000 | 68AC | 082F |
| 11612 | \\ | GO-TO(026#); | | | | | | | |

RTL/6000 FILE EDIT
MICROPROGRAM SECTION

| LINE # | | SEQUENCE: $TMCS | ADDRESS (HEX) | IMAGE (HEX) | | | | | |
|---|---|---|---|---|---|---|---|---|---|
| 11616 | $ | | 026 | 03FB | CC50 | 3C01 | 2008 | 576F | 032F |
| 11617 | $ | (026H) R4:D0 WB:RB ST-A0:WB GP-TRAF:1'RUN:1 | | | | | | | |
| 11618 | $ | IF:OBUS-ZERO- X2(450H,$PF-BK-05) | | | | | | | |
| 11619 | $ | CKVL | | | | | | | |
| 11620 | $ | (450H) LB-DW'RD-MEM-W WB:P ST-A1:WB GP-MISCS:10 | 450 | 1A00 | CC27 | 3C00 | 2009 | 5AAF | 012F |
| 11621 | $ | GO-TO(027H); | | | | | | | |
| 11622 | $ | (027H) LB-STALL | 027 | 0000 | CC34 | 3C00 | 0000 | 04AF | 082F |
| 11623 | $ | (034H) LD-DW(WW:WB) IB:S0 DALU:IB ST-E0:DALU | 034 | 0200 | CC35 | 3200 | D008 | 04AF | 4325 |
| 11624 | $ | RB:A0 WB:RB | | | | | | | |
| 11625 | $ | GO-TO(035H); | | | | | | | |
| 11626 | $ | (035H) LD-WR-MEM-W'UNLOCK | 035 | 3800 | CC36 | 3000 | 0000 | 04AF | 082F |
| 11627 | $ | GO-TO(036H); | | | | | | | |
| 11628 | $ | (036H) LB-P:Y'PREFETCH | 036 | ABC0 | CC37 | 3000 | 0000 | 04AF | 082F |
| 11629 | $ | CKVL | | | | | | | |
| 11630 | $ | (037H) RB:E0 WB:RD LB-STALL'WW:WB | 037 | 0100 | CC44 | 3200 | 1000 | 046F | 032F |
| 11631 | $ | GO-TO(044H); | | | | | | | |
| 11632 | $ | (044H) LB-DW'NXINST RB:D0 WB:RB FLOD-PF | 044 | 9600 | 0C45 | C000 | 0000 | 58AF | 082F |
| 11633 | $ | GO-TO(045H); | | | | | | | |
| 11634 | $ | (045H) LD-WR-MEM-W'UNLOCK GP-TRAF:0'RUN:1 | 045 | 3800 | CC46 | 3C00 | 0000 | 04AS | 082F |
| 11635 | $ | GO-TO(046H); | | | | | | | |
| 11636 | $ | (046H) IB:A1 BALU:ID LB-STALL'Y:UALU | 046 | 2100 | CC47 | 3C00 | 0009 | 6EAF | 082F |
| 11637 | $ | GO-TO(047H); | | | | | | | |
| 11638 | $ | (047H) LB-P:Y'PREFETCH GP-MISC6:1X | 047 | ABC0 | CC1A | 3C00 | 0000 | 0C9F | 012F |
| 11639 | $ | GO-TO(01AH); | | | | | | | |
| 11640 | $ | (01AH) WB:P BALU:WB-SUB1 LB-STALL'Y:BALU GP-MISC0:0A | 01A | 2100 | CC4E | 3C00 | 0000 | 64AF | 092F |
| 11641 | $ | GO-TO(04EH); | | | | | | | |
| 11642 | $ | (04EH) LB-STALL'P:Y WB:Y GP-INIT | 04E | 3100 | 2400 | 3000 | 2008 | 0480 | 012F |
| 11643 | SKIP HOF: | XA-AUX(4); | | | | | | | |
| 11644 | $XA:G0X | | | | | | | | |
| 11645 | $XL:HLT | (480H) WB:P ST-A0:WB BALU:WR-ADD1 LB-STALL'Y:BALU | 480 | 2100 | 5700 | 3000 | 2008 | 0480 | 012F |
| 11646 | $ | XL(SXL:HLT2) | | | | | | | |
| 11647 | $XL:HLT2 | (700H) WB:P BALU:WD LB-STALL'Y:BALU GP-INIT | 700 | 2112 | 5732 | 3C00 | 0000 | 64AF | 012F |
| 11648 | $ | IF:PRIVILEGED XL'ELS(&IV13); | | | | | | | |
| 11649 | $ | (730H) LJ-P:Y'PREFETCH GP-TRAF:0'RUN:1 | 730 | ABC0 | C408 | 3C00 | 0000 | 57AF | 0B2F |
| 11650 | $ | GO-TO(408H); | | | | | | | |
| 11651 | $SUPERIALT | (408H) GP-MISC5:00 | 408 | 0307 | CC08 | 3000 | 0000 | 38AF | 0B2C |
| 11652 | $ | (3B9H) DALU:000000 ST-D0:DALU GP-MISC6:X1 | 3B9 | 0300 | C730 | 3C00 | C000 | 61AF | 0B2F |
| 11653 | $XL:MCL | IF:PF-TESTS- X2(408H,$GOODBBY) | | | | | | | |
| 11654 | $ | GO-TO(SXL:HLT2) | | | | | | | |
| 11655 | $XL:BRK | (701H) ID:0000(SFH) DALU:IB ST-E0:DALU LB-STALL GP-INIT | 701 | 5128 | CCC2 | 3C3F | D000 | 04AF | CB25 |
| 11656 | $ | IF:LOADMODE X2(SQLT,STRAP) | | | | | | | |
| 11657 | $XL:BRK | (702H) ID:0U00(3EH) DALU:IB ST-E0:DALU LB-STALL'P:Y | 702 | 3128 | 1CC2 | 3C3E | D000 | 04AF | CB25 |
| 11658 | $ | IF:LOADMODE X2(SQLT2,STRAP) | | | | | | | |
| 11659 | $XL:RTT | (703H) IB:FFFF(00H) RB:IV DALU:RB-AND-ID WB:DALU G:DALU | 703 | 0301 | 0CFA | 3000 | 1500 | 046F | EF2D |
| 11660 | $ | IF:SIPTHAP X2(4FAH,UFAH); | | | | | | | |
| 11661 | $ | (4FAH) | 4FA | 0302 | 1CFA | 3000 | 0000 | 04AF | 0B2F |
| 11662 | $ | IF:SIP-PRESENT X2(4FBH,UFAH); | | | | | | | |
| | $ | (4FBH) GO-TO(SXL:UNDO-P); | 4FB | 0300 | C7A9 | 3000 | 0000 | 04AF | 0B2F |

RTL/6000 FILE EDIT
MICROPROGRAM SECTION

SEQUENCE: SSMCS

| LINE # | | | ADDRESS (HEX) | IMAGE (HEX) |
|---|---|---|---|---|
| 11663 | $ | (OFA#) CIP-STALL | OFA | 4309 03A8 3000 0000 04AF OB2F |
| 11664 | \\ | IF:CIPTRAP X2(SXL;UNDO-P,SGET-NATSAP); | | |
| 11665 | $ | (7A8#) | 7A8 | 030A 13A8 3CC0 0000 04AF OB2F |
| 11666 | \\ | IF:CIP-PRESENT X2(SXL;UNDO-P,SGET-NATSAP); | | |
| 11667 | $XL:RTCH | (704#) IB:0000(08#) DALU:IB WB:DALU-TW ST-00:WB | 704 | 0352 5732 3C08 2000 04AF C8A5 |
| 11668 | \\ | CKHF | | |
| 11669 | $XL:PICH2 | (734#) IB:80 RE:M0 DALU:RB-CR-IB ST-M0:DALU | 734 | 9707 2CC8 C000 9800 646F 0B27 |
| 11670 | \\ | XA; | | |
| 11671 | $XL:RTCF | (705#) IB:0000(F7#) DALU:IB WE:DALU-TW ST-B0:WB | 705 | 0352 5732 30F7 2000 04AF C8A5 |
| 11672 | \\ | CKHF | | |
| 11673 | $XL:RTCF2 | (735#) IB:80 RU:M0 DALU:IB WE:DALU-TW ST-MC:DALU | 735 | 9707 2CC8 CDC0 9800 646F OB2D |
| 11674 | \\ | XA; | | |
| 11675 | $XL:WDTH | (706#) IB:0000(10#) DALU:IB WE:DALU-TW ST-B0:WB | 706 | 0352 5732 3010 2000 04AF C8A5 |
| 11676 | \\ | CKHF | | |
| 11677 | $XL:WDTH2 | (736#) IB:80 RU:M0 DALU:RB-OR-IB ST-MO:DALU | 736 | 9707 2CC8 C000 9800 646F 0B27 |
| 11678 | \\ | XA; | | |
| 11679 | $XL:WDTF | (707#) IB:0000(EF#) DALU:IB WE:DALU-TW ST-B0:WU | 707 | 0352 5732 30EF 2000 04AF C8A5 |
| 11680 | \\ | CKHF | | |
| 11681 | $XL:WDTF2 | (737#) IB:00 RB:M0 DALU:RB-AND-IH ST-M0:DALU | 737 | 9707 2CC8 C000 9800 646F OB2D |
| 11682 | \\ | XA; | | |
| 11683 | SKIP HOF: | | | |
| 11684 | $XL:DMH | (708#) RH:D6 WB:RB*Q:RB DALU:RB-SUB1 | 708 | 03C0 517A 3CC0 0630 046F 071F |
| 11685 | \\ | IF:URANCHOP\D6>C\ XL*ELS(STV16-17A); | | |
| 11686 | $XL:APM2 | (578#) IB:U2 RU:D2 WB:RB-SR1 BALU:WB-ADD-IB | 578 | 6100 C3C8 3000 0202 0559 02EF |
| 11687 | \\ | LB-STALL*Y:DALW GP-XBLOAD-OFFSET GO-TO(308#); | | |
| 11688 | \\ | (308#) WB:P ST-A6:WB LB-P;Y*NCNPROC GP-MISCI:1X IB:QZEX | 308 | 3BFA C795 3C00 E20E 1E6F 3119 |
| 11689 | \\ | CKVL RB:D2 DALU:RB-ADD-IB ST-D2:DALU | | |
| 11690 | \\ | IF:DCVFL X2(SMMM-2,395#); | | |
| 11691 | $DEST-EA\ | (395#) IB:03 RH:D3 WH:RB-SR1 BALU:WB-ADD-IH | 395 | 613F 0715 3000 0303 0459 02EF |
| 11692 | \\ | LB-STALL*Y:BALW IF:XBREGO X2(715#,315#); | | |
| 11693 | \\ | (315#) IB:02 RU:D3 DALU:RB-ADD-IB ST-D3:DALU WB:RB-SR1 | 315 | 03FA 1266 3C00 C300 056F 32D9 |
| 11694 | \\ | CKVL GP-XBLOAD-OFFSET IF:DOVFL- X2(667#,SMMM-3); | | |
| 11695 | \\ | (715#) IB:QZEX RU:D3 DALU:RB-ADD-1B ST-D3:DALU WB:RU-SR1 | 715 | 03FA C266 3C00 C300 056F 32D9 |
| 11696 | \\ | CKVL GP-XBLOAD-OFFSET IF:DOVFL- X2(666#,SMMM-3); | | |
| 11697 | \\ | (667#) 43:ZS ST-A2:WB | 667 | 033F 139F 3C00 200A 04AF 006F |
| 11698 | $DEST-EA | IF:XBREG0- X2(SMMM-00X,SMMM-SKEWED); | | |
| 11699 | \\ | (666#) WU:ZS ST-A2:WB | 666 | 033F 079F 3C00 200A 04AF 006F |
| 11700 | \\ | IF:XBMAM-11X,SMMM-SKEWED); | | |
| 11701 | $MMM-00X | (79E#) IB:0000(04#) RB:D6 DALU:RB-SUB-IB ST-D6:DALU | 79E | 03F8 0722 3C04 C600 046F C806 |
| 11702 | \\ | CKVL IF:DCARRY16- X2(722#,322#); | | |
| 11703 | $MMM-11X | (79F#) LH-PW*NONPROC(WW:WB) IB:SB DALU:IB WH:DALU | 79F | 3500 0318 3200 0000 04AF 4B25 |
| 11704 | \\ | GO-TO(318#); | | |
| 11705 | \\ | (312#) LB-UR-MEM-H*YINCI IB:0000(05#) RB:D6 | 318 | 18B8 C722 3C05 C600 046F C806 |
| 11706 | \\ | DALU:RU-SUB-1B ST-D6:DALU | | |
| 11707 | \\ | IF:DCARRY16- X2(722#,322#); | | |
| 11708 | \\ | (322#) LB-PW*NONPROC(WW:WB) IB:SU DALU:IB WR:DALU | 322 | 3500 C723 3200 0000 04AF 4B25 |
| 11709 | \(2*\) | GO-TO(725#); | | |

RTL/6000 FILE EDIT
MICROPROGRAM SECTION

```
LINE #                      SEQUENCE: &SMCS                                                                                         ADDRESS  IMAGE
                                                                                                                                    (HEX)    (HEX)
11710                                                                                                                               723      3507 C324 3100 0000 04AF 4B25
11711   $   \2+\   (723#) LB-PW'NONPROC(WR:WB) IB:SB DALU:IB WB:DALU
11712   $   \2+\          IF:PF-TESTS- X2(724#,&MMM-RUPT);
11713   $   \2+\   (724#) LB-WR-MEM-D'YINC2 IB:0000(04#) RB:D6                                                                      724      0938 C722 3C04 C600 046F CB06
11714   $   \2+\          DALU:RB-SUB-1B ST-D6:DALU
11715   $   \\            IF:DCARRY16- X2(722#,322#);
11716   $   \\    (722#) IB:0000(04#) RB:D6 DALU:RB-ADD-1B WB:DALU-SR2                                                              722      03FB C722 3004 0600 056F CA99
11717   $   \\           CKVL GP-XBLOAD-OFFSET IF:OBUS-ZERO X2(&MMM-1,32D#);
11718   $   \\    (32D#) LB-PW'NONPROC(WR:WB) IB:SB DALU:IB WB:DALU                                                                 32D      3533 C72C 3200 0000 04AF 4B25
11719   $   \\           IF:XBREGO X2(72C#,&MMM-6);
11720   $   \\    (72C#) LB-WR-MEM-W'YINC1 GP-REINIT RB:D6 DALU:RB                                                                  72C      183C C72D 3000 0607 246F 0B2F
11721   $   &MMM-6 (32C#) LB-WR-MEM-H'YINC1                                                                                         32C      1880 C72D 3000 0000 04AF 0B2F
11722   $   \\           GO-TO(&MMM-1);
11723       SKIP HOF;
11724       &MMM-SKEWED
11725   $   \\    (39F#) LB-PW'NONPROC(WR:WB) IB:SB DALU:IB WB:DALU                                                                 39F      353F C710 3200 C000 4BAF 4A25
11726   $   \\           WB:DALU-SW GP-SHIN:OPEN
11727   $   \\           IF:XBREGO X2(710#,31D#);
11728   $   \\    (710#) LB-WR-MEM-H'YINC1 IB:0000(05#) RB:D6                                                                       710      1888 C710 3005 C600 046F CB06
11729   $   \\           DALU:RB-SUB-1B ST-D6:DALU
11730   $   \\    (31D#) IB:00C0(04#) RB:D6 DALU:RB-SUB-1B ST-D6:DALU                                                               31D      03F8 C726 3C04 C600 056F 0AE0
11731   $   \\           IF:DCARRY16- X2(726#,326#);
11732   $   \\    (726#) RB:D6 DALU:NOT-RJ WB:DALU-SR1 GP-XBLOAD                                                                    726      03FC 1326 3001 0606 046F 022F
11733   $   \\           CKVL
11734   $   \\    (727#) RB:D0 JB:RB-SW LB-STALL'WW:WB                                                                              727      013F 172C 3200 0000 04AF 4F25
11735   $   \\           IF:XBREGO X2(&MMM-1,&PMM-6);
11736   $   \\    (326#) IB:0ZEX RB:AD DALU:RB-AD-1B WE:DALU'Q:DALU                                                                 326      3533 C714 3C00 0000 04AF 3B27
11737   $   \2+\          IF:INDEXED X2(714#,314#);
11738   $   \\    (714#) RB:D0 WB:RB-SL4'Q:0SL4 ST-B0:WB                                                                            714      0300 C725 3000 2000 046F 07EF
11739   $   \\                                                  GO-TO(725#);
11740   $   \\    (314#) LB-PW'NONPROC IB:SB RB:D0 DALU:IB ST-D0:DALU                                                               314      3507 1324 3C00 E000 046F 47E5
11741   $   \2+\          IF:PF-TESTS- X2(725#,&MMM-RUPT);
11742   $   \\    (725#) RB:D0 WB:RB-SL4'Q:0SL4 ST-B0:W9 LB-STALL'WW:WB                                                             725      0133 0328 3200 2000 04AF 07EF
11743   $   \\           IF:INDEXED- X2(728#,32D#);
11744   $   \\    (328#) LB-WR-MEM-W'YINC1(WW:WB) IB:0ZEX DALU:IB WB:DALU                                                           328      183F 172C 3200 0000 046F 3B25
11745   $   \\           IF:XBREGO X2(&MMM-1,&MMM-6);
11746   $   \\    (728#) IB:00FF(00#) RB:D0 DALU:RB-AND-1B WB:DALU-SW                                                               728      0340 C323 3200 2008 046F FA2D
11747   $   \\           CKHF ST-AD:WB                                                                                              
11748   $   \\    (323#) IB:0ZEX RB:AD DALU:RB-OR-1B WB:DALU ST-AU:4B                                                               323      0240 C325 3100 2008 04AF 3B27
11749   $   \2+\          CKHF LB-DW(WR:WB)                    GO-TO(325#);
11750   $   \\    (325#) LD-WR-MEM-D'YINC2 IB:0000(04#) RB:D6                                                                       325      0938 0726 3004 C600 046F CB06
11751   $   \\           DALU:RB-SUB-1B ST-D6:DALU
11752   $   \\           IF:DCARRY16- X2(726#,326#);
11753   $   &MMM-RUPT
11754   $   \\    (324#) IB:0000(04#) RB:D6 DALU:RB-ADD-1B ST-D6:DALU                                                               324      0340 C266 3C04 C600 016F CF19
11755   $   \\           CKHF WR:DALU'Q:DALU GP-MISCO:X1     GO-TO(&MMM-3);
11756   $   &MMM-3 (266#) IB:0ZEX RB:D3 DALU:RB-SUB-1B ST-D3:DALU                                                                   266      0340 C795 3000 C300 046F 3B06
```

```
                              RTL/6000 FILE EDIT
                            MICROPROGRAM SECTION
                                                              ADDRESS    IMAGE
                  SEQUENCE: $$,HCS                            (HEX)      (HEX)

LINE #
11757           CKHF                          GO-TO($MHM-2);    795    2100 C71C 3000 000E 04A5 OB2F
11758  $MHM-2   \\   (795M) IB:A0 BALU:IB LB-STALL'Y:BALU                            
11759    \\                                      GO-TO(71CM);   71C    A0E9 5184 3CC0 E208 046F 3906
11760    \\     (71CM) IB:JZEX RB:D2 DALU:RB-SUB-IB ST-D2:DALU
11761    \\          CKVL LB-P:Y'PREFETCH WB:Y ST-A0:WB
11762    \\                 IF:MISC0B- XL'ELS($PF-BR-18);
11763  $MHM-1   \\   (72DM) RB:A0 JB:RB BALU:WB-ADD1 LB-DW'Y:BALU      72D    2200 C31C 3000 000E 0480 032F
11764    \\                                    GO-TO(31CM);
11765    \\     (31CM) DALU:000000 ST-D6:DALU LB-P:Y'PREFETCH   31C    A8C0 C184 3CC0 C600 04AF OB2C
11766  $PF-BR-18 \\                              GO-TO($PF-BR-18);
11767    \\     (184M)                                          184    A707 2C08 C000 0000 64AF OB2F
11768  $XL:JGT  \\                                           XAJ;
11769    \\     (709M) IB:0000(0FF) DALU:IB ST-D6:DALU         709    0300 C3C9 3CC0 C600 04AF CB25
11770    \\          CKVL
11771    \\     (309M) IB:0000(REV) DALU:IB ST-D7:DALU         309    9707 2C08 C054 C700 64AF CB25
11772    \\                                                 XA;
11773  SKIP HOF:
11774  $XL:ASD  (70AM) RJ:D7 JB:RB LB-DA(WA:WB)                70A    1313 5732 3300 0700 046F 032F
11775  $XL:ASD2 (73AM) IB:HS RALU:IB LH-DA'Y:BALU DALU:IB ST-E0:DALU   73A    2300 C1A8 A000 D005 04A5 OB25
11776    \\                FLINK:(0)
11777    \\     (1A8M) RB:D6 WB:RB LB-DA(WJ:WB)                1A8    13B0 C7D7 3200 0600 046F 032F
11778    \\                            IF:HBUS16- X2(707M,3D7M);
11779    \\     (707M) RB:E0 WB:RB-SR4 ST-A0:WB                707    0300 C1A9 3000 3008 046F 026F
11780    \\                                   GO-TO(1A9M);
11781    \\     (1A9M) IB:FFFF(OUM) RB:A0 DALU:RB-AND-IB WB:DALU   1A9    05FB 57D7 3000 0008 04AF EB2D
11782    \\                    IF:0BUS-ZERO XL'ELS(3D7M);
11783    \\     (3D7M) LB-WR-LOCAL(MMU,S)                      3D7    2880 06C8 6300 0000 04AF OB2F
11784    \\                                    GO-TO(SP:P1);
11785    \\     (70EM) IB:00FF(FFM) RB:A5 DALU:RB-SUB1-IB WB:RU BALU:WB   70E    21E3 C218 3DFF 0005 04AF F316
11786  $XL:VLD       CKVL LB-STALL'Y:BALU
11787    \\                  IF:DCARRY8 XL'ELS(339M,218M);
11788    \\     (218M) L9-RD-LOCAL(MPU,0) IB:00FF(FFM) DALU:1B   218    2A80 01AC 60FF 2000 04AF FA65
11789    \\                 WB:DALU-SR4 ST-B0:WB
11790    \\     (618M) L9-RD-LOCAL(MPU,0) IB:00FF(FFM) DALU:1B WJ:DALU   618    2A80 C1AC 60FF 2000 04AF FB25
11791    \\                                   GO-TO(1ACM)
11792    \\                 ST-J0:WB
11793    \\     (1ACM) IB:00FF(0FM) RB:10 DALU:RB-AND-I0 ST-E0:DALU   1AC    2100 C1AD 3000 F000 04AF F92D
11794    \\          DALU:IB LB-STALL'Y:BALU WB:Y ST-B0:WB
11795    \\                                   GO-TO(1ADM)
11796    \\     (1ADM) IB:J5 RB:E0 DALU:RB-AND-IB ST-E0:DALU FSEL:(0)   1AD    0300 9C00 D005 316F OB2D
11797    \\          GP-MISC(3:X1                   GO-TO(1AEM)
11798    \\     (1AEM) L3-DA IB:SB RB:E) DALU:RB-ADD-IB WB:Y ST-A0:WB   1AE    13E3 533B 3C00 3008 046F 4919
11799    \\                  IF:DCARRY8 XL'ELS(338M);
11800    \\     (338M) L3-DW IB:SB RB:A0 DALU:RB-AND-IB WB:DALU'Q:DALU   338    02B7 573C 3C00 0008 04AF 4F2D
11801    \\                  IF:1BUS24- XL'ELS(33CM);
11802    \\     (33CM) L3-DA IB:SB DALU:IB WB:DALU-SR1'Q:QSR1 ST-A0:WB   33C    1340 C182 3C00 2008 04AF 4EE5
11803    \\          CXHF                           GO-TO(1B2M)
        (1B2M) RB:D3 DALU:RB-SUB1 WB:DALU-SR1 ST-B0:WB IB:80   1B2    2380 C1B3 3CC0 2300 0465 OADF
```

```
                              RTL/6000 FILE EDIT
                            MICROPROGRAM SECTION
                                                            ADDRESS   IMAGE
                         SEQUENCE: SSMCS                    (HEX)     (HEX)
LINE #
11804            CKHL DALU:ID LB-DA'Y:DALU            GO-TO            1B3   0385 533D 3C00 3000 046F 0AD9
11805    //   >  CKHL IB:BO RB:EO DALU:RB-ADD-IB WB:DALU-SR1 ST-B0:WB
11806    //   >                                    IF:IBUS16 XL'ELS(33DN)    33D   03F8 533E 3000 0000 046F 3B16
11807    //   >  CKVL IB:QZEX RB:BO DALU:RB-SUB1-IB
11808    //   >                                    IF:DCARRY16 XL'ELS(33EN)  33E   0300 C1B4 91C0 2500 046F 022F
11809    //   >        RB:05 WB:RU-SW ST-B0:WB FSEL:(1)
11810    //   >                                        GO-TO(1B4N)          1B4   0300 C1B5 3C7F C000 04AF CB2D
11811    //  (1B4N) IB:0000(7FN) RB:D0 DALU:RB-AND-IB ST-D0:DALU
11812    //   >                                        GO-TO(1B5N)          1B5   0300 C1B6 3C1F C000 046F CB27
11813    //  (1B5N) IB:0000(1FN) RB:D0 DALU:RB-OR-IB ST-D0:DALU
11814    //   >                                        GO-TO(1B6N)          1B6   0300 C1B6 3C1F C000 046F CB2D
11815    //  (1B6N) IB:0000(7FN) RB:AO DALU:RU-AND-IB JD:DALU ST-AO:WB
11816    //   >                                    IF:MISC2A X2(SCVP2,265N)  265   03F1 C665 3C7F 2008 04AF 0B06
11817    //   >        IB:A0 RB:D0 DALU:RB-SU9-IB
11818    //   >                                    IF:DALU(24) XL'ELS(33FN)  33F   0340 C1B8 3C18 2008 04AF CBAD
11819    //  (33FN) IB:0000(1BN) RB:AO DALU:RB-AND-IB WB:DALU-SL2
11820    //   >                                        GO-TO(1B8N)          1B8   03FC C219 3C00 0008 046F 0B06
11821    //  (1B8N) IB:AO RB:D0 DALU:RB-SUB-IB
11822    //   >  CKVL                            IF:DALU(24) X2(SVLD'VR,SVLD'VRW)  619  9707 2CC8 CDC0 C300 64AF 0B2C
11823  SVLD'VR  (0194) DALU:C0000 ST-DS:DALU                            219   9707 2CC8 CCC2 C300 64AF CB25
11824    //   >                                                  XA:    
11825  SVLD'VRJ (2158) ID:0000(02N) DALU:IB ST-DS:DALU                 73B   0300 CC30 3C00 D00B 04AF 8B2A
11826    //   >                                                  XA:    
11827  SXL:VLD'-VR (73MN) IB:F-VAL DALU:NOT-IB ST-DS:DALU
11828    //   >                                     GO-TO(LPF-03):      70C   0300 C3CC 3C00 D003 04AF 0B2F
11829  SKIP HOF:
11830  SXL:LRDH (70CN) RI:U3 DALU:RB ST-E0:DALU                        30C   9707 2008 CDD0 3008 646F 032F
11831    //   >                                            GO-TO(30CN) 
11832    //   >  (30CN) RB:EO WH:RB ST-RDBR:WB                         70D   0300 C3CD 3C00 D00B 046F 0B2F
11833    //   >                                                  XA:   
11834  SXL:SRD3 (70DN) RB:HDDR DALU:RB ST-E0:DALU                      30D   9707 2CC8 CDC0 3003 646F 032F
11835    //   >                                            GO-TO(30DN) 
11836    //   >  (30CN) RB:EO WH:RB ST-DS:WB                           70E   2312 5732 3C00 0005 60A5 0B2F
11837  SXL:MEAD (70EN) IB:05 BALU:IB LB-DA'Y:DALU GP-MISC6:X0'(DHV-YL0) 
11838    //   >                                    IF:PRIVILEGED XL'ELS(STV13)  73E  1A00 0223 3C00 0000 04AF 0B2F
11839  SXL:MEAD2 (73EN) LB-DW'RD-MEM-W                                 223   0000 C224 3000 0000 04AF 0B2F
11840    //   >                                            GO-TO(223N) 
11841    //   >  (223N) LB-STALL                                       224   0200 C030 3400 C600 60AF 4B25
11842  //       (224N) LB-DW ID:SQ DALU:IB ST-D6:DALU
11843  //        GP-MISC6:X0'(CLR-YL0)                                 70F   0300 C312 3000 2008 04AF 012F
11844  SXL:DHR  (70FN) RB:P ST-AN:WB                          
11845    //   >                                     GO-TO(STV05):      490   2100 C310 3C00 1400 046F 032F
11846    //   >  (490N) R0:STKP WH:RU BALU:WB LB-STALL'Y:DALU
11847    //   >                                            GO-TO(310N) 310   03FC 5312 30F2 0017 04AF CB25
11848  //       (310N) IB:0000(F2N) DALU:IB
```

```
                              RTL/6000 FILE EDIT
                              MICROPROGRAM SECTION

SEQUENCE: SSMCS                              ADDRESS  IMAGE
                                                                     (HEX)    (HEX)

LINE #
11851             CKVL                                                710    9500 C19D F501 D100 6FAF 7A65
11852  $XL:STAX         IF:DALU(SEL) XL'ELS(SIVO5);
11853    \\       (71C#) LB-PW IU:SDZEX DALU:IB ST-E1:DALU WB:DALU-SR4
11854    $             FASP:WB'RING-IN GP-MISC6:1X'XBLOAD GO-TO(19DH);
11855    \\       (19DH) RB:E1 WB:RD ST-AO:WB FPRM:WB'RING-IN       GO-TO(197H);  19D   0300 C19D 0197 D500 3108 046F 032F
11856    \\       (197H) 1B:H7SEL DALU:1B LB-DA'Y:DALU RB:D7SEL WB:RB'Q:RD
11857    $             FPRM:WB'RING-IN GP-MISC6:00        GO-TO(198H);            197   2300 0198 D500 0757 6865 072F
11858    \\       (198H) 1B:00FF(88H) RB:AO DALU:RB-AND-1B ST-E1:DALU              198   03FB 040F 3088 D108 04AF FB2D
11859    \\            CKVL WO:DALU       IF:OBUS-ZERO X2(4DF#,00FH);
11860    \\       (ODFH) 1J:OOFF(OFH) RB:AO DALU:RB-AND-1B WB:DALU-SR4             ODF   03FB 53C6 300F 0008 05AF FA6D
11861    \\            CKVL GP-XBLOAD    IF:OBUS-ZERO XL'ELS($MFL);
11862  $MFL        1D:0ZEX DALU:1B ST-KO:DALU FSEL:(7)                             3D6   0300 C056 9700 C800 04AF 3825
11863    \\                                                 GO-TO(U56H);
11864    \\       (056H) RB:KO WB:RB ST-AO:WB                                      056   03FB 5442 3000 2808 046F 032F
11865    \\            CKVL              IF:OBUS-ZERO XL'ELS($STACK-MOD);
11866    \\       (4DF#) 1U:00FF(F0H) RB:AO DALU:RB-ADD-1B WB:Y ST-AO:WB           4DF   03F8 0473 3CF0 2008 04AF F919
11867    $             CKVL              IF:DCARRY16- X2(473H,073H);
11868    $        (473H) RJ:STKB DALU:1B:STKB DALU:1D                              473   2359 C785 0C00 D00D 04A5 0B00
11869    \\            CKHF LB-DA'Y:BALU   IF:SELZERO- X2(6RLO,$SIT);
11870    \\       (535H) RB:STKP WB:RB ST-07:4B                                    385   9707 2CC8 CDC0 3407 646F 032F
11871    $                                                    XA;
11872  $SIT         \\                                                              073   0319 C2D0 0C0C 0000 04AF 0B2F
11873    \\                       IF:SELZERO X2(4LDT,$ACQ);
11874  $ACQ       (2DCH) 1U:UZEX RB:E1 DALU:RO-ADD1-1B ST-EO:DALU WB:Y ST-AO:WB    200   03B5 53DB 3000 3108 046F 3809
11875    \\                       GO-TO(19BH);
11876  $STACK-MOD CKHL              IF:IBUS16 XL'ELS(3DBH);
11877    \\       (3DBH) RB:STKP WB:RB ST-B0:WB BALU:WE LB-DA'Y:BALU               3DB   23FB C443 3CO0 3400 046F 032F
11878  $ACQ-MOD           IF:OBUS-ZERO X2(STV16-443,SACQ-MOD);
11879    \\       (042H) RB:STKT RB:STKP DALU:R3-SUB-1B WB:HB UALU:WB              042   23E3 C443 3C00 140C 046F 0306
11880    \\            CKVL LB-DA'Y:BALU
11881    \\                       IF:DCARRY8- X2(STV16-443,SACQ-MOD);
11882    \\       (043H) RB:AO DALU:KJ ST-EO:DALU WU:Y ST-AO:WB LB-DW'Y:INC1       043   1200 C19B 3C00 F008 04AF 092F
11883    \\                       GO-TO(19BH);
11884    \\       (19BH) LB-DA'RO-MEM-L I1:STKT RB:EO DALU:RB-SUB-1B               19B   1AB0 C78A 3C00 D00C 046F 0B06
11885    \\            CKHL ST-EO:DALU    IF:DCARRY8- X2(78AH,38AH);
11886    \\       (38AH) IR:STKJ RB:E0 DALU:RB-ADD-1B                              38A   03E3 152E 3C00 100D 046F 0B19
11887    \\            CKVL            IF:DCARRY8- X2(SXE:LXA,12EH);
11888    \\       (12EH) IR:STKT DALU:1B LB-STALL'Y:DALU RB:E0 DALU:NOT-1B         12E   2100 03C7 3C00 D00C 0465 0B20
11889    \\                       GO-TO(3C7H);
11890    \\       (78AH) LB-STALL 1B:AO R3:EO DALU:HB-ADD1-1D WB:DALU              78A   0080 C19C 3008 3008 046F 0B09
11891    \\            CKHL ST-AO:WB                GO-TO(19CH);
11892    \\       (19CH) LB-DW 1B:SDZEX RB:AO DALU:RB-SUB1-1B                      19C   02E3 C78C 3C00 0008 04AF 7616
11893    \\            CKVL WO:RB-SW'Q:HEXB   IF:DCARRY8- X2(7dCH,STV10);
11894    \\       (78CH) R3:EO DALU:NOT-R3 ST-EO:DALU WB:DALU ST-B0:WB             78C   22B5 C7C7 3C00 F000 0440 3B20
11895    \\            CKHL BALU:WB-ADD1 LB-DW'Y:BALU 1B:UZEX
11896    \\                       IF:IBUS16- X2(7C7H,3C7H);
11897    \\       (7C7H) 1B:3D DALU:NOT-1B ST-E0:DALU WB:DALU ST-E0:WB             7C7   0340 C6D0 3C00 F000 04AF 0B2A
                       CKHF                                   GO-TO(SLDT);
```

RTL/6000 FILE EDIT
MICROPROGRAM SECTION

| LINE # | | SEQUENCE: $MCS | ADDRESS (HEX) | IMAGE (HEX) |
|---|---|---|---|---|
| 11878 | $ | | 3C7 | 0399 6130 0C00 300C 046F 0B00 |
| 11899 | \(2\) | IF:SELZERO XR'ELS($PF-13); | | |
| 11900 | $LDT | (3C7#) RU:EO DALU:RU-ADD1 WB:DALU ST-STKT:WB | | |
| 11901 | \\ | CKHL | | |
| 11902 | \\ | (6DC#) RU:STKT DALU:NOT-RB ST-E1:DALL WB:RB BALU:WB-SUB1 | 600 | 2300 C19E 3C00 D10C 049F 0320 |
| 11903 | \\ | LB-DA'Y:DALU GO-TO(19E#); | | |
| 11904 | \\ | (19E#) RU:STKP WB:RB | 19E | 03FB 15C3 3C00 1400 046F 0B09 |
| 11905 | \\ | CKHL IF:OBUS-ZERO X2($LDT-NEW,103#); | | |
| 11906 | \\ | (103#) 1B:STKB RU:E1 DALU:RB-ADD1-1B ST-E1:DALU WB:DALU | 103 | 0240 C3C4 3200 D10D 046F 0B09 |
| 11907 | \\ | CKHF LB-DW(WW:WB) GO-TO(3C4#); | | |
| 11908 | \\ | (3C4#) LU-WR-MEM-W'YINC1 WB:Y ST-STKD:WB RB:EO | 3C4 | 1800 C19F 3C00 F00D 046F 091F |
| 11909 | \\ | DALU:RB-SUB1 ST-EO:DALU GO-TO(19F#); | | |
| 11910 | \\ | (19F#) RU:STKP WB:RB BALU:WB LB-DA'Y:BALU | 17F | 2319 C5A0 0C00 1400 046F 032F |
| 11911 | \\ | IF:SELZERO- X2(5A0#,1A0#); | | |
| 11912 | \\ | (5A0#) 1B:00 RB:STKP DALU:RB-ADD1-1B WB:DALU LB-DW(WW:WB) | 5A0 | 0240 03C6 3200 1400 046F 0B09 |
| 11913 | \\ | CKHF GO-TO(3C6#); | | |
| 11914 | \\ | (3C6#) LU-WR-MEM-W'YINC1(WW:WB) 1B:STKB WB:EO | 3C6 | 1800 CCE2 3200 100D 045F 0B20 |
| 11915 | \\ | DALU:RB-ADD1-1B WE:DALU GO-TO(OE2#); | | |
| 11916 | \\ | (OE2#) RU:EO DALU:NOT-RU WD:DALU ST-STKT:WB BALU:WB-SUB1 | OE2 | 2380 CCE8 3000 300C 046F 0B20 |
| 11917 | \\ | CKHL LB-DA'Y:BALU GO-TO(OE8#); | | |
| 11918 | \\ | (OE8#) LB-WR-MEM-W'YINC1 RU:EO DALU:NOT-RB WB:DALU | OE8 | 1800 C2F4 3C00 3017 046F 0B20 |
| 11919 | \\ | ST-W7SEL:WB GO-TO($PF-2F); | | |
| 11920 | \\ | (1A0#) 1B:STKB RU:STKP DALU:RB-SUB-1B WB:DALU | 1A0 | 0240 C337 3200 140D 046F 0B06 |
| 11921 | \\ | CKHF LB-DW(WW:WB) GO-TO(337#); | | |
| 11922 | \\ | (337#) LB-WR-MEM-W'YINC1 1B:STKT RB:E1 DALU:RB-ADD-1B | 337 | 1800 C5C2 3000 D10C 046F 0B19 |
| 11923 | $LDT-NEW | ST-E1:DALU GO-TO($LDT-NEW); | | |
| 11924 | $XL:STAX2:LDT | (502#) RU:AO DALU:RB ST-STKP:DALU WB:RB | 502 | 03FB 57C0 3C00 0408 04AF 032F |
| 11925 | \\ | CKVL IF:OBUS-ZERO XL'ELS(3COM); | | |
| 11926 | $XL:STAX2:LEV | (7CC#) RB:STKP DALU:RB-ADD1 WE:DALU ST-STKT:WB | 7C0 | 9787 2CC8 3000 340C 646C 046F |
| 11927 | \\ | CKHL IF:MISC1A- X2($CIP-LOAD,$RDBR-SAVE); | | |
| 11928 | $XL:STAX3:LDT | (7C6#) RB:STKP DALU:RB-ADD1 WB:DALU ST-STKT:WB | 7C6 | 03AE 113E 3000 340C 045F 046F |
| 11929 | \\ | CKHL BALJ:WB-SUB1 LB-DA'Y:BALU GO-TO(1A1#); | | |
| 11930 | $XL:STAX3:LEV | (3CC#) RU:STKP DALU:RB-ADD1 WC:DALU ST-STKT:WB | 3C0 | 2380 C1A1 3000 340C 045F 7B09 |
| 11931 | \\ | CKHL WB:DALU ST-STKT:WB GO-TO(1A1#); | | |
| 11932 | $XL:STAX4:LDT | (1A1#) LB-WR-MEM-W YINST 1B:SBZEX RB:STKU DALU:RB-ADD1-1B XA; | 1A1 | 1A00 C1A2 F200 200D 04AF 092F |
| 11934 | $XL:STAX4:LEV | (1A2#) LB-STALL XL($XL:STAX3:LDT); | 1A2 | 0000 57CF 3C00 0000 04AF 082F |
| 11935 | \\ | (7CF#) LB-DW'Y:DALU 1B:SUZEX RU:STKT DALU:RB-SUN-1B | 7CF | 2280 C1A1 3000 200C 049F 7B06 |
| 11936 | \\ | CKHL BALU:WB-SUB1 GO-TO(1A1#); | | |
| 11937 | \\ | (7C5#) LD-DW'Y:HALU 1B:SUZEX RB:STKT DALU:RU-SUB1 | 7C5 | 2280 C1A1 3C00 200C 049F 7B06 |
| 11938 | \\ | CKHL WB:DALU ST-STKT:WB GO-TO(1A1#); | | |
| 11939 | \\ | (7CE#) LB-DW'HXINST 1B:SBZEX RB:STKU DALU:RB-ADD1-1B XA; | 7CE | 9687 2CG8 C000 200D 64AF 7B09 |
| 11940 | \\ | CKHL WU:DALU ST-STKH:WB | | |
| 11941 | \\ | (7C4#) LJ-DW 1B:SBZEX R3:STKB DALU:RE-ADD1-1B WB:DALU | 7C4 | 0280 C55F 3C00 200D 04AF 7B09 |
| 11942 | $KLW | CKVL ST-STKH:WB GO-TO($CIP-LOAD); | | |
| 11943 | \\ | (735#) LB-DW'RD-MEM-W 1B:STKT RB:STKP DALU:RU-SUB-1B | 785 | 1AE3 579C 3000 140C 046F 0B06 |
| 11944 | \\ | CKVL IF:DCARRY8- XL'ELS($YCM); | | |
| 11945 | \\ | (39C#) LU-STALL RU:STKP WB:RB | 39C | 00FB 579D 3C00 1400 046F 032F |
| 11946 | \\ | IF:OBUS-ZERO XL'ELS($YD#); | | |

```
                       RTL/6000 FILE EDIT
                    MICROPROGRAM SECTION
              SEQUENCE: $$MCS
                                                     ADDRESS  IMAGE
                                                     (HEX)    (HEX)
LINE #
11946                                                39D      0280 C1A4 3200 340D 046F 0F06
11947   $\\     (39DH) ID:STKB RU:STKP DALU:RB-SUB-1B WB:DALU'Q:DALU
11948   $XL:ALU-NG      CKHL ST-STKH:WB LB-DW(WW:WB)                     GO-TO(1A4H);
11949   $\\                                                   790      038C CC6A 3CC0 3000 046F 081F
11950   $\\     (79CH) RJ:EO DALU:RB-SUB1 WB:DALU ST-STKB:WB
11951   $\\             CKHL                                             GO-TO(STV16);
11952   $\\                                                   1A4      028C C1A3 3000 3000 046F 7B19
11953   $\\     (1A4H) LB-DW ID:SBZEX RB:EO DALU:RB-ADD-1B WB:DALU
11954   $\\             CKHL ST-STKH:WB                                  GO-TO(1A3H);
11955   $\\                                                   1A3      2200 C1A5 3000 1400 046F 032F
11956   $\\     (1A3H) RB:STKP WB:RB DALU:WB LB-DW'Y:DALU
11957   $\\                                                              GO-TO(1A5H);
11958   $\\                                                   1A5      1800 C1A6 3000 300C 046F 032F
11959   $\\     (1A5H) LJ-WR-AEA-W'YINC1 RB:EO WB:RB ST-STKT:WB
11960   $XL:CNFG                                                         GO-TO(1A6H);
11961   $XL:CNFG2                                              1A6      03F8 C5F8 3CC0 0000 04AF 3B25
11962   $\\     (1A6H) ID:QZEX DALU:1B WB:DALU
11963   SKIP HOF;       CKVL                                             IF:PRIVILEGED XL'ELS(STV13-2C9);
11964   $XL:USRCH                                              1F8      9707 2C08 CDC0 3017 646F 032F
11965   $\\     (1FCH) RB:EO JU:RB ST-B7SEL:WB
11966   $\\             CKVL                                             IF:OBUS-ZERO X2(STVU9,1F8H);
11967   $\\                                                   711      0212 5CC9 32C0 0700 366F 032F
11968   $\\     (711H) RB:D7 WB:RB LB-DW(WW:WB) GP-LOAD:1
11969   $\\                                                              IF:PRIVILEGED XL'ELS(STV13-2C9);
11970   $\\                                                   6C1      2200 0779 3C01 0600 056F 02EF
11971   $\\     (6C1H) ID:D5 WB:RB-SR1 DALU:WB LB-DW'Y:BALU GP-XBLOAD
11972   $\\                                                              GO-TO(S10W'CNFG);
11973   $\\                                                   712      6300 CC80 3096 0600 046F 032F
11974   $\\     (712H) RJ:D6 WB:RB RIB:OB-NZ                              IF:OBUS-ZERO XL'ELS(36AH);
11975   $\\             CKVL                                                       GO-TO(080H);
11976   $\\                                                   080      03F8 57BB 3CFF 0700 046F CB2D
11977   $\\     (080H) WB:P ST-A6:LB RB:D5                                IF:OBUS-ZERO XL'ELS(3B8H);
11978   $\\             LB-DA'Y:BALU                                     IF:OBUS-ZERO XL'LLS(3B8H);
11979   $\\                                                   572      0380 557A 3C00 260E 046F 012F
11980   $\\     (572H) DALU:FFFFFF ST-DU:DALU WB:RB-SW'Q:HEXU FLINK:(F)
11981   $\\             CKHL                                                       GO-TO(7BCH);
11982   $\\                                                   3B8      0300 CCC7 AF00 C000 1EAF 0623
11983   $\\     (OC7H) LJ-P:Y'NONPROC IB:0000(FFH) RB:D7 DALU:RB-AND-1B WB:DALU ST-A0:WB
11984   $\\             GP-MISC1:1X                                                GO-TO(OC7H);
11985   $\\                                                   0C7      3BC0 CCE3 3CC0 E00A 046F 3059
11986   $\\     (0C7H) LJ-P:Y'NONPROC IB:SB RB:D0 DALU:WB:ZS ST-A2:WB
11987   $\\             CKVL ST-DO:DALU WB:ZS ST-A2:WB                             GO-TO(0E3H);
11988   $\\                                                   0E3      0500 CCF9 3C01 C800 04AF CF25
11989   $\\     (0E3H) IB:0000(01H) DALU:IB ST-KD:DALU WB:DALU'Q:DALU
11990   $\\             CKVL                                                       GO-TO(GF9H);
11991   $\\                                                   0F9      03F8 578A 3096 0600 046F 032F
11992   $\\     (0F9H) RB:D6 WB:RB RIB:OB-NZ                               IF:OBUS-ZERO XL'ELS(36AH);
11993   $\\             CKVL                                                       GO-TO(080H);
11994   $\\                                                   30A      03F8 578B 3CFF 0700 046F CB2D
11995   $\\     (36AH) IB:0000(FFH) RB:D7 DALU:RB-AND-1B WB:DALU
11996   $\\             CKHF                                             IF:OBUS-ZERO XL'ELS(3B8H);
11997   $\\                                                              IF:OBUS-ZERO XL'LLS(3B8H);
11998   $\\                                                   3B8      0340 C7BC 3C00 C000 046F 0B03
11999   $\\     (3B8H) RB:D0 DALU:RB-ADD1-RB ST-DO:DALU
12000   $\\             CKHF                                                       GO-TO(7BCH);
12001   $\\                                                   7BC      0380 C3B6 3CFF 2708 046F CB2D
12002   $\\     (7BCH) IB:0000(FFH) RB:D7 DALU:RB-AND-1B WB:DALU ST-A0:WB
12003   $\\             CKHF                                                       IF:RBUS16 X2(7B6H,3B6H);
12004   $\\                                                   3B6      3547 57EC 3C00 2000 046F 482E
12005   $\\     (3B6H) LB-PW'NONPROC IB:SB RB:D0 DALL:RU-AND-NOT-1B
12006   $\\             CKHF WB:DALU ST-DO:WB                                     IF:PF-TESTS XL'ELS(3BCH);
12007   $\\                                                   7B6      3547 57BC 3C00 2000 046F 482D
12008   $\\     (7B6H) LB-PW'NONPROC IB:SB RB:D0 DALU:RB-AND-1B WB:DALU
12009   $\\             CKHF ST-DO:WB                                    IF:PF-TESTS XL'ELS(3BCH);
12010   $\\                                                   3BC      0380 C3E7 3CC0 E000 04AF 0363
12011   $\\     (3BCH) DALU:FFFFFF ST-DO:DALU RU:B0 LB:RB-SL1 ST-B0:WB
12012   $\\             CKHL                                                       GO-TO(03CH);
12013   $\\                                                   3B7      0340 CC3C 3C00 C200 046F 3B19
12014   $\\     (3B7H) ID:QZEX RB:D2 DALU:RB-ADD-1B ST-D2:DALU
12015   $\\             CKHF                                                       GO-TO(03CH);
12016   $\\                                                   7B7      03F8 57ED 3C00 0008 04AF 3B26
12017   $\\     (7B7H) ID:QZEX RB:A0 DALU:RB-XOR-1B LB:DALU
12018   $\\             CKHL                                             IF:OBUS-ZERO XL'ELS(3BDH);
```

RTL/6000 FILE EDIT
MICROPROGRAM SECTION

| LINE # | | SEQUENCE: $MCS | ADDRESS (HEX) | IMAGE (HEX) | | | | |
|---|---|---|---|---|---|---|---|---|
| 11993 | $ | | 03C | 03FB | 57BE | 3C96 | C600 | 046F | 3B06 |
| 11994 | \ | (03C#) IB:JZEX RB:D6 DALU:RB-SUB-1B ST-D6:DALU WB:DALU | | | | | | |
| 11995 | \ | CKVL RIB:OH-NZ IF:OBUS-ZERO XL'ELS(3DE#) | | | | | | |
| 11996 | \ | (3DD#) IB:JZEX RB:D6 DALU:RB-XOR-1B WB:DALU RIB:OB-NZ | 3DD | 03FB | 57BF | 3C96 | 0600 | 046F | 3B26 |
| 11997 | \ | CKVL IF:OBUS-ZERO XL'ELS(3BF#) | | | | | | |
| 11998 | \ | (3BE#) RB:KO WB:RB'Q:RB | 3BE | 0319 | 03BC | 8000 | 0800 | 046F | 072F |
| 11999 | \ | IF:SELZERO'DEC X2(78C#,3DC#) | | | | | | |
| 12000 | \ | (3BF#) IB:JZEX RB:KO DALU:RB-ADD-1B WB:DALU'Q:DALU | 3BF | 0319 | C3BC | BCC0 | 0800 | 046F | 3F19 |
| 12001 | $XL:RTRN | IF:SELZERO'DEC X2(78C#,3DC#) | | | | | | |
| 12002 | \ | (7134) \X\ WB:F ST-A0:WB | 713 | 0300 | C312 | 3C00 | 2008 | 04AF | 012F |
| 12003 | $XL:0C16 | | | | | | | | |
| 12004 | \ | (716#) WB:P ST-A0:WB | 716 | 0300 | C312 | 3C00 | 2008 | 04AF | 012F |
| 12005 | $XL:SCINTRINS | GO-TO($TV05) | | | | | | |
| 12006 | \ | (718#) LB-PH'Y:DALU FLOD-PF RE:B7SEL JB:RB BALU:WB BALU 1B:SB | 718 | 8585 | C519 | CD00 | 0017 | 04AF | 432F |
| 12007 | $XL:ASST | CKHL IF:IBUS16- X2(SXR:SST,$IV16-119) | | | | | | |
| 12008 | \ | (719#) IB:D5 DALU:1B LB-DA'Y:BALU FSEL:(F) | 719 | 23BB | C750 | 9F00 | 0005 | 04A5 | 0B2F |
| 12009 | \ | IF:OBUS-ZERO X2(750#,350#) | | | | | | |
| 12010 | \ | (750#) IB:0000(10#) DALU:1B WB:DACWA:WB | 750 | 1313 | 5732 | 3310 | 0000 | 1EAF | CB25 |
| 12011 | \ | GP-MISC1:1X | | | | | | |
| 12012 | \ | (739#) LB-WR-LOCAL(MMU,7) | 739 | 2880 | C575 | 67C0 | 0000 | 04AF | 0B2F |
| 12013 | \ | IF:NINGO XL'ELS($IRIV) | | | | | | |
| 12014 | \ | (35C#) LB-HD-LOCAL(MMU,2) IB:00FF(FF#) DALU:1B WB:DALU | 35C | 2A93 | 5CC9 | 62FF | 2008 | 04AF | FB25 |
| 12015 | $XL:ATST2 | ST-A0:WB IF:NING0 XL'ELS($IV15-2C9) | | | | | | |
| 12016 | \ | (6C9#) RJ:A0 DALU:RB-ADD1 WB:DALU ST-A0:WB DALU:000000 | 6C9 | 2180 | C1BF | 3000 | 2008 | 04AC | 0B00 |
| 12017 | \ | CKHL LB-STALL'Y:DALU GO-TO(1BF#) | | | | | | |
| 12018 | \ | (1BF#) IB:0000(7F#) DALU:1B WB:DALU | 1BF | 1300 | C1C8 | 3300 | 0000 | 04AF | 4B25 |
| 12019 | $XL:ATST | (71A#) IB:D5 DALU:1B LB-DA'Y:BALU FSEL:(F) | 71A | 2313 | 5CC9 | 9F00 | 0005 | 04A5 | 0B2F |
| 12020 | \ | (5CA#) IB:0000(FF#) RB:D6 DALU:RB-AND-1B WB:DALU ST-A0:WB | 5CA | 0340 | 0668 | 30FF | 2608 | 046F | CB2D |
| 12021 | $XL:ATST2 | GO-TO($LB-TSTR) | | | | | | |
| 12022 | \ | (71B#) IB:0000(7F#) DALU:1B WB:DALU ST-A1:WB GP-MISC2:1X | 71B | 0340 | C7CB | 307F | 2009 | 2EAF | CB25 |
| 12023 | $XL:CVP | GO-TO($XL:VLD) | | | | | | |
| 12024 | \ | (665#) LB-HD-LOCAL(MMU,2) DALU:000000 ST-D3:DALU | 665 | 2A80 | CCF8 | 6200 | C300 | 04AF | 0B2C |
| 12025 | $CVP2 | GO-TO(0F8#) | | | | | | |
| 12026 | \ | (0F8#) FSEL:(2) | 0F8 | 0300 | C1D8 | 9200 | 0000 | 04AF | 0B2F |
| 12027 | \ | | | | | | | | |
| 12028 | \ | (1D8#) IB:A0 RB:D0 DALU:RB-SUB-1B | 1D8 | 03FC | C2E3 | 3C00 | 0008 | 046F | 0B06 |
| 12029 | \ | CKVL IF:DALU(24) X2(6E3#,2E3#) | | | | | | |
| 12030 | \ | (2E3#) RB:D3 DALU:RB-ADD-RU ST-D3:DALU | 2E3 | 0359 | 01C9 | BC00 | C300 | 046F | 0B13 |
| 12031 | \ | CKHF IF:SELZERO'DEC X2(5C9#,1C9#) | | | | | | |
| 12032 | \ | (6E3#) RB:D3 DALU:RU-ADD1-RU ST-D3:DALU | 6E3 | 0359 | C1C9 | BC00 | C300 | 046F | 0B03 |
| 12033 | \ | CKHF IF:SELZERO'DEC X2(5C9#,1C9#) | | | | | | |
| 12034 | \ | (1C9#) LH-STALL IB:0CC0(1F#) RB:A0 DALU:RB-AND-1B | 1C9 | 0C40 | C1D8 | 3C1F | 2008 | 04AF | CBAD |
| 12035 | \ | CKHF WB:DALU-SL2 ST-A0:WB GO-TO(1D8#) | | | | | | |
| 12036 | \ | (5C9#) LB-DA IB:SB DALU:1B ST-LS:DALU | 5C9 | 1300 | C1DA | 3C00 | 5D00 | 04AF | 4B25 |
| 12037 | \ | GO-TO(1DA#) | | | | | | |
| 12038 | \ | | | | | | | | |
| 12039 | \ | (1DA#) LD-DW'NXINST IB:S0 RB:A1 DALU:RU-AND-1B ST-KS:DALU | 1DA | 9607 | 2CC8 | C000 | CD09 | 64AF | 4B2D |

```
                              RTL/6000 FILE EDIT
                           MICROPROGRAM SECTION

SEQUENCE: SSMCS

LINE #                                                                              ADDRESS   IMAGE
                                                                                    (HEX)     (HEX)
12040  $XL:MMJ0        \\                                                    XA;    71E       0313 5EC9 F5C7 0500 6E6F CB2D
12041  $XA:G2X:CIP     \\  (71EH) IJ:0060(07H) RB:05 DALU:RB-AND-1B WB:DALU
12042                  \\                FASP:WB'RING-IN GP-MISC6:1X
12043                  \\                IF:RINGO XL'ELS($TV13-2C9)          XA;    6CE       0200 C225 3200 0600 316F 032F
12044  $XL:MMUD2       \\  (6CEH) R0:06 WB:RB LB-DW(WW:WB) GP-MISC6:0X        GO-TO(225H);
12045                  \\                                                           225       0300 C220 EC00 2000 6CAF 006F
12046                  \\  (225H) FLINK:FB WB:2S ST-B0:WB GP-MISC6:0X         GO-TO(220H);
12047                  $   (22CH) R0:07 WB:RB LB-DW(WR:WB)                           220       0200 C226 3100 0700 046F 032F
12048                  $                                                     GO-TO(226H);
12049                  $   (226H) I0:05 BALU:IU LB-DA'Y:BALU                         226       2300 5620 3000 0005 04A5 0B2F
12050                  $                                                     XL($XL:MMUD-0)
12051  $XL:MMUD-0      \\  (62CH) LB-RD-LOCAL(MMU,0) RB:80 DALU:RB ST-D5:DALU        620       2A80 C221 6CC0 C500 04AF 0B2F
12052                  \\                                                    GO-TO(221H);
12053  $XL:MMUD-1      \\  (621H) LB-WR-LOCAL(MMU,1) RB:80 DALU:RB ST-D5:DALU        621       2880 CC20 6100 C500 04AF 0B2F
12054                  \\                                                    GO-TO(SPF-03);
12055  $XL:MMUD-2      \\  (622H) LB-RD-LOCAL(MMU,2) RB:80 DALU:RB ST-D5:DALU        622       2A80 C221 6200 C500 04AF 0B2F
12056                  \\                                                    GO-TO(221H);
12057  $XL:MMUD-3      \\  (623H) LB-WR-LOCAL(MMU,3) RB:80 DALU:RB ST-D5:DALU        623       2880 CC30 6300 C500 04AF 0B2F
12058                  \\                                                    GO-TO(SPF-03);
12059  $XL:MMUD-4      \\  (624H) LB-RD-LOCAL(MMU,4) RB:80 DALU:RB ST-D5:DALU        624       2A80 C221 6400 C500 04AF 0B2F
12060                  \\                                                    GO-TO(221H);
12061  $XL:MMUD-5      \\  (625H) LB-WR-LOCAL(MMU,5) RB:80 DALU:RB ST-D5:DALU        625       2880 CC00 6500 C500 04AF 0B2F
12062                  \\                                                    GO-TO(SPF-03);
12063  $XL:MMUD-6      \\  (626H) LB-RD-LOCAL(MMU,6) RB:80 DALU:RB ST-D5:DALU        626       2A80 C221 6600 C500 04AF 0B2F
12064                  \\                                                    GO-TO(221H);
12065  $XL:MMUD-7      \\  (627H) LB-WR-LOCAL(MMU,7) RB:80 DALU:RB ST-D5:DALU        627       2880 CC30 6700 C500 04AF 0B2F
12066                  \\                                                    GO-TO(SPF-03);
12067                  \\  (221H) LB-STALL                                           221       0000 C1D9 3000 0000 04AF 0B2F
12068                  \\                                                    GO-TO(1D9H);
12069                  \\  (1D9H) LB-DW IB:SB DALU:ID ST-D6:DALU                     1D9       0200 C222 3000 C600 04AF 4B25
12070                  \\                                                    GO-TO(222H);
12071                  $   (222H) LB-DA'WXINST ID:SB DALU:ID ST-D7:DALU              222       9707 2CC8 CC00 C700 64AF 4B25
12072                  $                                                     XA;
12073  SKIP HOF;
12074  $XA:G2X:CIP     \\  (4ACH) ID:F-VAL DALU:IB ST-LO:DALU WB:P ST-A7:WB          4A0       0300 C3CF 3CCC 780F 7AAF 8125
12075                  \3\                GP-MISC7:10                       GO-TO(30FH);
12076                  $   (30FH) DALU:000000 ST-RU:DALU GP-MISC6:11                30F       030A 5280 3C00 C800 6BAF 0B2C
12077                  \3\                IF:CIP-PRESENT XL'ELS($TVO5-290)
12078  $XL:CIP-VRF     $   (68D(H) LB-PW IB:SBZEX DALU:IB ST-E2:DALU WB:DALU'U:DALU 680       9587 C2CC 0500 D200 01AF 7F25
12079                  \3\                CKHL FPRA:WB'RING-IN GP-MISC0:X1
12080                  \3\                IF:IBUS24 X2($DIGIT,$BYTE);
12081  $XL:CIP-ALR     $   (681H) LB-PW IB:SBZEX DALU:IB ST-E2:DALU WR:DALU'U:DALU 681       9587 C2CC 0500 D200 04AF 7F25
12082                  \3\                CKHL FPRA:WB'RING-IN
12083                  \3\                IF:IBUS24 X2($DIGIT,$BYTE);
12084  $XL:CIP-ACM     $   (682H) LB-PW IB:SU2EX DALU:IB ST-E2:DALU WB:DALU'U:DALU 682       9587 C2CC 0500 D200 04AF 7F25
12085                  \3\                CKHL FPRA:WB'RING-IN
12086  $XL:CIP-MAT     $   (683H) LB-PW IB:SBZEX DALU:IB ST-E2:DALU WB:DALU'U:DALU 683       9587 C2CC 0500 D200 01AF 7F25
```

```
RTL/6000 FILE EDIT
MICROPROGRAM SECTION

ADDRESS    IMAGE
LINE #         SEQUENCE: %%MCS                                                (HEX)      (HEX)
12087
12088          CKHL FPR4:WB*RING-IN GP-MISC0:X1                                 684      9587 C2CC D500 D200 01AF 7F25
12089  $XL:CIP-AME    IF:IBUS24 X2($DIGIT,$BYTE);
12090  \3*\          CKHL FPR4:WB*RING-IN GP-MISC0:X1
12091  \\     (685H) LB-PW IB:SBZEX DALU:IB ST-E2:DALU WB:DALU*Q:DALU           685      9587 C2CC D500 D200 04AF 7F25
12092  $XL:CIP-DNC    IF:IBUS24 X2($DIGIT,$BYTE);
12093  \3*\          CKHL FPR4:WB*RING-IN GP-MISC0:X1
12094  \\     (686H) LB-PW IB:SBZEX DALU:IB ST-E2:DALU WB:DALU*Q:DALU           686      9587 C2CC D500 D200 01AF 7F25
12095  $XL:CIP-DME    IF:IBUS24 X2($DIGIT,$BYTE);
12096  \3*\          CKHL FPR4:WB*RING-IN GP-MISC0:X1
12097  \\     (687H) LB-PW IB:SBZEX DALU:IB ST-E2:DALU WB:DALU*Q:DALU           687      9587 C2CC D500 D200 04AF 7F25
12098  $XL:CIP-CBD    IF:IBUS24 X2($DIGIT,$BYTE);
12099  \3*\          CKHL FPR4:WB*RING-IN GP-MISC0:X1
12100  \\     (688H) LB-PW IB:SBZEX DALU:IB ST-E2:DALU WB:DALU*Q:DALU           688      9587 C2CC D500 D200 01AF 7F25
12101  $XL:CIP-SHH    IF:IBUS24 X2($DIGIT,$BYTE);
12102  \3*\          CKHL FPR4:WB*RING-IN GP-MISC0:X1
12103  \\     (689H) LB-PW IB:SBZEX DALU:IB ST-E2:DALU WB:DALU*Q:DALU           689      9587 C2CC D500 D200 04AF 7F25
12104  $XL:CIP-DML    IF:IBUS24 X2($DIGIT,$BYTE);
12105  \3*\          CKHL FPR4:WB*RING-IN GP-MISC0:X1
12106  \\     (68AH) LB-PW IB:SBZEX DALU:IB ST-E2:DALU WB:DALU*Q:DALU           68A      9587 C2CC D500 D200 04AF 7F25
12107  $XL:CIP-CDB    IF:IBUS24 X2($DIGIT,$BYTE);
12108  \3*\          CKHL FPR4:WB*RING-IN GP-MISC0:X1
12109  \\     (68BH) LB-PW IB:SBZEX DALU:IB ST-E2:DALU WB:DALU*Q:DALU           68B      9587 C2CC D5C0 D200 01AF 7F25
12110  $XL:CIP-DDV    IF:IBUS24 X2($DIGIT,$BYTE);
12111  \3*\          CKHL FPR4:WB*RING-IN GP-MISC0:X1
12112  \\     (68CH) LB-PW IB:SBZEX DALU:IB ST-E2:DALU WB:DALU*Q:DALU           68C      9587 C2CC D500 D200 04AF 7F25
12113  $XL:CIP-DAD    IF:IBUS24 X2($DIGIT,$BYTE);
12114  \3*\          CKHL FPR4:WB*RING-IN GP-MISC0:X1
12115  \\     (68DH) LB-PW IB:SBZEX DALU:IB ST-E2:DALU WB:DALU*Q:DALU           68D      9587 020C D500 D200 04AF 7F25
12116  $XL:CIP-DSU    IF:IBUS24 X2($DIGIT,$BYTE);
12117  \3*\          CKHL FPR4:WB*RING-IN GP-MISC0:X1
12118  \\     (68EH) LB-PW IB:SBZEX DALU:IB ST-E2:DALU WB:DALU*Q:DALU           68E      9587 C2CC D500 D200 04AF 7F25
12119  $XL:CIP-DSH    IF:IBUS24 X2($DIGIT,$BYTE);
12120  \3*\          CKHL FPR4:WB*RING-IN GP-MISC0:X1
12121  \\     (68FH) LB-PW IB:SBZEX DALU:IB ST-E2:DALU WB:DALU*Q:DALU           68F      9587 C2CC D500 D200 04AF 7F25
12122  $XL:CIP-DCM    IF:IBUS24 X2($DIGIT,$BYTE);
12123  \3*\          CKHL FPR4:WB*RING-IN GP-MISC0:X1
12124  \\     (60CH) DALU:000000 WB:DALU-SL2*Q:QSL2 ST-A0:WB FM-SEL:F8          60C      131C 317A D900 2008 04AF 0FAC
12125  $DIGIT        LB-DA
12126  \2*\          IF:MISC2H- XH*ELS($TV16-17A);
12127  \\     (60DH) DALU:000000 WB:DALU-SL1*Q:QSL1 ST-A0:WB FM-SEL:F8          20C      021C 317A D900 2008 04AF 0F6C
12128  $BYTE         LB-DW
12129  \2*\          IF:FREGO- XH*ELS($TV16-17A);
12130  SKIP HOF:
12131  $CIP-EAG (1F6H) RB:E2 WH:RB*Q:WB GP-MISC7:10                             1F6      0531 0537 3C00 1200 7A6F 072F
12132  \2*\          IF:MISC2A X2($37H,137H);
12133  $CIP-EAG-X (1FAH) GP-MISC7:10                                            1FA      0531 C537 3000 0000 7AAF 0B2F
12134             IF:MISC2A X2($37H,137H);
12135  \2*\   (137H) IU:QZEX DALU:IB ST-EC:DALU WB:Y ST-A6:WB                   137      0529 C793 3C00 F00E 2EAF 3925
12136               GP-MISC2:1X
12137          IF:MISC0\SHIFT RING-EFF\ X2(793H,393H);
12138  \2*\   (537H) IB:QZEX DALU:IB ST-E2:DALU WB:Y ST-A2:WB                   537      0336 C392 84C0 F20A 04AF 3925
12139               FSEL-LINK:(4)    IF:MISC2H= X2(792H,$CIP-TASK)
12140  \2*\   (792H) IB:QZEX DALU:IB ST-E1:DALU WB:Y ST-A1:WB                   792      0329 1792 3000 F109 21AF 3925
12141               GP-MISC2:X1
12142             IF:MISC0\SHIFT RING-EFF\ X2(793H,$CIP-TASK);
```

```
                    RTL/6000 FILE EDIT
                    MICROPROGRAM SECTION
                                                           ADDRESS   IMAGE
                                                           (HEX)     (HEX)
LINE #
                    SEQUENCE: $$MCS
12134               (793H) LD-PW IB:SBZEX DALU:IB ST-E2:DALU WB:DALU*Q:DALU    793    9587 020C D500 D200 6BAF 7F25
12135    $(2*)         CKHL FPRM:WB*RING-IN GP-MISC0:11
12136    //              IF:IBUS24 X2($DIGIT,$BYTE):DALU                       393    9587 C2CC D500 D200 6BAF 7F25
12137    \\              IF:IBUS24 X2($DIGIT,$BYTE):DALU
12138    \(3*)
12139    //
12140    $CIP-TASK
12141    $(2*)       (392H) LD-PW IB:SBZEX DALU:IB ST-E2:DALU WB:DALU*Q:DALU   392    0308 C6C0 F405 0000 32AF C825
12142    //              CKHL FPRM:WB*RING-IN GP-MISC0:11
12143    \\              IF:IBUS24 X2($DIGIT,$BYTE):DALU                       600    2307 5792 3000 000F 04A5 0B2F
12144    \(3*)
12145    $          (600H) IB:0000(05H) DALU:IB WB:DALU FASP:WB*RING-OUT       20D    5509 539B 3100 1800 046F 032F
12146    $(2*)               GP-MISC5:X0        IF:CIP-SIP-BUSY X2(600H,2U0H):DALU
12147    \\          (200H) R0:LO WB:RB LB-DA(WA:WB) CIP-STALL                 398    2880 CCD8 4700 3000 5E6F 072F
12148    \(3*)               IF:PF-TESTS XL*ELS($CIP-TASK):DALU
12149    //         (39BH) LB-WR-LOCAL(CIP,7) R0:E0 WB:R0 W:RB ST-B0:WB        008    4100 C2C8 3700 000E 04AF 076F
12150    \\                  GP-MISC5:1X                                       1EA    4100 C2C8 3700 001B 02AF 076F
12151    \(3*)       (0DCH) R0:A6 WB:RB-SL1*Q:QSL1 LB-STALL*WBYTE CIP-STALL
12152    //                                     GO-TO(0D8H):
12153    \\          (1EAH) R8:ASSEL WB:RB-SL1*Q:QSL1 LB-STALL*WBYTE           208    2899 C6CA 4900 0000 6EAF 0B2F
12154    \(3*)               GP-MISC0:X0 CIP-STALL
12155    \\          (202H) LB-WR-LOCAL(CIP,9) GP-MISC6:1X IB:00               60A    5100 0209 3300 0740 046F 022F
12156    //                               IF:1D19-23:ZERO X2(60AH,20AH):DALU
12157    \\          (60AH) R0:D7SEL WB:RB-SJ LB-STALL*WA:WB CIP-STALL         209    2880 C2CA 4800 0000 04AF 082F
12158    \(3*)                             GO-TO(209H):
12159    \\          (205H) LB-WR-LOCAL(CIP,3)
12160    //                                GO-TO(20AH):                       20A    5351 C6CB D900 0000 68AF 032F
12161    \(2*)       (20AH) R0:00 WB:RB LB-DA(WR:WB) GP-MISC0:00 FW-SEL:FB
12162    //                CIP-STALL        IF:MISC2A X2(60BH,20BH):DALU       20B    2880 C2F4 5FC0 D70F 04AF 0B2F
12163    \\          (20EH) LB-WR-LOCAL(CIP,IFH) RE:A7 DALU:RB ST-PCIP:DALU
12164    \(3*)                               GO-TO($PF-2F):                   60B    28A9 C5EA 4FC0 3340 2C6F 072F
12165    \\          (60BH) LB-WR-LOCAL(CIP,F) R0:E3SEL WE:RB*Q:RB ST-B0:WB
12166    SKIP HDF;                         IF:MISC0B X2($EAH,1EAH):            5EA    0300 C1EA F406 0000 2EAF CB25
12167    $XA:G6X:0-0PS (5EAH) IB:0000(06H) DALU:IB WE:DALU FASP:WB*RING-OUT
12168    //                                 GO-TO(1EAH);                      4E0    032C C7E7 3C01 0000 05AF 8A65
12169    \\          (4E0H) IB:F-VAL DALU:IB WB:DALU SR4 GP-X0LOAD
12170    \(3*)                              IF:LAFMODE X2($RE-0,3E7H):         3E7    223F 53F4 3C02 C802 04AF C325
12171    //          (3E7H) IB:0000(02H) DALU:IB ST-K0:DALU R0:02 WD:RB
12172    $RE-0                BALU:WD LD-DA*Y:DALU                            7E7    233F 53F4 3C03 C802 04AF C825
12173    //         (7E7H) IB:0000(05H) DALU:IB ST-K0:DALU R0:00 WD:RB
12174    \\                 BALJ:WB LD-DA*Y:DALU
12175    $XL*DGA
12176    //          (7F0H) LB-RD-MEM-W*LOCK IB:0000(09H) DALU:IB ST-D0:DALU   7F0    3A00 C3E2 3C09 E009 04AF CB25
12177    \\                 WB:RI-TW ST-A1:WD
12178    $XL*00T     (7F1H) LD-RD-MEM-W*LOCK GP-MISC2:1X FLINK:(3)             7F1    3A0C C3E2 A300 0000 2EAF 0B2F
12179    \\                                 GO-TO(3E2H);
12180    $XL*DGH     (7F2H) LB-RD-MEM-W*LOCK ID:0000(09H) DALU:IB ST-D0:DALU   7F2    3A00 C3E2 3D09 E009 04AF C825
                            WB:RI-TW ST-A1:WB
```

RTL/6000 FILE EDIT
MICROPROGRAM SECTION

| LINE # | | SEQUENCE: $SRCS | ADDRESS (HEX) | IMAGE (HEX) | | | | |
|---|---|---|---|---|---|---|---|---|
| 12181 | $XL:BCH | (7F3H) LB-RD-MEM-W°LOCK IB:0000(0FH) DALU:IB ST-D0:DALU | 7F3 | 3A00 | 03E2 | 3CDF | E009 | 04AF | C825 |
| 12182 | \\ | WB:R1-TW ST-A1:WB          GO-TO(3E2H); | | | | | | | |
| 12183 | $XL:SBA | (7F4H) LB-RD-MEM-W°LOCK IB:0000(09H) DALU:IB ST-D0:DALU | 7F4 | 3A00 | 03E2 | 9DD9 | E009 | 21AF | C825 |
| 12184 | \\ | WB:R1-TW ST-A1:WB GP-MISC2:X1 FSEL:(0) | | | | | | | |
| 12185 | | GO-TO(3E2H); | | | | | | | |
| 12186 | $XL:BOP-65 | (7F5H) | 7F5 | 0300 | C312 | 3C00 | 0000 | 04AF | 0B2F |
| 12187 | \\ | GO-TO(1TV05); | | | | | | | |
| 12188 | $XL:SGH | (7F6H) LB-RD-MEM-W°LOCK IB:C0C0(09H) DALU:1B ST-D0:DALU | 7F6 | 3A0C | C3E2 | 3CD9 | E009 | 21AF | C825 |
| 12189 | \\ | WB:R1-TW ST-A1:WD GP-MISC2:X1 | | | | | | | |
| 12190 | $XL:BOP-67 | (7F7H) | 7F7 | 0300 | C312 | 3000 | 0000 | 04AF | 0B2F |
| 12191 | \\ | GO-TO(1TV05); | | | | | | | |
| 12192 | \\ | (3E2H) LB-STALL DALU:FFFFF ST-E1:DALU | 3E2 | 0029 | C3E4 | 3C00 | D100 | 04AF | 0B23 |
| 12193 | \\ | IF:MISCOO- X2(7E4H,3E4H); | | | | | | | |
| 12194 | \\ | (3E4H) IB:A1 RB:D0 DALU:RB-AND-1B WB:DALU°Q:DALU | 3E4 | 0310 | 53F1 | 3000 | 0009 | 046F | 0F2D |
| 12195 | \\ | IF:BUS-ACK- XL°ELS($U-EXIT); | | | | | | | |
| 12196 | \\ | (7E4H) LB-DW(JW:WB) IB:SHZEX DALU:1B ST-E1:DALU RB:E1 | 7E4 | 0210 | 53F2 | 3200 | 0000 | 046F | 7325 |
| 12197 | \\ | WB:RB | | | | | | | |
| 12198 | $Q-EXIT | (3F1H) LB-WR-MEM-J°UNLOCK IB:Q2EX RB:E0 DALU:RB-OR-1B | 3F1 | 383C | 0EF4 | 3DFF | 1002 | 046F | 3B27 |
| 12199 | \\ | WB:DALU RILOAD:WB IF:DALU-(26) X2(6F4H,$PF-2F); | | | | | | | |
| 12200 | $PF-2F | (2F4H) | 2F4 | 9707 | 2CC8 | C000 | 0000 | 64AF | 0B2F |
| 12201 | \\ | XA; | | | | | | | |
| 12202 | \\ | (6F4H) WB:P BALU:WB LB-STALL°Y:DALU | 6F4 | 2100 | C75D | 30C0 | 0000 | 04AF | 012F |
| 12203 | $Q-ENTER | GO-TO($PLOAD); | | | | | | | |
| 12204 | \\ | (3F2H) LB-RD-MEM-W°UNLOCK RB:E1 DALU:RB RIC:0 | 3F2 | 383C | 16F4 | 3080 | 1107 | 046F | 0B2F |
| 12205 | \\ | IF:DALU-(31) X2(6F5H,$PF-2F); | | | | | | | |
| 12206 | \\ | (6F5H) LB-DW°YINC1 RB:D5 WB:RB ST-A0:WB | 6F5 | 1231 | C7E0 | 3C00 | 2508 | 046F | 032F |
| 12207 | \\ | IF:MISC2A X2(7E0H,$WLOOP); | | | | | | | |
| 12208 | $WLOOP-DUP | (7EC#) RB:AD DALU:RB-ADD1 WB:DALU ST-A0:WB | 7E0 | 03F8 | 56FA | 3C00 | 2008 | 04AF | 0B00 |
| 12209 | \\ | IF:OBUS-ZERO XL°ELS($WLOOP-DUP); | | | | | | | |
| 12210 | SKIP NOF: | (3EQH) LB-DA°Y:BALU IB:SBZEX DALU:000000 ST-E0:DALU | 3E0 | 1B07 | 17E6 | 3200 | D000 | 01AF | 7B25 |
| 12211 | $WLOOP | IF:LAFMODE X2(7E5H,3E5H); | | | | | | | |
| 12212 | \2*\ | (3E5H) LB-DW°Y:BALU IB:SBZEX DALU:1B ST-E2:DALU BALU:1B | 3E5 | 2219 | C2F7 | 0C00 | D200 | 04A5 | 0B2C |
| 12213 | \\ | IF:SELZERO X2(6F7H,2F7H); | | | | | | | |
| 12214 | \2*\ | (2FAH) LB-DW°Y:BALU IH:SU DALU:1B ST-E2:DALU BALU:1B | 2FA | 1H07 | 17E6 | 3200 | D000 | 01AF | 0B2C |
| 12215 | \\ | IF:SELZERO X2(6F7H,2F7H); | | | | | | | |
| 12216 | \2*\ | (3E6H) LB-STALL WB:Y ST-A7:WB | 3E6 | 002C | C7E5 | 3000 | 2D0F | 04AF | 092F |
| 12217 | \\ | IF:SELZERO X2(7E0H,2F7H); | | | | | | | |
| 12218 | \2*\ | (6F7H) LB-DW°YINC1 IU:B2 RB:E2 DALU:RB-XOR-1B WB:DALU | 6F7 | 12FB | C6F6 | 3000 | 1202 | 046F | 4B25 |
| 12219 | \\ | IF:OBUS-ZERO X2($XL:MISSOH,2F6H); | | | | | | | |
| 12220 | \2*\ | (2F6H) IB:31 RB:E2 DALU:RB-XOR-1B WB:DALU | 2F6 | 03FB | C6FA | 3000 | 1201 | 046F | 0B26 |
| 12221 | \\ | CKVL | | | | | | | |
| 12222 | \2*\ | (6FAH) LB-DA°RD-MEM-D | 6FA | 1000 | C2FB | 3000 | 0000 | 04AF | 0B2F |
| 12223 | \\ | GO-TO($HITADD); | | | | | | | |

RTL/6000 FILE EDIT
MICROPROGRAM SECTION

| LINE # | | SEQUENCE: $$MCS | ADDRESS (HEX) | IMAGE (HEX) | | | | |
|---|---|---|---|---|---|---|---|---|
| 12227 | | | 2F7 | 1H0G | C3E1 | 3200 | 0500 | 046F | 032F |
| 12228 | \2\ | | 2F7 | | | | | | |
| 12229 | $ | (2F7H) LD-DA*RD-MEM-D(WW:WB) RB:D5 WB:RB | | | | | | | |
| 12230 | | GO-TO(3E1H) | | | | | | | |
| 12231 | $PWORD | (3E1H) LB-STALL IB:B2 RB:E2 DALU:RB-XOR-IB WB:DALU | 3E1 | 00FB | 5EF3 | 3000 | 1202 | 046F | 0B26 |
| 12232 | \2\ | IF:OBUS-ZERO XL*ELS($PWORD); | | | | | | | |
| 12233 | $XL:MISS?H | (2F3H) LB-DW*YINC1 IB:S9 RB:A0 DALU:RB-SUB1-IB ST-D0:DALU | 2F3 | 12F8 | 57E0 | 3C00 | C008 | 04AF | 4B16 |
| 12234 | \\ | IF:DCARRY16- XL*ELS($QLOOP); | | | | | | | |
| 12235 | $XL:MISS | (6F6H) ID:0000(22H) DALU:IB ST-E0:DALU | 6F6 | 0336 | 16F9 | 3C22 | 0000 | 04AF | C825 |
| 12236 | \\ | | | | | | | | |
| 12237 | $XL:HIT0?H | (6F2H) ID:0000(22H) DALU:IB ST-E0:DALU RB:E0 WB:RB | 6F2 | 0100 | 07E7 | 3222 | D000 | 046F | C325 |
| 12238 | \\ | LB-STALL*WW:WH GO-TO($RE-Q); | | | | | | | |
| 12239 | $XL:HIT?H | (7E2H) LD-DA*RD-MEM-D R0:D0 DALU:NOT-RB WB:DALU | 7E2 | 1BF8 | C2FB | 3C00 | 0000 | 046F | 0B20 |
| 12240 | \\ | CKVL | | | | | | | |
| 12241 | $HITADD | (7E6H) RB:D0 DALU:NOT-RB WB:DALU | 7E6 | 03FB | C2FB | 3C00 | 0000 | 046F | 0B20 |
| 12242 | \\ | IF:OBUS-ZERO- X2(6F8H,$HITADD); | | | | | | | |
| 12243 | $ | (2F8H) ID:0000(20H) DALU:IB ST-E0:DALU | 2F8 | 0300 | C3A0 | 3C20 | D000 | 04AF | C825 |
| 12244 | $ | GO-TO($A0H); | | | | | | | |
| 12245 | $ | (6FBH) ID:00C0(24H) DALU:IB ST-E0:DALU | 6FB | 0300 | C3A0 | 3024 | D000 | 04AF | C825 |
| 12246 | $ | GO-TO($A0H); | | | | | | | |
| 12247 | $ | (3A0H) LB-STALL RB:E2 WB:RB ST-U1:WB | 3A0 | 002C | C6FC | 3C00 | 3201 | 046F | 032F |
| 12248 | $ | IF:LAFMODE X2(6FCH,21CH); | | | | | | | |
| 12249 | $ | (2FCH) LD-DW(WW:WB) IB:SBZEX DALU:ID ST-E1:DALU WB:DALU | 2FC | 0236 | C6F8 | 3200 | D100 | 04AF | 7B25 |
| 12250 | $ | IF:MISC2B X2(6F8H,2F8H); | | | | | | | |
| 12251 | $ | (6FCH) LD-DA(WA:WB) IB:SB DALU:IB ST-E1:DALU WB:DALU | 6FC | 1336 | C6F8 | 3C00 | D100 | 04AF | 4B25 |
| 12252 | $ | IF:MISC2B X2(6F8H,6F8H); | | | | | | | |
| 12253 | $ | (2F8H) DALU:0000000 WB:DALU LB-STALL*WW:WB | 2F8 | 0100 | 07E7 | 3200 | 0000 | 04AF | 0B23 |
| 12254 | $ | GO-TO($RE-Q); | | | | | | | |
| 12255 | $ | (6F8H) ID:A7 DALU:IB LO-STALL*Y:DALU | 6F8 | 212C | C6FD | 3C00 | 000F | 04A5 | 032F |
| 12256 | $ | IF:LAFMODE X2(6FDH,2FEH); | | | | | | | |
| 12257 | $ | (2FDH) LB-WR-MEM-W*YINC1 IB:B2 RB:E1 DALU:RB-XOR-IB WB:DALU | 2FD | 183B | C6F9 | 3000 | 1102 | 046F | 0B26 |
| 12258 | $ | IF:OBUS-ZERO X2(6F9H,2F9H); | | | | | | | |
| 12259 | $ | (6FDH) LD-WR-MEM-D IB:B2 RB:E1 DALU:RB-XOR-IH WB:DALU | 6FD | 193B | C6F9 | 3C00 | 1102 | 046F | 0B26 |
| 12260 | $ | IF:OBUS-ZERO X2(6F9H,2F9H); | | | | | | | |
| 12261 | $ | (2F9H) DALU:0000000 WB:DALU LB-STALL*WW:WB | 2F9 | 0100 | C7E7 | 3200 | 0000 | 04AF | 0B2C |
| 12262 | $ | GO-TO($RE-Q); | | | | | | | |
| 12263 | $ | (6F9H) ID:B2 RB:K0 WE:RB DALU:WB-ADD-IB LB-STALL*Y:BALU | 6F9 | 612C | C6FE | 3C00 | 0802 | 0459 | 032F |
| 12264 | $ | IF:LAFMODE X2(6FEH,2FEH); | | | | | | | |
| 12265 | $ | (2FEH) LB-STALL*WW:WB R3:A7 DALU:RB-SUB1 WB:DALU | 2FE | 0140 | C5DA | 3200 | 000F | 04AF | 0B1F |
| 12266 | $ | GO-TO($DAH); | | | | | | | |
| 12267 | $XL:HIT0UT | (6FEH) IB:B2 RB:K0 WB:RB DALU:WB-ADD-IB LB-STALL*Y:BALU | 6FE | 114C | C70A | 3300 | 000F | 04AF | 0B1F |
| 12268 | $ | GP-MISC0:X1 | | | | | | | |
| 12269 | $ | (6F3H) LB-DA*RD-MEM-D IB:B2 DALU:IB WE:RB ID:J000(01H) DALU:IB | 6F3 | 6100 | C3F5 | 3000 | 0802 | 0159 | 032F |
| 12270 | $ | ST-D0:DALU | | | | | | | |
| 12271 | $ | ($F5H) LB-DA*RD-MEM-D IB:B2 DALU:IB WE:RB ID:J000(01H) DALU:IB | 3F5 | 1E2C | C6FF | 3000 | D202 | 04AF | 0B25 |
| 12272 | $ | ST-D0:DALU | | | | | | | |
| 12273 | $ | (2FFH) LJ-STALL*WA:WB R3:A7 DALU:RB-SUB1 WB:DALU | 2FF | 0100 | C2F5 | 3C00 | C001 | 04AF | C325 |
| 12274 | $ | GO-TO(2FSH); | | | | | | | |
| 12275 | $ | (6FFH) LJ-STALL*WA:WB WE:RB ID:J000(01H) DALU:IB | 6FF | 1100 | 02DB | 3201 | C001 | 04AF | C325 |

```
RTL/6000 FILE EDIT
MICROPROGRAM SECTION

SEQUENCE: %SMCS                                    ADDRESS   IMAGE
LINE #                                                                 (HEX)     (HEX)
12274                    ST-DO:DALU                                    2F5       0280 C2F2 3C00 200F 046F 7B19
12275    ))        (2F5#) LB-DW IB:SBZEX RB:D0 DALU:RB-ADD-IB WB:DALU
                         GO-TO(2DB#);
12276    $         CKHL ST-A7:WB                                       2DB       1580 C3F6 3C00 200F 046F 4B19
12277    ))        (2DB#) LB-DA IB:SB RB:DU DALU:RB-ADD-IB WB:DALU ST-A7:WB
                         GO-TO(2F2#);
12278    $         CKHL                                                2F2       1800 C7E3 3200 0500 046F 032F
12279    ))        (2F2#) LB-WR-MEM-W'YINC1(WW:WB) RB:D5 WB:RB
                         GO-TO(3F6#);
12280    $                                                             3F6       0900 C7E3 3200 0500 046F 032F
12281    ))        (3F6#) LB-WR-MEM-W'YINC1(WW:WB) RB:D5 WB:RB
                         GO-TO(%XL:HITWOH);
12282    $XL:HITWOH IB:0U00(2D#) DALU:IB ST-E0:DALU RB:B1 WB:RB        7E3       232C C7F8 3C20 D001 04AF C325
12283    ))        (7E3#)
                         BALU:WB LB-DA Y:BALU IF:LAFMODE X2(7F6#,3F8#);
12284    $         CKHL                                                3F8       1800 C3F7 3C00 1200 046F 032F
12285    ))        (3F8#) LB-WR-MEM-W'YINC1(WW:WB) RB:E2 WB:RB
                         GO-TO(3F7#);
12286    $                                                             7F8       1800 C3D8 3300 1200 046F 032F
12287    ))        (7F8#) LB-WR-MEM-W'YINC1(WA:WB) RB:E2 WB:RB
                         GO-TO(3D8#);
12288    $                                                             3F7       1800 C3D9 3200 0001 04AF 032F
12289    ))        (3F7#) LB-WR-MEM-W'YINC2(WW:WB) RB:B1 WB:RB
                         GO-TO(3D9#);
12290    $                                                             3D8       0900 C3D9 3200 0001 04AF 0B2F
12291    ))        (3D8#) LB-WR-MEM-W'YINC2(WA:WB) RB:B1 WB:RB
                         GO-TO(3D9#);
12292    $                                                             3D9       232C 07DA 3C00 000F 04A5 0B2F
12293    ))        (3D9#) IB:A7 BALU:IB LB-DA'Y:BALU
                         IF:LAFMODE X2(7DA#,5DA#);
12294    $                                                             3DA       1800 C7E7 3200 0000 04AF 0B2F
12295    ))        (3DA#) LB-WR-MEM-W'YINC2(WW:WB) DALU:000000 WB:DALU
                         GO-TO(%HE-Q);
12296    $                                                             7DA       0900 C7E7 3200 0000 04AF 0B2F
12297    ))        (7DA#) LB-WR-MEM-W'YINC2(WA:WB) DALU:000000 WB:DALU
                         GO-TO(%HE-Q);
12298    $                                                             4F0       0300 C312 3000 0000 04AF 0B2F
12299    $XA:G-RFU                                                     
                         GO-TO(%IV05);
12300    SKIP HOF;                                                     492       0319 5649 0000 2780 4A74 072F
12301    $XA:SCL   (492#) R0:D7NUM WB:RB'Q:RB ST-B0:WB GP-SHIN:CIRC BR-3WAY
12302    \1*\                IF:SELZERO- XL'ELS(%SH-NP-S);
12303    $XA:SCL   (482#) R0:D7NUM WB:RB ST-B0:WB GP-SHIN:OPEN RIC:0   482       0500 C236 3C80 2780 4B6F 032F
12304    \1*\                GO-TO(236#);
12305    $XA:SAL   (4A2#) R0:D7NUM WB:RB ST-B0:WB GP-MISC2:10 RIO:0    4A2       0300 C236 3082 2780 2A6F 032F
12306    \1*\                GO-TO(236#);
12307    \1*\     (236#) DALU:000000 WB:DALU'Q:DALU GP-MISC4:X1 BR-3WAY 236      0319 5649 0000 0000 41B4 0F2F
12308                       IF:SELZERO- XL'ELS(%SH-NP-S);
12309    $XA:DCL   (482#) R0:D6NUM WB:RB ST-B0:WB GP-SHIN:CIRC         482       0300 C24B 3C00 2680 4A6F 032F
12310    \1*\                GO-TO(24B#);
12311    $XA:DOL-LT-16 (46?#) R0:D5NUM WB:RB ST-00:WB GP-SHIN:OPEN RIC:0 483     0300 C24B 3080 2680 4B6F 032F
12312    \1*\                GO-TO(24B#);
12313    $XA:DCL-GE-16 (493#) R0:D7NUM WB:RB ST-B0:WB GP-SHIN:OPEN     493       0300 C24A 30C0 2780 4B6F 032F
12314    \1*\                GO-TO(24A#);
12315    \1*\     (24A#) R0:D6NUM DALU:RB GP-MISC2:01                  24A       03FC C231 3CCC 0687 296F 0B2F
12316                       IF:DALU(S1) X2(65J#,251#);
12317    $         CKJL                                                
12318    $XA:DAL-LT-16 (4A3#) RB:D6NUM WB:RB ST-B0:WB GP-SHIN:AR-32 RIO:0 4A3    0300 C237 3C82 2680 496F 032F
12319    \1*\                GO-TO(257#);
12320    $         (237#) R0:D7NUM WB:RB'Q:RB GP-MISC2:11 BR-3WAY      237       0319 5647 0CC0 0780 2874 072F
```

RTL/6000 FILE EDIT
MICROPROGRAM SECTION

SEQUENCE: SSMCS

| LINE # | | | | ADDRESS (HEX) | IMAGE (HEX) | | | | | |
|---|---|---|---|---|---|---|---|---|---|---|
| 12321 | \1\ | | IF:SELZERO- XL'ELS($SH-NP-D); | 4B3 | 03B0 | 0232 | 3000 | 2780 | 496F | 032F |
| 12322 | \1\ | SXA:DAL-GE-16 | IF:SELZERO- XL'ELS($SH-NP-D); | | | | | | | |
| 12323 | \1\ | | IF:RBUS16 X2(632H,232H); | 232 | 03FB | C233 | 3CC0 | 0680 | 286F | 032F |
| 12324 | \1\ | | CKHL | | | | | | | |
| 12325 | \1\ | | IF:OBUS-ZERO- GP-MISC2:11 | | | | | | | |
| 12326 | s | (232H) RB:D6NUM WB:RB GP-MISC2:11 | | 632 | 03FB | C233 | 3CC0 | 0680 | 2B6F | 0B20 |
| 12327 | \1\ | | CKVL | | | | | | | |
| 12328 | SXA:KCL-LT-16 | (632H) RB:D6NUM DALU:NOT-RB WB:DALU GP-MISC2:11 | | 4C8 | 0300 | C234 | 3C00 | 2F80 | 4A6F | 032F |
| 12329 | \3\ | | IF:OBUS-ZERO- X2(633H,233H); | | | | | | | |
| 12330 | SXA:KCL-LT-16 | (4C8H) RB:L7NUM WB:RB ST-B0:WB GP-SHIN:CIRC | | 4D8 | 0300 | C217 | 3000 | 3F80 | 4A6F | 032F |
| 12331 | \3\ | | GO-TO(217H) | | | | | | | |
| 12332 | SXA:KCL-LT-16 | (4DEH) RJ:L7NUM WB:RB ST-B0:WB GP-SHIN:CIRC | | 4B1 | 0300 | C245 | 3080 | 2F80 | 4B6F | 032F |
| 12333 | \3\ | | GO-TO(245H) | | | | | | | |
| 12334 | SXA:KCL-LT-16 | (4B1H) RB:K7NUM WB:RB ST-B0:WB GP-SHIN:OPEN RIC:0 | | 491 | 0300 | C245 | 3000 | 3F80 | 4B6F | 032F |
| 12335 | \3\ | | GO-TO(245H); | | | | | | | |
| 12336 | s | (491H) RB:L7NUM WB:RB ST-B0:WB GP-SHIN:OPEN | | 248 | 03FC | C231 | 3C00 | 0F87 | 196F | 0B2F |
| 12337 | \1\ | | CKVL | | | | | | | |
| 12338 | SXA:KAL-LT-16 | (248H) RB:K7NUM DALU:RB GP-MISC1:01 | | 4A1 | 0300 | C24E | 3C82 | 2F60 | 496F | 032F |
| 12339 | \3\ | | IF:DALU(31) X2(631H,231H); | | | | | | | |
| 12340 | \1\ | | IF:OBUS-ZERO- X2(634H,234H); | 24E | 0319 | 5E47 | 0000 | 1F80 | 1B74 | 072F |
| 12341 | s | (24EH) RB:L7NUM WB:RB*Q:RB GP-SHIN:AR-32 | | | | | | | | |
| 12342 | SXA:KAL-GE-16 | (4B1H) RB:L7NUM WB:RB ST-B0:WB GP-SHIN:AR-32 | | 4B1 | 03B0 | C234 | 3C00 | 3F80 | 496F | 032F |
| 12343 | \3\ | | BR-3WAY | | | | | | | |
| 12344 | \3\ | | CKHL | | | | | | | |
| 12345 | s | (234H) RJ:K7NUM WB:RB GP-MISC1:11 | | 234 | 03FB | C234 | 3C00 | 0F80 | 1B6F | 032F |
| 12346 | \3\ | | IF:DALU'Q:DALU RIC:0 BR-3WAY | | | | | | | |
| 12347 | s | (634H) RJ:K/NUM DALU:NOT-RB WB:DALU GP-MISC1:11 | | 634 | 03FB | C635 | 3000 | 0F80 | 1B6F | 0B20 |
| 12348 | \3\ | | CKVL | | | | | | | |
| 12349 | \1\ | | IF:SELZERO- XL'ELS($SH-PUT); | | | | | | | |
| 12350 | s | (231H) DALU:000000 LH:DALU'Q:DALU RIC:0 BR-3WAY | | 231 | 0319 | 5E42 | 0C00 | 2780 | 4A74 | 072F |
| 12351 | \1\ | | IF:SELZERO- XL'ELS($SH-PUT); | | | | | | | |
| 12352 | s | (631H) DALU:C*CARRY WB:DALU'Q:DALU RIC:DCAHRY8 BR-3WAY | | 631 | 0319 | 5E42 | 0C81 | 0000 | 04B4 | 0F0C |
| 12353 | \1\ | | IF:SELZERO- XL'ELS($SH-PUT); | | | | | | | |
| 12354 | s | (233H) DALU:000000 WB:DALU'Q:DALU RIC:0 BR-3WAY | | 233 | 0319 | 5E42 | 0C82 | 0000 | 04B4 | 0F2C |
| 12355 | \1\ | | IF:SELZERO- XL'ELS($SH-PUT); | | | | | | | |
| 12356 | SKIP HOF; | | | | | | | | | |
| 12357 | SXA:SCH | (635H) DALU:010000 WB:DALU'Q:DALU RIC:1 BR-3WAY | | 635 | 0319 | 5E42 | 0C83 | 0000 | 04B4 | 0F2C |
| 12358 | \1\ | | IF:SELZERO- XL'ELS($SH-PUT); | | | | | | | |
| 12359 | SXA:SOH | | | | | | | | | |
| 12360 | s | (4D2H) RB:D7NJM WB:RB ST-B0:WB GP-SHIN:CIRC BR-3WAY | | 4D2 | 0C00 | 2780 | 4A74 | 072F | | |
| 12361 | \1\ | | IF:SELZERO- XL'ELS($SH-NP-S); | | | | | | | |
| 12362 | SXA:SAH | (4C2H) RB:D7NJM WB:RB ST-B0:WB GP-SHIN:OPEN RIC:0 | | 4C2 | 0300 | 0080 | 2780 | 4B74 | 072F | |
| 12363 | \1\ | | BR-3WAY | | | | | | | |
| 12364 | SXA:DCR | (4E2H) RJ:D7NUM WB:RB ST-B0:WB GP-SHIN:AR-32 RIC:0 | | 4E2 | 0300 | 0C80 | 2780 | 4974 | 072F | |
| 12365 | \1\ | | BR-3WAY | | | | | | | |
| 12366 | SXA:DOH-LT-16 | (4F2H) RB:D6NUM WB:RB ST-B0:WB GP-SHIN:CIRC | | 4F2 | 0300 | C24B | 3C00 | 2680 | 4A6F | 032F |
| 12367 | \1\ | | GO-TO(24BH) | | | | | | | |
| | SXA:DOR-GE-16 | (4C3H) RB:D6NUM WB:RB ST-B0:WB GP-SHIN:OPEN RIC:0 | | 4C3 | 0300 | C24B | 3C80 | 2680 | 4B6F | 032F |
| | \1\ | | GO-TO(24BH) | | | | | | | |
| | SXA:DOR-GE-16 | (4D3H) DALU:000000 WB:DALU ST-00:WB GP-SHIN:OPEN RB:D7NUM | | 4D3 | 03B0 | C211 | 3C00 | 2780 | 4B6F | 0B2C |

RTL/6000 FILE EDIT
MICROPROGRAM SECTION

```
SEQUENCE: $$HCS                                                                                    ADDRESS   IMAGE
                                                                                                   (HEX)     (HEX)
LINE N
12368        (1*)                          CKHL                        IF:RBUS16 X2(611N,211N);    211       0319 5640 0080 0680 2974 072F
12369        (1*)
12370        (1*)          (211N) RB:DONUM WB:RB*Q:RB RIC:0 GP-MISC2:01 BR-3WAY
12371        (1*)                                                      IF:SELZERO- XL*ELS($SH-DPUT);
12372        (1*)          (611N) RB:DONUM WB:RB*Q:RB DALU:0*CARRY RIC:DCARRY8                     611       0319 5640 0081 0680 2974 070C
12373        (1*)                          GP-MISC2:01 BR-3WAY
12374        $XA:DAR-LT-16 (1*)          (4E3N) RB:DONUM WB:RB ST-80:WB GP-SHIN:AR-32 RIC:0        4E3       0300 C248 3080 2680 496F 032F
12375        (1*)                                                      GO-TO(248N);
12376        (1*)          (248N) RB:D7NUM WB:RB*Q:RJ GP-MISC2:C1 BR-3WAY                          248       0319 5647 0CC0 0780 2974 072F
12377        (1*)                                                      IF:SELZERO- XL*ELS($SH-NP-D);
12378        $XA:DAR-GE-16 (1*)          (4F3N) RB:D7NUM GP-SHIN:AR-32                             4F3       0380 C212 3000 0780 496F 082F
12379        (1*)                          CKHL
12380        (1*)          (212N) RB:DONUM WB:RB*Q:RB RIC:0 GP-MISC2:0                             212       0380 C213 3C80 0680 296F 072F
12381        (1*)                                                      IF:SELZERO- XL*ELS($SH-DPUT);
12382        $            (612N) RB:DONUM WB:RB DALU:0*CARRY RIC:DCARRY8                           612       0380 C213 3081 0680 296F 070C
12383        (1*)                          CKHL GP-MISC2:01
12384        $XA:KCR-LT-16 (1*)          (4E2N) RB:K7NUM WB:RB ST-80:WB GP-SHIN:CIRC               4E8       0300 C245 3C00 2F80 4A6F 032F
12385        (3*)                                                      GO-TO(245N);
12386        $XA:KCR-GE-16 (3*)          (4F8N) RB:K7NUM WB:RB GP-SHIN:CIRC                        4F8       0300 C217 3C00 3F80 4A6F 032F
12387        (3*)                                                      GO-TO(217N);
12388        $            (217N) RB:K7NUM WB:RB GP-SHIN:C1 BR-3WAY                                 217       0519 5642 0C00 0F80 1974 072F
12389        (3*)                                                      IF:SELZERO- XL*ELS($SH:OPEN RIC:0;
12390        $XA:KOR-LT-16 (3*)          (4C1N) RB:K7NUM WB:RB GP-SHIN:OPEN RIC:0                  4C1       0300 C245 3C80 2F80 4B6F 032F
12391        (3*)                                                      GO-TO(245N);
12392        $XA:KOR-GE-16 (3*)          (4D1N) DALU:030000 WB:DALU ST-80:WB RB:L7NUM              4D1       0380 C238 3C00 3F80 4B6F 082C
12393        (3*)                                                      IF:RBUS16 X2(238N,638N);
12394        $            (238N) RB:K7NUM WB:RB*Q:RJ GP-MISC1:01 BR-3WAY                           238       0319 5642 0080 0F80 1974 072F
12395        (3*)                                                      IF:SELZERO- XL*ELS($SH-PUT);
12396        $            (638N) RB:K7NUM WB:RB ST-80:WB GP-MISC1:01 DALU:0*CARRY                  638       0319 5642 0081 0F80 1974 070C
12397        (3*)                          RIC:DCARRY8 BR-3WAY
12398        $XA:KAR-LT-16 (3*)          (4E1N) RB:K7NUM WB:RB ST-80:WB GP-SHIN:AR-32 RIC:0        4E1       0300 C245 3080 2F80 496F 032F
12399        (3*)                                                      GO-TO(245N);
12400        $            (245N) RB:L7NUM WB:RB*Q:RB GP-MISC1:01 BR-3WAY                           245       0319 5647 0C00 1F80 1974 072F
12401        (3*)                                                      IF:SELZERO- XL*ELS($SH-NP-D);
12402        $XA:KAR-GE-16 (3*)          (4F1N) RB:L7NUM GP-SHIN:AR-32                             4F1       0380 C288 3C00 1F80 496F 082F
12403        (3*)                                                      IF:RBUS16 X2(688N,288N);
12404        $            (288N) RB:K7NUM WB:RB*Q:RB GP-MISC1:01 RIC:0 BR-3WAY                     288       0380 C213 3080 0F80 1974 072F
12405        (3*)                                                      IF:SELZERO- XL*ELS($SH-PUT);
12406        $            (688N) RB:K7NUM WB:RB*Q:RB GP-MISC1:01 DALU:0*CARRY                      688       0380 C213 3081 0F80 1974 070C
12407        (3*)                          CKHL RIC:DCARRY8 BR-3WAY
12408        $            (213N) DALU:000000 WB:DALU ST-80:WB BR-3WAY                              213       0319 5642 0000 2000 04B4 082C
12409        (1*)                                                      IF:SELZERO- XL*ELS($SH-PUT);
12410        $            (613N) DALU:FFFFFF WB:DALU ST-80:WB BR-3WAY                              613       0319 5642 0000 2000 04B4 0823
12411        (1*)          (64FN) RB:B0 40*Q:RB*Q-SH1 ST-80:WB RIOC:SHIFT                          64F       0300 C64E 3CB5 2DC0 04AF 06EF
12412        $XL:SH15
12413        (1*)                                                      GO-TO($XL:SH14);
12414
```

RTL/6000 FILE EDIT
MICROPROGRAM SECTION

| LINE # | | SEQUENCE: SSMCS | ADDRESS (HEX) | IMAGE (HEX) | | | | |
|---|---|---|---|---|---|---|---|---|
| 12415 | $XL:SH14 | (64E#) RB:B0 WB'Q:RB'Q-SH2 ST-B0:WB RIOC:SHFT | 64E | 0300 | 064C | 3085 | 20C0 | 04AF 06AF |
| 12416 | \1*\ | GO-TO($XL:SH12) | | | | | | |
| 12417 | $XL:SH13 | (64D#) RB:B0 WB'Q:RB'Q-SH1 ST-B0:WB RIOC:SHFT | 64D | 0300 | C64C | 3C85 | 20C0 | 04AF 06EF |
| 12418 | \1*\ | GO-TO($XL:SH12) | | | | | | |
| 12419 | $XL:SH12 | (64C#) RB:B0 WB'Q:RB'Q-SH4 ST-B0:WB RIOC:SHFT | 64C | 0300 | 0648 | 3085 | 20C0 | 04AF 06AF |
| 12420 | \1*\ | GO-TO($XL:SH8) | | | | | | |
| 12421 | $XL:SH11 | (64B#) RB:B0 WB'Q:RB'Q-SH3 ST-B0:WB RIOC:SHFT | 64B | 0300 | C648 | 3C85 | 20C0 | 04AF 06EF |
| 12422 | \1*\ | GO-TO($XL:SH8) | | | | | | |
| 12423 | $XL:SH10 | (64A#) RB:B0 WB'Q:RB'Q-SH2 ST-B0:WB RIOC:SHFT | 64A | 0300 | 0648 | 3085 | 20C0 | 04AF 06AF |
| 12424 | \1*\ | GO-TO($XL:SH8) | | | | | | |
| 12425 | $XL:SH9 | (649#) RB:B0 WB'Q:RB'Q-SH1 ST-B0:WB RIOC:SHFT | 649 | 0300 | C648 | 3C85 | 20C0 | 04AF 06EF |
| 12426 | \1*\ | GO-TO($XL:SH8) | | | | | | |
| 12427 | $XL:SH8 | (648#) RB:B0 WB'Q:RB'Q-SH8 ST-B0:WB RIOC:SHFT | 648 | 0300 | C648 | 3085 | 20C0 | 04AF 066F |
| 12428 | \1*\ | GO-TO($XL:SH4) | | | | | | |
| 12429 | $XL:SH7 | (647#) RB:B0 WB'Q:RB'Q-SH3 ST-B0:WB RIOC:SHFT | 647 | 0300 | C644 | 3085 | 20C0 | 04AF 06EF |
| 12430 | \1*\ | GO-TO($XL:SH4) | | | | | | |
| 12431 | $XL:SH6 | (646#) RB:B0 WB'Q:RB'Q-SH2 ST-B0:WB RIOC:SHFT | 646 | 0300 | C644 | 3085 | 20C0 | 04B4 06AF |
| 12432 | \1*\ | GO-TO($XL:SH4) | | | | | | |
| 12433 | $XL:SH5 | (645#) RB:B0 WB'Q:RB'Q-SH1 ST-B0:WB RIOC:SH4 | 645 | 0300 | C644 | 3C85 | 20C0 | 04B4 06AF |
| 12434 | \1*\ | GO-TO($XL:SH4) | | | | | | |
| 12435 | $XL:SH4 | (644#) RB:B0 WB'Q:RB'Q-SH4 ST-B0:WB MIOC:SHFT | 644 | 032F | 1641 | 3085 | 20C0 | 04AF 066F |
| 12436 | \1*\ | IF:MISC1B X2($SH-KPUT,$SH-SPUT,$SH-DPUT) | | | | | | |
| 12437 | $XL:SH3 | (643#) RB:B0 WB'Q:RB'Q-SH1 ST-B0:WB MIOC:SHFT | 643 | 0300 | C642 | 3C85 | 20C0 | 04B4 06EF |
| 12438 | \1*\ | GO-TO($XL:SH2) | | | | | | |
| 12439 | $XL:SH2 | (642#) RB:B0 WB'Q:RB'Q-SH4 ST-B0:WB RIOC:SHFT | 642 | 032F | 1641 | 3085 | 20C0 | 04AF 06AF |
| 12440 | \1*\ | IF:MISC1B X2($SH-KPUT,$SH-SPUT,$SH-DPUT) | | | | | | |
| 12441 | $XL:SH1 | (641#) RB:B0 WB'Q:RB'Q-SH1 ST-B0:WB RIOC:SHFT | 641 | 032F | 1641 | 3C85 | 20C0 | 04AF 06EF |
| 12442 | \1*\ | IF:MISC1B X2($SH-KPUT,$SH-SPUT,$SH-DPUT) | | | | | | |
| 12443 | $SH-PUT | (242#) | 242 | 032F | C640 | 3000 | 0000 | 04AF 0B2F |
| 12444 | \1*\ | XA; | | | | | | |
| 12445 | $SH-SPUT | (241#) RB:B0 WB:R8 | 241 | 0331 | C214 | 3C00 | 0000 | 04AF 072F |
| 12446 | \1*\ | IF:MISC2A- X2(614#,214#) | | | | | | |
| 12447 | $SH-DPUT | (240#) R1:B0 DALU:RB ST-D6NUM:DALU | 240 | 0331 | C214 | 3C00 | C680 | 04AF 0B2F |
| 12448 | \1*\ | IF:MISC2A- X2(614#,214#) | | | | | | |
| 12449 | \ $ | (214#) 1B:02EX DALU:1B ST-D7NUM:DALU | 214 | 0322 | 1156 | 3C00 | C780 | 04AF 3B25 |
| 12450 | \1*\ | IF:R1-OVFL- X2($PF-SS,$DIVOV) | | | | | | |
| 12451 | \ $ | (614#) 1%:02EX DALU:1B ST-D7NUM:DALU | 614 | 9707 | 2CC8 | C000 | C780 | 64AF 3B25 |
| 12452 | \1*\ | XA; | | | | | | |
| 12453 | $SH-KPUT | (640#) R3:B0 DALU:R3 ST-K7NUM:DALU | 640 | 032E | C22A | 3C00 | CF80 | 04AF 0B2F |
| 12454 | \3\ | IF:MISC1A- X2(62A#,22A#) | | | | | | |
| 12455 | \ $ | (22A#) 1B:02EX DALU:1B ST-L7NUM:DALU | 22A | 0322 | C7EA | 3C00 | 5F80 | 04AF 3B25 |
| 12456 | \3\ | IF:R1-OVFL X2($XL:KOV,$PF-3E) | | | | | | |
| 12457 | \ $ | (62A#) 1B:02FX DALU:1B ST-L7NUM:DALU | 62A | 9707 | 2CC8 | C000 | 5F80 | 64AF 3B25 |
| 12458 | \3\ | XA; | | | | | | |
| 12459 | $SH-NP-D | (247#) 1B:0U00(1FH) RB:01 DALU:RB-AND-1B WB:DALU ST-A0:WB | 247 | 0369 | 0628 | 3C1F | 2108 | 046F CB2D |
| 12460 | \\ | CKMF | | | | | | |

```
                         RTL/6000 FILE EDIT
                         MICROPROGRAM SECTION
                         SEQUENCE: SSACS                                                        ADDRESS   IMAGE
                                                                                                (HEX)     (HEX)
LINE #
12461                                                                                           249       0369 C628 300F 2108 046F CB2D
12462  SSH-UP-S    (249H) L3:0000(UFA) RB:D1 DALU:RB-AND-IB WB:DALU ST-A0:WB
12463  \\                 IF:MISCU8 X2(SPF-62,228H,228H);
12464  SPF-62      (628H)                                          XA;                          628       9707 2CC8 C000 0000 64AF 0B2F
12465  \\
12466  \           (228H) L4:F-VAL RB:AC DALU:RB-OR-IB WB:DALU                                  228       0500 C24C F500 0008 6EAF 8B27
12467  \                  FASP:WG RING-IN GP-MISC6:1X           GO-TO(24CH);
12468  \           (24CH) FSEL-LINK:FB GP-MISC6:X                                               24C       0500 C24D CC00 0000 01AF 0B2F
12469  \                                                        GO-TO(24DH);
12470  \           (24DH) GP-MISC6:0X                                                           24D       0300 24C0 3CCC 0000 6CAF 0B2F
12471  $XA:KSH-NFU                                                              XA-AUX(4);
12472  \\          (470H)                                        GO-TO(STVU5);                  478       0300 C312 3000 0000 04AF 0B2F
12473  SKIP HOF:
12474  $XA:BI-LAF  (475H) LO-PA'Y:DALU IB:SH BALU:IB                                            495       8D40 1030 3000 0030 04A5 4B2F
12475  \\                 CKHF                    IF:BRANCHOP X2(SBR,SPF-03);
12476  $XA:BI-SAF  (485H) LO-PA'Y:DALU IB:SBZEX BALU:IB                                         485       8540 1C30 3000 0030 04A5 7B2F
12477  \\                 CKHF                    IF:BRANCHOP X2(SBR,SPF-03);
12478  $XA:BI-P-D  (4A5H) LO-PA'Y:DALU IB:SBSEX WB:P BALU:WB-ADD1-IB                            4A5       C540 1C30 3000 0030 0489 612F
12479  \\                 CKHF                    IF:BRANCHOP X2(SBR,SPF-03);
12480  $XA:BI      (485H) IB:F-DSP WB:P BALU:WB-ADD-IB LB-STALL Y:BALW                          485       6140 1C30 3000 0030 0499 A12F
12481  \\                 CKHF                    IF:BRANCHOP X2(SBR,SPF-03);
12482  $XA:BRE-LAF (499H) LO-PA'Y:DALU IB:SB BALU:IB                                            499       8D40 1030 3000 0780 0465 4B2F
12483  \\                 CKHF                    IF:BRANCHOP X2(SBR,SPF-03);
12484  $XA:BRE-SAF (489H) LO-PA'Y:DALU IB:SBZEX BALU:IB                                         489       8540 1C30 3000 0780 0465 7B2F
12485  \\                 CKHF                    IF:BRANCHOP X2(SBR,SPF-03);
12486  $XA:BRE-P-D (4A9H) LO-PA'Y:DALU IB:SBSEX WB:P BALU:WB-ADD1-IB                            4A9       C540 1C30 3000 0780 0449 612F
12487  \\                 CKHF                    IF:BRANCHOP X2(SBR,SPF-03);
12488  $XA:BR      (489H) IB:F-DSP WB:P BALU:WB-ADD-IB LB-STALL Y:BALW                          489       6140 1C30 3000 0780 0459 A12F
12489  \\                 CKHF RB:D7NUM           IF:BRANCHOP X2(SBR,SPF-03);
12490  $XA:BRE-LAF (478H) LO-PA'Y:DALU IB:SB BALU:IB SBZEX BALU:IB RB:D7NUM                     488       8D80 1C30 3000 0780 0465 4B1F
12491  \\                 CKHL                    IF:BRANCHZ X2(SBR,SPF-03);
12492  $XA:BRE-SAF (488H) LO-PA'Y:DALU IB:SBZEX BALU:IB RB:D7NUM                                488       8580 1C30 3000 0780 0465 7B1F
12493  \\                 CKHL DALJ:RB-SUB1       IF:BRANCHZ X2(SBR,SPF-03);
12494  $XA:BRE-P-D (4A8H) LO-PA'Y:HALW IB:SBSEX WB:P DALU:WB-ADD1-IB                            4A8       C580 1C30 3000 0780 0449 611F
12495  \\                 CKHL RB:D7NUM DALU:RB-SUB1
12496  \\                                         IF:BRANCHZ X2(SBR,SPF-03);
12497  $XA:BRE     (488H) IB:F-DSP WB:P BALU:WB-ADD-IB LB-STALL Y:BALW                          488       6180 1C30 3000 0780 0459 A11F
12498  \\                 CKHL RU:D7NUM DALU:RB-SUB1
12499  \\                                         IF:BRANCHZ X2(SBR,SPF-03);
12500  $XA:BRG-LAF (494H) LO-PA'Y:DALU IB:SB BALU:IB RB:D7NUM DALU:RB-SUB1                      494       8DCO 1C30 3000 0780 0465 4B1F
12501  \\                 CKVL                    IF:BRANCHZ X2(SBR,SPF-03);
12502  $XA:BRG-SAF (484H) LO-PW'Y:DALU IB:SBZEX BALU:IU RB:D7NUM                                484       85C0 1C30 3000 0780 0465 7B1F
12503  \\                 CKVL DALU:RB-SUB1       IF:BRANCHOP X2(SBR,SPF-03);
12504  $XA:BRG-P-D (4A4H) LO-PW'Y:DALW IB:SBSEX WB:P DALU:WB-ADD1-IB                            4A4       C5C0 1C30 3000 0780 0449 611F
12505  \\                 CKVL RB:D7NUM DALU:RB-SUB1
12506  \\                                         IF:BRANCHOP X2(SBR,SPF-03);
12507  $XA:BRG     (484H) IB:F-DSP WB:P BALW BALU:WB-ADD-IB LB-STALL Y:BALW                     484       61C0 1C30 3000 0780 0459 A11F
```

```
RTL/6000 FILE EDIT
MICROPROGRAM SECTION

ADDRESS   IMAGE
 LINE #                      SEQUENCE: $SMCS                                              (HEX)    (HEX)
 12508                       CKVL RB:D7NUM DALU:RB-SUB1
 12509    \1*\                 IF:BRANCHOP X2(SBR,SPF-03);                                 49A    3D80 C3D3 3C00 C780 0465 4800
 12510    $XA:BINC-LAF        (49AH) LB-PA*Y:UALU IB:SB DALU:IB RB:D7NUM DALU:RB-ADD1
 12511    \1*\                  CKHL ST-D7NUM:DALU                                         48A    8580 C3D3 3C00 C780 0465 7800
 12512    $XA:BINC-SAF        (48AH) LB-PW*Y:BALU IB:SBZEX BALU:IB RB:D7NUM
 12513    \1*\                  CKHL DALU:RB-ADD1 ST-D7NUM:DALU
 12514    \\                     IF:BRANCHZ X2(SPF-7D,SBRZ);                               4AA    C580 C3D3 3C00 C780 0449 6100
 12515    $XA:BINC-P-D        (4AAH) LB-PW*Y:HALW IB:SBSEX WB:P BALU:WB-ADD1-1B
 12516    \1*\                  CKHL RB:D7NUM DALU:RB-ADD1 ST-D7NUM:DALU
 12517    \\                     IF:BRANCHZ X2(SPF-7D,SBRZ);                               48A    6180 C3D3 3C00 C780 0459 A100
 12518    $XA:BINC            (48AH) LB-PW*Y:BALU WB:P BALU:WB-ADD-1B LB-STALL*Y:BALW
 12519    \1*\                  CKHL RB:D7NUM DALU:RB-ADD1 ST-D7NUM:DALU
 12520    \\                     IF:BRANCHZ X2(SPF-7D,SBRZ);                               490    8080 C3D3 3C00 C780 0465 4B1F
 12521    $XA:JDEC-LAF        (490H) LB-PA*Y:HALU IB:SB DALU:IB RB:D7NUM DALU:RB-SUB1
 12522    \1*\                  CKHL ST-D7NUM:DALU                                         480    8580 C3D3 3C00 C780 0465 7B1F
 12523    $XA:JDEC-SAF        (480H) LB-PW*Y:BALU IB:SBZEX BALU:IB RB:D7NUM
 12524    \1*\                  CKHL DALU:RB-SUB1 ST-D7NUM:DALU
 12525    \\                     IF:BRANCHZ X2(SPF-7D,SBRZ);                               4AB    C580 C3D3 3C00 C780 0449 611F
 12526    $XA:JDEC-P-D        (4ABH) LB-PW*Y:BALU IB:SBSEX WB:P BALU:WB-ADD1-1B
 12527    \1*\                  CKHL RB:D7NUM DALU:RB-SUB1 ST-D7NUM:DALU
 12528    \\                     IF:BRANCHZ X2(SPF-7D,SBRZ);                               489    6180 C3D3 3C00 C780 0459 A11F
 12529    $XA:JDEC            (489H) LB-F-DSP WB:P DALU:WB-ADD-1B LB-STALL*Y:HALW
 12530    \1*\                  CKHL RB:D7NUM DALU:RB-SUB1 ST-D7NUM:DALU
 12531    \\                     IF:BRANCHZ X2(SPF-7D,SBRZ);                               030    9707 2CC8 CDC0 0000 64AF 0B2F
 12532    $PF-03                (030H)
 12533    \\                     XA;                                                       431    A8C4 1C50 3000 2008 04AF 012F
 12534    $BR                 (431H) WB:P ST-AO:WB LB-P:Y*PREFETCH
 12535    \1*\                  CKVL                                                       3D3    A8C4 1050 3000 2008 04AF 012F
 12536    $BRZ                (3D3H) WB:P ST-AO:WB LB-P:Y*PREFETCH
 12537    \1*\                  CKVL                                                       050    A707 2CC8 C000 0000 64AF 0B2F
 12538    $PF-BR-05             (050H)
 12539    \\                     XAJ;                                                      451    0300 C7C2 3C00 0000 04AF 0B2F
 12540    $TRACE              (451H)
 12541    \\                     GO-TO($XL:BRK);                                           49C    8001 1790 A800 0000 04A5 482F
 12542    SKIP HDF;
 12543    $XA:JRSIP-LAF       (49CH) LB-PA*Y:HALU IB:SB BALU:IB FLINK:(0)
 12544    \1*\                   IF:SIPTRAP- X2(791H,390H);                                48C    8501 1790 A800 0000 04A5 782F
 12545    $XA:JRSIP-SAF       (48CH) LB-PW*Y:HALW IB:SBZEX HALU:IB FLINK:(B)
 12546    \1*\                   IF:SIPTRAP- X2(791H,390H);                                4AC    C501 1790 A800 0000 0489 612F
 12547    $XA:JRSIP-P-D       (4ACH) LB-PW*Y:BALU IB:SBSEX WB:P BALU:WB-ADD1-1B
 12548    \1*\                     FLINK:(B)
 12549    \\                     IF:SIPTRAP- X2(791H,390H);                                48C    6201 1790 A800 0000 0499 A12F
 12550    $XA:JRSIP           (48CH) LB-DW*Y:DALW IB:F-DSP WB:P BALU:WB-ADD-1B
 12551    \1*\                     FLINK:(B)
 12552    \\                     IF:SIPTRAP- X2(791H,390H);                                490    8D08 C535 3000 0000 04A5 482F
 12553    $XA:JRCIP-LAF       (490H) LB-PA*Y:UALU IB:SB DALU:IB
 12554    \1*\                   IF:CIP-SIP-BUSY X2(535H,135H);                            480    8508 0535 3000 0000 04A5 782F
          $XA:JRCIP-SAF       (480H) LB-PW*Y:UALU ID:SDZEX BALU:IB
          \1*\                   IF:CIP-SIP-BUSY X2(535H,135H);
```

RIL/6000 FILE EDIT
MICROPROGRAM SECTION

| LINE # | SEQUENCE: $$MCS | ADDRESS (HEX) | IMAGE (HEX) |
|---|---|---|---|
| 12555 | $XA:BKCIP-P-D (4ADH) LB-PU'Y:BALW IB:SUSEX WB:P BALU:WB-ADD1-IB | 4AD | C508 C535 3000 0000 0489 612F |
| 12556 | \1*\ IF:CIP-SIP-BUSY X2(535H,135H); | | |
| 12557 | $XA:BKCIP (4BDH), LJ-DW'Y:BALW IB:F-DSP WB:P BALU:WB-ADD-IB | 4BD | 6208 C535 3C00 0000 0499 A12F |
| 12558 | \1*\ IF:CIP-SIP-BUSY X2(535H,135H); | | |
| 12559 | $ (535H) WB:ZS ST-A2:WB | 535 | 0507 02AF 3C00 200A 04AF 006F |
| 12560 | IF:PF-TESTS- X2(6AFH,$UNDO-P2); | | |
| 12561 | $ (6AFH) | 6AF | 0308 C535 3C00 0000 04AF 0B2F |
| 12562 | IF:CIP-SIP-BUSY X2(535H,135H); | | |
| 12563 | $ (135H) CIP-STALL | 135 | 4309 C791 3C00 0000 04AF 0B2F |
| 12564 | IF:CIPTRAP- X2(791H,391H); | | |
| 12565 | \1*\ (791H) | 791 | 030B 1430 3C00 0000 04AF 0B2F |
| 12566 | IF:SIP-SIP-BRANCH X2($BR,$PF-03); | | |
| 12567 | $ (390H) | 390 | 0302 C3A9 3C00 0000 04AF 0B2F |
| 12568 | IF:CIP-PRESENT X2($XL:UNDO-P,$TVO5-3A9); | | |
| 12569 | $ (391H) | 391 | 030A C3A9 3C00 0000 04AF 0B2F |
| 12570 | IF:CIP-PRESENT X2($XL:UNDO-P,$TVO5-3A9); | | |
| 12571 | $XA:BKRFU-LAF (49EH) | 49E | 0300 C312 3000 0000 04AF 0B2F |
| 12572 | \1*\ GO-TO($TVO5); | | |
| 12573 | $XA:BKRFU-SAF (48EH) | 48E | 0300 C312 3C00 0000 04AF 0B2F |
| 12574 | \1*\ GO-TO($TVO5); | | |
| 12575 | $XA:BKRFU-P-D (4AEH) | 4AE | 0300 C312 3C00 0000 04AF 0B2F |
| 12576 | \1*\ GO-TO($TVO5); | | |
| 12577 | $XA:BKRFU (4BEH) | 4BE | 0300 C312 3000 0000 04AF 0B2F |
| 12578 | \1*\ GO-TO($TVO5); | | |
| 12579 | $XA:OPV (4BFH) IB:F-VAL DALU:IB WB:DALU ST-BO:WB BRAMBI | 4BF | 0340 4500 3C00 2000 0488 8B25 |
| 12580 | \1*\ CKHF XE(S); | | |
| 12581 | $XA:OPV-OS (48FH) IB:F-VAL DALU:IB WB:DALU ST-BO:WB BRAMBI | 48F | 0340 4500 3C00 2000 0488 8B25 |
| 12582 | \1*\ CKHF XE(S); | | |
| 12583 | $XA:OPV-OL (49FH) IB:F-VAL DALU:IB WB:DALU ST-BO:WB BRAMBI | 49F | 0340 4500 3C00 2000 0488 8B25 |
| 12584 | \1*\ CKHF XE(S); | | |
| 12585 | $XA:OPV-1 (4AFH) IB:F-VAL DALU:IB WB:DALU ST-BO:WB BRAMBI | 4AF | 0340 4500 3C00 2000 0488 8B25 |
| 12586 | \1*\ CKHF XE(S); | | |
| 12587 | SKIP HUF; | | |
| 12588 | $XA:IMA-SAF (406H) LB-PU'Y:BALU IB:SBZEX BALU:IB | 406 | 8500 6500 3C00 0000 04A5 7B2F |
| 12589 | \1*\ XK(S); | | |
| 12590 | $XA:R-IMA-SAF (606H) LU-DU'Y:BALU IB:SBZEX BALU:IB | 606 | 2200 6500 3C00 0000 04A5 7B2F |
| 12591 | \1*\ XK(S); | | |
| 12592 | $XA:IMA-LAF (416H) LB-PU'Y:BALU IB:SB BALU:IB | 416 | 8D00 6500 3C00 0000 04A5 4B2F |
| 12593 | \1*\ XK(S); | | |
| 12594 | $XA:R-IMA-LAF (616H) LU-DA'Y:BALU IU:SB BALU:IB | 616 | 2300 6500 3C00 0000 04A5 4B2F |
| 12595 | \3*\ XK(S); | | |
| 12596 | $XA:IMAX-SAF (496H) LB-PW'Y:BALU IB:SBZEX R8:D3NDX WB:RB-SCALED | 496 | 8500 6C01 0380 0559 75AF |
| 12597 | \1*\ BALU:WB-ADD-IB GP-XBLOAD XK(S); | | |
| 12598 | $XA:R-IMAX-SAF (696H) LU-DW'Y:BALU IB:SBZEX R8:D3NDX WB:RB-SCALED | 696 | 2200 6C01 0380 0559 75AF |
| 12599 | \3*\ BALU:WB-ADD-IB GP-XBLOAD XK(S); | | |
| 12600 | $XA:IMAX-LAF (436H) LB-PA'Y:BALU IB:SB R6:D3NDX WB:RU-SCALED | 436 | CD00 6C01 0380 0559 45AF |
| 12601 | \1*\ BALU:WB-ADD-IB GP-XBLOAD XK(S); | | |

RTL/6000 FILE EDIT
MICROPROGRAM SECTION

SEQUENCE: SSMCS

| LINE # | | | | | ADDRESS (HEX) | IMAGE (HEX) | | | | | |
|---|---|---|---|---|---|---|---|---|---|---|---|
| 12602 | SXA:R-IMAX-LAF | (636H) | LB-DA*Y:BALW IB:SB RE:D3NDX WB:RB-SCALED | XR(5); | 636 | 6300 | 6SC0 | 3C01 | 0380 | 0559 | 45AF |
| 12603 | \3*\ | | BALU:WB-ADD-1B GP-XBLOAD | | | | | | | | |
| 12604 | SXA:P-D | (4C6H) | LB-PW*Y:BALW IB:SBSEX WB:P BALU:WB-ADD-1B | XR(5); | 4C6 | C500 | 6SC0 | 3C00 | 0000 | 0489 | 612F |
| 12605 | \1*\ | | | | | | | | | | |
| 12606 | SXA:R-P-D | (6C6H) | LB-DW*Y:BALW IB:SBSEX WB:Y BALU:WB-ADD-1B | XR(5); | 6C6 | 6200 | 6SC0 | 3C00 | 0000 | 0499 | 692F |
| 12607 | \3*\ | | | | | | | | | | |
| 12608 | SXA:B | (426H) | IB:B7SEL BALU:1B LB-STALL*Y:BALU | XR(5); | 426 | 2100 | 3CC0 | 3C00 | 0017 | 04A5 | 0B2F |
| 12609 | \1*\ | | | | | | | | | | |
| 12610 | SXA:B-X | (4A6H) | IB:B7SEL RB:D3NDX WB:RB-SCALED BALU:WB-ADD-1B | XR(5); | 4A6 | 6100 | 6SC0 | 3C01 | 0397 | 0559 | 05AF |
| 12611 | \1*\ | | LB-STALL*Y:BALU GP-XBLOAD | | | | | | | | |
| 12612 | SXA:B-D | (4E6H) | LB-PW*Y:BALW IB:SBSEX RB:B7SEL WB:RB | XR(5); | 4E6 | C500 | 6SC0 | 3C00 | 0017 | 0499 | 632F |
| 12613 | \1*\ | | BALU:WB-ADD-1B | | | | | | | | |
| 12614 | SXA:R-B-D | (6E6H) | LB-DW*Y:BALW IB:SBSEX RB:B7SEL WB:RB | XR(5); | 6E6 | 6200 | 6SC0 | 3C00 | 0017 | 0499 | 632F |
| 12615 | \3*\ | | BALU:WB-ADD-1B | | | | | | | | |
| 12616 | SXA:'IMA-SAF | (407H) | LB-PW*Y:BALW IB:SB BALU:1B | | 407 | 850C | 3CC0 | 3000 | 0000 | 0489 | 7B2F |
| 12617 | \2*\ | | | GO-TO(1DFH); | | | | | | | |
| 12618 | SXA:R-'IMA-SAF | (607H) | LB-DW*Y:BALW IB:SBZEX BALU:1B | | 607 | 2200 | C1DF | 3000 | 00C0 | 04A5 | 7B2F |
| 12619 | \\ | | | GO-TO(1DFH); | | | | | | | |
| 12620 | SXA:'IMA-LAF | (417H) | LB-PA*Y:BALW IB:SBSEX WB:Y BALU:1B | | 417 | 8D0C | C1DF | 3C00 | 0000 | 04A5 | 4B2F |
| 12621 | \2*\ | | | GO-TO(1DFH); | | | | | | | |
| 12622 | SXA:R-'IMA-LAF | (617H) | LB-DA*Y:BALW IB:SBSEX RB:B7SEL BALU:1B | | 617 | 2300 | C1DF | 3C00 | 0017 | 04A5 | 4B2F |
| 12623 | \\ | | | GO-TO(1DFH); | | | | | | | |
| 12624 | SKIP HOF; | (4C7H) | LB-PW*Y:BALW IB:SB BALU:0C000 WB:P BALU:WB-ADD-1B | | 4C7 | C500 | C1DF | 3000 | 0008 | 04AF | 0B2C |
| 12625 | SXA:'B-D | | | | | | | | | | |
| 12626 | SXA:R-'B-D | (6C7H) | LB-DW*Y:BALW IB:SBSEX WB:Y BALU:WB-ADD-1B | | 6C7 | 6200 | C1DF | 3C00 | 0000 | 0499 | 692F |
| 12627 | \2*\ | | | GO-TO(1DFH); | | | | | | | |
| 12628 | SXA:B | (427H) | IB:B7SEL BALU:1B LB-DA*Y:BALU | | 427 | 2300 | C1DF | 3000 | 0017 | 0499 | 632F |
| 12629 | \2*\ | | | GO-TO(1DFH); | | | | | | | |
| 12630 | SXA:'B-D | (4E7H) | LB-PW*Y:BALW IB:SBSEX WB:P BALU:WB-ADD-1B | | 4E7 | C500 | C1DF | 3C00 | 0017 | 0499 | 632F |
| 12631 | \2*\ | | | GO-TO(1DFH); | | | | | | | |
| 12632 | SXA:R-'B-D | (6E7H) | LB-DW*Y:BALW IB:SBSEX RB:B7SEL WB:RB | | 6E7 | 6200 | C1DF | 3C00 | 0017 | 0499 | 632F |
| 12633 | \\ | | BALU:WB-ADD-1B | GO-TO(1DFH); | | | | | | | |
| 12634 | | (1DFH) | LB-DA*RD-MEM-D DALU:0CC000 WB:DALU ST-A0:WB | | 1DF | 1800 | CC3E | 3000 | 2008 | 04AF | 0B2C |
| 12635 | | | | GO-TO($INDIRECT-AB) | | | | | | | |
| 12636 | SXA:'IMAX-SAF | (497H) | LB-PW*Y:BALW IB:SB BALU:1B | | 497 | 8500 | 3CC1 | 3000 | 0000 | 04A5 | 7B2F |
| 12637 | \2*\ | | | IF:FALSE XB*ELS(0C1H) | | | | | | | |
| 12638 | SXA:R-'IMAX-SF | (697H) | LB-DW*Y:BALW IB:SBZEX BALU:1B | | 697 | 220C | 3CC1 | 3CC0 | 0000 | 04A5 | 7B2F |
| 12639 | \\ | | | IF:FALSE XB*ELS(0C1H) | | | | | | | |
| 12640 | SXA:'IMAX-LAF | (437H) | LB-PA*Y:BALW IB:SBSEX WB:P BALU:1B | | 437 | 8000 | 3CC1 | 3C00 | 0000 | 04A5 | 4B2F |
| 12641 | \2*\ | | | IF:FALSE XB*ELS(0C1H) | | | | | | | |
| 12642 | SXA:R-'IMAX-LF | (637H) | LB-DA*Y:BALW IB:SBSEX RB:B7SEL BALU:1B | | 637 | 2300 | 3CC1 | 3C00 | 0017 | 04A5 | 4B2F |
| 12643 | \\ | | | IF:FALSE XB*ELS(0C1H) | | | | | | | |
| 12644 | SXA:'E-X | (4A7H) | IB:B7SEL BALU:1B LJ-STALL*Y:BALU | | 4A7 | 2100 | 3CC0 | 0017 | 04A5 | 0B2F | |
| 12645 | \2*\ | | | IF:FALSE XB*ELS(0C1H) | | | | | | | |
| 12646 | | (0C1H) | LB-DA*RD-MEM-D RU:D3NDX WB:RB-SCALED ST-A0:WB | | 0C1 | 1800 | CC3E | 3C01 | 2388 | 056F | 05AF |
| 12647 | \2*\ | | GP-XBLOAD | | | | | | | | |
| 12648 | | | | GO-TO($INDIRECT-AB); | | | | | | | |

RTL/6000 FILE EDIT
MICROPROGRAM SECTION

SEQUENCE: SAMCS

| LINE # | | | | ADDRESS (HEX) | IMAGE (HEX) | | | | | |
|---|---|---|---|---|---|---|---|---|---|---|
| 12649 | $XA:B-PUSH | (4B6N) RB:B7SEL IB:KWOS DALU:RB-SUB-IB WB:DALU | | 4B6 | 21AB | 6564 | 3000 | 2017 | 04AF | CB06 |
| 12650 | \1*\ | CKHL ST-B7SEL:WB BALU:WD LD-STALL'Y:BALU | | | | | | | | |
| 12651 | | IF:LOADMODE- XR'ELS(164N): | | | | | | | | |
| 12652 | $XA:B-POP | (4F6N) RB:B7SEL IB:KWOS DALU:RB-ADD-IB WB:DALU | | 4F6 | 21AB | 6564 | 3000 | 2017 | 2686 | CB19 |
| 12653 | \1*\ | CKHL ST-B7SEL:WB BALU:WB SUB-IB LB-STALL'Y:BALU | | | | | | | | |
| 12654 | | GP-RLTA:0 IF:LOADMODE- XR'ELS(164N): | | | | | | | | |
| 12655 | \1\ | (164N) GP-MISCS:10 XR(S); | | 164 | 0300 | C5C0 | 3CC0 | 0000 | 5AAF | 0B2F |
| 12656 | | | | | | | | | | |
| 12657 | $XA:B-POP-K'D | (4F9N) RB:B7SEL IB:KWOS DALU:RB-ADD-IB WB:DALU | | 4F9 | 2180 | 6500 | 3000 | 2017 | 0486 | CB19 |
| 12658 | \2*\ | CKHL ST-B7SEL:WB BALU:WB-SUB-IB LB-STALL'Y:BALU | | | | | | | | |
| 12659 | | XR(S); | | | | | | | | |
| 12660 | $XA:B-POP-S | (4F5N) RB:B7SEL IB:KWOS DALU:RB-ADD-IB WB:DALU | | 4F5 | 2180 | 65C0 | 3000 | 2017 | 0486 | CB19 |
| 12661 | \1*\ | CKHL ST-37SEL:WB BALU:WB SUB-IB LB-STALL'Y:BALU | | | | | | | | |
| 12662 | | XK(S); | | | | | | | | |
| 12663 | $XA:B-POP-H | (4F4N) RB:B7SEL IB:KWOS DALU:RB-ADD-IB WB:DALU | | 4F4 | 2180 | 6500 | 3000 | 2017 | 0486 | CB19 |
| 12664 | \1*\ | CKHL ST-B7SEL:WB BALU:WB-SUB-IB LB-STALL'Y:BALU | | | | | | | | |
| 12665 | | XR(S); | | | | | | | | |
| 12666 | $XA:B-X-PUSH | (4B7N) R3:B3SEL RB:D3NDX DALU:RB-SUB-SUB1 ST-D3NDX:DALU | | 4B7 | 6180 | 6500 | 3C01 | C393 | 0559 | 0D9F |
| 12667 | \1*\ | CKHL WB:DALU-SCALED JALU:WB-ADD-IB LD-STALL'Y:BALW | | | | | | | | |
| 12668 | | GP-XDLOAD | | | | | | | | |
| 12669 | $XA:B-X-POP | (4F7N) IB:B3SEL RB:D3NDX DALU:RB-ADD1 ST-D3NDX:DALU | | 4F7 | 6140 | 65C0 | 3C01 | C393 | 0559 | 0580 |
| 12670 | \1*\ | CKHF WB:RB-SCALED JALU:WB-ADD-IB LH-STALL'Y:BALW | | | | | | | | |
| 12671 | | GP-XDLOAD | | | | | | | | |
| 12672 | SKIP HDF: | | | | | | | | | |
| 12673 | $XA:IMO-B | (474N) RB:B7NUM WB:RB LD-DA(WA:WJ) | | 474 | 132C | 0466 | 3300 | 0027 | 04AF | 032F |
| 12674 | \1*\ | IF:LAFMODE X2(466N,066N); | | | | | | | | |
| 12675 | | (06CN) RB:B7NUM WB:RB LD-DW(WL:WB) GO-TO(2U0N); | | 06C | 020C | C200 | 3200 | 0027 | 04AF | 032F |
| 12676 | \1\ | | | | | | | | | |
| 12677 | \1\ | (2CCN) LB-PW'Y:BALU IB:SB2EX DALU:NOT-IB ST-EO:DALU XE(6); | | 200 | 8500 | 4EC0 | 3C00 | F000 | 01A5 | 712A |
| 12678 | \1\ | BALU:IB WB:P ST-30:WB GP-MISCO:X1 | | | | | | | | |
| 12679 | \1\ | (466N) IF:CMB'CMN X2(5XA:IMO-S,075N); | | 466 | 030E | 4C00 | 3C00 | 0000 | 04AF | 0B2F |
| 12680 | \1\ | | | | | | | | | |
| 12681 | \1\ | (075N) LB-PA'Y:BALU ID:SB DALU:NOT-IB ST-EO:DALU BALU:IB | | 075 | 8000 | 3CD0 | 3CC0 | F000 | 01A5 | 412A |
| 12682 | \1\ | WB:P ST-DO:WB GP-MISCO:X1 XE(6); | | | | | | | | |
| 12683 | | | | | | | | | | |
| 12684 | $XA:R-IMC-B | (674N) XR(S); | | 674 | 0300 | 6500 | 3CC0 | 0000 | 04AF | 0B2F |
| 12685 | \1\ | | | | | | | | | |
| 12686 | $XA:IMO-S | (475N) LB-PJ GO-TO(605N); | | 475 | 9500 | C6C5 | 3000 | 0000 | 04AF | 0B2F |
| 12687 | \1\ | | | | | | | | | |
| 12688 | \1\ | (605N) LB-PW'Y:BALU WB:P BALU:WB IF:ODSIZZ- XR'ELS(11AN); | | 605 | 8515 | 611A | 3000 | 0000 | 04AF | 012F |
| 12689 | \1\ | | | | | | | | | |
| 12690 | \1\ | (11AN) LB-PJ GU-TO(11UN); | | 11A | 9500 | C11B | 3000 | 0000 | 04AF | 0B2F |
| 12691 | \1\ | | | | | | | | | |
| 12692 | \1\ | (11BN) LB-PJ | | 11B | 9514 | 657A | 3CC0 | 0000 | 04AF | 0B2F |
| 12693 | $XA:R-IMO-S | (675N) XR(S); | | 675 | 0300 | 6500 | 3CC0 | 0000 | 04AF | 0B2F |
| 12694 | \3*\ | | | | | | | | | |
| 12695 | $XA:IMO-K'D | (479N) LB-PW IB:SBSEX DALU:IB ST-DO:DALU WH:DALU ST-A0:WJ | | 479 | 9555 | C6C5 | 3000 | E008 | 04AF | 6B25 |

```
RTL/6000 FILE EDIT
MICROPROGRAM SECTION

ADDRESS    IMAGE
LINE #                       SEQUENCE: $$ACS                                  (HEX)      (HEX)
12696  \2+\                  CKHF                    IF:ODSIZ2 X2(605#,205#); 205   2116 C67A 3000 0000 04AF 012F
12697  $                     (205#) WD:P BALU:WB LB-STALL'Y:BALU
12698  \2+\                                          IF:ODSIZ2 X2(67A#,27A#); 67A   9554 457A 3CU0 2000 04B8 7B25
12699  $                     (67A#) LB-PW WB:P IB:SHZEX DALU:IB WB:RBUS ST-B0:WB BRAMBI
12700  \2+\                  CKHF                                             27A   0380 1533 3CU0 2000 046F 032F
12701  $                     (27A#) RB:DO WO:RB ST-B0:WB      IF:0DSIZ4 XE°ELS($IV16-17A):
12702  \3\                                           IF:RBUS16- X2($KWD-POS,$KWD-NEG)
12703  SXA:R-1H0-K'D                                                          67D   0314 657A 3000 0000 04AF 0B2F
12704  \\                    (67D#)                  IF:ODSIZ4 XR°ELS($IV16-17A);
12705  SXA:IM0                                                                476   9555 410B 3CU0 2000 01B8 6B25
12706  \1+\                  (476#) LB-PW IO:SUSEX DALU:1B WB:DALU ST-B0:WB
12707  $                     CKHF GP-MISCO:X1 BRAMBI                IF:ODSIZ2- XE°ELS(10B#);
12708  \2+\                                                                   10B   22D5 CC48 3CU0 0000 02AF 012F
12709  SXA:R-1M0             (10B#) WB:P BALU:WB LB-DW°Y:BALU GP-MISC0:X0 1B:B0
12710  \\                    (076#) LB-DW IO:SBSEX DALU:1B WB:DALU ST-30:WB BRAMBI  676  0255 41C5 3CU0 2000 04B8 6B25
12711  SIM0-H                CKHF                              IF:ODSIZ2- XE°ELS(105#);
12712  \\                    (105#) IB:BU                                     105   03B5 CC48 3000 0000 04AF 0B2F
12713  SIM0-H                                        IF:1BUS16 X2($IM0-H,$IM0-H)
12714  \1+\                  (048#) IB:OUFF(00#) RB:00 DALU:RB-AND-1B WB:DALU-SW   048  9340 4500 3C00 2000 04AF FA2D
12715  SIM0-H                CKHF ST-B0:WB
12716  \1+\                  (448#) IB:0000(FF#) RB:00 DALU:RB-OR-1B WB:DALU-SW    448  0340 4500 30FF 2000 04AF CA27
12717  SKIP HOF;             CKHF ST-B0:WB                                    XE(5):
12718  SXA:R1-3                                                               446   0315 410D 3000 2740 0478 032F
12719  \1+\                  (446#) RD:D7SEL WB:RB ST-B0:WB BRAMBI
12720  \1+\                  (4DC#) RD:D7SEL WB:RB ST-B0:WB BRAMBI            4DC   0315 41CD 3CU0 2740 0478 032F
12721  \1+\                                                        IF:ODSIZ2- XE°ELS(10D#);
12722  SXA:R1-3-K'D                                                           10D   0387 CC48 3CU0 2000 04AF 022F
12723  \1+\                  (10D#) RD:D0 WO:RB ST-A0:WB    IF:1BUS24 X2($IM0-H,$IM0-H)
12724  \1+\                  (445#) RB:D7SEL WB:RE°Q:RB LB-STALL'4A:WB        445   0316 C72B 3CU0 0017 04AF 032F
12725  SXA:R4-7-K'D          CKHF                           IF:ODSIZ2 XL°ELS(3DD#);
12726  \2+\                  (4D5#) RD:D7SEL WB:RB ST-B0:WB                   4D9   0316 C72B 3CU0 2740 046F 032F
12727  \1+\                                                      IF:ODSIZ2 X2(72B#,32B#);
12728  \1+\                  (32B#) DALU:000000 WB:DALU ST-A0:WB NB:D7SEL GP-MISC7:11   32B  0380 4535 3C00 2748 7B78 0B2C
12729  \3\                   CKHL BRAMBI                    IF:RBUS16- XE°ELS($KWD-NEG);
12730  \1+\                  (72B#) RD:D0SEL WO:RB ST-A0:WB FLINK:(0) BRAMBI  72B   0517 418B ACU0 2648 0478 032F
12731  SXA:R1-3                                                  IF:QUADDR- XE°ELS(188#);
12732  \1+\                  (188#) RB:D7SEL WB:RE°Q:RB LB-STALL°4A:WB        188   1115 57DD 3CU0 0017 04AF 072F
12733  \2+\                  (3DD#) LB-WR-LOCAL(CPU) IB:QZEX DALU:1B WB:DALU ST-B0:WB  3DD  2880 CCD5 1C00 2000 7BAF 3B25
12734  \3\                   GP-MISC7:11                             GO-TO(0D5#):WB
12735  $                     (0D5#) LB-DW IB:SHZEX DALU:1B WB:DALU ST-A0:WB   0D5   0240 4500 3C00 2008 04AF 7B25
12736  \3\                   CKHF                                             XE(5):
12737  \3\                   (444#) IB:87SEL DALU:NOT-1B ST-EU:DALU BALU:1B   444   2300 4600 3C00 D017 04AS 0B2A
12738  SXA:B1-3              LB-DA°Y:BALU                                     XE(6):
12739  \1+\                  (4D4#) IB:87SEL DALU:NOT-1B ST-EU:DALU DALU:1B   4D4   2300 4CC0 3CU0 D017 04AS 0R2A
12740  \1+\                  LB-DA°Y:BALU                                     XE(6):
12741  \1+\                  (445#) GP-MISC6:X0°($IP-60) WB:ZS ST-B0:WB       445   0301 C4CA 3800 2000 60AF 006F
12742  SXA:SA1-3
```

RTL/6000 FILE EDIT
MICROPROGRAM SECTION

```
LINE #                SEQUENCE: $$MCS                                                              ADDRESS   IMAGE
                                                                                                   (HEX)     (HEX)
12743                                         IF:SIPTRAP- X2($SS13,00AH);                          405       1301 14CA 3300 0740 046F 032F
12744  $XA:R4-7-S  \1\                        IF:SIPTRAP- X2(40BH,00AH):RB
12745              \1\  (4D5H) LB-DA'WA:WB RE:D7SEL WB:RB
12746  $           (00AH) GP-MISC6:X0'(END-SIP-GO)                                                 00A       0302 021C 3000 0000 60AF 0B2F
12747                                         IF:SIP-PRESENT X2($UNDU,$TV03);
12748              \1\  (40BH) R5:06 WB:RB LB-STALL'WA:WB                                          40B       0103 C2E1 3C00 0600 046F 032F
12749  $                                      IF:SCISTR- X2($SST2,2E1H);
12750              \1\  (2E1H) WB:ZS ST-BO:WB                                                      2E1       0300 C2A4 3C00 2000 04AF 006F
12751  $                                                                       GO-TO(2A4H);
12752              \2\  (2A4H) LB-RD-LOCAL(SIP) IB:C000(01H) DALU:IB GP-MISC3:X1                   2A4       28FC CCCE 3C01 0017 31AF CB25
12753  $                                      IF:DALU(SEL) X2(40EH,00EH);
12754              \2\  (40EH) LB-DW IB:SB DALU:IB ST-D6:DALU                                      40E       0200 CCCE 3C00 C600 04AF 4B25
12755  $                                                                       GO-TO($$S13);
12756              \2\  (00EH) LB-DA IB:SB DALU:IB ST-D7SEL:DALU                                   00E       1300 C4CA 3C00 C740 04AF 4B25
12757  $
12758  SKIP_HOF:
12759  $XA:FT-PP                              IF:IBUS24 X2(796H,397H);
12760              \2\  (486H) IB:KHOS DALU:NOT-IB WB:DALU ST-A0:WB                                486       034D 0797 3C00 2008 04AF CB2A
12761  $XA:R-FT-PP  \2\                       IF:OP-READ X2(797H,397H);
12762              \2\  (686H) IB:KHOS DALU:NOT-IB RB:DALU ST-A0:WB                                686       034D C797 3C00 2008 04AF CB2A
12763  $                                      IF:OP-READ X2(797H,397H);
12764              \2\  (797H) R3:A0 DALU:RB-ADD1 WB:DALU ST-A0:WB                                 797       038C C442 3C00 2008 04AF 0B00
12765  SFT-PP-SVRS                            IF:OP-WRITE X2($FT-PP-SVRS,$STACK-MOD);
12766              \3\  (442H) IB:FFFF(E8H) DALU:IB WB:DALU ST-A0:WB                               442       036C C787 30E8 2008 04AF EB25
12767  $                                      IF:OP-WRITE X2($FT-PP-SVRS,$STACK-MOD);
12768              \3\  (387H) IB:FFFF(EFH) DALU:IB WB:DALU ST-A0:WB                               387       0340 C787 30EF 2008 04AF EB25
12769  $                                                                       GO-TO(787H);
12770              \2\  (787H) IB:F-VAL                                                            787       0387 1397 3C00 0000 04AF 8B2F
12771  $                                      IF:IBUS24 X2(796H,397H);
12772              \2\  (397H) RB:AU DALU:NOT-RD WB:DALU ST-A0:WB                                  397       054C 1C42 3000 2008 04AF 0B20
12773  SFT-D-P    \2\                         IF:OP-WRITE X2($TV16-443,$STACK-MOD);
12774              \2\  (796H) R3:AU DALU:RB-ADD1 WB:DALU ST-A0:WB                                 796       0380 CC42 3000 2008 04AF 0B00
12775  $                                                                       GO-TO($STACK-MOD);
12776              \2\  (487H) LB-PW IB:SBSEX DALU:IB ST-E2:DALU                                   487       95B5 C1CC 3C00 D200 04AF 6B25
12777  $XA:R-FT-D  \2\                        IF:IUUS16 X2($FT-D-M,SFT-D-P);
12778              \2\  (637H) LB-DW IB:SUSEX DALU:IB ST-E2:DALU                                   687       02B5 01CC 3C00 D200 04AF 6B25
12779  SFT-D-M    \2\                         IF:IDUS16 X2($FT-D-M,SFT-D-P);
12780              \2\  (1CCH) IB:STKT RB:E2 DALU:RB-ADD-IB ST-E2:DALU WB:RB                       1CC       23E3 05DC 3C00 D20C 0459 0319
12781  $                             CKVL BALU:WB-ADD-IB LH-DA'Y:BALU
12782  $
12783              \2\  (5DCH) IB:STKB RB:E2 DALU:RB-SUB-IB                                        5DC       03E3 65DC 3C00 120C 046F 0B06
12784  SFT-D-M    \2\                         IF:DCARRY8- XR'ELS($TV16-1DC);
12785              \2\  (5CCH) IB:STKB RB:E2 DALU:RB-ADD-IB ST-E2:DALU WB:RB                       5CC       23E3 11DC 3C00 D20D 0459 0319
12786  $                             CKVL BALU:WB-ADD-IB LB-DA'Y:BALU
12787  $                                      IF:DCARRY8 X2($DDH,$TV16-1DC);
12788              \2\  (5DDH) IB:STKT RH:E2 DALU:RB-SUB-IB                                        5DD       03E3 61DC 3000 120C 046F 0B06
12789  SKIP_HOF                               IF:DCARRY8 XR'ELS($TV16-1DC);
```

RTL/6000 FILE EDIT
MICROPROGRAM SECTION

| LINE # | | SEQUENCE: $$MCS | ADDRESS (HEX) | IMAGE (HEX) | | | | |
|---|---|---|---|---|---|---|---|---|
| 12790 | SXA:IV-D | (477N) LD-PW Y:DALU IB:SBZEX DALU:IB ST-IV:DALU RB:IV | 477 | 8500 | C074 | 3000 | F500 | 0E6F | 6325 |
| 12791 | \\ | WB:RB ST-BO:WB BALU:WB GP-MISCO:1X GO-TO(074N); | | 2200 | CC74 | 3C00 | F500 | 0E6F | 6325 |
| 12792 | SXA:R-IV-D | (077N) LD-DW Y:DALU IB:SBSEX DALU:WB GP-MISCO:1X GO-TO(074N); | 677 | 1000 | CC76 | 3C00 | F500 | 046F | 0325 |
| 12793 | \\ | WB:RB ST-BO:WJ BALU:WB GP-MISCO:1X GO-TO(074N); | 074 | 002C | C61F | 3000 | 0000 | 04AF | 082F |
| 12794 | $ | (074N) LD-DA*RD-REM-D IB:BD DALU:IB ST-IV:DALU RB:IV | | | | | | | |
| 12795 | \\ | WB:RB ST-BO:WB | | | | | | | |
| 12796 | $ | (076N) LB-STALL | 076 | | | | | | |
| 12797 | \\ | | | | | | | | |
| 12798 | $ | IF:LAFMODE X2(61FN,21FN); | 21F | 2200 | 6500 | 3C00 | 0000 | 0C99 | 732F |
| 12799 | \\ | (21FN) LD-DW Y:DALU IB:SBZEX RB:DD WB:RB BALU:WB-ADD-1B | | | | | | | |
| 12800 | $ | GP-MISCO:0X XR(5); | | | | | | | |
| 12801 | \\ | (61FN) LD-DA Y:DUALW IB:SB RB:BO WB:RB BALU:WB-ADD-1B | 61F | 6300 | 6500 | 3C00 | 0000 | 0C99 | 432F |
| 12802 | SXA:AS2S | (447N) GP-MISCO:0X XR(5); | 447 | 039F | C432 | 3000 | 0000 | 6EAF | 082F |
| 12803 | \\ | CKHL | | | | | | | |
| 12804 | $ | (032N) LD-PW IB:SBZEX DALU:IB ST-E2:DALU | 032 | 9587 | CC33 | F500 | D200 | 01AF | 7F25 |
| 12805 | \\ | CKHL FASP:WB*RING-IN GP-MISCO:X1 | | | | | | | |
| 12806 | $ | IF:IBUS24 X2(432N,032N); | | | | | | | |
| 12807 | \\ | (432N) LD-DW YINC1 IB:SBZEX DALU:IB ST-E2:DALU | 432 | 12B7 | CC33 | F400 | D200 | 02AF | 7F25 |
| 12808 | $ | CKHL WB:DALU*Q:DALU FASP:WB*RING-OUT GP-MISCO:X0 | | | | | | | |
| 12809 | \\ | IF:IBUS24 X2(438N,038N); | | | | | | | |
| 12810 | SAS2 | (033N) FM-SEL:FB GP-MISC7:10 | 033 | 0310 | C438 | D900 | 0000 | 7AAF | 082F |
| 12811 | \2\ | IF:MISC6B X2(438N,038N); | | | | | | | |
| 12812 | SAS3 | (433N) FM-SEL:FD GP-MISC7:01 | 433 | 0310 | C438 | D900 | 0000 | 79AF | 082F |
| 12813 | \2\ | IF:MISC6B X2(438N,038N); | | | | | | | |
| 12814 | $ | (438N) DALU:030000 WB:DALU ST-A0:WB | 438 | 0329 | 317A | 3000 | 2008 | 04AF | 082C |
| 12815 | \2\ | IF:MISC0B XB*ELS(STV16-17A); | | | | | | | |
| 12816 | $ | (038N) DALU:000000 WB:DALU GP-MISCO:X0 | 038 | 0314 | 3514 | 3C00 | 2008 | 02AF | 082C |
| 12817 | \3\ | IF:ODSIZ4 XB*ELS(114N); | | | | | | | |
| 12818 | $ | (114N) | 114 | 0315 | C458 | 3C00 | 0000 | 04AF | 082F |
| 12819 | \\ | | | | | | | | |
| 12820 | $ | (058N) DALU:030000 WB:DALU*Q:QSL4 ST-A0:WB | 058 | 0300 | 3500 | 3C00 | 2008 | 04AF | 0FEC |
| 12821 | \\ | IF:ODSIZ2 X2(458N,058N); | | | | | | | |
| 12822 | $ | (458N) DALU:000000 WB:DALU*Q:QSL1 ST-A0:WB | 458 | 0300 | 3500 | 3000 | 2008 | 04AF | 0F6C |
| 12823 | \\ | XB(5); | | | | | | | |
| 12824 | SKIP HOF; | (407N) LD-PW IB:SBZEX DALU:IB ST-DD:DALU WB:DALU*Q:DALU | 407 | 9546 | 06ED | 0500 | E000 | 6BAF | 7F25 |
| 12825 | SXA:EI1T | CKHF ST-30:WB FPRM:WB*RING-IN GP-MISC6:11 | | | | | | | |
| 12826 | \\ | IF:FREG4 X2(6EDN,2EDN); | | | | | | | |
| 12827 | $ | (6EDN) FM-SEL:FD IB:QZEX | 6ED | 0307 | C169 | D900 | 0000 | STV05-169 | 382F |
| 12828 | \\ | CKHL | | | | | | | |
| 12829 | $ | (569N) IB:3000(0FN) RB:DD DALU:RB-AND-1B ST-D0:DALU | 569 | 0500 | C2E4 | 3C6F | C000 | 046F | CB2D |
| 12830 | \\ | GO-TO($REMOTE-XA); | | | | | | | |
| 12831 | $ | (2EDN) RB:DD GP-MISC6:U1 | 2ED | 0380 | C3C9 | 3C00 | 0000 | 696F | 082F |
| 12832 | \3\ | CKHL | | | | | | | |
| 12833 | $ | (3C9N) DALU:000000 WB:DALU ST-A0:WB | 3C9 | 030C | 4569 | 3000 | 2008 | 04AF | 082C |
| 12834 | \3\ | IF:RBUS16 X2(7C9N,3C9N); | | | | | | | |
| 12835 | $ | IF:OP-WRITE XE*ELS(STV05-169) | | | | | | | |
| 12836 | $ | (7C9N) DALU:FFFFFF WB:DALU ST-A0:WB GP-MISC7:10 | 7C9 | 030C | 4569 | 3000 | 2008 | 7AAF | 0B23 |

```
RTL/6000 FILE EDIT
MICROPROGRAM SECTION

LINE #                                    SEQUENCE: SIMCS                                            ADDRESS    IMAGE
                                                                                                    (HEX)      (HEX)
12437                    IF:OP-WRITE XE'ELS(STV05-169);
12838  $XA:EII25         (467H) LB-PW IB:SBSEX DALU:IB WB:DALU*Q:DALU ST-BO:WB                       467   9546 C5DE D500 2000 6BAF 6F25
12839  \2\               CKHF FPRM:WB*RING-IN GP-MISC6:11
12840  \\                      IF:FREG4 X2(SDEN,1DEN);
12841  \\
12842  \3\               (5DEH) IB:QZEX DALU:IB ST-E2:DALU FM-SEL:FB                                 5DE   03B7 CC33 D5C0 D200 04AF 3B25
12843  \\                      IF:LGUS24 X2(SAS3,SAS2);
12844  \2\               (1DEH) IB:BO AB:P DALU:WB-ADD-IB LB-CA*Y:DALU RB:BO                         1DE   23F8 C32A 3000 0000 0499 011F
12845  \\                CKVL DALU:RU-SUB1
12846  \\                      IF:DCARRY16 X2(72AN,32AN);
12847  \2\               (32AH) RB:K7NUM WB:RB-SL1 ST-BO:WB                                          32A   032C C769 3C00 2F80 046F 036F
12848  \\                      IF:LAFMODE X2(769N,369N);
12849  \2\               (72AH) RJ:K7NUM WO:RB-SL1 ST-BO:WB                                          72A   0300 CC03 3C00 2F80 046F 036F
12850  \\                                                         GO-TO(OD3N);
12851  \2\               (369H) LB-PW*Y:BALU IB:SBZEX BALU:IB RB:L7NUM WB:RB*Q:RB                    369   85D0 1CBF 3C00 1F80 0465 772F
12852  \\                      IF:OP-READ- X2(SXA:BRRFU,0BFN);
12853  \2\               (769H) LB-PA*Y:BALU IB:SU BALU:IB RB:L7NUM WB:RB*Q:RB                       769   800D 1CEF 3C00 1F80 0465 472F
12854  \\                      IF:OP-READ- X2(SXA:BRRFU,0UFN);
12855  \2\               (0D3H) RB:L7NUM WO:RB*Q:RB                                                  0D3   030D 1CBF 3C00 1F80 046F 072F
12856  \\                                     IF:OP-READ- X2(SXA:BRRFU,0BFN);
12857  \2\               (0BFH) IB:QZEX RB:B0 DALU:RB-OR-1B WE:DALU ST-BO:WB                         0BF   0340 CCD4 3C00 2000 68AF 3B27
12858  \\                CKHF GP-MISC6:00                                 GO-TO(OD4N);
12859  \2\               (0D4H) RB:B0 DALU:RB-SUB1                                                   0D4   03C0 1C30 3000 0030 04AF 0B1F
                                     CKVL
12860  $XA:RFU-B         (454H)                    IF:BRANCHOP X2(SUK,SPF-03);                       454   0300 C312 3C00 0000 04AF 0B2F
12861  $XA:RFU-K         (456H)                                                GO-TO(STV05);        456   0300 C312 3C00 0000 04AF 0B2F
12862  \\
12863  $XA:RFU-S         (455H)                                                GO-TO(STV05);        455   0300 C312 3C00 0000 04AF 0B2F
12864  \\
12865  $XA:RFU           (456H)                                                GO-TO(STV05);        456   0300 C312 3C00 0000 04AF 0B2F
12866  \\
12867  $XA:*RFU          (457H)                                                GO-TO(STV05);        457   0300 C312 3C00 0000 04AF 0B2F
12868  \\
12869  SKIP HOF;
12870  \ ENTRIES FOR ADDRESS SYLLABLE 2 \
12871  $XB:B-O-O         (5D1H) RJ:A0 AB:HB*Q:Q-SCALED ST-AU:WB GP-MISC0:UX*XBOFFS                   5D1   039F C610 3000 2008 6DAF 05EF
12872  \1\               CKHL
12873  \\                      IF:REMOTE-AS X2(610N,210N);
12874  \1\               (21CH) LB-PA*Y:DALU IB:SBSEX RB:B7SEL WO:RB                                 210   C51C 65F6 3000 0017 0499 632F
12875  \\                BALU:WB-ADD-13
12876  \1\               (61CH) LB-DA*Y:BALU IB:SBSEX RB:B7SEL WB:RB                                 610   C51C 65F6 3000 0017 0499 632F
12877  $XB:P-O           (5CCH) RJ:A0 AB:RB*Q:Q-SCALED ST-AU:WB GP-MISC0:UX*XBOFFS                   5CC   039F C6D9 3000 2008 6DAF 05EF
12878  \1\               CKHL
12879  \\                      IF:REMOTE-AS X2(6D9N,2D9N);
12880  \1\               (2D9H) LB-PW*Y:DALU WB:P BALU:WB-ADD-1U                                     209   C51C 65F6 3000 0000 0489 612F
12881  \\                      IF:FREGO XR*ELS(SCIP-EAG);
12882  \1\               (6D9H) LB-DA*Y:BALW IB:Y BALU:WB-ADD-1B                                    6D9   C51C 65F6 3000 0000 0499 692F
12883  $XB:B-B-X-O       (5D2H) IB:A0 RB:D7NDX DALU:RB-ADD-1B WB:DALU*Q:U-SCALED                     5D2   039F C5E9 3C01 2788 056F 0DD9
```

```
                      RTL/6000 FILE EDIT
                      MICROPROGRAM SECTION

LINE #           SEQUENCE: SSACS                                                    ADDRESS    IMAGE
                                                                                    (HEX)      (HEX)
12884                 CKHL ST-A0:WB GP-XBLOAD  IF:REMOTE-AS X2(5E9H,1E9H);            5C1      039F C5E9 3CC1 2388 7D6F 0DD9
12885  *XB:'E-D-X-0  (5C1H) IB:A0 RB:D5NDX DALU:RB-ADD-1B WB:DALU'Q:Q-SCALED
12886   \1\                CKHL ST-A0:WB GP-MISC7:0X*XBLOAD
12887                                          IF:REMOTE-AS X2(5E9H,1E9H);            1E9      95A6 C630 3C00 F208 6CAF 6119
12888  \1\           (1E9H) LB-PW IB:SBSEX RB:A0 DALU:RB-ADD-1B ST-E2:DALU
12889                 CKHL WB:P ST-A0:WB GP-MISC6:0X
12890                                          IF:ASMAP2 X2(630H,230H);               5E9      13A6 C630 3000 F208 6CAF 6119
12891  \1\           (5E9H) LB-DA IB:SUSEX RB:A0 DALU:RB-ADD-1B ST-E2:DALU
12892   \3\           CKHL WB:P ST-A0:WB GP-MISC6:0X
12893                                          IF:ASMAP2 X2(630H,230H);               230      631C C5FA 3C00 1208 7E49 032F
12894  \1\           (230H) IB:A0 RB:E2 WB:RB BALU:WB-ADD-1B LB-DA*Y:BALW
12895                                          IF:FREGO XR*ELS(SCIP-EAG-X);           630      631C C5FA 3C00 1217 0459 032F
12896  \1\           (630H) IB:B7SEL RB:E2 WB:RB BALU:WB-ADD-1B LB-DA*Y:BALW
12897                                          IF:FREGO XR*ELS(SCIP-EAG-X);           5C4      039F C46C 3C00 2008 6DAF 0SEF
12898  *XU:P-DD-0    (5C4H) RB:A0 WB:RB'Q:Q-SCALED ST-A0:WB GP-MISC6:0X*XBOFFS
12899   \2\            CKHL                    IF:REMOTE-AS X2(46CH,06CH);
12900                                           GO-TO(03AH);                          06C      3500 C03A 3200 0000 04AF 4825
12901  \2\           (06CH) LB-PW*NONPROC(WR:WD) IB:SB DALU:1B WB:DALU
12902                                                                                 03A      3500 CC3B 3100 0000 31AF 4825
12903  \2\           (03AH) LB-PW*NONPROC(WR:WD) IB:SB DALU:1B WB:DALU
12904                                           GO-TO(03BH);                          03B      288C CC6E 1CC0 2000 04AF 012F
12905                                  GP-MISC3:X1
12906  \2\           (03BH) LB-WR-LOCAL(CPU) WD:P ST-B0:WB
12907                                           GO-TO(06EH);                          46C      1800 CC4F 3C00 2000 31AF 092F
12908  \2\           (46CH) LB-DA*RD-MEM-D WB:Y ST-B0:WB GP-MISC3:X1
12909                                           GO-TO(04FH);                          04F      0080 CC6E 3C00 2000 04AF 0B00
12910  \2\           (04FH) LB-STALL RB:00 DALU:RB-ADD1 WB:DALU ST-B0:WB
12911                                           GO-TO(06EH);                          06E      239C C5FA 3C0C 0000 3299 4B1F
12912  \2\           (06EH) LB-DA*Y:BALW Q:Q-SCALED IB:SB RE:E0 DALU:RB-SUB1 WB:DALU
12913                 CKHL BALU:WB-ADD-1B GP-MISC3:X0
           SKIP HOF;                            IF:FREGO XR*ELS(SCIP-EAG-X);
12914  *XB:*E-D-X-0  (5C7H) IB:A0 RB:D7NDX DALU:RB-ADD-1B WB:DALU'Q:Q-SCALED           5C7      039F C527 3CC1 2788 056F 0DD9
12915   \1\                CKHL ST-A0:WB GP-XBLOAD IF:REMOTE-AS X2(527H,127H);
12916  \1\           (5C6H) RB:A0 WB:RB'Q:Q-SCALED ST-A0:WB GP-XBLOAD-OFFSET          5C6      039F C527 3C00 2008 05AF 05EF
12917                 CKHL                      IF:REMOTE-AS X2(527H,127H);
12918  \1\           (127H) LB-PW*Y:BALW IB:SUSEX RB:B7SEL WB:RB                      127      C500 C46A 3C00 0017 0499 632F
12919                 BALU:WB-ADD-1B            GO-TO(SINDIRECT-XB);
12920  \1\           (527H) LB-DA*Y:BALW IB:SBSEX RB:B7SEL WB:RB                      527      6300 C46A 3C00 0017 0499 632F
12921   \2\           BALU:WB-ADD-1B            GO-TO(SINDIRECT-XB);
12922  \2\           (5C2H) RB:A0 WB:RB'Q:Q-SCALED ST-A0:WB GP-XBLOAD-OFFSET          5C2      039F C5D6 3C00 2008 05AF 05EF
12923                 CKHL                      IF:REMOTE-AS X2(5D6H,1D6H);
12924  \2\           (1D6H) LB-PW*Y:BALW IB:SBSEX WB:P BALU:WB-ADD-1-B                1D6      C500 C46A 3C00 0000 0489 612F
12925                                           GC-TO(SINDIRECT-X0)
12926  \2\           (5D6H) LB-DA*Y:BALW IB:SBSEX WB:Y BALU:WB-ADD-1B                 5D6      6300 C46A 3C00 0000 0499 692F
12927                                           GC-TO(SINDIRECT-XB);
12928  \1\           (46AH) LB-DA*RD-MEM-D GP-MISC6:0X                                46A      1800 CC3E 3CC0 0000 6CAF 0B2F
12929   \1\                                     GO-TO(SINDIRECT-AB);
```

```
                                    RTL/6000 FILE EDIT
                                    MICROPROGRAM SECTION
                                                                                 ADDRESS   IMAGE
                                                                                 (HEX)     (HEX)
LINE #
12930         $INDIRECT-AB                       SEQUENCE: $&MCS
12931         \1\                                                IF:LAFMODE X2(423M,023M);  03E  002C C423 3C00 0000 04AF 082F
12932         *          (023M) LB-DW*Y:BALU IB:SBZEX RB:A0 WB:RH BALU:WB-ADD-1B
12933         \1\                 FASP:WB*RING-OUT   IF:FREGO XR*ELS($CIP-EAG-X);           023  221C 65FA F400 0008 0499 732F
12934         *          (423M) LB-DA*Y:DALU IB:SB RB:A0 WB:RE BALU:WB-ADD-1B
12935         \1\                 FASP:WB*RING-OUT   IF:FREGO XR*ELS($CIP-EAG-X);           423  631C 65FA F400 0008 0499 432F
12936         $XB:ASS    ($C5M)                                                             5C3  039F C5CB 3C00 0000 04AF 082F
12937         \1\                                    IF:REMOTE-AS X2($C0M,1C0M);
12938         *          (1C0M) LB-PW IB:SBZEX DALU:IB ST-E2:DALU WB:DALU'Q:DALU
12939         \1\                 CKHL FASP:WB*RING-IN GP-MISC7:01                           1CB  95B7 C2CC F500 D200 79AF 7F25
12940         \1\                 IBUS24 X2($DIGIT,SBYTE);
12941         *          (5C5M) LB-DA IB:SBZEX DALU:IB ST-E2:DALU WB:DALU'Q:DALU
12942         \1\                 CKHL FASP:WR*RING-OUT GP-MISC7:01
12943         \1\                 IBUS24 X2($DIGIT,SBYTE);                                   5C5  13B7 C20C F400 D200 79AF 7F25
12944         $XB:IMM    ($C5M)                                                              5C5  039F C5CE 3C00 0000 04AF 082F
12945         \1\                                    IF:REMOTE-AS X2($C0M,1C0M);
12946         *          (1C0M) LB-PW*Y:UALU WB:P BALU:WB-ADD1                               1CE  851C C5F6 3C00 0000 0480 012F
12947         \1\                                    IF:FREGO X2($TV16-5F6,$CIP-EAG);
12948         $XB:RFU    ($C0M)                                                              5CE  031C C5F6 3C00 0000 04AF 082F
12949         \1\                                    IF:FREGO X2($TV16-5F6,$CIP-EAG);
12950         $XB:RFU    ($DFM)                                   GO-TO($TV05);              5DF  0300 C312 3C00 0000 04AF 082F
12951         \1\
12952         $XB:RFU*   ($CFM)                                   GO-TO($TV05);              5CF  0300 C312 3C00 0000 04AF 082F
12953         \1\
12954         SKIP MUF;
12955         \ ENTRIES FOR ADDRESS SYLLABLE 3 \
12956         $X3:0-0-K-0 ($D9M)   RB:L7NDX WB:RU LB-DA(WR:WB)                               5D9  1300 3C2E 3100 1F80 046F 032F
12957         \3\
12958         *          (022M)   RB:K7NDX WB:R0 LB-DW(WW:WB)    IF:REMOTE-AS X2(42CM,02CM); 02E  029F C42C 3200 0F80 046F 032F
12959         \3\                 CKHL
12960         *          (02CM) LB-PW*Y:BALU IB:SB RB:B7SEL WB:RB                            02C  850C CC3F 3C00 0017 0499 632F
12961         \3\                 BALU:WB-ADD-1B                  GO-TO(035M);
12962         *          (42CM) LB-DA*Y:BALU IB:SB RB:B7SEL WB:RB                            42C  2300 CC3F 3C00 0017 0499 632F
12963         \3\                 BALU:WB-ADD-1B                  GO-TO(035M);
12964         *          (035M) LB-WR-LOCAL(CPU) GP-MISC3:X1                                 035F 2980 CC2B 1C00 0000 31AF 082F
12965         \3\
12966         *          (029M) LB-DA IB:SB RG:A0 DALU:RB-ADD-1B                             029  1380 CCC1 2008 6DAF 4009
12967         \3\                 CKHL WB:DALU'Q:0-SCALED ST-A0:WB GP-MISC6:0X*XBLOAD
12968         \3\                                                 GO-TO(02FM);
12969         *          (02FM) IB:A0 WB:Y BALU:WB-ADD-1B LB-DA*Y:BALU XR*ELS($CIP-EAG-X);   02F  231C 65FA 3000 0008 3299 092F
12970         \3\
12971         *          (5DCM) LB-STALL*Y:BALW RB:E2 DALU:RD-ADD-RB WB:DALU-SR4             5D0  619F C61E 3000 120B 0459 0A53
12972         \3\                 CKHL IB:KDBR BALU:WB-ADD-1B
12973         \3\                                     IF:REMOTE-AS X2($TV12,21EM);
12974         *          (21EM) LB-DA*RD-MEM-0 GP-MISC3:X1                                   21E  1800 C250 3000 0000 31AF 082F
12975         \3\
12976         *          (250M) LB-STALL*YINC1                                               250  101C 077F 3C00 0000 04AF 082F
```

```
                         RTL/6000 FILE EDIT
                       MICROPROGRAM SECTION

ADDRESS   IMAGE
                                                     (HEX)     (HEX)
LINE #    SEQUENCE: SSALS
12977              IF:FREGO X2(77F#,37F#);            37F    02FC C20C F400 D200 7AAF 4F25
12978 \3*\  (37F#) LB-DW IB:SB DALU:IB ST-E2:DALU WB:DALU
12979 \3*\          CKVL GP-MISC7:10 FASP:WB'RING-OUT
12980 \7\                       IF:DALU(24) X2(SDIGIT,SBYTE);  77F    0200 C0C4 D400 C000 04AF 4A65
12981 \4\   (77F#) LB-DJ IB:SB DALU:IB ST-DO:DALU WB:DALU-SR4
12982 \7\           FPRM:WB'RING-OUT            GO-TO(0C4#);
12983 \5\   (0C4#) LB-DA'RD-MEM-D IB:0000(06F#) RB:D0 DALU:RB-AND-IB   0C4    1000 C317 D46F C000 786F C72D
12984 \7\           ST-DO:DALU WB:RD'G:RB FPRM:WB'RING-OUT
12985 \7\           GP-MISC7:00                  GO-TO(317#);
12986 \5\   (317#) LB-STALL IB:0000(07#) RB:D0 DALU:RB-AND-IB WB:DALU  317    00FB C5D5 3007 0000 046F CB2D
12987 \7\           CKVL             IF:OBUS-ZERO X2(5D5#,1D5#);
12988 \4\   (1D5#) FM-SEL:FB IB:0000(08#) DALU:IB GP-MISC6:0X          1D5    03FC 2257 D5D8 0017 6CAF CB25
12989 \7\           CKVL             IF:DALU(SEL) XA*ELS(257#);
12990 \4\   (5D5#) FM-SEL:FB IB:0000(04#) DALU:IB GP-MISC6:0X          5D5    03FC 2657 D5D4 0017 6CAF CB25
12991 \7\           CKVL             IF:DALU(SEL) XA*ELS(257#);
12992 \4\   (257#) GP-MISC6:1X                                         257    0300 C284 3C00 0000 6EAF 0B2F
12993 \7\                            GO-TO(SREMOTE-XA);
12994 \REMOTE-XA (284#) IB:0000(6C#) RB:D0 DALU:RB-XOK-IB WB:DALU      284    03FB 2C6A 3C6C 0000 6C6F CB26
12995 \3\           CKVL GP-MISC6:0X       IF:OBUS-ZERO XA*ELS(5TV16);
12996 \SXR:REG-K (5DE#) WB:L7SEL WB:RE ST-B0:DA LB-DA(WR:WD) GP-MISC6:0X  5DE  1514 C12F 3100 3F40 6C6F 032F
12997 \2\                   IF:ODSIZE- X2(SXE:LXA,12F#);
12998 \4\   (12F#) RB:K7SEL WU:RE ST-B0:WE LB-DW(WW:WE)                12F    0210 4518 3200 2F48 046F 032F
12999 \3\                            IF:MISCOB XE*ELS(118#);
13000 \3\   (118#) LB-WR-LOCAL(CPU) IB:BO DALU:IB ST-KO:DALU           118    2897 4700 1CC0 C800 04AF CB25
13001 \3\                            IF:ODADDR XE*ELS(300#);
13002 \3\   (300#) RB:KU WB:RB ST-B0:WB BRANDI                        300    0300 4500 2800 0478 0B25 032F
13003 \3\                                          XE(5);
13004 SKIP HJF;
13005 \XB:*FT-POP (5C8#) IB:STKT DALU:IB LB-DA*Y:BALU RB:STKP WB:RB   5C8   23FB 15F7 3C00 140C 0465 032F
13006 \7\                    IF:OBUS-ZERO X2(5TV16-5F6,1F7#);
13007 \7\   (1F7#) LB-DA'RD-MEM-D RB:STKT DALU:RB-ADD1 ST-EO:DALU      1F7   186C C78E 3C00 D00C 6CAF 0B00
13008 \7\           CKHF GP-MISC6:0X    IF:LAFMODE X2(7DE#,38E#);
13009 \7\   (38E#) IB:0000(01#) RB:K0 DALU:RB-SUB-IB ST-KO:DALU       38E   0340 C38D 3C01 C800 046F CB06
13010 \7\                                          GO-TO(38D#);
13011 \7\   (78E#) IB:0000(02#) RB:K0 DALU:RB-SUB-IB ST-KO:DALU       78E   0340 C38F 3C02 C800 046F CB06
13012 \7\                                          GO-TO(38D#);
13013 \7\   (38D#) LB-STALL IB:STKB RB:E0 DALU:RB-SUB1-IB              38D   00E3 13D1 3000 100D 046F 0816
13014 \7\           CKVL         IF:DCARRY8 X2(SXL:TV16,5D1#);
13015 \7\   (3DF#) LB-STALL IB:STKB RB:E0 DALU:RB-SUB-ID              3DF   00E3 C300 3C00 100D 046F 0B06
13016 \7\           CKVL         IF:DCARRY8 X2(SXL:TV16,3DO#);
13017 \7\   (5D1#) LB-DW*Y:HALU IB:SHZEX BALU:IB RB:E0 WB:RB           5D1   2200 6500 3C00 3C0C 0465 732F
13018 \3\           ST-STKT:WB                                XR(5);
13019 \7\   (3DC#) LB-DA*Y:BALU IB:SB DALU:IB RB:E0 DALU:RB-ADD1       3D0   2380 6500 3C00 300C 0465 4B00
13020 \3\           CKHL WB:DALU ST-STKT:WB                   XR(5);
13021 \EXB:FT-U-X-0 (5DE#)                                            5D8   031C 1C4D 3000 0000 04AF 0B2F
13022 \3\                        IF:FREGO- X2(44C#,04D#);
13023 \4\   (04D#) IB:AD RB:D7SEL DALU:WB-ADD-IB WB:DALU-SCALED        04D   039F C5D7 3C01 2748 6D6F 0D99
```

```
                                RTL/6000 FILE EDIT
                              MICROPROGRAM SECTION

SEQUENCE: $SMCS
                                                              ADDRESS    IMAGE
                                                              (HEX)      (HEX)

LINE #
13024              CKHL ST-AO:WB GP-MISC6:0X'XBLOAD
13025   \3\          IF:REMOTE-AS X2(5D7N,1D7N);              107   9585 CC4C 3CC0 F208 04AF 6259
13026   \1\      (1D7N) LB-PJ IU:SBSEX RB:AO DALU:RB-ADD-IB ST-E2:DALU
13027   \3\          CKHL WB:RB-SR4 ST-AO:WB     IF:IBUS16 X2(44CN,04CN);   5D7   13B5 0C4C 3C00 F208 04AF 6259
13028   \1\      (5D7N) LB-DA IB:SBSEX RB:AO DALU:RB-ADD-IB ST-E2:DALU
13029   \1\          CKHL WB:RB-SR4 ST-AO:WB                   04C   03B5 11CC 3C00 0008 04AF 0B2F
13030   \3\      (04CN) IB:AO
13031   \3\          CKHL                          IF:IBUS16 X2(STV16-5CD,SFT-D-P);  44C   03B5 11CD 3C00 0008 04AF 0B2F
13032   \1\      (44CN) IB:AO
13033   \3\          CKHL
13034  SXB:'FT-D-0  (SCAN) RB:AO WB:RB'Q:U-SCALED ST-AO:WB GP-XBLOAD-OFFSET  5CA  039F C5D3 3C00 2008 04AF 05EF
13035   \1\          CKHL                          IF:REMOTE-AS X2(5D3N,1D3N);
13036  SXB:'FT-D-X-0 (5DAN) IB:AO RB:D7SEL DALU:RB-ADD-IB WB:DALU'Q:U-SCALED  5DA  039F C5D3 3001 2748 056F 0DD9
13037   \1\          CKHL ST-AO:WB GP-XBLOAD IF:REMOTE-AS X2(5D3N,1D5N)
13038   \1\      (1D2N) LB-PW IB:SBSEX DALU:IB ST-E2:DALU
13039   \1\          CKHL                          IF:IBUS16 X2(STV16-5CD,SFT-D-M,STV16-1CD);  1D3  95B5 C1D4 3C00 D200 04AF 6B25
13040   \1\      (5D3N) LD-DA IB:SBSEX DALU:IB ST-E2:DALU
13041   \1\          CKHL                          IF:IBUS16 X2(5D4N,1D4N);   1B5  13B5 C1D4 3C00 D200 04AF 6B25
13042   \1\      (1D4N) IB:STKT RB:E2 DALU:RB-ADD-IB ST-E2:DALU WB:RB
13043   \1\          CKHF BALU:WB-ADD-IB LB-DA'Y:BALW               GO-TO(1C1N);  634C C1C1 3C00 D20C 0459 0319
13044   \1\      (5D4N) IB:STKB RB:E2 DALU:RB-ADD-IB ST-E2:DALU WB:RB
13045   \1\          CKHF BALU:WB-ADD-IB LB-DA'Y:BALW               GO-TO(1C2N);  6340 C1C2 3C00 D200 0459 0319
13046   \1\      (1C1N) IB:STKU RB:E2 DALU:RB-SUB-IB
13047   \1\          CKVL             IF:DCARRYB- X2(SINDIRECT-XB,STV16);  1C1  03E3 C46A 3CC0 120C 046F 0B06
13048   \1\      (1C2N) IB:STKT RB:E2 DALU:RB-SUB-IB
13049   \1\          CKVL             IF:DCARRYB X2(SINDIRECT-XB,STV16);   1C2  03E3 CC6A 3C00 120C 046F 0B06
13050  SKIP HOF;
13051  SXR:NO-READ  (51DN) WU:Y ST-AO:WB                                     51D  0300 4500 3C00 2008 04AF 092F
13052  SXR:HALF     (51CN) LB-DW'RD-MEM-W IB:0000(FFN) DALU:IB WB:DALU         XE(S);  51D  1A40 C2C2 3OFF 2000 04AF CB25
13053  \1\          CKHF ST-BO:WA                                GO-TO(2U2N);
13054  \1\      (202N) LB-STALL                                              202  OC3F C603 3000 0000 04AF OB2F
13055  \1\                                       IF:XBREG0 X2(603N,203N);
13056  \1\      (203N) LJ-DJ IB:SB RB:BO DALU:RB-AND-NOT-RB WB:DALU-SW       203  02B5 45E0 3000 2000 04AF 4A24
13057  \1\          CKHL ST-BO:WB                    IF:IBUS16- XE'ELS(1EON);
13058  \1\      (603N) LJ-DJ IB:SB RB:BO DALU:RB-AND-IB WB:DALU ST-BO:WB    603  0287 45E0 3000 2000 04AF 4B2D
13059  \1\          CKHL ST-BO:WB                    IF:IBUS24- XE'ELS(1EON);
13060  \1\      (1EON) IH:FFF(U0N) RB:JO DALU:RU-OR-IB WB:DALU ST-BO:W3     1E0  0340 C1C0 3C00 0000 04AF EB27
13061  \1\          CKHL LB-DW'RD-MEM-W                                    XE(S);
13062  \1\      (511N) LB-DW'RD-MEM-W                                      511  1A00 C1C0 3C00 0000 04AF OB2F
13063  SXR:WORD   (512N) LB-DA'RD-MEM-D DALU:FFFFF ST-E0:DALU GP-MISC2:X1  512  1B17 CC4A 3C00 D000 21AF 0B23
13064  \1\      (04AN) LB-OCADDR- X2(44AN,04AN); DALU:IB WB:DALU ST-AO:WB
13065  SXR:DBL     CKHF LB-STALL                                          04A  0040 4700 3000 2008 04AF FB25
13066  \1\                                        XE(7);
13067  \1\      (44AN) LB-STALL                                           44A  0000 C121 3000 0000 04AF 0B2F
13068  \1\          CKHF                                GO-TO(SKOP-DBL);
```

```
                              RTL/6000 FILE EDIT
                              MICROPROGRAM SECTION
                                                                          ADDRESS   IMAGE
                          SEQUENCE: $$MCS                                 (HEX)     (HEX)
LINE #
13071         $XR:RMW             IF:MISC3A- XE'ELS(101N)                 513       3A2B C1C0 3CC0 0000 3EAF 082F
13072         \1*\         (513H) LB-RD-MEM-W'LOCK GP-MISC3:1X            100       001E 41C1 3000 0000 04AF 092F
13073         \1*\                LD-STALL WB:Y                                     
13074         \1*\         (10CH) LB-DW(WW:WB) IB:SDSEX DALU:1B WB:DALU ST-B0:WB    101       0250 4512 32C0 2000 04AF 6B25
13075         \1*\                       IF:BUS-ACK XE'ELS(112N)                    
13076         \1*\         (112H) LB-RD-MEM-W'LOCK                                  112       3A00 C100 3C00 0000 04AF 082F
13077         \1*\                CKHF                           GO-TO(100H)                  
13078         \1*\         (500H) LB-STALL WB:Y GP-MISC5:1X DALU:FFFFF ST-STKP:DALU 500       0C00 C131 3C00 0400 5EAF 0923
13079         \1*\                                                       GO-TO(131H)
13080         \1*\         (131H) LB-DW(WW:WB) IB:SDSEX DALU:1B WB:DALU ST-B0:WB    131       0250 4530 328E 2000 04AF 6B25
13081         \1*\                CKHF RII:BSACK          IF:BUS-ACK XE'ELS(SPF-13)
13082         $PF-13       (13CH)                                                   130       9707 2CC8 C000 0000 64AF 082F
13083         \1\                                                                   
13084         \1\          (50BH)                            GO-TO(STVUS)           508       0300 C312 3000 0000 04AF 082F
13085         $XR:KOP-RFU  
13086         \1\          
13087  SKIP HOF;
13088         $XM:KCP      (505H) LB-DA'RD-MEM-D DALU:FFFFF WB:DALU:1B           509       1016 C768 AC00 E000 04AF 0063
13089         \2\                 ST-B0:WB FLINK:(0)           IF:ODSIZ1 X2(768M,368M)
13090         $                   LD-STALL DALU:000000 WB:DALU ST-A0:WB             368       0015 57DE 3C00 2008 04AF 082C
13091         \2\                                                    IF:ODSIZ2 XL'ELS(30EH)
13092         \3\          (30EH) LB-DW IB:S3ZEX DALU:1B WB:DALU ST-B0:WB           30E       0285 4533 3C00 2000 04AF 7B25
13093         \3\                 CKHL                                              
13094         $KWD-NEG     (133H) DALU:FFFFF WB:DALU ST-A0:WB      IF:FFRM7 XE'ELS(1E1N)       133       0321 45E1 3C00 2008 04AF 0823
13095         \3\          
13096         \3\          (1E1H) DALU:000000 WB:DALU ST-A0:WB                      1E1       0300 45C0 3C00 2008 04AF 082C
13097         \3\                                                    XE(5)
13098         \3\          (768H) LD-STALL IB:QZEX DALU:1B WB:DALU ST-E0:DALU R3:B0 WB:RB-SW   768       0014 C121 3C00 F000 04AF 3225
13099         $KOP-RFU     (121H) LB-DW IB:SDSEX DALU:1B WB:DALU ST-A0:WB          121       0250 41C9 3C00 2008 31AF 6B25
13100         \2\                                           IF:MISC68- XE'ELS(109N)
13101         \2\          (105H) LB-DA IB:SUZEX DALU:1B WB:DALU ST-B0:WB           109       1340 45C0 3C00 2000 04AF 7B25
13102         \2\                 CKHF                                           XE(5)
13103         \2\          (521H) IU:0000(0FH) RB:B0 DALU:RB-AND-1B ST-LO:DALU      521       0315 C768 3CCF 5800 04AF C620
13104         \2\                 WB:RB-SW'Q:HEXB
13105         \2\                                   IF:ODSIZ2 X2(SHALF-PREP,$BS-PREP)
13106  SHALF-PREP   
13107         \3\          (76BH) IU:FFFF(00H) DALU:1B ST-D0:DALU WB:DALU-TW         76B       037F C76D 3C00 E008 04AF E8A5
13108         \3\                 CKHF                  IF:XBREGO X2(76CN,360M)
13109         \3\          (360H) LD-DW IB:SO RB:DU DALU:RB-AND-1B WB:DALU-SW       360       0285 452B 3000 2000 046F 4A20
13110         \3\                 CKHL ST-B0:WB                         IF:IBUS16- XE'ELS(12BM)
13111         \3\          (760H) LB-DW IB:SB RB:DO DALU:1B-AND-NOT-RB WB:DALU      76D       02B7 452B 3000 2000 046F 4B24
13112         \3\                 CKHL ST-B0:WB                         IF:IBUS24- XE'ELS(12BM)
13113         \3\          (12BH)                                                   12B       0321 412C 3C00 0000 04AF 082F
13114         \3\          (12CH) IU:00FF(00H) RB:U0 DALU:RU-OR-1B WB:DALU ST-B0:WB  12C       0340 C133 3C00 2000 04AF F827
13115         \3\                 CKHF                                     GO-TO($KWD-NEG)
13116         \3\
```

```
                              RTL/6UCO FILE EDIT
                              MICROPROGRAM SECTION

ADDRESS  IMAGE
                                                                    (HEX)    (HEX)

LINE #
13117  SBS-PREP          SEQUENCE: $SBCS
13118    //         (36EH) LB-DW'YINC1 IB:SB DALU:1B ST-E2:DALU WB:DALU        36B  1240 CCF2 3000 F208 04AF 4B25
13119    //                CKHF ST-A0:WB                          GO-TO(OF2H)
13120    //         (OF2H) LB-DA'RD-MEM-D RB:EO DALU:RU-ADD-RB WB:DALU-SR4      OF2  1B80 CCF3 3000 300F 04AF 0A53
13121    //                CKHL ST-A7:WB
13122    //         (OF3H) RB:A7 WB:RB-SW ST-A7:WB                GO-TO(OF5H)  OF3  0300 CCF4 3000 200F 04AF 022F
13123    //
13124    //         (OF4H) IB:UZEX RB:KO DALU:RB-ADD-IB ST-KO:DALU  GO-TO(OF5H) OF4  0340 OCF5 3000 C800 04AF 3B19
13125    //                CK1F
13126    //         (OF5H) IB:0000(1FH) RU:SW Q:HEXB DALU ST-A7:WB             OF5  03FB C400 301F 200F 04AF CB2D
13127    //                CKVL                                  IF:UBUS-ZERO X2(4DUH,ODOH);
13128    //         (4DCH) IB:0000(1FH) RB:01 DALU:RB-AND-IB WB:DALU ST-A7:WB   4D0  0340 CODO 301F 210F 04AF CB2D
13129    //                CKHF                                    GO-TO(ODOH)
13130    //         (ODOH) IB:00CO(0FH) RB:A7 DALU:RB-AND-IB WB:DALU'Q:DALU    ODO  0300 CCF7 300F 0UOF 04AF CF19
13131    //                                                        GO-TO(OF7H)
13132    //         (OF7H) IB:UZEX RB:LO DALU:RB-ADD-IB ST-LO:DALU              OF7  03FC C36C 3CC0 5802 04AF 3E19
13133    //                CKVL WJ:DALU-SW'Q:HEXB    IF:DALU(26) X2(76CH,36CH);
13134    //         (36CH) IB:UZEX RB:KO DALU:RB-OR-IB ST-KO:DALU GP-MISC2:00   36C  0321 C1C6 3C00 C800 286F 3B27
13135    //                                          IF:FPRM7- X2(506H,106H);
13136    //         (76CH) IB:UZEX RB:KO DALU:RB-AND-IB ST-KO:DALU GP-MISC2:10  76C  0321 C1C6 3000 C800 2A6F 3B27
13137    //                                          IF:FPRM7- X2(506H,106H);
13138    //         (106H) IB:UZEX RB:A0 DALU:RB-AND-IB WB:DALU                106  03FB 15C7 3000 0008 04AF 3B2D
13139    //         (107H) IB:A0 RB:KO DALU:IB-OR-NOT-RJ WB:DALU'Q:DALU        107  0071 1132 3000 2808 04AF 0F21
13140    //                CKHF LU-STALL             IF:DALU(26) X2(533H,132H);
13141    //         (506H) IB:A0 RB:KO DALU:RB-AND-IB JU:DALU'Q:DALU ST-A0:WB   506  0071 C152 3CC0 2808 04AF 0F2D
13142    //                CKHF LU-STALL             IF:MISC2A- X2(SKWD-POS,132H);
13143  SKIP HUF;
13144  SKWD-POS           (532H) DALU:000000 WB:DALU ST-A0:WD                  532  0316 4128 3CC0 2008 04AF 0B2C
13145    //                                          IF:ODSIZ1- XE'ELS(SBS-PREP-LOOP);
13146    //         (533H) DALU:FFFFFF WB:DALU ST-A0:WB                         533  0300 C128 3CC0 2008 04AF 0B23
13147    //                                                      GO-TO(SBS-PREP-LOOP)
13148    //         (132H) LU-DW IB:SBZEX DALU:1B ST-E1:DALU WB:DALU'Q:DALU    132  0240 C128 3CC0 F100 04AF 7F25
13149    //                CKHF ST-90:WB                           GO-TO(SBS-PREP-LOOP)
13150  SBS-PREP-LOOP  (128H) RB:LO DALU:RB                                    128  03FC CCFC 3C00 1804 04AF 082F
13151    //                CKVL                       IF:DALU(26) X2(4FCH,OFCH);
13152    //         (OFCH) RB:A0 WB:RH-SR4'Q:QSR4 ST-A0:WB                     OFC  0300 C129 3C00 2008 04AF 066F
13153    //
13154    //         (129H) RB:A0 WB:RB-SR4'Q:QSR4 ST-A0:WB                    129  0300 C4FC CCFD 3C00 2008 04AF 066F
13155    //                CKVL                      GO-TO(129H)
13156    //         (4FCH) RB:LO DALU:RB                                      4FC  03FC CCFD 3C00 1805 04AF 066F
13157    //                CKVL                      IF:DALU(29) X2(4FDH,OFDH);
13158    //         (OFDH) RB:A0 WB:RB-SR4'Q:QSR4 ST-A0:WB                    OFD  0300 C4FD 3C00 2008 04AF 066F
13159    //
13160    //         (4FDH) RB:LO DALU:RB                                      4FD  03FC C3AA 3C00 1806 04AF 082F
13161    //                CKVL                      IF:DALU(30) X2(7AAH,3AAH);
13162    //         (3AAH) RB:A0 WB:RB-SR2'Q:QSR2 ST-A0:WB                    3AA  0300 C7AA 3CC0 2008 04AF 06AF
13163    //                                                      GO-TO(7AAH)
```

RTL/6000 FILE EDIT
MICROPROGRAM SECTION

SEQUENCE: $$MCS

| LINE # | | | | ADDRESS (HEX) | IMAGE (HEX) |
|---|---|---|---|---|---|
| 13164 | $ | | (7AAH) R3:L0 DALU:RB | 7AA | 03FC C3AB 3CC0 1807 046F 0B2F |
| 13165 | // | | CKVL IF:DALU(31) X2(7ABH,3ABH); | | |
| 13166 | // | | (3ABH) R6:A0 WB:R6-SR1'Q:QSR1 ST-A0:WB | 3AB | 0300 C7AB 3C00 2008 04AF 06EF |
| 13167 | // | | GO-TO(7ABH); | | |
| 13168 | // | | (7ABH) IB:Q2EX DALU:IB WB:DALU ST-B0:WB | 7AB | 0376 C7AC 3C00 2000 04AF 3B25 |
| 13169 | // | | CKHF IF:MISC2B X2(7ACH,3ACH); | | |
| 13170 | // | | (3ACH) RB:L0 DALU:RB | 3AC | 03FC 452A 3C00 1803 046F 0B2F |
| 13171 | // | | CKVL IF:DALU-(27) XE'ELS(12AH); | | |
| 13172 | // | | (12AH) IB:Q2EX DALU:IB ST-D0:DALU | 12A | 0300 C115 3CC0 C000 04AF 3B25 |
| 13173 | // | | GO-TO(115H); | | |
| 13174 | // | | (115H) RB:E1 WB:RB ST-A0:WB | 115 | 0300 C116 3CC0 3108 046F 032F |
| 13175 | // | | GO-TO(116H); | | |
| 13176 | // | | (116H) LB-DA IB:SB DALU:IB ST-E1:DALL WB:DALU'Q:DALU | 116 | 1300 C128 3CC0 D100 21AF 4F25 |
| 13177 | // | | GP-MISC2:X1 GO-TO(SDS-PREP-LOOP); | | |
| 13178 | $ | | (7ACH) RB:D0 WB:RB ST-A0:WB | 7AC | 0300 45C0 3C00 2008 046F 032F |
| 13179 | // | | XE(5); | | |
| 13180 | SKIP HOF; | | | | |
| 13181 | $XR:LAR | | (514H) WB:Y ST-B7NUM:WB \WRAP TEST TBD\ | 514 | 9707 2CC8 C000 2027 64AF 092F |
| 13182 | /1*/ | | XA; | | |
| 13183 | $XR:LXA | | (50BH) WB:ZS ST-A2:WB FLINK:(0) | 50B | 0317 C7CA ACC0 200A 04AF 006F |
| 13184 | /2*/ | | | | |
| 13185 | /1*/ | | (76AH) WB:RB-SL4'Q:QSL4 FASP:WB'RING-OUT | 76A | 0315 57BF F400 0000 04AF 07EF |
| 13186 | /2*/ | | IF:0DADDH X2(76AH,30AH); | | |
| 13187 | /1*/ | | (36AH) WB:RB-SL4'Q:QSL4 FASP:WB'RING-OUT | 36A | 0300 C3BF F4C0 0000 04AF 07EF |
| 13188 | /2*/ | | IF:0DS122 XL'ELS(30FH); | | |
| 13189 | /1*/ | | (30FH) DALU:000000 ST-D7NUM:DALU RB:A2 WB-SW ST-A2:WB | 30F | 0314 54C0 D900 E78A 04AF 022C |
| 13190 | /2*/ | | FM-SEL:FB XL'ELS(0C0H); | | |
| 13191 | /1*/ | | (0C0H) IB:0GG(0FH) RB:A2 DALU:RB-AND-IB ST-D7NUM:DALU | 0C0 | 0355 3C0F 3C00 E78A 04AF CAAD |
| 13192 | /2*/ | | CKHF WB:DALU-SR2 ST-A2:WB IF:0DS122- XL'ELS(0C2H); | | |
| 13193 | /1*/ | | (0C2H) RB:A2 DALU:RB ST-D7NUM:DALU WB:RB-SR1 ST-A2:WB | 0C2 | 0316 54C3 3C00 E78A 04AF 02EF |
| 13194 | /2*/ | | IF:0DS121 XL'ELS(0C3H); | | |
| 13195 | $ | | (0C3H) R3:A2 DALU:RB ST-D7NUM:DALU | 0C3 | 0300 C4C0 C78A 04AF 0B2F |
| 13196 | // | | GO-TO($XL:LXA); | | |
| 13197 | $XL:LXA | | (4C0H) WB:Y ST-B7SEL:WB ST-E1:DALU WB:DALU | 4C0 | 0300 C130 3C00 2017 68AF 092F |
| 13198 | /2*/ | | GO-TO($PF-13); | | |
| 13199 | $XR:ENT | | (517H) DALU:000000 WB:DALU GP-MISC5:X0'(RING) | 517 | 0300 C516 3400 0000 50AF 082C |
| 13200 | /1*/ | | GO-TO($XR:JMP); | | |
| 13201 | $XR:LNJ | | (515H) WB:P ST-B7NUM:WB LB-P:Y'PREFETCH | 515 | ABC4 C321 3C00 2027 04AF 012F |
| 13202 | /2*/ | | CKVL IF:TRACE X2($TRACE-J,321H)'TRAF | | |
| 13203 | $XR:JMP | | (516H) WB:P-ST-B0:WB LB-P:Y'PREFETCH GP-LOAD:0'TRAF | 516 | ABC4 C321 3000 2000 67AF 012F |
| 13204 | /1*/ | | CKVL IF:TRACE X2($TRACE-J,321H); | | |
| 13205 | $ | | (321H) R3:U7NUM DALU:RB-ADD1 WB:DALU ST-B7NUM:WB | 321 | A787 2CC8 C000 2027 64AF 0B00 |
| 13206 | // | | CKHL XAJ; | | |
| 13207 | $TRACE-J | | (721H) R3:B7NUM DALU:RB-ADD1 ST-E1:DALU WB:DALU | 721 | 0380 C117 3C00 F127 04AF 0B00 |
| 13208 | // | | CKHL ST-D7NUM:WB GO-TO(117H); | | |
| 13209 | $ | | (117H) RB:E1 DALU:RB-SUB1 WB:DALU ST-A0:WB | 117 | 0380 C702 3C00 3108 046F 0B1F |
| 13210 | // | | CKHL GO-TO($XL:BRK); | | |
| 13211 | SKIP HOF; | | | | |

RTL/6000 FILE EDIT
MICROPROGRAM SECTION

```
LINE #                                                                                          ADDRESS  IMAGE
                                                                                                (HEX)    (HEX)
13212  $XR:S-NOT-SST                                                                            518      0101 C6E0 3700 0000 04AF 096F
13213     \1*\                          (518#) WB:Y-SL1 LB-STALL'WBYTE   IF:SIPTRAP- X2(6E0#,2E0#);
13214     \1*\                          (6E0#) LB-DA'RD-MEM-S WB:ZS ST-B0:WB   IF:SCISTR X2(6E2#,2E2#);   6E0      0B03 C6E2 3000 2000 04AF 0B2F
13215     \1*\                                 LB-STALL'YINC2 18:0000(0F#) R8:B0 DALU:RB-1B-NOT
13216     \1*\                                 ST-PSIP:DALU WB:P ST-B0:WB                                 2E2      3016 1CE4 3C0F F600 04AF C122
13217     \1*\                                                          IF:ODSIZ1 X2(6E5#,2E4#);
13218     \1*\                          (6E2#) LH-STALL'YINC2 18:0000(0F#) R8:00 DALU:RB-1B-NOT
13219     \1*\                                 ST-PSIP:DALU WB:P ST-B0:WB                                 6E2      3016 C6E4 3C0F F600 04AF 006F
13220     \1*\                                                          IF:ODSIZ1 X2(6E4#,2E4#);
13221     \1*\                          (2E4#) LB-DA'RD-MEM-S                                             2E4      0B00 C6E4 3C00 0000 04AF 0B2F
13222     \1*\                                                          GO-TO(6E4#);
13223     \1*\                          (6E4#) LB-STALL                                                   6E4      0003 C2E5 3C00 0000 04AF 0B2F
13224     \1*\                          (2E5#) LB-WR-LOCAL(SIP)                 IF:SCISTR- X2(6E5#,2E5#); 2E5      2880 C6E5 3C00 0000 04AF 0B2F
13225     \1*\                          (515#) WB:Y-SL1 LB-STALL'WBYTE          GO-TO(6E5#);              519      0101 1CE0 3700 0000 04AF 096F
13226     \1*\                          (6E1#) LB-WR-LOCAL(SIP) WB:ZS ST-B0:WB                            6E1      2880 040A 3000 2000 04AF 006F
13227     \1*\                                                          IF:SIPTRAP- X2(6E5#,2E0#);
13228  $XR:SSI                          (40A#) 18:0000(0F#) RB:00 DALU:RB-1B-NOT ST-PSIP:DALU              40A      030C C6E5 3C0F F600 60AF C122
13229     \2*\                                 WB:P ST-B0:WB GP-MISC6:X0' (END-SIP-GO)
13230     $SST2                                                          GO-TO($SST3);
13231     $SST3                          (6E5#) 18:00 RB:PSIP DALU:RB-ADD1-1B ST-PSIP:DALU               6E5      9747 2008 C000 D600 646F 0B09
13232     $SST5                                 CKIIF                                             XA;
13233     \2*\                           (2EC#)                                                           2E0      0302 C21C 3C00 0000 04AF 0B2F
13234     \1*\
13235  $XR:SDI                           (51A#) RB:D7NUM WB:RB ST-B0:WB LU-STALL'WW:WB                    51A      0100 7400 3200 2780 046F 032F
13236     \1*\                                                          IF:SIP-PRESENT X2($UNDV,$TV03);
13237  SKIP NOF;                         (51E#) RJ:J7NUM DALU:RB ST-E0:DALU WB:RB LB-STALL'WA:WB XW(4);   51B      1100 7400 3300 D027 04AF 032F
13238  $XR:1U-GRP                                                        IF:MISCC2A X2(776#,376#);
13239     \1*\                           (51C#) RB:D7 WB:RB LB-STALL'WA:WB                       XW(4);   51C      1100 C185 3300 0700 046F 032F
13240     \1*\                                                          GO-TO($SDI2);
13241  $IO-XR1                           (51F#) WB:RI-TW ST-A0:WB GP-MISC0:00                             51F      0331 0776 3C00 2008 68AF 082F
13242     \1*\                           (376#) FLINK:(A) GP-MISC7:00    IF:MISCC2A X2(776#,376#);        376      0300 C35A AA00 0000 78AF 0B2F
13243  $IO-AS                                                            GO-TO($IO-XR1);
13244     \1*\                           (35A#) WB:Y ST-A6:WB 1B:F-VAL DALU:1B ST-E2:DALU                 35A      0312 1732 3C00 F20E 04AF 8925
13245     \1*\                                                          IF:PRIVILEGED X2($IO-AS,$IV13);
13246     \1*\                           (733#) WB:ZS ST-A2:WB GP-MISC6:1X RII:BSACK                      733      0300 C37A 308E 200A 6EAF 006F
13247     \1*\                                                          GO-TO($37A#);
13248     \1*\                           (37A#) LB-PW 18:SBZEX DALU:1B WB:DALU ST-A7:WB                   37A      95F2 1372 F500 200F 2EAF 7B25
13249     \1*\                                 CKVL FASP:WB'RING-1N GP-MISC2:1X
13250     \1*\                                                          IF:0B10-21:ZERO WB:RB-SR1 BALU:WB
13251     \1*\                           (372#) RB:A7 DALU:RB ST-E1:DALU WB:RB-SR1 BALU:WB                372      21FC C37C 3C00 D1DF 05AF 02EF
13252     \1*\                                 CKVL LB-STALL'Y:BALU GP-XBLOAD-OFFSET
13253     \1*\                                                          IF:DALU(31) X2($IO-OUT,$IO-IN);
```

```
                    MTL/6000 FILE EDIT
                  MICROPROGRAM SECTION
              SEQUENCE: $$ACS                                                    ADDRESS  IMAGE
                                                                                  (HEX)   (HEX)
LINE #
13260  $     (773N)  ID:0000(F7N) RD:A0 DALU:RB-AND-IB ST-L0:DALU                  773   0300 2400 D9F7 5808 04AF C82D
13261  >/                                                     XA-AUX(4);
13262  >/    (776N)  LD-DW*RD-MEM-W GP-MISC7:00                                    776   1400 C361 3000 0000 78AF 082F
13263  >/                                                     GO-TO(361N);
13264  >/    (361N)  LD-STALL                                                      361   0036 C370 3000 0000 04AF 082F
13265  >/                                IF:MISC2D- X2(770N,$IO-RANGE);
13266  >/    (77CN)  LD-DW*Y:DALU IB:SBZEX DALU:IB ST-E1:DALU                      770   22FC C37C 3CC1 D107 05AF 7AE5
13267  >/                   CKVL WB:DALU-SR1 BALU:KB GP-XBLOAD
13268  >/                                IF:DALU(31) X2($IO-OUT,$IO-IN);
13269  $IO-IN  (37CN)  RJ:E1 WB:RB-SL2 ST-A7:WB GP-MISC6:1X                        37C   0382 C370 3C00 310F 6E6F 03AF
13270  >/                   CKHL
13271  >/    (77DN)  RD:L0 WB:RB RILOAD:WE                                         77D   0300 C11C 3CFF 1800 046F 032F
13272  >/                                IF:OB10-21:ZERO X2(77DN,37DN);
13273  >/    (11CN)  WB:Y ST-A0:WB                                                 11C   0300 C11D 3C00 2008 04AF 092F
13274  >/                                                     GO-TO(11CN);
13275  >/    (11DN)  ID:A7 RB:IV DALU:RB-XOR-IB WB:DALU-SR2 ST-A7:WB                11D   03F2 C32E 3C00 350F 2B6F 0AA6
13276  >/                   CKVL GP-MISC2:11 IF:OB10-21:ZERO X2(SXL:TV15,32EN);
13277  >/    (32EN)  IB:0000(C0N) RB:A7 DALU:RB-AND-IB WB:DALU                     32E   03FB 132F 3CC0 000F 5EAF C82D
13278  >/                   CKVL GP-MISC5:1X IF:OBUS-ZERO- X2(SXL:TV15,32FN);
13279  >/    (32FN)  LD-WR-IO-KSVP RB:A2 WB:RB-SL4 ST-A2:WB GP-MISC5:X1             32F   08C0 C374 6C00 200A 31AF 03EF
13280  >/                                                     GO-TO(374N);
13281  >/    (37DN)  LD-RD-IO RD:A2 WB:RB GP-MISC5:1X                              37D   0A00 C374 6C00 200A 5EAF 03EF
13282  >/                                                     GO-TO(374N);
13283  >/    (374N)  LD-STALL'Y:BALU RI1:BSACK IU:A6 BALU:IB Rd:E2                 374   2100 574B F58E 120E 2C65 032F
13284  >/                   WU:RB FASP:WB'RING-IN GP-MISC2:0X  XL(SXL:I0);
13285  SXL:I0-AS2  (74AN)  GP-MISC7:10                                             74A   0300 C748 3000 0000 7AAF 082F
13286  SXL:I0-AS3  (74C N)  GP-MISC7:01                                            74C   0300 C74B 3C00 0000 79AF 082F
13287  SXL:I0     (74BN)  GP-MISC6:00 FM-SEL:FE                                    74B   0315 C77E D900 0000 68AF 082F
13288  >/                                IF:ODSIZ2 X2(77EN,37EN);
13289  >/    (37EN)  RD:A2 WB:RB GP-XBLOAD                                         37E   0336 1775 3C01 000A 05AF 032F
13290  >/                                IF:MISC2B X2(774N,375N);
13291  >/    (77EN)  RD:A2 WD:RB GP-MISC6:00                                       77E   032F C375 3C01 000A 05AF 032F
13292  >/                                IF:MISC1D- X2(775N,375N);
13293  >/    (774N)  LD-DA(NW:WB) RI1:NSACK IB:SUZEX DALU:IB WB:DALU               774   135C 7430 328E 2000 58AF 7B25
13294  >/                   CKHF ST-30:WB GP-MISC5:CO IF:BUS-ACK XW'ELS($PF-03):DALU
13295  >/    (375N)  LD-DW(NW:WB) RI1:BSACK IB:SUZEX DALU:IB WB:DALU               375   0250 7430 328E 2000 58AF 7B25
13296  >/                   CKHF ST-30:WB GP-MISC5:00 IF:BUS-ACK XW'ELS($PF-03):DALU
13297  >/    (775N)  LD-DJ(JK:WB) RI1:NSACK IB:SUZEX DALU:IB WB:DALU-1W            775   0250 7430 328E 2000 58AF 78A5
13298  >/                   CKHF ST-30:WB GP-MISC5:00 IF:BUS-ACK XW'ELS($PF-03):WB
13300  SKIP NUF;
13302  $IO-OUT  (77CN)  DALU:000000 J6:DALU ST-A7:WB GP-MISC6:00                   77C   032F 0779 200F 68AF 082C
13303  >/                                IF:MISC1E X2($IOW'CNFG,379N);
13304  >/    (375N)  RJ:A6 JB:RB BALU:WB LB-STALL'Y:DALU IB:F-VAL                  379   2185 C378 3C00 000E 04AF 832F
13305  >/                   CKHL                IF:IBUS16 X2($IOLD,378N);
13306  $     (378N)  LB-DW'RD-MEM-W RJ:A2 WB:RB-SL4 ST-A2:WB                       378   1A15 C777 3000 200A 04AF 03EF
```

```
                              RTL/6000 FILE EDIT
                             MICROPROGRAM SECTION

SEQUENCE: S&MCS

LINE #
13307  //                                IF:ODSIZ2 X2(777H,377H);          ADDRESS   IMAGE
13308  //   (777H) LD-STALL IB:A2                                          (HEX)     (HEX)
13309  //          CKHL                   IF:IBUS16 X2(778H,378H);
13310  //   (377H) LD-STALL                                                 777    0085 C378 3C00 000A 04AF 0B2F
13311  //                                                    GO-TO(77BH)    377    0000 C778 3000 0000 04AF 0B2F
13312  //   (778H) LD-DW(JA:WB) IB:SBZEX DALU:IB WB:DALU                    77B    0200 C35F 33C0 0000 04AF 7B25
13313  //                                                    GO-TO(35FH)    378    0200 0335 3300 0000 04AF 7A25
13314  //   (378H) LD-DW(JA:WB) IB:SBZEX DALU:IB WB:DALU-SW
13315  $IOLD                                                 GO-TO(35FH)    778    2A80 C357 6200 200A 51AF 03EF
13316  //   (778H) LD-RD-LOCAL(MPU,2) RB:A2 WB:RE-SL4 ST-A2:WB
13317  //          GP-MISC5:X1                                GO-TO(357H)
13318  //   (557H) LD-STALL NB:A2 WB:RB'U:RB GP-MISC5:10                    357    0000 C358 3CC0 000A 5AAF 072F
13319  //                                                    GO-TO(358H);
13320  //   (558H) LD-DA(WR:WB) IB:S0 DALU:IB WB:DALU-SL1'U:USL1             358   1340 C35D 31C0 200F 56AF 4F65
13321  //          CKHF ST-A7:WB GP-MISC5:00                 GO-TO(35DH);
13322  //   (55DH) I3:00FF(FFH) DALU:RB RB:A7 DALU:Rd-AND-NOT-IB WB:DALU     35D   0340 C35F 3CFF 200F 21AF FB2E
13323  //          CKHF ST-A7:WU GP-MISC5:X1                 GO-TO(35FH);
13324  //   (35FH) IB:A7 RB:E1 DALU:RU-OR-IB WB:DALU-SR1 BALU:WB             35F   210C C779 3C01 110F 056F 0AE7
13325  //          LB-STALL'Y:DALU GP-XBLOAD                 GO-TO(S1OW'CNFG)
13326  //   (37CH) LD-DA(JA:WB) BRA3O IB:SBZEX DALU:IB WB:DALU               370   02B4 C430 33C0 0000 22AF 7B25
13327  //          CKHL GP-MISC2:X0       IF:OVMASK \RI-I\ X2(430H,SPF-03)
13328  //   (43CH)_ID:0000(04H) RB:A1 DALU:RB-ADD-IB WB:DALU-SR1             430   2180 C779 3C04 0009 05AF CAD9
13329  //          CKHL BALU:WB LB-STALL'Y:BALU GP-XBLOAD-OFFSET
13330  //                                                    GO-TO(S1OW'CNFG);
13331  $IOW'CNFG
13332  //   (779H) LD-WR-10-W RB:E1 WB:R8 ST-A1:WB                          779    0836 C733 6000 3109 046F 032F
13333  $IO-EXIT                           IF:MISC28 X2(S1O-AS,S1O-EXIT);
13334  //   (333H) RII:BSACK                                                 333    0331 C785 308E 0000 04AF 0B2F
13335  //                                 IF:MISC2A X2(785H,3B5H);
13336  //   (3B5H) GP-LOAD:0'TRAF                                            3B5    0300 C7B5 3000 0000 67AF 0B2F
13337  //   (785H) LD-WR-LOCAL(CPU)                          GO-TO(785H);    785    2880 0C30 1C00 0000 04AF 0B2F
13338  //                                                    GO-TO(SPF-03);
13339  SKIP HOF;
13340  $XE:IO                             IF:MISC2A X2(46BH,U6BH);
13341  //   (59FH) WB:RI-TW ST-AC:WB GP-MISC0:00                             59F    0331 C46B 3000 2008 68AF 0B2F
13342  $XE:IOH                            IF:MISC2A X2(46BH,06BH);
13343  //   (59DH) WB:RI-TW ST-AD:WB GP-MISC6:00                             59D    0331 C46B 3000 2008 68AF 0B2F
13344  //                                 IF:MISC2A X2(46BH,06BH);
13345  //   (06BH) RB:30 JD:RB LB-DA(WA:WB) GP-MISC1:X1 FLINK:(B)            06B    1327 C75A A800 0000 11AF 032F
13346  //   (75AH) FLINK:(C) GP-MISC7:00                                     75A    0300 C35A ACC0 0000 78AF 03EF
13347  $XE:IOLD                                              GO-TO(S1O-XR1);
13348  //   (59CH) GP-MISC6:00                                               59C    0331 146A 3000 0000 68AF 0B2F
13349  //   (46BH) RB:B0 DALU:RB ST-E1:DALU GP-MISC7:00 BRAM81               46B    0336 1370 3000 D100 7B88 0B2F
13350  $IC-CL
13351  //   (771H) RB:E1 DALU:RB WB:RB-SR1 UALU:WB LB-DA'Y:HALU              771    25FC C37C 3CC1 1107 056F 02EF
13352  //          CKVL GP-XBLOAD         IF:DALU(31) X2(S1O-OUT,S1O-IN);
```

```
                           RTL/60C0 FILE EDIT
                           MICROPROGRAM SECTION

SEQUENCE: $$MCS                                     ADDRESS  IMAGE
                                                                           (HEX)    (HEX)
LINE #
13354  $XE:RFU-80B      (59EN)  WB:Y ST-A0:WB                   GO-TO($TVU5);   59E  0300 C312 3C00 2008 04AF 092F
13355    \\
13356  $XE:RFU-830      (59SN)  WB:Y ST-A0:WB                   GO-TO($TVU5);   599  0300 C312 3C00 2008 04AF 092F
13357    \\
13358  $XE:RFU-850      (595N)  WB:Y ST-A0:WB                   GO-TO($TVU5);   595  0300 C312 3C00 2008 04AF 092F
13359    \\
13360  $XE:RFU-858      (594N)  WB:Y ST-A0:WB                   GO-TO($TVU5);   594  0300 C312 3C00 2008 04AF 092F
13361    \\
13362  $XE:RFU-F10 ,    (58DN)  WB:Y ST-A0:WB                   GO-TO($TVU5);   58D  0300 C312 3C00 2008 04AF 092F
13363    \\
13364  $XE:CALL         (592N)  \ZX;                                            592  030C CCC0 3C00 0000 04AF 0B2F
13365  $XE:ENT          (588N)  WB:P ST-A0:WB BALU:WB                           588  2229 657A 3C00 2008 04AF 012F
13366    \\
13367  $XE:JMP          (598N)  WB:P ST-A0:WB BALU:WB LB-DW Y;BALU             598  2229 657A 3C00 2008 04AF 012F
                                IF:MISC0B XR'ELS($TV16-17A);
13368    \\
13369  $XE:LNJ          (588N)  WB:P ST-A0:WB BALU:WB LB-DW Y;BALU             588  2229 657A 3C00 2008 04AF 012F
                                IF:MISC0B XR'ELS($TV16-17A);
13370    (3*\
13371  $XF:LAB          (5A8N)  WB:P ST-A0:WB BALU:WB LB-DW Y;BALU             5A8  2229 657A 3C00 2008 04AF 012F
13372    (5*\                   IF:MISC0B XR'ELS($TV16-17A);
13373  SKIP HOF:
13374    \\
13375  $XE:LBF          (58FN)  LB-DW BRAMO IB:SB DALU:IB ST-DC;DALU FLINK:(0)  58F  0233 0068 AC00 C000 04AF 4625
                                IF:RB-SW'Q:HEXB
13376    \\
13377    \\              (58CN)  LB-DW BRAMO IB:SB DALU:IB ST-D0;DALU FLINK:(1)  58C  0233 CC68 A100 C000 04AF 4625
                                WB:RB-SW'Q:HEXB
13378  $XE:LB           (59AN)  LB-DW BRAMO IB:SB DALU:IB ST-D0;DALU FLINK:(2)  59A  0233 CC68 A200 C000 04AF 4625
                                WB:RB-SW'Q:HEXB
13379    \\
13380  $XE:LBC          (589N)  LB-DW BRAMO IB:SB DALU:IB ST-D0;DALU FLINK:(3)  589  0233 CC68 A300 C000 04AF 4625
                                WB:RB-SW'Q:HEXB
13381    \\
13382  $XE:LBS          (58BN)  LB-DW BRAMO IB:SB DALU:IB ST-D0;DALU           58B  0200 CC60 3C00 E000 04AF 4825
                                WB:RI-TW ST-B0:W3
13383    \\
13384    \\              (06CN)  IB:0000(16H) RB:30 DALU:RB-AND-1B              06C  0300 CC61 F410 0000 6EAF CA6D
                                WB:DALU-SR4 FASP:WB'RING-OUT GP-MISC6:1X        GO-TO(060N);
13385    \\
13386    \\                                                                                                    GO-TO(061N);
13387    \\              (061N)  FLINK:FB WB:RE-SW'Q:HEXB                        061  0333 CC68 EC00 0000 04AF 062F
13388    \\
13389  $XE:LBF          (468N)  LB-PW IB:SBZEX DALU:IB WB:DALU'Q:DALU           468  95FB 1468 3C00 0000 04AF 7F25
13390    \\                      CKVL
13391    \\              (465N)  RB:D1 WB:RH'Q:RB                                469  0300 CC68 3CC0 0100 046F 072F
                                                                                GO-TO(068N);
13392    \\
13393    \\              (068N)  IB:QZEX RB:00 DALU:RB-AND-1B WB:DALU RIB:0B-NZ  068  0300 5462 3096 0000 686F 3B2D
                                GP-MISC(6:00                                    XL($XL:LB)
13394  $XL:LBF          (46CN)  IB:QZEX RB:D0 DALU:RB-AND-NOT-1B WB:DALU ST-B0:WB 460  0300 5462 3200 2000 046F 382E
13395    \\
13396    \\                      CKHF LU-STALL'WW:WB                   IF:MISCOB-XW'ELS($IMO-XW);
13397  $XL:LBT          (461N)  IB:QZEX RB:D0 DALU:RB-OR-1B WB:DALU ST-B0:WB   461  0169 7C77 3200 2000 046F 3B27
13398    \\                      CKHF LU-STALL'WW:WB                   IF:MISCOB-XW'ELS($IMO-XW);
13399  $XL:LE           (462N)                                           XA;   462  9707 2CC8 CDC0 0000 64AF 0B2F
13400    \\
```

RTL/6000 FILE EDIT
MICROPROGRAM SECTION
SEQUENCE: $SACS

| LINE # | | | | ADDRESS (HEX) | IMAGE (HEX) | | | | | |
|---|---|---|---|---|---|---|---|---|---|---|
| 13401 | $XL:LDC | (463H) IB:OZEX RB:D0 DALU:RB-XOR-IB WB:DALU ST-BO:WB | | 463 | 0169 | 7C77 | 3200 | 2000 | 046F | 04AF | 3B26 |
| 13402 | \2\; | CKHF LB-STALL'WW:WB IF:MISCOB- XW'ELS(SIMO-XW); | | | | | | | | | |
| 13403 | $XE:LBF-KREG | (79EH) \Z\; | | 79B | 0300 | CCC0 | 3CC0 | 0000 | 046F | 04AF | OB2F |
| 13404 | $XE:LBT-KREG | (78FH) \Z\; | | 78F | 0300 | CCC0 | 3CC0 | 0000 | 046F | 04AF | OB2F |
| 13405 | $XE:LBT-KREG | (78CH) \Z\; | | 78C | 0300 | CCC0 | 3CC0 | 0000 | 046F | 04AF | OB2F |
| 13406 | $XE:LBS-KREG | (78EH) \Z\; | | 78B | 0300 | CCC0 | 3CC0 | 0000 | 046F | 04AF | OB2F |
| 13407 | $XE:LBC-KREG | (789H) \Z\; | | 789 | 0300 | CCC0 | 3CC0 | 0000 | 046F | 04AF | OB2F |
| 13408 | SKIP HOF; | | | | | | | | | | |
| 13409 | $XE:LDH | (5BAH) IB:0000(FFH) RB:D0 DALU:RB-AND-IB ST-D7NUM:DALU XA; | | 5BA | 9707 | 2008 | CDFF | C780 | 64AF | CB2D | |
| 13410 | \2\; | | | | | | | | | | |
| 13411 | $XE:LDH | (5BEH) RB:D0 DALU:RD ST-D7NUM:DALU XA; | | 5BE | 9707 | 2CC8 | CD00 | C780 | 64AF | OB2F | |
| 13412 | \2\; | | | | | | | | | | |
| 13413 | $XE:CMH | (5BCH) IB:00 RB:D7NUM DALU:RB-SUB-IB WB:DALU RIGLU:CMP CKHL | | 5BC | 9787 | 2CC8 | CDC6 | 0780 | 646F | OB06 | |
| 13414 | \1\; | | | | | | | | | | |
| 13415 | $XE:ORH | (5B6H) IB:00 RB:D7NUM DALU:RB-OR-IB ST-D7NUM:DALU XA; | | 5B6 | 9707 | 2CC8 | CD00 | C780 | 646F | OB27 | |
| 13416 | \1\; | | | | | | | | | | |
| 13417 | $XE:XOH | (5B2H) IB:00 RB:D7NUM DALU:RB-XOR-IB ST-D7NUM:DALU XA; | | 5B2 | 9707 | 2CC8 | CD00 | C780 | 646F | OB26 | |
| 13418 | \1\; | | | | | | | | | | |
| 13419 | $XE:ANH | (5B4H) IB:00 RB:D7NUM DALU:RB-AND-IB ST-D7NUM:DALU XA; | | 5B4 | 9707 | 2CC8 | CD00 | C780 | 64AF | OB2D | |
| 13420 | \3\; | | | | | | | | | | |
| 13421 | $XE:CLH | (5?GH) DALU:00(0000 WB:DALU ST-B0:WB LB-STALL'WW:WB | | 590 | 0100 | 7400 | 3200 | 2000 | 04AF | OB2C | |
| 13422 | \2\; | | | | | | | | | | |
| 13423 | $XE:STH | (5BOH) RJ:D7NUM WB:RB-TJ ST-B0:WB LB-STALL'WW:WB XW(4); | | 580 | 0100 | 7400 | 3200 | 2780 | 046F | OOAF | |
| 13424 | \1\; | | | | | | | | | | |
| 13425 | $XE:LDR | (5AFH) LB-DW'NXINST BRA3O IB:SBSEX DALU:IB ST-D7NUM:DALU XW(4); | | 5AF | 9607 | 2CC8 | CDC0 | C780 | 64AF | 6B25 | |
| 13426 | \1\; | | | | | | | | | | |
| 13427 | $XE:LDV | (5E7H) IB:00 DALU:IB ST-D7NUM:DALU XA; | | 5E7 | 9707 | 2CC8 | CD00 | C780 | 64AF | OB25 | |
| 13428 | \1\; | | | | | | | | | | |
| 13429 | $XE:LDV- | (5E6H) IB:00 DALU:IB ST-D7NUM:DALU XA; | | 5E6 | 9707 | 2CC8 | CD00 | C780 | 64AF | OB2F | |
| 13430 | \1\; | | | | | | | | | | |
| 13431 | $XE:AND | (5B5H) LB-DW'NXINST BRAMO IB:SBSEX RB:D7NUM DALU:RB-AND-IB ST-D7NUM:DALU | | 5B5 | 9607 | 2008 | CD00 | C780 | 646F | 6B2D | |
| 13432 | \1\; | | | | | | | | | | |
| 13433 | $XE:OR | (5B7H) LB-DW'NXINST BRAMO IB:SBSEX RB:D7NUM DALU:RB-OR-IB ST-D7NUM:DALU | | 5B7 | 9607 | 2CC8 | CD00 | C780 | 646F | 6B27 | |
| 13434 | \1\; | | | | | | | | | | |
| 13435 | $XE:XOR | (5B3H) LB-DW'NXINST BRAMO IB:SBSEX RB:D7NUM DALU:RB-XOR-IB ST-D7NUM:DALU | | 5B3 | 9607 | 2CC8 | CD00 | C780 | 646F | 6B26 | |
| 13436 | \1\; | | | | | | | | | | |
| 13437 | $XE:ADD | (5AEH) LB-DW BRAMO IB:SBSEX RB:D7NUM DALU:RB-ADD-IB ST-D7NUM:DALU RIOC:ADD | | 5AB | 02FA | 1156 | 3C84 | C780 | 646F | 6B19 | |
| 13438 | \1\; | | | | | | | | | | |
| 13439 | | IF:DOVFL- X2(SPF-55,$DIVOV); | | | | | | | | | |
| 13440 | $PF-55 | (557H) | | 557 | 9707 | 2CC8 | CD00 | 0000 | 64AF | OB2F | |
| 13441 | \1\; | | | | | | | | | | |
| 13442 | $XE:ADV | (5E3H) IB:00 RB:D7NUM DALU:RB-ADD-IB ST-D7NUM:DALU | | 5E3 | 03FA | 1156 | 3084 | C780 | 046F | OB19 | |
| 13443 | \1\; | CKVL RIOC:ADD IF:DOVFL- X2(SPF-55,$DIVOV); | | | | | | | | | |
| 13444 | $XE:ADV- | (5E2H) IB:00 RB:D7NUM DALU:RB-ADD-IB ST-D7NUM:DALU | | 5E2 | 03FA | 1156 | 3084 | C780 | 046F | OB19 | |
| 13445 | \1\; | CKVL RIOC:ADD | | | | | | | | | |
| 13446 | $XE:SUB | (5BBH) LB-DW BRAMO IB:SBSEX RB:D7NUM DALU:RB-SUB-IB | | 5BB | 02FA | 1156 | 3C84 | C780 | 046F | 6B06 | |
| 13447 | | CKVL ST-D7NUM:DALU RIOC:ADD | | | | | | | | | |

RTL/6000 FILE EDIT
MICROPROGRAM SECTION

SEQUENCE: $$MCS

| LINE # | | | | ADDRESS (HEX) | IMAGE (HEX) | | | |
|---|---|---|---|---|---|---|---|---|
| 13448 | | | IF:DOVFL- X2($PF-SS,$DIVUV); | 58C | 0200 | 018C | 3CC0 | C000 04AF 4B25 |
| 13449 | $XE:CMZ | \\ | (58C#) LB-DW IB:SD UNAMO DALU:IB ST-DO:DALU | | | | | |
| 13450 | $XE:CMR | \1\ | GO-TO(18C#); | 18C | 9707 | 2CC8 | CDC6 | 0000 646F 330C |
| 13451 | | \2\ | (18C#) RB:00 WB:RB DALU:0'CARRY IU:UZEX RIGLU:CMP XA; | | | | | |
| 13452 | $XE:CMR | \1\ | (5AD#) LB-DW'HXINST BRAMO IB:SBSEX RE:D7NUM | 5AD | 9687 | 2CC8 | CDC6 | 0780 646F 6B06 |
| 13454 | | | CKHL DALU:RB-SUB-IB WB:DALU RIGLU:CMP XA; | | | | | |
| 13455 | $XE:CNV | \1\ | (5E5#) LB-DW'HXINST ERAMO IB:SUSEX RE:D7NUM | 5E5 | 9687 | 2CC8 | CDC6 | 0780 646F 6B06 |
| 13456 | | | CKHL DALU:RB-SUB-IH WB:DALU RIGLU:CMP | | | | | |
| 13457 | $XF:CNV- | \1\ | (5E4#) LJ-DW'HXINST BRAMO IB:SBSEX RB:D7NUM | 5E4 | 9687 | 2CC8 | CDC6 | 0780 646F 6B06 |
| 13458 | | | CKHL DALJ:RB-SUB-IJ WJ:DALU RIGLU:CMP XA; | | | | | |
| 13459 | SKIP HOF; | | | | | | | |
| 13460 | $XE:NEG | \1\ | (59E#) LB-DW BRAMO IB:SUSEX DALU:NOT-IB ST-DO:DALU | 59B | 020C | C15A | 3C00 | C000 04AF 6B2A |
| 13461 | | | GO-TO(19A#); | | | | | |
| 13462 | | $ | (19A#) RB:DO DALU:RB-ADD1 WB:DALU ST-B0:WB LB-STALL'WW:WB | 19A | 01A9 | 7077 | 3284 | 2000 046F 0B00 |
| 13463 | $XE:CPL | \1\ | CKHL RICC:ADD | | | | | |
| 13464 | | \2\ | (593#) LB-DW(WW:WB) BRAMO IB:SBSEX DALU:NOT-IB WB:DALU | 593 | 0269 | 7C77 | 3200 | 2000 04AF 6B2A |
| 13465 | | | CKHF ST-DO:WB | | | | | |
| 13466 | $XE:DEC | \1\ | (58E#) RB:30 DALU:RB-SUB1 WB:DALU ST-BO:WB LB-STALL'WW:WB | 58E | 01A9 | 7C77 | 32A4 | 2000 04AF 0B1F |
| 13467 | | | CKHL BALU:WB RIOCB:INC | | | | | |
| 13468 | $XE:INC | \1\ | (58A#) RB:80 DALU:RB-ADD1 WB:DALU ST-B0:WB LB-STALL'WW:WB | 58A | 02A9 | 7C77 | 32A4 | 2000 04AF 0B00 |
| 13469 | | | CKHL IB:90 BALU:IB RIOCB:INC | | | | | |
| 13470 | | | IF:MISCOB- XW'ELS($IMO-XW); | | | | | |
| 13471 | $XE:CAD | \1\ | (582#) LB-DW BRAMO IB:SUSEX DALU:IB ST-E0:DALU RIO:0 | 582 | 0220 | C157 | 3082 | D000 04AF 6B26 |
| 13472 | | | IF:RI-CARRY- X2($PF-SS,157#); | | | | | |
| 13473 | | \3\ | (157#) RB:E0 DALU:RB-ADD1 WB:DALU ST-B0:WB LB-STALL'WW:WB | 157 | 01A9 | 7077 | 3284 | 3000 046F 0B00 |
| 13474 | | | CKHL RIOC:ADD | | | | | |
| 13475 | $XE:CL | \1\ | (591#) DALU:00000 WB:DALU ST-B0:WB LB-STALL'WW:WB | 591 | 0129 | 7C77 | 32C0 | 2000 04AF 0B2C |
| 13476 | | \2\ | CKHF ST-DO:WB | | | | | |
| 13477 | $XE:STH | \1\ | (5A1#) RB:D7NUM WB:RB ST-B0:WB LB-STALL'WW:WB | 5A1 | 0129 | 7C77 | 32C0 | 2780 04AF 032F |
| 13478 | | | IF:MISCOB- XW'ELS($IMO-XW); | | | | | |
| 13479 | $XE:SWR | \1\ | (5A3#) LB-DW(WW:WB) BRAMO IB:SBSEX DALU:IB ST-D7NUM:DALU | 5A3 | 0229 | 7C77 | 3200 | E780 04AF 6325 |
| 13480 | | | RB:D7NUM WB:RB ST-B0:WB | | | | | |
| 13481 | | | IF:MISCOB- XW'ELS($IMO-XW); | | | | | |
| 13482 | $XE:SRH | \1\ | (5AA#) LB-DW BRAMO IB:SUSEX RB:D7NUM DALU:RB-XOR-IB | 5AA | 0240 | C1AA | 3000 | 2780 046F 6B26 |
| 13483 | | | GO-TO(1AA#); | | | | | |
| 13484 | | $ | (1AA#) LB-PW IU:SRZEX DALU:IR ST-DO:DALU WB:DALU | 1AA | 95FB | C5E8 | 3000 | C000 04AF 7B25 |
| 13486 | | | IF:OBUS-ZERO X2(5E8#,1E8#); | | | | | |
| 13487 | | \3\ | (1E8#) IB:H0 RB:D0 DALU:IB-AND-NOT-RB LB:DALU ST-B0:WB | 1E8 | 0340 | C1AB | 3000 | 2000 046F 0B24 |
| 13488 | | | GO-TO(1AB#); | | | | | |
| 13489 | $XE:STS | \1\ | (5E8#) IB:00 RB:D1 DALU:IB-AND-NOT-RB WB:DALU ST-B0:WB | 5E8 | 0340 | C1AB | 3000 | 2100 046F 0B24 |
| 13490 | | | GO-TO(1AB#); | | | | | |
| 13491 | | \3\ | (1AB#) IB:00 RB:D7NUM DALU:RB-XOR-IB WB:DALU ST-B0:WB | 1AB | 0169 | 7077 | 3200 | 2780 046F 0B26 |
| 13492 | | \3\ | CKHF LB-STALL'WW:WB | | | | | |
| 13493 | | $ | (587#) WB:IS ST-DO:WB FLINK:(0) | 587 | 032C | C788 | A000 | 2000 04AF 006F |
| 13494 | $STS-SAF | | IF:LAFMODE X2($STS-LAF,$STS-SAF); | | | | | |
| 13495 | | | (388#) IB:0000(3F#) RB:IV DALU:RB-AND-IB | 388 | 0340 | C1B1 | 3C3F | 3508 046F CBAD |

RTL/6000 FILE EDIT
MICROPROGRAM SECTION

```
LINE #              SEQUENCE: SSMCS                                                          ADDRESS  IMAGE
                                                                                             (HEX)    (HEX)
13495
13496  $STS-LAF   \3*\         CKHF  WB:DALU-SL2 ST-AO:WB             GO-TO(181N)             788  0340 C181 307E 3508 046F CB6D
13497         \3*\   (788N) LB:0000(7EN) RB:IV DALU:RB-AND-1B         GO-TO(181N)
13498         $              CKHF  WB:DALU-SL1 ST-AO:WB                                       181  0300 C188 3000 1500 046F FF20
13499         \3*\   (181N) 1B:00FF(00N) RB:IV DALU:RB-AND-1B WB:DALU'Q:DALU
13500         \3*\                                                    GO-TO(188N)
13501         \3*\   (188N) 1D:0ZEX RB:AO DALU:RB-OR-1B WB:DALU'Q:DALU                        188  0300 C183 3C00 0008 04AF 3F27
13502         \3*\   (183N) 1B:00FF(FFN) RB:90 DALU:RB-AND-NOT-1B ST-E1:DALU                  183  031D CC2E 3CFF D100 04AF FB2E
13503         \3*\                         IF;MISC6B X2(62EN,22EN);
13504         \3*\   (62EN) 1B:0000(20N) RB:B0 DALU:RB-OR-1B WB:DALU ST-BO:WB                 62E  0340 C22E 3020 2000 04AF CB27
13505         \3*\                                                    GO-TO(22EN)
13506         $     (22EN) 1B:0000(E0N) RB:30 DALU:RB-AND-1B WB:DALU-SW                       22E  0340 C187 30E0 2000 04AF CA2D
13507         \3*\           CKHF ST-BO:WB                            GO-TO(187N)
13508         \3*\   (187N) 1B:B0 RB:E1 DALU:RB-OR-1B WB:DALU-SL1 ST-BO:WB                    187  0340 CCE6 3000 3100 046F 0B67
13509         $              CKHF                                                             0B6  0240 5600 3200 2000 04AF 3AA7
13510         \3*\   (0B6N) 1B:3ZEX RB:B0 DALU:RB-OR-1B WB:DALU-SR2 ST-BO:WB
13511         \3*\           CKHF LB-D4(WW:WB)                        XL(SXL:STS)
13512  $XL:STS                                                                                600  0329 7C77 3CC0 0000 04AF 0B2F
13513         \3*\
13514  SKIP HJF:
13515         $               IF:MISCOC- XW'ELS(SIMO-XW);
13516  $XE:LDJ-SAF \1*\                                                                       5A6  9647 2CC8 CE00 2027 64AF 7B25
13517         \1*\   (5A6N) LB-DW'NXINST 1B:SUZEX DALU WB:DALU ST-B7NUM:WB
13518  $XE:LDJ-LAF \1*\           CKHF                                                        7A6  9747 2CC8 CDC0 2027 64AF 4B25
13519         \1*\   (7A6N) LB-DA'NXINST 1B:SB    DALU WE:DALU ST-B7NUM:WD
13520         \1*\           CKHF                                     XA;
13521  $XE:LDJ-IMO'RG \1*\                                                                    6A6  9707 2CC8 CD00 2027 64AF 092F
13522         \1*\   (6A6N) WB:Y ST-B7NUM:WB                          XA;
13523  $XE:CMN-SAF \2*\                                                                       584  2200 CCE4 3000 0000 04A5 7B2F
13524         \2*\   (584N) LB-DW'Y:DALU 1B:SDZEX DALU:1B
13525         \2*\                         GO-TO(BXE;CMN-1MO'RG)
13526  $XE:CMN-LAF \2*\                                                                       784  02FB C5F9 3CC0 0008 04AF 4B2D
13527         \2*\   (784N) LJ-DW 1B:SB RB:AO DALU:RB-AND-1B WB:DALU
13528         $                           IF:OBUS-ZERO X2(5F9N,1F9N);
13529         \2*\           CKVL                                     XA;
13530  $XE:CMN-IMO'RG \1*\                                                                    1F9  9787 2CC8 CDC6 1008 646F 0B06
13531         \1*\   (1F9N) 1B:AO RB:EO DALU:RB-SUE-1B RIGLU:CMP
13532         \1*\           CKHL                                     XA;
13533  $XE:CPB-SAF \2*\   (5F9N) LB-DA'NXINST 1B:SB RB:EO DALU:RB-ADD1-1B WB:DALU              5F9  9787 2CC8 CDC6 1000 646F 4B09
13534         $              CKHL RIGLU:CMP                                                   684  9707 2CC8 CDC6 0000 64AF 090C
13535         \2*\   (684N) WB:Y DALU:0'CARRY RIGLU:CMP
13536  $XE:CPB-SAF \2*\                                                                       5A4  9687 2CC8 CDC6 0000 64AF 7B06
13537         \2*\   (5A4N) LB-DW'NXINST 1B:SB RB:AO DALU:RB-AND-1B WB:DALU
13538         $              CKHL WB:DALU RIGLU:CMP                                           7A4  02FB 1716 3000 0008 04AF 4B2D
13539         \2*\   (7A4N) LB-DW 1B:SB RB:AO DALU:RB-AND-1D WB:DALU
13540         $                           IF:OBUS-ZERO X2(717N,316N);
13541         \1*\           CKHL                                     XA;
13542  $XE:CMB-LAF \2*\                                                                       316  9787 2CC8 CDC6 0008 64AF 0B16
13543         \3*\   (316N) 1D:AO RB:AO DALU:RB-SUE1-1B WE:DALU RIGLU:CMP
13544         \1*\           CKHL                                     XA;
13545         \1*\   (717N) LB-DA'NXINST 1B:SB RB:B7NUM DALU:RB-SUB-1B WB:DALU                 717  9787 2CC8 CDC6 0027 64AF 4B06
13546         \1*\           CKHL RIGLU:CMP                           XA;
13547  $XE:CMB-1MO'RG \1*\                                                                    6A4  9787 2CC8 CDC6 1027 646F 0B09
13548         \1*\   (6A4N) 1B:B7NUM RB:EC DALU:RB-ADD1-1B WB:DALU RIGLU:CMP
13549         \1*\           CKHL                                     XA;
13550  $XE:ST0-K \1*\                                                                         7A0  1300 7400 3300 0027 04AF 072F
13551         \1*\   (7A0N) RB:B7NUM WB:RG'Q:RB  LB-DA(WA:WB)
```

RTL/6000 FILE EDIT
MICROPROGRAM SECTION

SEQUENCE: $SMCS

| LINE # | | | | ADDRESS (HEX) | IMAGE (HEX) |
|---|---|---|---|---|---|
| 13542 | \\ | | XW(4); | | |
| 13543 | $XE:STB-IMO*RG | (6ACH) RB:D7NUM DALU:RB ST-EO:DALU | | 6A0 | 0329 7C3D 3C00 D027 04AF 0B2F |
| 13544 | \1*\ | | IF:MISCOB- XW*ELS(O3DH) | | |
| 13545 | $ | (03DH) RU:B0 WB:RB BALU:WB-ADD1 LB-DA*Y:BALU | XW(4); | 03D | 2300 7400 3000 0000 0480 032F |
| 13546 | | | | | |
| 13547 | $XE:SWB-SAF | (5A2H) RB:D7NUM WB:RB LB-DW(WW:WB) IE:SBZEX DALU:IB | | 5A2 | 0200 C3A2 3200 D027 04AF 7325 |
| 13548 | \2*\ | ST-EO:DALU | GO-TO(3A2H) | | |
| 13549 | $XE:SWB-LAF | (7A2H) RB:D7NUM WB:RB*Q:RB LB-DA(WA:WB) 1B:SB DALU:IB | | 7A2 | 1300 C3A2 3300 D027 04AF 4725 |
| 13550 | \2*\ | ST-EO:DALU | GO-TO(3A2H) | | |
| 13551 | $ | (3A2H) RB:EO WB:RB ST-D7NUM:WB IB:D7NUM DALU:IB | XW(4); | 3A2 | 0300 7400 3C00 F027 04AF 0325 |
| 13552 | | ST-EO:DALU | | | |
| 13553 | $XE:SWB-IMO*RG | (6A2H) RB:D7NUM DALU:IB ST-EO:DALU WB:Y ST-B7NUM:WB | | 6A2 | 0329 7C3D 3C00 F027 04AF 0925 |
| 13554 | \2*\ | | IF:MISCOB- XW*ELS(O3DH) | | |
| 13555 | SKIP HOF; | | | | |
| 13556 | $XE:AID | (597H) LJ-DA BRAMO IB:SB RB:D7 DALU:RB-ADD-IB ST-D7:DALU | | 597 | 13F8 0104 3C00 C700 046F 4B19 |
| 13557 | \3*\ | CKVL | IF:DCARRY16 X2(504H,104H); | | |
| 13558 | $ | (104H) IB:A0 RB:D6 DALU:RB-ADD-IB ST-D6:DALU RIOC:ADD | | 104 | 03FA 1530 3C84 C608 046F 0B19 |
| 13559 | | CKVL | IF:DOVFL X2(531H,SPF-13); | | |
| 13560 | $ | (504H) IU:A0 RB:D6 DALU:RB-ADD-IB ST-D6:DALU RIOC:ADD | | 504 | 03FA 1530 3C00 C700 046F 0809 |
| 13561 | | CKVL | IF:DOVFL X2(531H,SPF-13); | | |
| 13562 | $XE:SIB | (596H) LB-DA BRAMO IB:SB RB:D7 DALU:RB-SUB-IB ST-D7:DALU | | 596 | 13F8 C13D 3C00 C700 046F 4806 |
| 13563 | \3*\ | CKVL | IF:DCARRY16 X2(55DH,13DH); | | |
| 13564 | $ | (13DH) IB:A0 RB:D6 DALU:RB-SUB1-IB ST-D6:DALU RIOC:ADD | | 13D | 03FA 1530 3084 C608 046F 0B16 |
| 13565 | | CKVL | IF:DOVFL X2(531H,SPF-13); | | |
| 13566 | $ | (53DH) IB:A0 RB:D6 DALU:RB-SUB-IB ST-D6:DALU RIOC:ADD | | 53D | 03FA 1530 3C84 C608 046F 0B06 |
| 13567 | | CKVL | IF:DOVFL X2(531H,SPF-13); | | |
| 13568 | $ | (531H) RB:M1 WB:RB-SR1 ST-B0:WB | | 531 | 0300 0196 3000 3900 046F 02EF |
| 13569 | | | GO-TO(196H); | | |
| 13570 | $ | (196H) RB:B0 | | 196 | 0380 C158 3CC0 0000 04AF 0B2F |
| 13571 | | CKHL | IF:RBUS16 X2(STV06,SPF-15); | | |
| 13572 | $XE:LDI | (586H) LB-DA BRAMO IB:SB DALU:IB ST-D7:DALU | | 586 | 1300 C186 3C00 C700 04AF 4B25 |
| 13573 | \3*\ | | GO-TO(186H); | | |
| 13574 | $ | (186H) IB:A0 DALU:IB ST-D6:DALU | | 186 | 9707 2CC8 CD00 C608 64AF 0B25 |
| 13575 | $XE:SDI | (585H) RB:D7 WU:RB ST-B0:WB | XA; | 585 | 0300 C185 3C00 2700 046F 032F |
| 13576 | \3*\ | | | | |
| 13577 | $SDI2 | (185H) RB:RB ST-AD:WB LB-STALL*WW:WB | | 185 | 0100 7400 32C0 2608 046F 032F |
| 13578 | \3*\ | | | | |
| 13579 | $ | (5E1H) RB:B0 WB:RB*Q:RB RIO:0 GP-MISC7:10 IH:BO BR-3WAY | | 5E1 | 03BD C341 3C82 0000 7AB4 072F |
| 13580 | SKIP HOF; | | IF:IBUS31 X2(741H,341H); | | |
| 13581 | $XE:MLV | (5E0H) RB:B0 WB:RB*Q:RH RIO:0 GP-MISC7:10 IB:BO BR-3WAY | | 5E0 | 03BD C341 3C82 0000 7AB4 072F |
| 13582 | \3*\ | CKHL | IF:IBUS31 X2(741H,341H); | | |
| 13583 | $XE:MLV- | (5A9H) LB-DW BRAMO IE:SBSEX DALU:IB WB:DALU*Q:DALU RIO:0 | | 5A9 | 02BD C341 3C82 0000 7AB4 6F25 |
| 13584 | \3*\ | CKHL GP-MISC7:10 BR-3WAY | IF:IBUS31 X2(741H,341H); | | |
| 13585 | $XE:MUL | (341H) DALU:0G000 WB:DALU-SR1*Q:QSR1 ST-B0:WB FSEL:(D) | | 341 | 0300 1343 9D00 2000 04B4 0EEC |
| 13586 | \3*\ | BR-3WAY | | | |
| 13587 | $ | (741H) RU:D7NUM WB:RB-SR1*Q:QSR1 ST-EO:WB FSEL:(D) | | 741 | 0300 1343 9DC0 2780 0474 06EF |

```
                           RTL/6000 FILE EDIT
                          MICROPROGRAM SECTION                              ADDRESS   IMAGE
                                                                            (HEX)     (HEX)

LINE #
15590  \3*\                 SEQUENCE: $$MCS
15591  \       BR-3WAY                 IF:FALSE X2(,343H,342H);              342   0519 1343 8000 2000 0484 06EF
15592  \2*\                             IF:SELZERO'DEC X2(742H,343H,342H):WB BR-3WAY
15593  \2*\         CKHL ST-30:WB BR-3WAY                                    343   0399 1343 BC00 2000 2780 0474 0ED9
15594  //                              IF:SELZERO'DEC X2(742H,343H,342H);
15595  \3*\ (742H) R3:D7NUM DALU:NOT-RB ST-D7NUM:DALU IB:QZEX                742   03BD C352 3000 3000 C780 046F 3B20
15596  \3*\                              IF:IBUS31 X2(752H,352H,352H);
15597  \3*\ (352H) R3:D0 4B:RB-SR1'Q:QSR1 ST-80:WB                           352   031B C351 3000 3000 2000 04AF 06EF
15598  \3*\         CKHL                 IF:NUM7 X2(751H,351H)Q:QSR1
15599  \3*\ (752H) R3:00 R3:D7NUM DALU:RB-ADD1-IB WE:DALU-SR1'Q:QSR1         752   039B C351 3000 3000 2780 046F 0EC9
15600  \3*\         CKHL ST-30:WB                                            
15601  \3*\                              IF:NUM7 X2(751H,351H);
15602  \3*\ (351H) R3:00 4B:RB-SR1'Q:QSR1 ST-80:WB                           351   038S C353 3000 3000 C780 046F 3B20
15603  \3*\         CKHL                 IF:IBUS16 X2(753H,353H);
15604  \3*\ (353H) RH:00 WB:RA                                               353   03FB C55C 3000 0000 04AF 032F
15605  \3*\         CKVL                 IF:OBUS-ZERO X2(55CH,$DIVOV2);
15606  \3*\ (753H) R0:B0 DALU:RB-ADD1                                        753   03E3 C15C 3000 0000 04AF 0800
15607  \3*\         CKVL                 IF:DCARRY8 X2(55CH,$DIVOV2);
15608  \3*\ (751H) R3:B0 DALU:RB ST-D6:DALU                                  751   0300 C55C 3C00 C600 04AF 0B2F
15609  \3*\         CKVL                                         GO-TO(55CH);
15610  \3*\ (55CH) IB:QZEX DALU:IB ST-D7NUM:DALU              XA;            55C   9707 2CC8 C780 64AF 3B25
15611  //                                                                   
15612  $XE:DIV  \3*\ (509H) LW-DW BRAM0 IB:SJSEX DALU:IB ST-D0:DALU WB:DALU  509   0285 C150 3C00 E000 79AF 6B25
15613  \3*\         CKHL ST-30:WB GP-MISC7:C1 IF:IBUS16 X2(550H,150H):WB     
15614  \3*\ (150H) R3:80 DALU:NOT-RB ST-EG:DALU                              150   031B C151 3C00 D000 04AF 0B20
15615  \3*\                              IF:NUM7 X2(551H,151H);
15616  \3*\ (550H) DALU:NOT-RB ST-E0:DALU GP-MISC1:1X                        550   031B C151 3000 0000 1EAF 0B20
15617  \3*\         CKHL                 IF:NUM7 X2(551H,151H);
15618  \3*\ (151H) R1:D7NUM WB:RB'Q:RB                                       151   03B0 C152 3C00 0780 046F 072F
15619  \3*\         CKHL                 IF:RBUS16- X2(552H,152H);
15620  \3*\ (551H) R3:D7 4B:RB'Q:RB                                          551   032E C553 3000 0700 046F 072F
15621  \3*\                              IF:RBUS16 X2(553H,153H);
15622  \3*\ (152H) 13:00 RB:E0 DALU:RU-ADD1-IB WE:DALU ST-B0:WB              152   032E 0554 3000 2000 04AF 0F6C
15623  \3*\         CKHL FLIJK:(A) BR-3WAY IF:MISC1A X2(554H,154H);
15624  \3*\ (552H) DALU:FFFFFF WD:DALU-SL1'Q:QSL1 ST-B0:WB                   552   032E C155 3C00 2000 04AF 0F63
15625  \3*\         CKHL                 IF:MISC1A- X2(555H,155H);
15626  \3*\ (553H) R3:D6 4B:RB-SL1'Q:QSL1 ST-00:WB                           553   03B0 1555 3000 2600 046F 076F
15627  \3*\         CKHL                 IF:NUM7- X2(554H,155H);
15628  \3*\ (1543H) 13:00 R0:E0 DALU:RU-ADD1-IB WE:DALU ST-B0:WB             154   03B0 1154 3000 2600 046F 076F
15629  \3*\         CKHL FLIJK:(A) BR-3WAY IF:DCARRY8- X2(556H,$DIVOV):WB
15630  $\+/+\ (154H) 15:00 R0:E0 DALU:R0-ADD-IB WD:DALU ST-B0:WB             154   03E3 C556 AA00 3000 0474 0B09
15631  \3*\         CKVL FLIJK:(A) BR-3WAY IF:DCARRY8- X2(556H,$DIVOV);
15632  \3*\ (154H) 15:00 R0:E0 DALU:R0-ADD-IB WD:DALU ST-B0:WB               154   03E3 C556 AA00 3000 0474 0B09
15633  \3*\ (554H) 13:00 RE:D0 DALU:RB-ADD-IB WD:DALU ST-B0:WB               554   03E3 C556 AB00 2000 0474 0B19
15634  $\-/-\ (555H) 13:00 R0:D0 DALU:R0-ADD-IB WD:DALU ST-B0:WB             555   03E3 C156 AF00 2000 1174 0B19
15635  \3*\         CKVL FLIJK:(I) BR-3WAY
15636  //                              IF:DCARRY8 X2(556H,$DIVOV);
```

```
RTL/6000 FILE EDIT
MICROPROGRAM SECTION

SEQUENCE: $$MCS                                                     ADDRESS  IMAGE
                                                                                        (HEX)    (HEX)
LINE #
13637  $\-/-\       (155#) IB:00 RB:E0 DALU:RB-ADD1-1B WB:DALU ST-B0:WB                 155      03E3 C156 AE00 3000 1174 0B09
13638  \3*\                CKVL FLINK:(E) GP-MISC1:X1 BR-3WAY
13639  \\                                          IF:DCARRY8 X2(556#,$DIVOV);
13640  \3*\         (556#) VL HB:90 DALU:K0 WU:RB-SL1'Q:USL1 ST-B0:WB RIO:0             556      03C0 114D 9E82 2000 04B4 076F
13641  \3*\                CKVL FSEL:(E) BR-3WAY   IF:FALSE X2(,14D#,14C#);
13642  \USIIN = DALU8<EJ>MISC1A\
13643  \2*\         (14D#) VL IB:00 RB:E0 DALU:RB-ADD1-1B WB:DALU ST-B0:WB              14D      03D9 114D 8C00 3000 0474 0F49
13644  \2*\                CKVL ST-00:WB BR-3WAY
13645  \\                                          IF:SELZERO'DEC X2(54C#,14D#,14C#);
13646  \2*\         (14C#) VL IB:00 RB:D0 DALU:RB-ADD-1B WB:DALU-SL1'Q:USL1             14C      03D9 114D 8000 2000 0474 0F59
13647  \2*\                CKVL ST-U0:4B BR-3WAY
13648  \\                                          IF:SELZERO'DEC X2(54C#,14D#,14C#);
13649  \3*\         (54C#) ID:UZEX DALU:IB ST-KC:DALU RB:B0 WB:RB-SR1                   54C      03BE C14E 3C00 E800 04AF 32E5
13650  \3*\                CKHL ST-U0:WB           IF:REMAINDER-OK X2(54E#,14E#);
13651  \3*\         (14E#) VL IB:00 RB:E0 DALU:RB-ADD-1B WB:DALU ST-B0:WB               14E      03FB CC7D 3C00 0000 04AF 032F
13652  \3*\                CKHL RB:80 WB:RB
13653  \\                                          IF:OBUS-ZERO- X2(47D#,07D#);
13654  \3*\         (54E#) RU:B0 WB:RB                                                  54E      03FB 5C7D 3CCC 0000 04AF 032F
13655  \\           (U7D#)                         IF:OBUS-ZERO- XL'ELS(U7D#);
13656  \3*\         (47D#) RJ:K0 WB:RB ST-A0:WB                                         07D      032E 107B 3C00 2808 046F 0B2F
13657  \3*\                CKHL                    IF:MISC1A- X2(47C#,07C#);
13658  \3*\         (07C#) IB:B0 RU:D0 DALU:RB-ADD-1B WB:DALU ST-B0:WB                  47D      03B0 C55D 3000 2808 046F 0B00
13659  \3*\                CKHL                                   GO-TO(55D#);
13660  \3*\         (47C#) IB:B0 RU:D0 DALU:RB-ADD-1B WB:DALU                           07C      03B0 C55D 3C00 2000 046F 0B2F
13661  \3*\                CKHL                    IF:OBUS-ZERO- X2(SXL:DIV-P'P,07A#);
13662  \3*\         (47F#) IB:B0 RU:D0 DALU:RB-ADD-IU WB:DALU                           47C      0380 C47B 3C00 3000 046F 0B09
13663  \\                                          IF:OBUS-ZERO- X2(SXL:DIV-P'M,07A#);
13664  $XL:DIV-P'P  (47E#) RU:K0 WB:RB ST-A0:WB                                         47B      0380 1C7A 3C00 2000 04AF 0B19
13665  \3*\                CKHL                                   GO-TO(55D#);
13666  $XL:DIV-P'M  (47A#) DALU:000000 WB:DALU ST-A0:WB                                 47A      032E 1C7B 3C00 3000 04AF 0B2C
13667  \3*\                                        IF:MISC1A- X2(SXL:DIV-P'P,07A#);
13668  $XL:DIV-M'P  (07A#) RJ:K0 DALU:RB-ADD1 WE:DALU ST-A0:WB                          07A      03FA 115C 3C00 2808 046F 0B00
13669  \3*\                CKHL                    IF:DOVFL- X2(55D#,$DIVOV2);
13670  \3*\         (55D#) RJ:A0 DALU:RB ST-D7NUM:DALU                                  55D      031B 3CC0 C788 04AF 0B2F
13671  \\                                          IF:NUM7 X2(559#,159#);
13672  \3*\         (559#) RJ:B0 DALU:RB-SUB1      RIC:DCARRY6             XA;          559      9707 2CC8 CE81 0000 64AF 0B1F
13673  \3*\         (159#) RI0:1 RB:M1 GP-INIT                             XA;          159      9707 2CC8 CDC0 C600 64AF 0B2F
13674  \3*\                CKHL
13675  $DIVOV       (156#) RI0:1 RU:M1 GP-INIT                                          156      03B4 3C83 1900 646F 0B2F
13676  \3*\                                        IF:OVMASK X2(31V06,3PF-15,SPF-15);
13677  \3*\                CKHL
13682  $DIVOV2      (15C#)                                                              15C      03B4 C558 3C83 1900 646F 0B2F
```

RTL/6000 FILE EDIT
MICROPROGRAM SECTION

| LINE # | | | | SEQUENCE: $SMCS | ADDRESS (HEX) | IMAGE (HEX) | | | | |
|---|---|---|---|---|---|---|---|---|---|---|
| 13684 | | | | IF:OVMASK X2($TV06,$PF-15); XA; | 158 | 9707 | 2CC8 | CCC0 | 0000 | 64AF | 0B2F |
| 13685 | $FF-15 | | | | | | | | | | |
| 13686 | SKIP HOF; | | | CKHL | | | | | | | |
| 13687 | $XE:SLD-K | \\ | | (15&#) | | | | | | | |
| 13688 | $XE:SAD-K | \\ | | (5AEH) WB:ZS ST-B0:WB IF:SIPTRAP- X2(6EE#,2EE#); | 5AE | 0301 | 0EEE | 3000 | 2000 | 04AF | 0B2F |
| 13689 | $XE:SPL-K | \\ | | (5ACH) WB:ZS ST-B0:WB IF:SIPTRAP- X2(6EE#,2EE#); | 5AC | 0301 | CEEE | 3CC0 | 2000 | 04AF | 006F |
| 13690 | $XE:SPL-K | \\ | | (5A7H) WB:ZS ST-B0:WB IF:SIPTRAP- X2(6EE#,2EE#); | 5A7 | 0301 | CEEE | 3000 | 2000 | 04AF | 006F |
| 13691 | $XE:SST-K | \\ | | (5A5H) WB:ZS ST-B0:WB IF:SIPTRAP- X2(6EE#,2EE#); | 5A5 | 0301 | CEEE | 3C00 | 2000 | 04AF | 006F |
| 13692 | | \\ | | (6EE#) IB:0000(0FH) RB:B0 DALU:RB-SUB-1H WB:DALU IF:SIPTRAP- X2(6EE#,2EE#); | 6EE | 0303 | C6EF | 3C0F | F600 | 04AF | C122 |
| 13693 | | | | WB:P ST-B0:WB IF:SCISTR X2(6EF#,2EF#); | | | | | | | |
| 13694 | | \\ | | (2EF#) LB-WR-LOCAL(SIP) IB:00 RB:PSIP CALU:RB-ADD1-1B | 2EF | 2880 | C3EA | 3C00 | D600 | D46F | 0B09 |
| 13695 | | | | ST-PSIP:DALU GO-TO($PF-3E) | | | | | | | |
| 13696 | | \\ | | (6EF#) LB-RO-LOCAL(SIP) IU:B0 RB:PSIP DALU:RB-AO0-1B GO-TO(2E6#) | 6EF | 28C0 | C2E6 | 3CC0 | D600 | 316F | 0B09 |
| 13697 | | | | ST-PSIP:DALU GP-MISC3:X1 | | | | | | | |
| 13698 | | \\ | | (2E6#) LB-DA 1B:SB DALU:1B ST-L7SEL:DALU | 2E6 | 1300 | C2E7 | 3CC0 | 5F40 | 04AF | 4B25 |
| 13699 | | \\ | | (2E7#) LB-DW`NXINST IR:SB DALU:1B ST-K7SEL:DALU GO-TO(2E7#); | 2E7 | 9607 | 2CC8 | CD00 | CF40 | 64AF | 4B25 |
| 13700 | | \\ | | (2EE#) XA; | 2EE | 0302 | 021C | 3000 | 0000 | 04AF | 0B2F |
| 13701 | $XE:LXA | \\ | | (52F#) IF:SIP-PRESENT X2($UNDO,$TVC3); | 52F | 0300 | 0C6A | 3000 | 0000 | 04AF | 0B2F |
| 13702 | $XE:KLD | \\ | | (526#) IU:B0 DALU:1B ST-L7NUM:DALU GO-TO($TV16); | 526 | 0500 | CCBA | 3C00 | 5F80 | 68AF | 0B25 |
| 13703 | $XE:KLDV | \\ | | (53E#) IU:B0 DALU:1D ST-L7NUM:DALU GO-TO(0BA#); | 53E | 0500 | CCBA | 3C00 | 5F80 | 68AF | 0R25 |
| 13704 | | | | GP-MISC6:00 | | | | | | | |
| 13705 | | \\ | | (0BA#) IB:A0 DALU:1B ST-L7NUM:DALU GO-TO(0BA#); XA; | 0BA | 9707 | 2C0B | CD00 | CF88 | 64AF | 0B25 |
| 13706 | $XE:KC1 | \\ | | (524#) IU:A0 RB:K7NUM DALU:RB-SUB-1H WB:DALU RIGLU:CMP | 524 | 05FB | 17EA | 30C6 | 0F88 | 686F | 0B06 |
| 13707 | | | | CKVL GP-MISC6:00 IF:OBUS-ZERO X2(7EB#,$PF-3E) | | | | | | | |
| 13708 | $XE:KC1V | \\ | | (53C#) IB:A0 RU:K7NUM DALU:RB-SUB-1B WR:DALU RIGLU:CNP | 53C | 05FB | 17EA | 30C6 | 0F88 | 686F | 0B06 |
| 13709 | | | | CKVL GP-MISC6:00 IF:OBUS-ZERO X2(7EB#,$PF-3E) | | | | | | | |
| 13710 | | \\ | | (7EB#) IU:B0 RB:L7NUM DALU:RR-SU0-1B WB:DALU`Q:DALU | 7EB | 03F8 | 03A1 | 3C00 | 1FB0 | 046F | 0F06 |
| 13711 | | | | IF:DCARRY16 X2(7A1#,3A1#); | | | | | | | |
| 13712 | | \\ | | (7A1#) IB:0ZEX DALU:1B LB-DA`Y:BALU | 7A1 | 2300 | CCF0 | 3000 | 0000 | 04A5 | 3B2F |
| 13713 | | | | GO-TO(0F0#); | | | | | | | |
| 13714 | | \\ | | (0F0#) IB:A0 DALU:RB-SUB-1B WB:Y RIGLU:CMP | 0F0 | 9787 | 2CC8 | CCC6 | 0008 | 64AF | 0906 |
| 13715 | | | | CKHL | | | | | | | |
| 13716 | | \\ | | (3A1#) IR:A0 DALU:RB-SUB1-1B RIGLU:CMP XA; | 3A1 | 9787 | 2008 | CDC6 | 0008 | 64AF | 0B16 |
| 13717 | $XE:KADD | \\ | | CKHL | | | | | | | |
| 13718 | | \\ | | (522#) IU:B0 RB:L7NUM DALU:RB-ADD-1B ST-L7NUM:DALU | 522 | 05F8 | C3E8 | 3C00 | 5F80 | 046F | 0B19 |
| 13719 | | | | CKVL GP-MISC6:00 IF:DCARRY15 X2(7E8#,3E8#); | | | | | | | |
| 13720 | $XE:KADV | \\ | | (53A#) IR:B0 RB:L7NUM DALU:RB-ADD-1B ST-L7NUM:DALU | 53A | 05F8 | 03E8 | 3000 | 5F80 | 686F | 0B19 |

HTL/6000 FILE EDIT
MICROPROGRAM SECTION

SEQUENCE: SSMCS

```
LINE #                                                                                              ADDRESS   IMAGE
                                                                                                    (HEX)     (HEX)
13731  \2\                                                                                          
13732  $    CKVL    GP-MISC6:00              IF:DCARRY16 X2(7E8H,3E8H)                              3E8    03FA 07EA 3C84 CF88 046F 0B19
13733  \2\ (3E8H) 10:40 RB:K7NUM DALU:RB-ADD-1B ST-K7NUM:DALU                                       7E8    03FA C7EA 3C84 CF88 046F 0B09
13734  $    CKVL    RIOC:ADD                 IF:DOVFL X2(SXL:KOV,SPF-SE)                            7E8    03FA C7EA 3C84 CF88 046F 0B09
13735  SXE:KSUB (7E8H) 10:AD RB:K7NUM DALU:RB-ADD1-1B ST-K7NUM:DALU                                 52A    03F8 C3E9 3C00 5F80 686F 0B06
13736  $    CKVL    RIOC:ADD                 IF:DOVFL X2(SXL:KOV,SPF-SE)                            
13737  \3\ (52AH) 10:AD RB:L7NUM DALU:RB-SUB-1B ST-L7NUM:DALU                                       3E9    03FA C7EA 3C84 CF88 046F 0B16
13738  $    CKVL    GP-MISC5:00              IF:DCARRY16 X2(7E9H,3E9H)                              
13739  \3\ (3E9H) 10:AD RB:K7NUM DALU:RB-SUB1-1B ST-K7NUM:DALU                                      7E9    03FA C7EA 3C84 CF88 046F 0B06
13740  $    CKVL    RIOC:ADD                 IF:DOVFL X2(SXL:KOV,SPF-SE)                            
13741  \3\ (7E9H) 10:AD RB:K7NUM DALU:RB-SUB-1B ST-K7NUM:DALU                                       7EA    0384 C558 3000 1A00 046F 0B2F
13742  SXL:KOV CKVL RIOC:ADD                 IF:DOVFL X2(SXL:KJV,SPF-SE)                            
13743  \1\ (7EAH) RB:M2                                                                             3EA    9707 2CC8 CCC0 0000 64AF 082F
13744  SPF-SE CKHL                           IF:OVMASK X2(KIVU6,SPF-15)                             
13745  \1\ (3EAH)                                                                          XA:      520    0538 AA00 0008 78AF 032F 0800
13746  SXE:KRUL (52CH) GP-MISC7:00 FLINK:(A) RB:AO WE:RB                                            138    1139 3C00 0008 7EAF 032F 0800
13747  \1\    CKVL                           IF:OBUS-ZERO X2(SXE:KMLV,138H)                         
13748  $    (138H) GP-MISC7:1X RB:AO DALU:RB-ADD1                                                   139    03F8 C3EC 3C00 0F80 7C6F 032F
13749  \1\    CKVL                           IF:OBUS-ZERO X2(SXE:KMLV,139H)                         
13750  $    (139H) GP-MISC7:0X RB:K7NUM WB:RB                                                       7EC    03F8 57EC 3C00 0F80 7E6F 0800
13751  \1\    CKVL                           IF:OBUS-ZERO- X2(7ECH,3ECH)                            
13752  $    (7ECH) GP-MISC7:1X RB:K7NUM DALU:RB-ADD1                                                3EC    0300 C1E2 3C00 0000 04AF 072F
13753  \1\    CKVL                           IF:DCARRY16- XL'ELS(3ECH)                              
13754  $    (3ECH) RB:B0 WB:RB' Q:RB                                                    GO-TO(1E2H) 539    0300 C1E3 AA00 1F80 046F 072F
13755  \1\                                                                                          
13756  SXE:KRLV (538H) RB:L7NUM WB:RE' Q:RB FLINK:(A)                                   GO-TO(1E5H) 1E2    0326 C744 3000 5F80 046F 032F
13757  \1\ (1E2H) RB:L7NUM WB:RE ST-B0:WB                                                           1E3    0326 C744 3C00 2F88 046F 032F
13758  $                                                                                            
13759  \1\ (1E3H) RB:K7NUM WB:RE ST-B0:WB    IF:ASMAP2 X2(744H,344H)                                344    0300 C1E4 3CFF D000 7AAF FB2D
13760  \1\                                                                                          
13761  \1\ (344H) 10:0FF(FFH) RB:30 DALU:RB-AND-1B ST-EO:DALU                                       744    0300 C1E4 3CFF D000 04AF FB2B
13762  \1\    GP-MISC7:10                                                          GO-TO(1E4H)     
13763  \1\ (744H) 10:0FF(FFH) RB:H0 DALU:RH-OR-NOT-1B ST-EO:DALU                                   
13764  \1\                                                                          GO-TO(1E4H)    1E4    03BD C346 9E00 2000 0484 3B2C
13765  \1\ (1E4H) DALU:000000 WB:DALU ST-B0:WB FSEL:(E) IB:42EX                                    346    0300 1355 3C00 2000 0484 06EF
13766  $    CKHL    BR-3WAY                                                                        
13767  \1\ (346H) RB:B0 WB:RB-SR1'Q:QSR1 ST-B0:WB BR-3WAY                                           746    0380 1355 3C00 3000 0474 0ED9
13768  \1\                                   IF:FALSE X2(,DALU-SR1'Q:QSR1                           
13769  \1\ (746H) 10:B0 RB:E0 DALU:RB-ADD-1B WB:DALU-SR1'Q:QSR1 ST-B0:WB BR-3WAY                    
13770  \1\                                   IF:FALSE X2(,355H,354H)                                354    0319 1355 BC00 2000 0484 06EF
13771  \1\ (354H) RB:B0 WB:RB-SR1'Q:QSR1 ST-B0:WB BR-3WAY                                           
13772  \1\                                   IF:SELZERO'DEC X2(754H,355H,354H)                      355    0399 1355 BC00 3000 0474 0ED9
13773  \1\ (355H) 18:B0 RB:E0 DALU:RB-ADD-1B WB:DALU-SR1'Q:QSR1 ST-B0:WB BR-3WAY                    
13774  \1\                                   IF:SELZERO'DEC X2(754H,355H,354H)                      
13775  \1\    CKHL    ST-B0:WB BR-3WAY                                                              
13776  \1\                                                                                          754    0331 C764 3000 F10F 046F 3325
13777  $    (754H) RB:E1 WB:RB ST-A7:WB IB:RB ST-E1:DALU                                            
```

```
                                    MTL/6000 FILE EDIT
                                   MICROPROGRAM SECTION

ADDRESS   IMAGE
                                                                      (HEX)    (HEX)

SEQUENCE: SSMCS
                        IF:MISC2A X2(764H,364H,364H);                  364  038D 0346 9000 0008 2EB4 072F
 (364H) RB:A0 JD:RB'Q:RH GP-MISC2:1X FSEL:(D) IB:A0
   CKHL BR-3WAY
 (764H) RB:E0 DALU:NOT-RB ST-E0:DALU IB:QZEX IF:IBUS31 X2(746H,346H);  764  038D C365 3C00 0000 046F 3B20
   CKHL
 (365H) RB:B0 WB:RB                IF:IBUS31 X2(765H,365H);            365  03FB C756 3000 0000 04AF 032F
   CKVL
 (765H) IB:30 RD:E0 DALU:RB-ADD1-IB WB:DALU ST-B0:WB IF:OBUS-ZERO X2(756H,356H);  765  03FB C756 3000 3000 046F 0B09
   CKVL
 (356H) RD:B0 WB:RB-SR1'Q:USR1 ST-U0:WB DALU:RB-ADD1 IF:OBUS-ZERO X2(756H,356H);  356  03E3 57ED 3000 3000 04AF 0B09
   CKVL
 (756H) RB:B0 WB:RU-SR1'Q:USR1 ST-U0:WB IF:DCARRY8- XL'ELS(3EDH);      756  0300 03ED 3000 2000 04AF 06C0
   CKVL                                              GO-TO(3EDH);
 (3EDH) IB:QZEX DALU:RB ST-K7NUM:DALU                                  3ED  0300 01E5 3000 2000 04AF 06EF
                                                     GO-TO(1E5H);
 (1E5H) RB:A7 DALU:RB ST-L7NUM:DALU                                    1E5  9707 2CC8 CC00 5F8F 64AF 0B2F
                                                        XA;
SKIP-HOF:
BXE:KDIV
 (528H) GP-SHIV:AR-32 FLINK:(A) DALU:CC000 ST-00:DALU                  528  03B0 C144 AA00 C008 49AF 0B2C
   CKHL RU:A0
 (144H) IB:00FF(FFH) RB:00 QU:00 DALU:RB-AJD-IB WB:DALU'Q:DALU         144  03FB C7EE 3CFF 0000 04AF FF2D
   CKVL GP-MISC2:1X
 (544H) IB:00 QU:00 DALU:RB-SUB-IB WB:DALU'Q:DALU IF:OBUS-ZERO X2(7EEH,3EEH);  544  03FB C145 3C00 0000 2E6F 0F06
   CKVL RB:A0 WB:RB
 (7EEH) RB:A0 DALU:NOT-RB WB:DALU ST-A0:WB                             7EE  03FB 57EE 3C00 0008 04AF 032F
 (145H) RB:A0 DALU:NOT-RB WB:DALU ST-A0:WB IF:OBUS-ZERO XL'ELS(3EEH);  145  0340 C3EE 3C00 2008 04AF 0B20
   CKHF                                        GO-TO(3EEH);
 (545H) IB:A0 RB:D0 DALU:RB-SUB-IB WB:DALU ST-A0:WB                    545  0380 C3EE 3C00 2000 046F 0B06
   CKHL                                        GO-TO(3EEH);
 (3EEH) RD:K7NUM DALU:K7NUM WB:DALU ST-A7:WB FSEL:(C)                  3EE  0380 C147 9C00 2F8F 796F 0B20
   CKHL GP-MISC7:01
 (147H) RB:L7NUM WB:RB ST-B0:WB IF:RBUS16 X2(547H,147H);               147  0300 CCC6 3C00 0008 04AF 032F
                                               GO-TO(0C6H);
 (547H) RB:MISC2A X2(548H,148H);
 (148H) RB:B0 DALU:RB-ADD1 WB:DALU ST-B0:WB GP-MISC2:1X                147  0371 C548 3F80 0008 04AF 0B20
 (548H) RB:A0 DALU:RB-ADD1 WB:DALU ST-A0:WB IF:DCARRY X2(549H,149H):1X 148  03FB C149 3C00 2000 2EAF 0B00
   CKVL
 (549H) RB:B0 DALU:RB-ADD1 WB:DALU ST-B0:WB IF:DCARRY X2(549H,149H):0X 548  03FB C149 3C00 2000 2CAF 0B00
   CKVL
 (549H) RB:A7 DALU:RB ST-E0:DALU            GO-TO(SKDIV-NMLZ);         149  0300 C289 3C00 000F 04AF 0B2F
 (0C6H) RH:A7 DALU:NOT-RB ST-E0:DALU        GO-TO(SKDIV-NMLZ);         549  0340 C289 3C00 000F 04AF 0B20
   CKHF
SKDIV-JMLZ                                                             0C6  0300 C289 3C00 000F 04AF 0B20
 (289H) IB:QZEX RB:B0 DALU:RB-SUB-IB BR-3WAY                           289  03FB C146 3C00 0000 04B4 3B06
```

```
RTL/6000 FILE EDIT
MICROPROGRAM SECTION

LINE #                    SEQUENCE: $$4CS                                                          ADDRESS  IMAGE
                                                                                                    (HEX)   (HEX)
13825  \3\         IF:DCARRY16 X2(546#,146#);                                                        146    03D9 12C7 BC00 1008 046F 0B16
13826  \3\  CKVL   (146#) VL ID:A0 RB:E0 DALU:RB-SUB1-IB                                             546    03D9 12C7 BC00 1008 046F 0B06
13827  \3\         IF:DCARRY16 X2(,207#,206#);
13828  \3\  CKVL   (546#) VL ID:A0 RB:E0 DALU:RB-SUB-IB                                              207    03B5 C289 3C00 2008 04AF C7EF
13829  \3\         IF:SELZERO DEC X2(,207#,206#);
13830  \3\  CKHL   (207#) RD:A0 WB:RB-SL4*Q:QSL4 ST-A0:WB IB:00FF(00#)                               206    03B5 C289 3C00 200E 04AF FB23
13831  \3\         IF:1BUS16 X2(689#,269#);
13832  \3\  CKHL   (206#) DALU:FFFFF WE:DALU ST-A6:WB IB:00FF(00#)                                   689    0300 CCD6 3C00 D100 04AF 3725
13833  \3\         IF:1BUS16 X2(689#,269#);
13834  \3\  CKHL   (689#) IB:QZEX DALU:IB ST-E1:DALU RB:80 WB:RB*Q:RB                                0D6    0340 CCD7 3C00 3109 046F 0B20
13835  \3\                                                            GO-TO(0D6#);
13836  \3\         (0D6#) RD:E1 DALU:NOT-RB WB:DALU ST-A1:WB                                         0D7    0300 CC54 3C00 F100 046F 832A
13837  \3\  CKHF                                                      GO-TO(0D7#);
13838  \3\         (0D7#) RB:E1 WB:RB ST-D0:WB IB:F-VAL DALU:NOT-IB                                  054    0300 CC55 F40F D100 6E6F C3AD
13839  \3\                ST-E1:DALU                                  GO-TO(054#);
13840  \3\         (054#) IB:0000(0F#) RB:E1 DALU:RB-AND-IB ST-E1:DALU                               055    0300 CC57 D400 D108 046F 02AA
13841  \3\                WB:RB-SL2 FASP:WB*RING-OUT GP-MISC6:1X
13842  \3\                                                            GO-TO(055#);
13843  \3\         (055#) RB:E1 WB:RB-SR2 FPRM:WB*RING-OUT IB:A0 DALU:NOT-ID                         057    0300 CC57 EC00 F008 6C6F 0765
13844  \3\                ST-E1:DALU                                  GO-TO(057#);
13845  \3\         (057#) ID:A0 DALU:IB ST-E0:DALU RB:E0 WB:RB-SL1*Q:QSL1                            740    0300 C740 3C00 F100 046F CB13
13846  \3\                ST-A0:WB FLINK:FB GP-MISC6:0X                GO-TO(740#);
13847  SKIP HOF;
13848  \3\         (140#) RD:D0 DALU:RB-ADD-RB ST-D0:DALU IB:0000(00#)                               140    03B5 C340 3C00 C000 046F FB03
13849  \3\                                                            IF:1BUS16 X2(740#,340#);
13850  \3\  CKHL   (340#) ID:QZEX RD:A0 RB:E0 DALU:RB-ADD-IB WB:DALU*Q:DALU                          340    03F8 C14A 3C00 0009 04B4 3F09
13851  \3\         BR-3WAY                                             IF:1BUS16 X2(54B#,14B#);
13852  \3\  CKVL   (14B#) VL ID:A0 RB:E0 DALU:RB-ADD-IB WB:DALU-SL1*Q:QSL1                           14B    03D9 5141 BC00 3008 0474 0F59
13853  \3\                ST-A0:WB BR-3WAY                             IF:DCARRY16 X2(54B#,14B#);
13854  \3\  CKVL   (54B#) VL ID:A0 RB:E1 DALU:RB-ADD1-IB WB:DALU-SL1*Q:QSL1                          54B    03D9 5141 B000 3008 0474 0F49
13855  \3\                ST-A0:WB BR-3WAY                             IF:SELZERO DEC XL*ELS(141#,140#);
13856  \3\  CKVL   (141#) VL ID:A0 RB:E1 DALU:RB-ADD1-IB WB:DALU-SL1*Q:QSL1                          141    03B5 C340 3C00 200E 046F FB03
13857  \3\                ST-A0:WB BR-3WAY                             IF:SELZERO DEC XL*ELS(141#,140#);
13858  \3\  CKHL   (141#) RD:D0 DALU:NOT-RB WB:DALU ST-A6:WB BR-3WAY                                 740    03F8 C14A 3C00 0009 04B4 3F09
13859  \3\  CKHL   (740#) IB:QZEX RD:A0 DALU:RB-ADD-IB WB:DALU*Q:DALU                                14A    03D9 5141 BC00 3108 0474 0F59
13860  \3\                BR-3WAY                                      IF:DCARRY16 X2(54A#,14A#);
13861  \3\  CKVL   (14A#) VL ID:A0 RB:E1 DALU:RB-ADD-IB WB:DALU-SL1*Q:QSL1                           54A    03D9 5141 B000 3008 0474 0F49
13862  \3\                ST-A0:WB BR-3WAY                             IF:SELZERO DEC XL*ELS(141#,140#);
13863  \3\  CKVL   (54A#) VL ID:A0 RB:E1 DALU:RB-ADD1-IB WB:DALU-SL1*Q:QSL1                          542    0340 C543 3C00 200E 04AF 0B20
13864  \3\                ST-A0:WB BR-3WAY                             IF:SELZERO DEC XL*ELS(141#,140#);
13865  \3\  CKHF   (542#) RD:D0 DALU:NOT-RB WB:DALU ST-A6:WB BR-3WAY                                 543    03C0 1141 F200 0008 04AF 0B25
13866  \3\                                                             GO-TO($XL:KDIV-32);
13867  $XL:KDIV-16   (543#) VL ID:A0 DALU:IB FLINK:DEC
13868  $XL:KDIV-32   (543#) VL ID:A0 DALU:IB FLINK:DEC
13869                                                                  IF:FALSE X2(50#,10E#,10E#);
13870  $XL:KDIV-EXIT (541#) RD:D0 DALU:NOT-RB WB:DALU ST-A7:WB                                       541    0371 C5CE 3000 200F 046F 0B20
13871                                                                  IF:MISC2A X2(50E#,10E#,10E#);
```

RTL/6000 FILE EDIT
MICROPROGRAM SECTION

```
LINE #                    SEQUENCE: SSMCS
13874  $       (10EH) IB:A6 DALJ:NOT-IB ST-K7NUM:DALU RB:K7NUM WB:RB
13875  )\              CKHL ST-A6:WB           IF:IBUS16 X2(50FH,10FH);
13876  $       (50EH) RB:A7 DALU:RB-ADD1 ST-L7NUM:DALU
13877  )\              CKVL                    IF:DCARRY16 X2(54FH,14FH);
13878  $       (10FH) RB:A6 DALU:RB-ADD1 ST-L7NUM:DALU
13879  )\                                      GO-TO(JXL:KOV);
13880  $       (50FH) RB:A7 DALU:NOT-RB ST-L7NUM:DALU                 XA;
13881  )\              CKVL
13882  $       (14FH) RB:A6 DALU:RB ST-K7NUM:DALU                     XL;
13883  )\
13884  $       (54FH) RB:A6 DALU:RB-ADD1 ST-K7NUM:DALU                XL;
13885  )\              CKHF
13886  SKIP HOF;
13887  $XE:KAND (52DH) IB:B0 RB:L7NUM DALU:RB-AND-IB ST-K7NUM:DALU
13888  )\              GP-MISC6:00                    GO-TO(0B8H);
13889  $       (0B8H) IB:A0 RB:K7NUM DALU:RB-AND-IB ST-K7NUM:DALU     XA;
13890  )\              CKVL
13891  $XE:KOR (529H) IB:B0 RB:L7NUM DALU:RB-OR-IB ST-L7NUM:DALU
13892  )\              GP-MISC6:00                    GO-TO(0BCH);
13893  $       (0BCH) IB:A0 RB:K7NUM DALU:RB-OR-IB ST-K7NUM:DALU      XA;
13894  )\
13895  $XE:KXOR (52BH) IB:B0 RB:L7NUM DALU:RB-XOR-IB ST-L7NUM:DALU
13896  )\              GP-MISC6:00                    GO-TO(0BDH);
13897  $       (0BDH) IB:A0 RB:K7NUM DALU:RB-XOR-IB ST-K7NUM:DALU     XA;
13898  )\              CKHF
13899  $XE:KCPL (501H) RB:A0 DALU:NOT-RB WB:DALU ST-B0:WB LB-DW(WW:WB)
13900  )\              CKHF                           GO-TO(0ACH);
13901  $       (0ACH) RB:B0 DALU:NOT-RB WB:DALU ST-B0:WB LB-DW(WR:WB)
13902  )\              CKHF                    IF:DCARRY16 X2(7AEH,3AEH);
13903  $XE:KNEG (503H) RB:A0 DALU:NOT-RB WB:DALU ST-A0:WB
13904  )\              CKHF
13905  $       (0AEH) RB:B0 DALU:NOT-RB WB:DALU ST-80:WB
13906  )\                                             GO-TO(SXE:KINC);
13907  $XE:KINC (507H) RB:A0 DALU:RB-ADD1 WB:DALU ST-B0:WH LB-DW(WR:WB)
13908  )\              CKVL                    IF:ODSIZ1 X2(7AEH,3AEH);
13909  $       (3AEH) RB:A0 DALU:RB-ADD1 WB:DALU LB-DW(WW:WB)
13910  )\              CKHF RIOC:ADD           IF:ODSIZ1 X2(7AFH,3AFH);
13911  $       (7AEH) RB:A0 DALU:RB-ADD1 WB:DALU ST-A0:WB
13912  )\              CKHL RIOC:ADD
13913  $XE:KDEC (505H) RB:B0 DALU:RB-SUB1 WB:DALU ST-B0:WB LB-DW(WR:WB)
13914  )\              CKVL                    IF:ODSIZ1 X2(7ADH,3ADH);
13915  $       (3ADH) RB:A0 DALU:RB-SUB1 WB:DALU LB-DW(WW:WB)
13916  )\              CKHF RIOC:ADD           IF:ODSIZ1 X2(7AFH,3AFH);
13917  $       (7ADH) RB:A0 DALU:RB-SUB1 WB:RB LB-DW(WW:WB)
13918  )\              CKHF RIOC:ADD
13919  $       (3AFH) RB:B0 DALU:RB' W:RB LB-DW(WW:WB)
13920  )\                                      IF:FPRM7 X2(418H,018H);
```

| ADDRESS (HEX) | IMAGE (HEX) | | | | |
|---|---|---|---|---|---|
| 10E | 03B5 | C1CF | 3C00 | EF8E | 046F 032A |
| 50E | 03F8 | C14F | 3C00 | 5F8F | 04AF 0B00 |
| 10F | 0300 | C7EA | 3C00 | CF8E | 04AF 0B2F |
| 50F | 9707 | 2CC8 | CDC0 | 5F8F | 64AF 0B20 |
| 14F | 9707 | 2CC8 | C0C0 | CF8E | 64AF 0B2F |
| 54F | 9747 | 2CC8 | C000 | CF8E | 64AF 0B00 |
| 52D | 0300 | 0C8A | 3000 | 5F80 | 686F 0B20 |
| 0B8 | 9707 | 2CC8 | C000 | CF88 | 646F 0B2D |
| 529 | 0300 | CCBC | 3000 | 5F80 | 686F 0B20 |
| 0BC | 9707 | 2CC8 | CCB0 | 5F80 | 646F 0B27 |
| 52B | 0300 | CCBD | 3C00 | 5F80 | 686F 0B26 |
| 0BD | 9707 | 2CC8 | C000 | CF88 | 646F 0B26 |
| 501 | 0240 | CCAC | 3200 | 2008 | 04AF 0B20 |
| 0AC | 0256 | C7AF | 3100 | 2000 | 04AF 0B20 |
| 3AE | 0296 | C7AF | 3284 | 0008 | 04AF 0316 |
| 7AE | 0296 | C7AF | 3284 | 2008 | 04AF 0B00 |
| 505 | 02F8 | C3AD | 3100 | 2000 | 04AF 0B1F |
| 3AD | 0296 | C7AF | 3284 | 2008 | 04AF 0B1F |
| 7AD | 0256 | C7AF | 3284 | 0008 | 04AF 0306 |
| 3AF | 0221 | C418 | 3200 | 0000 | 04AF 072F |

RTL/6000 FILE EDIT
MICROPROGRAM SECTION

SEQUENCE: SSMCS

```
LINE #                                                                                          ADDRESS   IMAGE
                                                                                                (HEX)     (HEX)
                                                                                                 7AF      0314 746F 3C00 3200 EF88 046F 0B2F
13921   $
13922   \3\
13923   SKIP NOF:       (7AFN)              IF:ODSIZ4 XW*ELS(06FN);
13924   SXE:KSW \3\     (52CN) ID:A0 DALU:IB ST-K7NUM:DALU RB:RB   IF:ODSIZ1 X2(7B1N,3B1N)        52C     0216 C7E1 3C00 3200 EF88 046F 0325
13925   $               ST-A0:WB LB-DW(WW:WB)                                                    3B1     0221 C418 32C0 7F80 046F 0325
13926   \3\     (3B1N) ID:A0 DALU:IB ST-L7NUM:DALU RE:L7NUM WB:RB                                 7B1     0214 746F 31C0 7F80 046F 0325
13927   $               ST-J0:WB DALU:IB ST-L7NUM:DALU RE:L7NUM WB:RB                            
13928   \3\     (7B1N) ID:A0 DALU:IB ST-L7NUM:DALU RE:L7NUM WB:RB   IF:ODSIZ4 XW*ELS(06FN);
13929   $               ST-J0:W0 LB-DW(WR:WB)                                                    
13930   SXE:KST \3\     (52EN) RB:K7NUM WB:RB ST-A0:KB LB-DW(WW:WB)                               52E     0216 C7B0 3C00 2F88 046F 032F
13931   $                       IF:ODSIZ1 X2(7B0N,3B0N);                                         
13932   \3\     (3B0N) RB:L7NUM WB:RB ST-B0:KB LB-DW(WW:WB)                                      3B0     0221 C418 3200 3F80 046F 032F
13933   $                       IF:FPRM7 X2(418N,018N);                                          
13934   \3\     (7B0N) RB:L7NUM WB:RB ST-B0:WB LB-DW(WR:WB)                                      7B0     0214 746F 31C0 3F80 046F 032F
13935   $                       IF:ODSIZ4 XW*ELS(06FN);
13936   \3\     (06FN)                                                                           06F     0315 07E4 3C00 0000 04AF 0B2F
13937   $                       IF:ODSIZ2 X2(704N,SBS-POST);
13938   \3\     (7B4N) R3:00  ID:RB-TW LH-DW(WW:WB)                                              7B4     0221 C7E2 3C00 0000 04AF 00AF
13939   $                       IF:FPRM7 X2(702N,3B2N);                                          
13940   \3\     (702N) ID:00                                                                     7B2     03B7 1BE2 3C00 0000 04AF 0B2F
13941   CKHL                                                                                     
13942   \3\             IF:IBUS24 X2(703N,3B2N);                                                 
13943   \3\     (703N) ID:0FF(00N) RB:B0 DALU:RB-AND-NOT-1B WB:DALU                               7B3     03FB C419 3C00 0000 04AF FB2E
13944   CKVL                    IF:OBUS-ZERO X2(419N,019N);                                      
13945   \3\     (3B2N) ID:0FF(UGN) RB:90 DALU:RB-AND-1B WB:DALU                                  3B2     03FB 1419 3C00 0000 04AF FB2D
13946   CKVL                    IF:OBUS-ZERO X2(418N,019N);                                      
13947   \3\     (419N) ID:B0                                                                     418     03B5 1C18 3C00 0008 04AF 0B20
13948   CKHL                                                                                     
13949   \3\             IF:IBUS16 X2(419N,018N);                                                 
13950   \3\     (419N) RB:A0 DALU:NOT-RB WB:DALU                                                 419     03FB 7419 3C00 0008 04AF 0B20
13951   CKVL                    IF:OBUS-ZERO XW*ELS(019N);                                       
13952   \3\     (018N) RB:A0 WB:RB                                                                018     03FB 7419 3000 0008 04AF 032F
13953   CKVL                                                                                      
13954   SBS-POST        (019N) R10:1                         XW(4);                              019     0300 7400 3C83 0000 04AF 072F
13955   \3\     (3B4N) RB:B0 DALU:RB ST-E0:DALU WB:RE*Q:RB                                       3B4     0321 075A 3C00 D000 04AF 072F
13956   \3\                     IF:FPRM7 X2(79AN,39AN);
13957   \3\     (79AN) RB:A0 DALU:RB ST-D0:DALU                    GO-TO(386N);                  79A     0300 C386 3C00 C008 04AF 06EF
13958   \3\     (39AN) RB:A0 DALU:RB ST-D0:DALU WB:RB-SR1*Q:QSR1                                 39A     0300 C386 3C00 C008 04AF 06EF
13959   CKVL                                                       GO-TO(386N);                  
13960   \3\     (386N) RB:A0 WB:RB-SR1*Q:QSR1                                                    386     030C C345 3C00 0008 04AF 06EF
13961   \3\                                                                                      
13962   \3\     (345N) RB:A7 DALU:R9-SUB1 WB:DALU ST-A7:WB                                       345     03FB C786 3C00 200F 04AF 0B1F
13963   CKVL                    IF:0BUS-ZERO X2(78bN,386N);                                      
13964   \3\     (78bN) ID:32EX DALU:IB ST-D0:DALU WB:A0 WH:RB                                    786     03FB C7C8 3CC0 C008 04AF 3325
13965   CKVL                    IF:0BUS-ZERO X2(7C8N,3C8N);                                      
13966   \3\     (7C8N) RB:D0 WB:RB                                                               7C8     03FB 1704 3C00 0000 046F 032F
13967   \3\                     IF:ODUS-ZERO X2(705N,3D4N);                                      
```

```
                              RTL/6000 FILE EDIT
                             MICROPROGRAM SECTION

SEQUENCE: $IMCS
LINE #
13968  $ //
13969  $ //  (3C8H) RB:A0 DALU:NOT-RB W0:DALU
13970  $ //                                   IF:OBUS-ZERO X2(704H,3D4H);
13971  $ //       CKVL
13972  $ //  (704H) RB:D0 DALU:NOT-RB W0:DALU
13973  $ //                                   IF:OBUS-ZERO X2(7D5H,3D4H);
13974  $ //       CKVL                                          GO-TO(7D5H);
13975  $ //  (3D4H) RID:0
13976  $ //  (7D5H) RB:LO DALU:NOT-RB W0:DALU FASP:WB*RING-OUT
13977  $ //       GP-MISC6:1X                                   GO-TO(347H);
13978  $ //  (347H) RB:ED WB:RB ST-A0:WB FM-SEL:FE
13979  $ //                                                    GO-TO(34BH);
13980  $ //  (34BH) DALU:FFFFF WB:DALU*Q:DALU GP-MISC6:0X
13981  $ //       IF:SELZERO*DEC X2(41CH,U1CH);
13982  $ //  (01CH) RB:A0 WB:RB-SL1*Q:QSL1 ST-A0:WB
13983  $ //  (41CH) IB:A0 RB:E1 DALU:RB-XOR-IB ST-E1:DALU W0:Y
13984  $ //       BALU:WB-SUB1 LO-DA*Y:BALU
13985  $ //                                   IF:MISC2A X2(654H,254H);
13286  $ //  (254H) IB:OZEX RB:K0 DALU:RB-AND-IB ST-K0:DALU
13287  $ //                                                    GO-TO(34FH);
13288  $ //  (34FH) IH:A0 WB:HB-SL1*Q:QSL1 ST-A0:WB
13289  $ //                                   IF:SELZERO*DEC X2(34DH,34FH);
13290  $ //  (654H) IB:OZEX RB:E1 DALU:RB-XOR-IB W0:DALU*Q:DALU
13291  $ //                                                    GO-TO(34DH);
13292  $ //  (34AH) IB:OZEX RB:K0 DALU:RB-AND-IB WB:DALU LB-DW(WR:WB)
13293  $ //       GP-MISC6:1X                                   GO-TO(34BH);
13294  $ //  (34BH) FASP:WB*RING-OUT RB:D0 WB:RB ST-A0:WB GP-SHIN:CIRC
13295  $ //                                                    GO-TO(34CH);
13296  $ //  (34CH) IB:OZEX RB:E2 DALU:RB-XOR-IB WB:DALU LB-DW(WW:WB)
13297  $ //       IF:MISC2B X2(76FH,36FH);
13298  $ //  (265H) RB:A0 WB:HB-SL1*Q:QSL1 ST-A0:WB
13299  $ //                                   IF:SELZERO*DEC X2(669H,269H);
14000  $ //  (669H) IB:OZEX RB:E1 DALU:RB-XOR-IB W0:DALU*Q:DALU
14001  $ //                                                    GO-TO(34DH);
14002  $ //  (34DH) IB:OZEX RB:K0 DALU:RB-AND-IB WB:DALU LB-DW(WW:WB)
14003  $ //                                                    GO-TO(34EH);
14004  $ //  (34EH) IB:OZEX RB:E2 DALU:RB-XOR-IB WB:DALU LB-DW(WW:WB)
14005  $ //       IF:MISC2A X2(76FH,36FH) RB:A0 WB:RB
14006  $ //                                   IF:MISC2A X2(76FH,SPF-36);
14007  $ //  (36FH) LB-WR-MEM-D
14008  $ //                                                    GO-TO(SPF-36);
14009  $ //  (76FH) LB-WR-MEM-D
14010  SPF-36 (36EH)                                           XA;
14011  SKIP HOF:
14012  $XE:MT3 (3BFH) L3-DW BRAMO I0:SBSEX DALU:IB ST-D0:DALU
14013  $ //       CKHF WB:DALU-SW ST-H0:WB                      GO-TO(1F1H);
14014  $ //  (1F1H) I3:0000(1CH) DALU:IB FLINK:(0)
```

ADDRESS   IMAGE
(HEX)     (HEX)

3C8   03FB C704 3C00 0008 04AF 0B20
704   03FB 17D4 3C00 0000 046F 0B20
3D4   030C C7D5 3C82 0000 04AF 0B2F
7D5   0300 C347 F4C0 1800 6E6F 0B20
347   0300 C348 D5CC 3008 046F 032F
34B   0319 CC1C B000 0000 6CAF 0F23
01C   0319 CC1C B000 2008 046F 0F26
41C   2331 0654 3000 D108 045F 0926
254   0300 0269 8000 0000 6CAF 3B2D
34F   0300 C34F 3000 1208 046F 0F26
654   0300 C34A 3000 1100 046F 3F20
34A   0200 C34B 3100 0008 6EAF 3B26
34B   0300 C34C F400 2008 4A6F 032F
34C   0319 0269 8000 0000 6CAF 072F
269   0319 C269 8000 2008 046F 076F
669   0300 C34D 3000 1200 046F 3F26
34D   0300 C34E 3CC0 0800 686F 3F20
34E   0236 C36F 3200 1200 046F 3B26
36F   1831 176E 3200 0008 04AF 032F
76F   1900 C36E 3000 0000 04AF 0B2F
36E   9707 2CC8 CDC0 0000 64AF 0B2F
3BF   0240 C1F1 3C0C E000 04AF 6A25
1F1   03FC C1EE AC1C 0027 04AF CB25

RTL/60C0 FILE EDIT
MICROPROGRAM SECTION

SEQUENCE: $$MCS

| LINE # | | | | ADDRESS (HEX) | IMAGE (HEX) | | | | |
|---|---|---|---|---|---|---|---|---|---|
| 14015 | | | CKVL IF:DALU(NUM) X2(5EE#,1EE#); | 5EE | 03FC | C1ED | 3004 | 0027 | 04AF | CB25 |
| 14016 | | | CKVL | | | | | | | |
| 14017 | | | (5ED#) IB:0000(04#) DALU:1D IF:DALU(NUM) X2(5ED#,1ED#); | 1ED | 03FC | C1EC | 3008 | 0027 | 04AF | CB25 |
| 14018 | | | (1ED#) IU:0000(08#) DALU:1B | 5ED | 0301 | C166 | A500 | 0000 | 2EAF | 0B2F |
| 14019 | | | CKVL IF:DALU(NUM) X2(5EC#,1EC#); | | | | | | | |
| 14020 | | | (5EC#) FLINK:(5) GP-MISC2:1X | 5EC | 0301 | C166 | A400 | 0000 | 2EAF | 0B2F |
| 14021 | | | IF:SIPTRAP X2(566#,166#); | | | | | | | |
| 14022 | | | (5EC#) FLINK:(4) GP-MISC2:1X | 566 | 0302 | C270 | AC00 | 3F88 | 046F | 026F |
| 14023 | | | IF:SIPTRAP X2(566#,166#); | | | | | | | |
| 14024 | | | (566#) R0:M7NUM WB:RB-SR4 ST-A0:WB FLINK:(0) | 1EC | 4309 | 1166 | A300 | 0000 | 04AF | 0B2F |
| 14025 | | | IF:SIP-PRESENT X2(670#,$MTM2); | | | | | | | |
| 14026 | | | (1EC#) FLINK:(3) CIP-STALL | 567 | 030A | C270 | AC00 | 3F88 | 046F | 026F |
| 14027 | | | IF:CIPTRAP X2(567#,166#); | | | | | | | |
| 14028 | | | (567#) R0:M7NUM WB:RB-SR4 ST-A0:WB FLINK:(0) | 670 | 0300 | C61C | 3C00 | 0000 | 04AF | 0B2D |
| 14029 | | | IF:CIP-PRESENT X2(670#,$MTM2); | | | | | | | |
| 14030 | | | (670#) GO-TO($UNDO); | 166 | 0300 | C270 | 3C00 | 3F88 | 046F | 026F |
| 14031 | | | (166#) R0:M7NUM WB:RB-SR4 ST-A0:WB GO-TO($MTM2); | | | | | | | |
| 14032 | | | (1EE#) R0:M7NUM WB:RB-SR4 ST-A0:WB GO-TO($MTM2); | 1EE | 0300 | C270 | 3C00 | 3F88 | 046F | 026F |
| 14033 | | $MTM2 | (27C#) R0:A0 WB:RB-SR4 ST-A0:WB IB:0000(FF#) GO-TO(1F4#); | 270 | 0300 | C1F4 | 3CFF | F008 | 04AF | C265 |
| 14034 | | | DALU:1B ST-E0:DALU | | | | | | | |
| 14035 | | | (1F4#) ID:A0 RB:D0 DALU:1U-AND-NOT-RB WB:DALU-SW ST-A0:WB GO-TO(1F5#); | 1F4 | 0340 | C1F5 | 3000 | 2008 | 046F | 0A24 |
| 14036 | | | CKWF | | | | | | | |
| 14037 | | | (1F5#) I4:A0 RB:D0 DALU:RB-AND-1B WB:DALU'Q:DALU | 1F5 | 030C | C176 | 3000 | 0008 | 046F | 0F2D |
| 14038 | | | GO-TO(176#); | | | | | | | |
| 14039 | | | (176#) IB:00 RB:00 DALU:RB-AND-1B ST-D0:DALU GO-TO(177#); | 176 | 0300 | C177 | 3C00 | C000 | 046F | 0B2D |
| 14040 | | | (177#) IB:A0 DALU:R0 ST-A0:WH XL(SXL:MTM) | 177 | 1340 | 55F0 | 3300 | 2008 | 046F | 08A7 |
| 14041 | | $XL:MT#3 | (5F5#) LB-WR-LOCAL(SIP,13#) RB:A0 DALU:RB ST-M7NUM:DALU GO-TO(1F5#); | 5F5 | 2880 | C1F3 | 3300 | 9F88 | 04AF | 0B2F |
| 14042 | | $XL:MT#4 | (5F4#) LB-WR-LOCAL(SIP,11#) RB:A0 DALU:RB ST-M7NUM:DALU GO-TO(1E8#); | 5F4 | 2880 | C1E8 | 3100 | 9F88 | 04AF | 0B2F |
| 14043 | | $XL:MT#3 | (5F3#) LB-WR-LOCAL(CIP,11#) RB:A0 DALU:RB ST-M7NUM:DALU GO-TO(1F3#); | 5F3 | 2880 | C1F3 | 5100 | 9F88 | 04AF | 0B2F |
| 14044 | | $XL:MTM | (5F0#) RB:A0 DALU:R0 ST-M7NUM:DALU GO-TO(1F0#); | 5F0 | 0300 | C1F0 | 3C00 | 9F88 | 04AF | 0B2F |
| 14045 | | | (1F0#) RB:A1 WB:RB GP-MISC5:X0'(HOTM1) | 1F0 | 0300 | C1F3 | 3200 | 1900 | 506F | 032F |
| 14046 | | | GO-TO(1F3#); | | | | | | | |
| 14047 | | | (1E8#) R0:M4 JB:R0-SR1 GP-MISC5:X0'(HOTM4) | 1E8 | 0300 | C1F3 | 3300 | 1C00 | 506F | 02EF |
| 14048 | | | GO-TO(1F3#); | | | | | | | |
| 14049 | | | (1F3#) IB:02EX R0:E0 DALU:RB-AND-1B WB:DALU R1B:0B-N2 XA; | 1F3 | 9707 | 2C08 | CD96 | 1000 | 646F | 3B2D |
| 14050 | | $XE:ST0 | (5U1#) R0:M7NUM WB:RH LJ-STALL'WA:WB GO-TO(1C3#); | 5R1 | 1100 | C1C3 | 3300 | 1F80 | 046F | 032F |

```
                         RTL/6000 FILE EDIT
                       MICROPROGRAM SECTION

SEQUENCE: $$MCS                           ADDRESS    IMAGE
                                                                (HEX)     (HEX)

LINE #
14062   $       (1C3N) L3-JH-LOCAL(CPU) IU:00FF(00H) DALU:IB ST-DU:DALU    1C3   2880 C1B1 1000 C000 04AF FB25
14063   ))                                                    GO-TO(1B1N)
14064   ))      (1B1N) L3-DJ(44:WB) IU:SRZEX RB:D0 DALU:RB-OR-IB WB:DALU   1B1   0269 7C77 3200 2000 046F 7B27
14065   ))                          IF:MISCOL- XW'FLS(SIMU-XW):
14066   EXE:SAVE (5S1N) L3-PW IB:SUZEX DALU:IB JB:DALU ST-A7:WB FLINK:(1)  581   95FB C470 A100 200F 04AF 7B25
14067   ))                          IF:OBUS-ZERO X2(470N,SSAVE-SUB);
14068   $               CKVL
14069   ))      (47CN) RJ:D1 JB:RB ST-A7:WB                                470   03FB 1470 3000 210F 046F 032F
14070   $SAVE-SUB               IF:OBUS-ZERO X2(SXL:SAVE,SSAVE-SUB);
14071   ))      (07(N) WD:RI-TW ST-B0:WD FSEL:(7)                          070   032C 16D2 9700 2000 04AF 0B2F
14072   $       \\
14073   \3*)    (0D3N) RU:37SEL WB:RH LB-DA(WA:WB)                         6D3   1319 12D3 B300 0017 04AF 0B2F
14074   $       CKVL
14075   \3*)    (2D3N) RJ:A7 WB:RU-SR1 ST-A7:WB DALU:RB                    2D3   03FC C2D5 3000 200F 04AF 02EF
14076   $                       IF:DALU(31) X2(6D5N,2D5N);
14077   \3*)    (2D5N) IB:0000(FFN) RU:B0 DALU:RB-AND-IB WB:DALU ST-B0:WB  2D5   0359 16D2 BCFF 2000 04AF CB2D
14078   $                       IF:SELZERO- X2(6D3N,2D2N);
14079   \3*)    (6D5N) L3-WR-MEM-D'YINC2 IB:0000(FFN) RB:B0                6D5   0919 16D2 0CFF 2000 04AF CB2D
14080   $               CKHF
14081   \3*)    (2D2N) RB:A7 WB:RB-SR1 ST-A7:WB DALU:RB                    2D2   03FC C2D4 3C00 200F 04AF 02EF
14082   $               CKVL    IF:DALU(31) X2(6D4N,2D4N);
14083   \3*)    (2D4N) IB:0000(FFN) RB:B0 DALU:RB-AND-IB WB:DALU ST-B0:WB  2D4   0359 C2D2 BCFF 2000 04AF CB2D
14084   $                       IF:SELZERO-'DEC X2(602N,2D2N);
14085   \3*)    (6D4N) RB:B/SEL WB:RB LB-DA(WW:WB)                         6D4   0219 C6D6 B200 0017 04AF 02EF
14086   $               CKHF
14087   \3*)    (6D6N) RB:A7 WB:RB-SR1 ST-A7:WB DALU:RB                    6D6   03FC B200 3C00 200F 04AF 02EF
14088   $                       IF:SELZERO-'DEC X2(6D8N,2D8N);
14089   \3*)    (2D8N) IB:0000(FFN) RB:B0 DALU:RB-AND-IB WB:DALU ST-B0:WB  2D8   0359 C6D6 BCFF 2000 04AF CB2D
14090   $                       IF:SELZERO- X2(606N,206N);
14091   \3*)    (6D8N) RB:B7SEL WB:RB LU-DA(WR:WB)                         6D8   1300 C2CE 31C0 0017 04AF 0B2F
14092   $               CKHF
14093   \3*)    (2CEN) L3-WR-MEM-D'YINC2 IB:CC00(FFN) RB:30     GO-TO(2CEN) 2CE  0919 C2C2 BCFF 2000 04AF CB2D
14094   $                       DALU:RU-AND-IB WD:DALU ST-B0:WB
14095   ))                      IF:SELZERO- X2(6D2N,2D2N);
14096   $
14097   \3*)    (2D6N) FSEL:(7) GP-MISC3:X1                                206   0300 C2DA 9700 0000 31AF 0B2F
14098   $
14099   ))      (6D2N) FSEL:(7) GP-MISC3:X1                     GO-TO(2DAN) 602  0300 CC71 9700 0000 31AF 0B2F
14100   \\
14101   \3*)    (071N) RH:A7 WB:RU-SR1 ST-A7:WB DALU:RB                    071   03FC BC00 3000 200F 04AF 02EF
14102   $                       IF:SELZERO-'DEC X1'ELS(071N);
14103   \3*)    (2DCN)                                                     2DC   0319 5C71 BC00 0000 04AF 032F
14104   $
14105   \3*)    (6DCN) RJ:D7SEL WB:RB LB-DJ(WW:WB);                        6DC   0219 C2DA B200 0740 04AF 02EF
14106   $
14107   \3*)    (2DAN) RJ:A7 WB:RB-SR1 ST-A7:WB DALU:HB                    2DA   03FC C2DD 3000 200F 04AF 02EF
14108   $                       IF:DALU(31) X2(6DDN,2DDN);                 2DD   0319 120A B000 0000 04AF 0B2F
            (2DDN)
```

RTL/OULO FILE EDIT
MICROPROGRAM SECTION

SEQUENCE: $$MCS

| LINE # | | | | ADDRESS (HEX) | IMAGE (HEX) | | | | |
|---|---|---|---|---|---|---|---|---|---|
| 14109 | \3^| | | IF:SELZERO'DEC X2(6DDH,2DAH); | 6DD | 1319 | C2CE | B100 | 0740 | 046F | 032F |
| 14110 | \3^| | | IF:SELZERO'DEC X2(6DEH,2DEH); | 2DE | 0900 | CC71 | 3000 | 0000 | 04AF | 0B2F |
| 14111 | \ | | | GO-TO(071H); | 6DE | 180C | CCCA | 3C00 | 0000 | 04AF | 0B2F |
| 14112 | \3^| | (6DEH) RJ:D/SEL WB:RB LB-DA(WR:WB) | | | | | | | |
| 14113 | \ | | (2DEH) LJ-WR-MEM-D°YINC2 | | | | | | | |
| 14114 | \ | | (6DEH) LU-WR-MEM-W°YINC1 | GO-TO(0DAH); | 6DA | 1100 | CCDB | 33C0 | 1900 | 046F | 032F |
| 14115 | \3^| | (6DAH) RB:A1 WB:RB LB-STALL°WA:WB | GO-TO(6DBH); | 6DB | 180C | 5471 | 3C00 | 0000 | 04AF | 0B2F |
| 14116 | \3^| | (6DBH) LU-WR-MEM-W°YINC1 | | | | | | | |
| 14117 | \ | | | XL(3XL:SAVE); | 471 | 9707 | 2CC8 | C0C0 | 0000 | 64AF | 0B2F |
| 14118 | \ | | (471H) | XA; | | | | | | | |
| 14119 | 3XL:SAVE | | | | | | | | | | |
| 14120 | SKIP HOF: | | | | | | | | | | |
| 14121 | EXE:RSTR | | (58CH) LU-PW IB:SBZEX DALU:IB WB:DALU ST-A2:WB | | 580 | 95FB | C7D2 | 9700 | 200F | 1EAF | 012F |
| 14122 | \3^| | CKVL | IF:OHJS-ZERO X2(7D2H,3D2H); | 702 | 03F0 | 17D2 | 3000 | 21DF | 046F | 032F |
| 14123 | \3^| | (702H) RU:D1 JU:KD ST-A7:WB | | | | | | | |
| 14124 | \ | | CKVL | IF:OHUS-ZERO X2(1PF-7D,3D2H); | 703 | 9707 | 2CC8 | C000 | 0000 | 64AF | 0B2F |
| 14125 | SPF-7D | | (705H) | XA; | | | | | | | |
| 14126 | \ | | (3D2H) WB:P ST-A6:WB GP-MISC1:1X FLINK:(1) | | 3D2 | 0300 | C180 | A100 | 200E | 1EAF | 012F |
| 14127 | \ | | (180H) LU-P:Y°NONPROC WB:ZS ST-A2:WB | GO-TO(180H); | 180 | 30EC | C7C2 | 3C00 | 200A | 04AF | 006F |
| 14128 | \3^| | (5C2H) LB-PW°NONPROC IB:SHZEX DALU:IE WB:DALU ST-B7SEL:WB | | | | | | | |
| 14129 | SHSTR-S | | CKVL | IF:LAFMODE X2(SHSTR-L,SHSTR-S); | 3C2 | 0SFC | C2C4 | 3C00 | 200F | 04AF | 02EF |
| 14130 | \3^| | (7C2H) RB:A7 JB:RB-SR1 ST-A7:WB DALU:RB | | | | | | | |
| 14131 | \3^| | CKVL | IF:DALU(31) X2(6C4H,2C4H); | 6C2 | 03FC | C2C4 | 3C00 | 200F | 04AF | 02EF |
| 14132 | \ | | (6C2H) RB:A7 WB:RB-SR1 ST-A7:WB DALU:RB | | | | | | | |
| 14133 | \ | | (2C4H) | IF:DALU(31) X2(6C4H,2C4H); | 2C4 | 0319 | 13C2 | BC00 | 0000 | 04AF | 0B2F |
| 14134 | \3^| | (6C4H) LB-PW°NONPROC IB:SHZEX DALU:IE WB:DALU ST-B7SEL:WB | | | | | | | |
| 14135 | SHSTR-L | | CKVL | IF:SELZERO-°DEC X2(6C2H,2C2H); | 6C4 | 3559 | CEC2 | BC00 | 2017 | 04AF | 7B25 |
| 14136 | \3^| | (7C2H) RB:A7 WB:RB-SR1 ST-A7:WB DALU:RB | | | | | | | |
| 14137 | \ | | CKVL | IF:DALU(31) X2(6C4H,2C4H); | 6C5 | 03FC | C2C5 | 3C00 | 200F | 04AF | 02EF |
| 14138 | \ | | (3C5H) RB:A7 WB:RB-SR1 ST-A7:WB DALU:RB | | | | | | | |
| 14139 | \3^| | CKVL | IF:DALU(31) X2(6C5H,2C5H); | 3C5 | 03FC | C2C5 | 3C00 | 200F | 04AF | 02EF |
| 14140 | \3^| | (2C5H) | | 2C5 | 0319 | C3C3 | BC00 | 0000 | 04AF | 0B2F |
| 14141 | \ | | (6C5H) | IF:SELZERO-°DEC X2(7C5H,3C5H); | 6C5 | 0319 | CEC3 | 0C00 | 0000 | 04AF | 0B2F |
| 14142 | \3^| | (6C5H) LB-PA°NONPROC IB:SB JU:DALJ ST-B7SEL:WB | | | | | | | |
| 14143 | \3^| | CKHF | IF:SELZERO'DEC X2(SHSTR-L); | 6C5 | 3059 | C7C2 | B000 | 2017 | 04AF | 4B25 |
| 14144 | \ | | (2C2H) RB:90 WB:RB RILOAD:WB | | | | | | | |
| 14145 | \3^| | CKHF | | 2C2 | 030C | C7C3 | 3CFF | 0000 | 04AF | 032F |
| 14146 | \ | | (2C5H) LU-PW IB:SB DALU:IB WB:DALU RILOAD:WB | GO-TO(7C5H); | 2C5 | 950C | C7C3 | 3CFF | 0000 | 04AF | 4B25 |
| 14147 | \ | | (6C5H) | GO-TO(7C5H); | 6C5 | | | | | | |
| 14148 | \3^| | (7C5H) FSEL:(7) RB:A6 WB:RB BALU:WB-ADD1 LB-STALL°Y:BALU | | 7C5 | 2100 | 02EC | 9700 | 000E | 0480 | 032F |

```
                              RTL/6000 FILE EDIT
                              MICROPROGRAM SECTION

SEQUENCE: $$MCS                                    ADDRESS  IMAGE
                                                                                 (HEX)    (HEX)

LINE #
14156  //      (2EC#) RB:A7 WB:RB-SR1 ST-A7:WB DALU:RB              GO-TO(2EC#); 2EC  03FC C2C8 3000 200F 04AF 02EF
14157  \\           CKVL
14158  |*|                                   IF:DALU(51) X2(6C8#,2C8#);          2C8  0319 C2EC B000 0000 02AF 0B2F
14159  \\      (2C8#) GP-MISC0:X0
14160  |*|                                   IF:SELZERO*DEC X2(6EC#,2EC#);
14161  \\      (6C8#) LB-P*'IONPROC IB:SB DALU:10 ST-07SEL:DALU                  6C8  3519 C2EC B000 C740 01AF 4B25
14162  \\           GP-MISC0:X1              IF:SELZERO*DEC X2(6EC#,2EC#);
14163  \\      (6EC#) R*:A1 WB:RB-SR4 ST-A0:WB                                   6EC  0300 C2C7 3000 3908 046F 026F
14164  \\      (2C7#) R*:DU 4H:R3-SW ST-B0:WB                       GO-TO(2C7#); 2C7  0325 5270 3000 2000 046F 022F
14165  \\
14166  \\      (5F1#) R3:A0 DALU:R0 ST-M1:DALU WB:RB GP-MISC5:X0*(HOTM1);        5F1  ABC0 C184 3200 9908 50AF 032F
14167  $XL:M1M:RSTR CKVL LU-P:Y*PREFETCH                        GO-TO(5PF-BR-18);
14168  \\      (671#) L3-P:Y*PREFETCH                                            671  ABC0 C184 3C00 0000 04AF 0B2F
14169  $XL:HSTR CKVL                                            GO-TO(5PF-BR-18);
14170  \\
14171  SKIP HOF:
14172  $RUPT   (020#) L3-RD-LOCAL(MFU,4) IB:00FF(80#) RB:IV         GO-TO(0B0#); 020  2A80 CCEN 6480 3508 046F FB2D
14173  \\           DALU:RB-AND-I* WB:DALU ST-A0:WB
14174  \\      (0B0#) L9-STALL IB:U0FF(C0#) RB:IV DALU:RB-AND-I# WB:DALU         0B0  0065 1CB1 A200 3500 046F FB2D
14175  \\           CKMF ST-B0:WB FLINK:(2)           IF:PFI X2(400#,0B1#);
14176  \\      (4BC#) DALU:000000 ST-D0:DALU WB:DALU LB-DW(W4:WB)               4B0  022C C09E 3200 C000 70AF 0B2C
14177  \\           GP-MISC7:X0*PFI-ACK   IF:LAFMODE X2(69E#,29E#);
14178  \\      (0B1#) L3-DW(W4:WB) IB:SB DALU:1B ST-D0:DALU WB:DALU             0B1  022C C09E 3200 C000 04AF 4B25
14179  \\                                   IF:LAFMODE X2(69E#,29E#);
14180  \\      (29E#) IB:0000(3F#) RB:D0 DALU:RB-AND-I# ST-D0:DALU GO-TO(0B2#);  29E  230C CCB2 3C3F C000 046F 026F
14181  \\           HB:DALU DALU:WB LB-DA*Y:BALU
14182  \\      (69E#) IB:0000(3F#) RB:D0 DALU:RB-AND-I0 ST-D0:DALU GO-TO(0B2#);  69E  230C CCB2 3C3F C000 046F CB6D
14183  \\           WB:DALU-SL1 BALU:WB LB-DA*Y:BALU
14184  \\      (0B2#) IB:A0 WB:Y BALU:WB-OR-IB LB-DA*Y:BALU GP-MISC0:1X         0B2  2300 CCB3 3C00 0008 0EA7 092F
14185  \\                                                          GO-TO(0B3#);
14186  \\      (0B3#) LB-DA*RD-MEM-D R3:D0 WB:RB-SR4 ST-A0:WB                   0B3  1B0C CCB4 3C00 2008 056F 026F
14187  \\                                                          GO-TO(0R4#);
14188  \\      (0B4#) LH-STALL W3:P ST-A6:WB                                    0E4  002C C*9F 3C00 200E 04AF 012F
14189  \\
14190  \\      (29F#) L3-DW*Y:BALU IB:SRZEX BALU:1B DALU:1B WB:DALU             29F  22FB C6A8 3CC0 0000 04A5 7B25
14191  $XE:LEV    CKVL                      IF:OBUS-ZERO X2(SLEV-ABORT,2A8#);
14192  \\      (69F#) LB-DA*Y:BALU IB:SB    BALU:1B DALU:1B WB:DALU             69F  23FB C6A8 3CC0 0000 04A5 4B25
14193  \\           CKVL                    IF:OBUS-ZERO X2(SLEV-ABORT,2A8#);
14194  \\      (2A8#) LU-WR-4EM-W*YINC1 GP-MISC2:X1                             2A8  1800 C165 3C00 000C 21AF 0B2F
14195  \\                                                          GO-TO($ISM-H);
14196  \\      (583#) LH-D**Y:BALU BRA40 IU:SBSEX DALU:10 ST-D0:DALU            583  2212 C732 3C00 200E 0480 6125
14197  $XL:TRAP:LEV WU:P UALU:WB-ADD1
14198  \\                                   IF:PRIVILEGED X2(SXL:TRAP:LEV,$TV13);
14199  \\      (732#) ID:FFFF(C0#) RB:D0 DALU:R0-AND-NOT-1B WB:DALU-SR4         732  0341 C15E 30C0 2008 056F EA6E
14200  \\           CKHF ST-A0:WB GP-X0LOAD-OFFSET
14201  \\                                   IF:SIPTRAP X2(55E#,15E#);
14202  \\      (55E#)                                                           55E  0302 115E 3000 0000 04AF 0B2F
```

RTL/6000 FILE EDIT
MICROPROGRAM SECTION

```
SEQUENCE: $IMCS
                            IF:SIP-PRESENT X2($SFN,15EN);
                                                                GO-TO($UNDO);
          ($5FN)          (15EN) IB:FFFF(00N) RB:IV DALU:RB-AND-IB WB:DALU ST-B0:WB
                            CKHF FLINK:(2)                      GO-TO(15FN);
          (15FN)          WJ:Y ST-A6:WB
                                                                GO-TO($ISM-H);
$XL:ISM-H:LEV  (682N)    LB-DW IB:SB DALU:IB
                            CKVL                  IF:DALU(24) X2($LEV2,15BN);
          (15EN)          IB:0000(20N) RB:00 DALU:RB-OR-IB ST-E0:DALU
                            WB:DALU-SW*Q:HEXB CIP-STALL
                                                 IF:CIPTRAP X2(61DN,21DN);
          (01DN)                                 IF:CIP-PRESENT X2($UNDO,21DN);
$LEV2     (55EN)          IB:0000(20N) RB:00 DALU:RB-OR-IB ST-E0:DALU
                            WB:DALU-SW*Q:HEXB GP-MISC0:1X      GO-TO(21DN);
          (21DN)          AO RB:E0 DALU:R9-OR-I3 WB:DALU BALU:WB
                            LB-STALL'Y:BALU      IF:LAFMODE X2(692N,290N);
          (292N)          LB-DW*R0-AEM-W I3:0000(3FN) RB:D0 DALU:RB-AND-IB
                            CKHF LU:DALU ST-A7:WB            GO-TO(U62N);
          (692N)          LB-DW*R0-AEM-W IB:0000(3FN) RB:D0 DALU:RB-AND-IB
                            CKHF WB:DALU-SL1 ST-A7:WB        GO-TO(062N);
          (062N)          LB-STALL IB:42EX DALU:IB ST-E1:DALU
                            CKHL                IF:INDEXED X2(691N,291N);
          (291N)                                 IF:LAFMODE X2(692N,292N);
                                                                GO-TO(063N);
          (292N)          LB-WR-MEM-W'YINC1 RB:IV WB:RB ST-A0:WB
                                                                GO-TO(063N);
          (692N)          LB-DW'MEM-W'YINC1 RB:IV WB:RB-SR1 ST-A0:WB
                                                                GO-TO(063N);
          (063N)          MM:ZS ST-A2:WB GP-MISC1:1X RB:00
                            CKHL                IF:RBUS16-\S-BIT\ X2(453N,$RE$USP);
          (053N)          I3:0000(3FN) RB:A0 DALU:RB-AND-IB WB:DALU-SR4
          (453N)          CKHF ST-A0:WB GP-XOLOAD               GO-TO($LEV2);
          (041N)          R3:00 4B:RB-SL1 ST-A0:WB DALU:RB
                            CKHL                IF:DALU(24)\Q-BIT\ X2($QLC1,041N);
$XL:PF-44 (440N)                                 IF:3XL*PF-44,$SCAN);
                                                                XA;
$RESUSP   (691N)          LB-DW('W:WB) IB:SB RE:E1 DALU:IB-AND-NOT-RB
                            WB:DALU                             GO-TO(078N);
          (078N)          LU-WR-MEM-W'YINC1 R3:00 DALU:R3
                                                IF:DALU(24)\Q-EIT\ X2($QLC1,$SCAN);
          (04CN)          RB:E0 AD:RB BALU:WB LB-STALL'Y:BALU
                                                                GO-TO(085N);
$SCAN     (085N)          LD-P:Y'NONPROC IB:FFFF(00N) DALU:IB WB:DALU-SL2
                            CKVL ST-A7:WB                       GO-TO(0C8N);
```

| ADDRESS (HEX) | IMAGE (HEX) | | | | |
|---|---|---|---|---|---|
| 55F | 0300 C61C 3000 0000 04AF | 0B2F |
| 15E | 034C C15F A200 3500 046F | EB2D |
| 15F | 0300 C165 3C00 200E 04AF | 092F |
| 682 | 02FC C15B 3000 0000 04AF | 4B25 |
| 15B | 4309 C21D 3C20 D000 04AF | CE27 |
| 61D | 030A 121D 3C00 0000 04AF | 0B2F |
| 55B | 0300 021D 3C20 D000 04AF | CE27 |
| 21D | 212C C690 3000 1008 046F | 0B27 |
| 290 | 1A40 CC62 303F 200F 046F | CB2D |
| 690 | 1A40 CC62 303F 200F 046F | CB6D |
| 062 | 0033 C691 3C00 D100 04AF | 3B25 |
| 291 | 022C C692 3200 1100 046F | 4B27 |
| 292 | 1800 0C63 3000 5508 046F | 032F |
| 692 | 1800 CC63 3000 3508 046F | 02EF |
| 063 | 0380 C453 3000 200A 1E6F | 006F |
| 053 | 0340 C55B 303F 2008 05AF | CA6D |
| 453 | 03FC CC41 3000 2008 046F | 036F |
| 041 | 0380 CC40 0008 0000 046F | 0B2F |
| 440 | 9707 2C08 C000 0000 64AF | 0B2F |
| 691 | 0200 CC78 3200 1100 046F | 4B24 |
| 078 | 183C 1C40 3000 0000 046F | 0B2F |
| 04C | 2100 0CB5 3000 1000 046F | 032F |
| 085 | 3BC0 FCC8 3000 200F 04AF | EBA5 |

RTL/6000 FILE EDIT
MICROPROGRAM SECTION

SEQUENCE: $SMCS

| LINE # | | | | ADDRESS (HEX) | IMAGE (HEX) | | | | | | |
|---|---|---|---|---|---|---|---|---|---|---|---|
| 14251 | $ | (DC8H) LB-PW*NONPROC IB:SBZEX DALU:IB WB:DALU-SR4"Q:QSR4 | | DC8 | 35FB | C293 | 3000 | 2009 | 04AF | 7E65 | |
| 14252 | ; | CKVL ST-A1:WB | | | | | | | | | |
| 14253 | ; | (293H) LH-PW*NONPROC IB:SBZEX DALU:IB WB:DALU-SR4"Q:QSR4 | | 293 | 35FB | C294 | 3000 | 2009 | 04AF | 7E65 | |
| 14254 | ; | CKVL ST-A1:WB | | | | | | | | | |
| 14255 | ; | (294H) LB-PW*NONPROC IB:SBZEX DALU:IB WB:DALU-SR4"Q:QSR4 | | 294 | 35FB | C295 | 3000 | 2009 | 04AF | 7E65 | |
| 14256 | ; | CKVL ST-A1:WB | | | | | | | | | |
| 14257 | ; | (295H) LB-PW*NONPROC IB:SBZEX DALU:IB WB:DALU-SR4"Q:QSR4 | | 295 | 3540 | C067 | 3000 | 2009 | 04AF | 7E65 | |
| 14258 | ; | CKHF ST-A1:WB GO-TO(067H) | | | | | | | | | |
| 14259 | ; | (693H) RB:A1 WB:RB-SR4"Q:QSR4 ST-A1:WB IB:FFFF(F8H) | | 693 | 23FB | C6EA | 30F8 | 2009 | 04A5 | E66F | |
| 14260 | ; | CKVL BALU:IB LH-DA"Y:BALU | | | | | | | | | |
| 14261 | ; | IF:OBUS-ZERO X2(6EAH,2EAH); | | | | | | | | | |
| 14262 | ; | (694H) RB:A1 WB:RB-SR4"Q:QSR4 ST-A1:WB IB:FFFF(F0H) | | 694 | 23FB | C6EA | 3CF0 | 2009 | 04A5 | E66F | |
| 14263 | ; | CKVL BALU:IB LB-DA"Y:BALU | | | | | | | | | |
| 14264 | ; | IF:OBUS-ZERO X2(6EAH,2EAH); | | | | | | | | | |
| 14265 | ; | (695H) RB:A1 WB:RB-SR4"Q:QSR4 ST-A1:WB IB:FFFF(E8H) | | 695 | 23FB | C6EA | 30E8 | 2009 | 04A5 | E66F | |
| 14266 | ; | CKVL BALU:IB LB-DA"Y:BALU | | | | | | | | | |
| 14267 | ; | IF:OBUS-ZERO X2(6EAH,2EAH); | | | | | | | | | |
| 14268 | ; | (067H) RB:A1 WB:RB-SR4"Q:QSR4 ST-A1:WB IB:FFFF(E0H) | | 067 | 23FB | C6EA | 3CE0 | 2009 | 04A5 | E66F | |
| 14269 | ; | CKVL JALU:IB LB-DA"Y:BALU | | | | | | | | | |
| 14270 | ; | IF:OBUS-ZERO X2(6EAH,2EAH); | | | | | | | | | |
| 14271 | ; | (2EAH) RB:A1 WB:RB-SR4"Q:QSR4 ST-A1:WB LB-DA"Y:BALU | | 2EA | 33FB | C6EA | 3000 | 2009 | 04AF | 066F | |
| 14272 | ; | CKVL IF:OBUS-ZERO X2(6EAH,2EAH); | | | | | | | | | |
| 14273 | ; | (6EAH) WB:Y BALU:WB-ADD1-WB LB-DA"Y:BALU IB:QZEX RB:A7 | | 6EA | 23F8 | C2EB | 3000 | D10F | 0483 | 3919 | |
| 14274 | ; | CKVL DALU:RB-ADD-IB ST-E1:DALU | | | | | | | | | |
| 14275 | ; | IF:DCARRY16 X2(6EBH,2EBH); | | | | | | | | | |
| 14276 | ; | (2EBH) IB:QZEX RB:E1 DALU:RB-ADD-IB | | 2EB | 03F8 | C298 | 3CC0 | 1100 | 046F | 3B19 | |
| 14277 | ; | CKVL IF:DCARRY16 X2(698H,298H); | | | | | | | | | |
| 14278 | ; | (6EBH) IB:A7 RB:E1 DALU:RB-ADD-IB LB-DA"YINC2 | | 6EB | 33F8 | C298 | 3CC0 | 11DF | 046F | 0B19 | |
| 14279 | ; | CKVL IF:DCARRY16 X2(698H,298H); | | | | | | | | | |
| 14280 | ; | (298H) WB:Y ST-AC:WB BALU:WB-ADD1-WB LB-DA"Y:BALU | | 298 | 256C | C699 | 3C60 | F008 | 0443 | C919 | |
| 14281 | ; | CKHF IB:DOOO(60H) RB:E0 DALU:RB-ADD-IB ST-E0:DALU | | | | | | | | | |
| 14282 | ; | (698H) IB:QZEX ST-A0:WB IB:DOOC(60H) RB:E0 DALU:RB-ADD-IB | | 698 | 056C | C69A | 3C60 | F008 | 046F | C919 | |
| 14283 | ; | CKHF ST-E0:DALU | | | | | | | | | |
| 14284 | ; | (29AH) IB:A0 WB:E0 BALU:WB-SUB-IB LB-STALL"Y:BALU | | 299 | 2100 | CCA1 | 3000 | 1005 | 0446 | 032F | |
| 14285 | ;Y=LVA1 | GO-TO(OA1H) | | | | | | | | | |
| 14286 | ; | (699H) IB:A0 RB:E0 DALU:RB-SUB1-WB BALU:WB-SUB-IB | | 699 | 2180 | CCA1 | 3000 | 1008 | 0446 | 0B06 | |
| 14287 | ; | CKHL LB-STALL"Y:EALU GO-TO(OA1H); | | | | | | | | | |
| 14288 | ; | (29AH) IB:A0 RB:E0 WB:R9 BALU:WB-SUB1-IB LB-STALL"Y:BALU | | 29A | 2100 | CCA1 | 3000 | 1008 | 0456 | 032F | |
| 14289 | ; | CKHL DALU:WR-SUB1-WB LB-STALL"Y:BALU GO-TO(OA1H); | | | | | | | | | |
| 14290 | ; | (69AH) IB:A0 RB:E0 DALU:RB-SUB1-IB LB-STALL"Y:BALU | | 69A | 2180 | CCA1 | 3000 | 1008 | 0456 | 0B16 | |
| 14291 | ; | CKHL BALU:WR-SUB1-WB LB-STALL"Y:BALU GO-TO(OA1H) | | | | | | | | | |
| 14292 | ; | (0A1H) LB-DA"RD-MEM-D W3:Y ST-A7:WB | | 0A1 | 1B2C | 069B | 3000 | 200F | 04AF | 092F | |
| 14293 | ; | | | | | | | | | | |
| 14294 | ; | (6A8H) RB:IV WB:RB ST-A7:W3 IF:LAFMODE X2(69BH,29BH); | | 6A8 | 032C | C69B | 3C00 | 350F | 046F | 032F | |
| 14295 | $LEV-AUORT | | | | | | | | | | | |
| 14296 | ; | (29BH) LB-STALL IB:A7 RB:IV DALU:RB-XOR-IB WB:DALU | | 29B | 00FB | CC5E | 3000 | 15DF | 046F | 0B26 | |
| 14297 | ; | IF:LAFMODE X2(69BH,29BH); | | | | | | | | | |

RIL/6000 FILE EDIT
MICROPROGRAM SECTION

SEQUENCE: S&HCS

| LINE # | | | |
|---|---|---|---|
| 14298 | // | CKVL | IF:OBUS-ZERO-\LVA::LVC\ X2(45EH,$QLC2S) |
| 14299 | // | (69EH) LB-STALL IB:A7 RB:IV DALU:RJ-XOR-IB WB:DALU | |
| 14300 | // | CKVL | IF:OBUS-ZERO- X2(45CH,$QLC2S) |
| 14301 | $ // | (45EH) LB-DW IB:SB2EX DALU:IB WB:DALU ST-A1:WB | |
| 14302 | // | CKVL | IF:OBUS-ZERO-\IVA::O\ XL'ELS(051H) |
| 14303 | // | (45CH) LB-DA IB:SB DALU:IB WB:DALU ST-A1:WB | |
| 14304 | // | CKVL | IF:OBUS-ZERO- XL'ELS(052H) |
| 14305 | // | (051H) IB:0000(3FH) RB:A7 DALU:RB-AND-IB ST-D0:DALU | |
| 14306 | // | | GO-TO(0A2H) |
| 14307 | // | (052H) IB:0000(7EH) RB:A7 DALU:RB-AND-IB ST-D0:DALU | |
| 14308 | // | | GO-TO(0A3H) |
| 14309 | $ // | (0A2H) IB:0000(3FH) RB:D0 DALU:RB-SUB-IB WB:RB ST-A0:WB | |
| 14310 | // | CKVL | IF:DCARRY16 XL'ELS($RESUSP) |
| 14311 | $ // | (0A3H) IB:0000(7EH) RB:D0 DALU:RB-SUB-IB WB:RB-SR1 | |
| 14312 | // | CKVL ST-A0:WB | IF:DCARRY16 XL'ELS($RESUSP) |
| 14313 | $XL:LEV-IVC // | (452H) RB:IV WB:RB BALU:WB LB-STALL'Y:BALU | |
| 14314 | // | | GO-TO(0A4H) |
| 14315 | $ // | (0A4H) LB-DA'RD-MEM-D RU:A7 DALU:RB ST-K0:DALU | |
| 14316 | // | | GO-TO(0A5H) |
| 14317 | $ // | (0A5H) LB-STALL | |
| 14318 | // | | IF:CIP-PRESENT X2(66FH,$LEV-SAVED) |
| 14319 | $ // | (29CH) LB-DW IB:SB2EX DALU:IB WB:DALU FLINK:(1) | |
| 14320 | // | CKVL | IF:OBUS-ZERO-\IVC::O\ X2(45AH,05AH) |
| 14321 | $ // | (69CH) LB-DA IB:SB DALU:IB WB:DALU FLINK:(1) | |
| 14322 | // | CKVL | IF:OBUS-ZERO- X2(45BH,05AH) |
| 14323 | $ // | (05AH) GP-MISC5:X1 CIP-STALL | |
| 14324 | // | | IF:CIPTRAP- X2(66FH,26FH) |
| 14325 | $ // | (26FH) GP-MISC5:X0 | |
| 14326 | // | | IF:CIP-PRESENT X2(66FH,$LEV-SAVED) |
| 14327 | $ // | (66FH) LB-RD-LOCAL(CIP,2) GP-MISC5:X0 | |
| 14328 | // | | GO-TO($LEV-SAVED) |
| 14329 | $ // | (45AH) IB:A1 RB:E1 DALU:RB-XOR-IB WB:DALU FLINK:(1) | |
| 14330 | // | CKVL | IF:OBUS-ZERO- X2(45FH,$QLC2S) |
| 14331 | $ // | (45EH) IB:A1 RB:E1 DALU:RB-XOR-IB WB:DALU FLINK:(1) | |
| 14332 | // | CKVL | IF:OBUS-ZERO- X2(45DH,$QLC2L) |
| 14333 | $QLC2S // | (05EH) RB:A7 DALU:RB ST-IV:DALU WB:RB LB-DA(WR:WB) | |
| 14334 | // | FLINK:(D) | GO-TO(0AAH) |
| 14335 | $QLC2L // | (05CH) RB:A7 DALU:RB ST-IV:DALU WB:RB-SR1 LB-DA(WR:WB) | |
| 14336 | // | FLINK:(D) | GO-TO(0AAH) |
| 14337 | $QLC1 // | (441H) RB:IV WB:RB BALU:WB LB-STALL'Y:BALU | |
| 14338 | $ // | (0AAH) LB-DA'RD-MEM-D I1:0000(50H) RB:E0 DALU:RB-OR-IB | |
| 14339 | // | WB:DALU'Q:DALU | GO-TO(0A7H) |
| 14340 | $ // | (0A7H) IB:02EX RB:A7 DALU:RB-OR-IB ST-IV:DALU WB:DALU | |
| 14341 | // | CKdF ST-A7:WB HALU:WB LB-STALL'Y:BALU | |
| 14342 | // | | IF:LAFMODE X2(69DH,29DH) |
| 14343 | // | | |

| ADDRESS (HEX) | IMAGE (HEX) | | | | | |
|---|---|---|---|---|---|---|
| 698 | 00FB | CC5C | 3000 | 150F | 046F | 0B26 |
| 45E | 02FB | 5C51 | 3000 | 2009 | 04AF | 7B25 |
| 45C | 15FB | 5C52 | 3000 | 2009 | 04AF | 4B25 |
| 051 | 0300 | CCA2 | 3C3F | C00F | 04AF | CB2D |
| 052 | 0300 | CCA3 | 3C7E | C00F | 04AF | CB2D |
| 0A2 | 03F8 | 5053 | 303F | 2008 | 046F | C306 |
| 0A3 | 03F8 | 5C53 | 307E | 2008 | 046F | C2C6 |
| 452 | 2100 | CCA4 | 3CC0 | 1500 | 046F | 032F |
| 0A4 | 1800 | CCA5 | 3C00 | C80F | 04AF | 0B2F |
| 0A5 | 002C | C69C | 3C00 | 0000 | 04AF | 0B2F |
| 29C | 02FB | 0C5A | 3C00 | D100 | 046F | 7B25 |
| 69C | 15FB | 1C5A | 3C00 | D100 | 04AF | 4B25 |
| 05A | 4309 | C66F | 3000 | 0000 | 51AF | 0B2F |
| 26F | 030A | 126E | 3000 | 0000 | 52AF | 0B2F |
| 66F | 28C0 | C26E | 4200 | 0000 | 52AF | 0B2F |
| 45A | 03FB | 1C5E | A100 | 1109 | 046F | 0B26 |
| 45B | 03FB | 1C5C | A100 | 1109 | 046F | 0B26 |
| 05E | 1300 | CCAA | A000 | D50F | 04AF | 032F |
| 05C | 1300 | CCAA | A000 | D50F | 04AF | 02EF |
| 441 | 2100 | CCA6 | 3CC0 | 1500 | 046F | 032F |
| 0A6 | 1800 | CCA7 | 3C8C | 0000 | 04AF | CF27 |
| 0A7 | 216C | C69D | 3C00 | F50F | 04AF | 3B27 |

RTL/6000 FILE EDIT
MICROPROGRAM SECTION

SEQUENCE: $IMCS

```
LINE #
14344           (27DH) LJ-DW(WW:WB) IB:SB DALU:IB WB:DALU          GO-TO(OA8H);
14345    \\
14346    \\     (070H) LJ-DA(WA:WB) IB:SB DALU:IB WB:DALU          GO-TO(OA9H);
14347    \\
14348    \\     (0A8H) LJ-WR-MEM-W'YINC1(WR:WB) RB:A7 DALU:RB ST-IV:DALU
14349    \\                    WB:RB FLINK:(D)                     GO-TO(0AAH);
14350    \\     (0A9H) LJ-WR-MEM-D'YINC2(WR:WB) RB:A7 DALU:RB ST-IV:DALU
14351    \\                    WB:RB-SR1 FLINK:(D)                 GO-TO(0AAH);
14352    \\     (0AAH) LB-WR-LOCAL(MMU,5) GP-INIT
14353    \\                                                 GO-TO($XL:P:A6);
14354    \\
14355    \\     (45FH) RB:A6 WB:RB LB-STALL'WR:WB
14356    \\                    IF:MISC2A X2(SLVL-CHG,SISM-H)
14357    \\     (45DH) RB:A6 WB:RH LB-STALL'WA:WB                  GO-TO(OAEH);
14358  $XL:ISM-H:LEV2 (681H) LB-DJ'Y:DALU RB:E1 WB:RB BALU:WB-ADD1 GP-MISC3:X1
14359    \\             CKHL IR:SH         IF:MISC2A X2(SLVL-CHG,SISM-H);
14360    \\     (15AH) LJ-DA'RD-MEM-D GP-MISC2:1X
14361    \\                    IF:MISC2A X2(SSAH,15AH);
14362    \\     (55AH) LJ-DA'RD-MEM-D GP-MISC2:1X                  GO-TO(OAEH);
14363    \\
14364    \\     (OAEH) LB-STALL'YINC2 DALU:FFFFF WB:DALU
14365    \\                    GP-MISC5:XO'(RING)                  GO-TO(OAFH);
14366    \\     (OAFH) LB-DA IB:SBZEX DALU:IR ST-E2:DALU FLINK:(2)
14367    \\                                                        GO-TO(OADH);
14368    \\     (OADH) LJ-DW IB:SHZEX DALU:IB WB:DALU ST-A7:WB
14369    \\                    IF:LAFMODE X2(6A9H,2A9H);
14370    \\     (2A9H) LB-WR-MEM-W'YINC1 WH:ZS ST-BO:WB IB:0000(04H)
14371    \\             CKHF            RH:E1 DALU:HB-SUB-IB ST-E1:DALU GP-MISC3:X0
14372    \\                    RB:E1 DALU:RB-SUB-1B ST-E1:DALU GP-MISC3:X0
14373    \\                                                        GO-TO($STS-SAF);
14374    \\                                                        GO-TO($STS-LAF);
14375  $XL:STS:LEV    (602H) LJ-WR-MEM-W'YINC1 DALU:000000 WB:DALU ST-A0:WB
14376    \\                                                        GO-TO($SAVE-SUB);
14377  $XL:SAVE:LEV   (472H) RJ:E2 WB:RB-SW ST-A7:WB GP-MISC3:X1 FSEL-LINK:(3)
14378    \\             CKVL DALJ:RO      IF:DALU(31)\SVMSK-31\ X2(6AAH,2AAH);
14379    \\     (6AAH) RJ:M6SEL WB:RB LJ-DA(WA:WB)
14380    \\                                                        GO-TO(6A8H);
14381    \\     (6A8H) RJ:M7SEL WB:RB-SR4 ST-B0:WB
14382    \\                                                XL($XL:LEV-M23)
14383  $XL:LEV-M23    (6A3H) RH:00 WB:RB-SR4 ST-B0:WB FSEL-LINK:(5)
14384    \\                                                        GO-TO($XL:LEV-M45)
14385  $XL:LEV-M45    (6A5H) RJ:00 WB:RB-SR4 ST-B0:WB FSEL-LINK:(7)
14386    \\                                                        GO-TO($XL:LEV-M67)
14387  $XL:LEV-M67    (6A7H) RJ:00 WB:RB-SR4 ST-B0:WB FSEL-LINK:(0)
14388    \\                                                        GO-TO(OB7H);
14389    \\     (OB7H) IA:00(FFH) RJ:10 DALJ:RB-OR-1B WB:DALU-SW
14390    \\             LB-DJ(WR:WE)                               GO-TO(OB8H);
```

| ADDRESS (HEX) | IMAGE (HEX) | | | | | | |
|---|---|---|---|---|---|---|---|
| 290 | 0200 | CCA8 | 32C0 | 0000 | 04AF | 4B25 | |
| 690 | 1300 | 0CA9 | 3300 | 0000 | 04AF | 4B25 | |
| 0A8 | 1800 | CCAA | ADC0 | D50F | 04AF | 032F | |
| 0A9 | 0900 | 0CAA | A000 | D50F | 04AF | 02EF | |
| 0AA | 2880 | C7BF | 6500 | 0000 | 64AF | 0B2F | |
| 45F | 0131 | 1565 | 32C0 | 000E | 04AF | 032F | |
| 45D | 1131 | 1565 | 3300 | 000E | 04AF | 032F | |
| 681 | 2287 | C15A | 3000 | 1100 | 3140 | 432F | |
| 15A | 1800 | CCAE | 3000 | 0000 | 2EAF | 0B2F | |
| 55A | 1000 | CCAE | 3000 | 0000 | 51AF | 0B2F | |
| 0AE | 3000 | CCAF | 3400 | 0000 | 50AF | 0B23 | |
| 0AF | 1300 | CCAD | A200 | D200 | 04AF | 7B25 | |
| 0AD | 026C | C6A9 | 3000 | 200F | 04AF | 7B25 | |
| 2A9 | 1800 | 0388 | 3004 | F100 | 326F | C046 | |
| 6A9 | 0900 | C788 | 3CC7 | F100 | 326F | C046 | |
| 602 | 1800 | CC70 | 3C00 | 2008 | 04AF | 0B2C | |
| 472 | 03FC | C2AA | 8300 | 320F | 316F | 022F | |
| 6AA | 1500 | C6AB | 3300 | 1E40 | 046F | 032F | |
| 6AB | 0300 | 56A3 | 3000 | 3F40 | 046F | 026F | |
| 6A3 | 0300 | CCE7 | 8500 | 2000 | 04AF | 026F | |
| 6A5 | 0300 | CCE7 | 8700 | 2000 | 04AF | 026F | |
| 6A7 | 0300 | CCE8 | 8000 | 2000 | 04AF | 026F | |
| 0B7 | 0200 | CCE8 | 31FF | 0000 | 04AF | CA27 | |

RTL/6000 FILE EDIT
MICROPROGRAM SECTION

| LINE # | | | SEQUENCE: $$MCS | ADDRESS (HEX) | IMAGE (HEX) | | | | | |
|---|---|---|---|---|---|---|---|---|---|---|
| | | | | 0B8 | 0919 | 16AA | 03C0 | 1E40 | 046F | 032F |
| 14392 | 5 | // | (0B8H) LB-WR-MEM-D*YINC2(WA:WB) RB:MOSEL WB:RB | | | | | | | |
| 14393 | // | | IF:SELZERO- X2(6AUH,2AAH); | 2AA | 022C | 06F0 | 03C0 | 1E40 | 326F | 032F |
| 14394 | 6 | // | (2AAH) RB:STKP WB:RB LB-DA(WA:WB) GP-MISC3:X0 FLINK:(6) | | | | | | | |
| 14395 | // | | IF:LAFMODE X2(6F0H,2F0H); | 6F0 | 1500 | C2F0 | 3300 | 1400 | 046F | 032F |
| 14396 | 6 | // | (6F0H) RB:STKP WB:RB LB-DA(WA:WB) | | | | | | | |
| 14397 | // | | GO-TO(2F0H); | | | | | | | |
| 14398 | 6 | // | (2F0H) RB:Y ST-A6:WB RB:E2 DALU:RB GP-MISC1:1X FSEL:(0) | 2F0 | 03FC | C2AC | 9000 | 320E | 1E6F | 092F |
| 14399 | // | | IF:DALU(30)\SVMSK-30\ X2(6ACH,2ACH); | | | | | | | |
| 14400 | 6 | // | (6ACH) | 6AC | 032C | C6F1 | 3C00 | 0000 | 04AF | 0B2F |
| 14401 | // | | CKVL | | | | | | | |
| 14402 | 6 | // | (2ACH) RB:E2 DALU:RB | 2AC | 03FC | 16D1 | 3C00 | 1205 | 046F | 0B2F |
| 14403 | // | | CKVL | | | | | | | |
| 14404 | 6 | // | (2D1H) IB:0000(C0H) RB:A2 DALU:RB-AND-1B WB:DALU-SR4 | 2D1 | 036C | C6AD | 3C00 | 200A | 04AF | CA6D |
| 14405 | // | | CKHF ST-A2:WB IF:LAFMODE X2(6ADH,2ADH); | | | | | | | |
| 14406 | 6 | // | (2ADH) RB:A2 WB:RB-SR2 ST-A2:WB | 2AD | 0300 | CCB9 | 3000 | 200A | 04AF | 02AF |
| 14407 | // | | GO-TO(0B9H); | | | | | | | |
| 14408 | 6 | // | (6ABH) RB:A2 WB:RB-SR1 ST-A2:WB | 6AB | 0300 | CCE9 | 3000 | 200A | 04AF | 02EF |
| 14409 | // | | GO-TO(0B9H); | | | | | | | |
| 14410 | 6 | // | (0B9H) IB:A2 RB:STKA WB:RB EALU:WB-ADD-1B LB-DA*Y:BALU | 0B9 | 232C | C6F1 | 3000 | 130A | 0459 | 032F |
| 14411 | // | | IF:LAFMODE X2(6F1H,2F1H); | | | | | | | |
| 14412 | 6 | // | (2F1H) LB-WR-MEM-W*YINC1*WBYTE RB:A6 WB:RB-SL1 CIP-STALL | 2F1 | 1800 | C600 | 3C01 | 200E | 04AF | CB19 |
| 14413 | // | | DALU:RB-ADD-1B WB:DALU ST-A6:WB GO-TO(SLOT); | | | | | | | |
| 14414 | 6 | // | (6F1H) LB-WR-MEM-D*YINC2 IB:0000(02H) RB:A6 | 6F1 | 0900 | C600 | 3002 | 200E | 04AF | CB19 |
| 14415 | // | | DALU:RB-ADD-1B WB:DALU ST-A6:WB GO-TO(SLOT); | | | | | | | |
| 14416 | 6 | // SRDBR-SAVE | (13EH) RB:A7 WB:RB-SR1 ST-A7:WB IB:A7 | 13E | 03BD | C285 | 3000 | 200F | 04AF | 02EF |
| 14417 | // | | IF:1EUS31\SVMSK-23\ X2(685H,285H); | | | | | | | |
| 14418 | 6 | // | (685H) RB:A6 WB:RB BALU:WB-ADD1 LB-DA*Y:BALU | 685 | 232C | C6E8 | 3000 | 000E | 0480 | 032F |
| 14419 | // | | IF:LAFMODE X2(6E8H,2E8H); | | | | | | | |
| 14420 | 6 | // | (2E8H) RB:RDBR WB:RB LB-STALL*WW:WB | 2E8 | 0100 | C281 | 3200 | 000B | 04AF | 032F |
| 14421 | // | | GO-TO(281H); | | | | | | | |
| 14422 | 6 | // | (281H) LB-WR-MEM-W*YINC1*WBYTE RB:A6 WB:RB-SL1 CIP-STALL | 281 | 5800 | C283 | 3700 | 000E | 04AF | 036F |
| 14423 | // | | GO-TO(283H); | | | | | | | |
| 14424 | 6 | // | (6E8H) RB:RDBR WB:RB LB-STALL*WA:WB | 6E8 | 1100 | C282 | 3300 | 000B | 04AF | 032F |
| 14425 | // | | GO-TO(282H); | | | | | | | |
| 14426 | 6 | // | (282H) LB-WR-MEM-D*YINC2*WBYTE RB:A6 WB:RB-SL1 CIP-STALL | 282 | 4900 | C283 | 3700 | 000E | 04AF | 036F |
| 14427 | // | | GO-TO(283H); | | | | | | | |
| 14428 | 6 | // | (283H) LB-WR-LOCAL(CIP,19H) WE:Y ST-A6:WB | 283 | 2880 | C285 | 5C00 | 200E | 04AF | 092F |
| 14429 | // | | IF:1EUS31\SVMSK-23\ X2(6E9H,2E9H); | | | | | | | |
| 14430 | 6 | // | (285H) RB:E1 WB:RB BALU:WB LB-STALL*Y:BALU | 285 | 2131 | C2E9 | 3C00 | 1100 | 046F | 032F |
| 14431 | // | | IF:MISC2A-1H\ X2(6E9H,2E9H); | | | | | | | |
| 14432 | 6 | // | (6E9H) LB-STALL*WA:WB RB:PCIP WB:RB | 6E9 | 1800 | C284 | 3C00 | 0000 | 04AF | 0B2F |
| 14433 | // | | GO-TO(284H); | | | | | | | |
| 14434 | 6 | // | (234H) LB-STALL*WA:WB RB:PCIP WB:RB | 284 | 112C | 046B | 3300 | 1700 | 046F | 032F |
| 14435 | // | | IF:LAFMODE X2(66UH,26BH); | | | | | | | |
| 14436 | 6 | // | (26BH) LB-DA*Y:BALU IB:SBZEX BALU:IB | 26B | 2200 | C262 | 3000 | 0000 | 04A5 | 7B2F |
| 14437 | // | | GO-TO(262H); | | | | | | | |
| 14438 | 6 | // | (66BH) LB-DA*Y:BALU IB:SB BALU:IB | 66B | 2300 | C262 | 3000 | 0000 | 04A5 | 4B2F |

```
                                    RTL/6000 FILE EDIT
                                    MICROPROGRAM SECTION

SEQUENCE: $$MCS                                          ADDRESS   IMAGE
                                                                                 (HEX)     (HEX)

LINE #
14439
14440   /  (262H) LJ-WR-MEM-D'YINC2                       GO-TO(202H);            262    0900 C180 3C00 0000 04AF 0B2F
14441   $  /
14442   /  (1BCH) WJ:Y-SL1 LB-STALL'WBYTE CIP-STALL       GO-TO(180H);            180    410C C264 37C0 0000 04AF 096F
14443   $  /
14444   /  (264H) LJ-WR-LOCAL(CIP,15H) GP-MISC5:AC        GO-TO(264N);            264    2880 C2E9 5500 0000 52AF 0B2F
14445   $  /
14446   /  (2E9H) I1:A7 DALU:IB ST-E2:DALU GP-MISC2:1X    GO-TO(2E9H);            2E9    03B0 C26C 3CC0 D20F 2EAF 0B25
14447   $  /          IF:IBUS31\SVMSK-22\ X2(66CH,26CH):
14448   /  (66CH) RB:A0 WB:RB-SL1 LB-STALL'WBYTE                                  66C    0101 CC1B 3700 000E 04AF 036F
14449   $  /          IF:SIPTRAP X2(018H,018H):
14450   /  (01EH) LJ-WR-LOCAL(SIP,19H) RB:A6 IB:UC00(00H)                         01B    2880 C26C 350D 200E 04AF CB19
14451   $  /          DALU:RB-ADD-IB WJ:DALU ST-A0:WB    GO-TO(26CH);
14452   /  (41BH) RB:A6 IH:0000(00H) DALU:RB-ADD-IB WB:DALU ST-A0:WB              41B    0380 026C 300D 200E 04AF 0B2F
14453   $  /          CKHL
14454   /  (26CH) LJ:A6 DALU:IB LU-DA'Y:BALU FSEL:(7) RU:E2 DALU:RB               26C    23FC C26E 9700 120E 0465 0B2F
14455   $  /          CKVL            IF:DALU(30)\SVMSK-21\ X2(66EH,SLEV-SAVED);
14456   /  (66EH) RU:K7SEL WB:RB LB-STALL'WW:WB          GO-TO(275H);             66E    0100 C275 32C0 0F40 046F 032F
14457   $  /
14458   /  (275H) RB:L7SEL WB:RB LU-DA(LR:WB)                                     275    1319 1271 B1CC 1F40 046F 032F
14459   $  /          IF:SELZERO'DEC X2(,271H);
14460   /  (271H) LU-WR-MEM-D'YINC2                                               271    0919 C66E 0000 0000 04AF 0B2F
14461   $  /          IF:SELZERO- X2(66EH,SLEV-SAVED);
14462   /  (26EH) RH:K0 WB:RB ST-A7:WB GP-MISC2:0X                                26E    0336 C421 30CC 280F 2C6F 032F
14463   $LEV-SAVED /  IF:MISC2(6)\RUPT NOW\ X2(421H,021H);
14464   /  (021H) GP-MISC2:1X                            GO-TO(2A0H);             021    0324 1420 3CC0 0000 2EAF 0B2F
14465   $  /          IF:RUPT-\RUPT PEND\ X2(421H,$RUPT);
14466   /  (564H) RB:A1 WB:RB BALU:WB-ADD1 LB-STALL'WA:WB                         564    112C 06ED 3300 D50F 04AF 02EF
14467   $LVL-CHG /        IF:LAFMODE X2(66DH,26DH);
14468   /  (421H) RB:A7 DALU:RB ST-IV:DALU WB:RB-SR1 LB-STALL'WA:WB               421    112C C6ED 33C0 D50F 04AF 02EF
14469   $  /          IF:LAFMODE X2(66DH,26DH);
14470   /  (26DH) RB:IV WB:RB LB-STALL'WA:WB                                      26D    1100 C66E 33C0 1500 046F 032F
14471   $  /
14472   /  (66DH) LU-WR-LOCAL(MAU,5) IB:0000(40H) DALU:IB WB:DALU-TW              66D    2880 C1AF 6580 200E 2EAF C8A5
14473   $  /          ST-A6:WB GP-MISC2:1X              GO-TO(1AFH);
14474   /  (1AFH) IB:A6 RH:K0 DALU:RB-CR-IB ST-PO:DALU                            1AF    0300 C2A0 3C00 980E 046F 0B27
14475   $  /
14476   /  (2A0H) RB:A1 WB:RB BALU:IB WB:BALU-ADD1 LB-STALL'Y:BALU FLINK:(2)      2A0    21FB C6A1 A200 0009 0480 032F
14477   $  /          CKVL            IF:OBUS-ZERO X2(6A1H,2A1H);
14478   /  (6A1H) IB:A7 DALU:IB WB:BALU'Y:BALU GP-INIT                            6A1    2100 C2E9 3000 000F 64A5 0B2F
14479   $  /                                            GO-TO($SUPERHALT);
14480   /  (2A1H) LJ-P:Y'NONPROC IB:0000(40H) DALU:IB WB:DALU-TW                  2A1    7BC0 C229 3C40 200E 04AF C8A5
14481   $  /          CKVL ST-A6:WB CIP-STALL           GO-TO(229H);
14482   /  (229H) LJ-PW'NONPROC IB:SB DALU:IB WB:DALU ST-A7:WB                    229    3541 C22C 3CC0 200F 04AF 4B25
14483   $  /          CKHF             IF:SIPTRAP X2(62CH,22CH);
14484   /  (22CH) LJ-PW'NONPROC IB:SB DALU:IB ST-E2:DALU                          22C    35B7 CC1D 3C00 D200 04AF 4B25
14485   $  /          CKHL             IF:IBUS24\H-BIT\ X2(41DH,01DH);
```

RTL/6000 FILE EDIT
MICROPROGRAM SECTION
SEQUENCE: SSMCS

| LINE # | | | | ADDRESS (HEX) | IMAGE (HEX) | | | | |
|---|---|---|---|---|---|---|---|---|---|
| 14486 | | | (62CH) LB-PW*NONPROC IB:SB CALU:IB ST-E2:DALU | 62C | 55B7 | CC1D | 3CC0 | D200 | 04AF | 4B25 |
| 14487 | \\ | | CKHL | | | | | | | |
| 14488 | \\ | | IF:IBUS24\H-BIT\ X2(41DH,01DH); | | | | | | | |
| 14489 | \\ | | (01DH) IB:A6 RB:M0 DALU:RB-AND-NOT-IB ST-M0:DALU | 01D | 0300 | CCF6 | 3CC0 | 980E | 046F | 0B2E |
| 14490 | \\ | | GO-TO(0F6H); | | | | | | | |
| 14491 | \\ | | (41DH) IB:A6 RB:M0 DALU:RB-OR-IB ST-M0:DALU | 41D | 0300 | CCF6 | 3CC0 | 980E | 046F | 0B27 |
| 14492 | \\ | | GO-TO(0F6H); | | | | | | | |
| 14493 | \\ | | (0F6H) RB:E2 | 0F6 | 0380 | C2AE | 3CC0 | 1200 | 046F | 0B2F |
| 14494 | \\ | SMMU-LOAD | IF:RBUS16 X2(SMMU-LOAD,SLOAD) | | | | | | | |
| 14495 | \\ | | (6AEH) ID:0000(10H) DALU:IB WB:DALU-SW ST-A6:WB | 6AE | 036C | C61A | 3C10 | 200E | 04AF | CA25 |
| 14496 | \\ | | CKHF | | | | | | | |
| 14497 | \\ | | IF:LAFMODE X2(61AH,21AH); | | | | | | | |
| 14498 | \\ | | (21AH) ID:3000(05H) RB:A1 WB:RB BALU:WB-SUB-IB | 21A | 2100 | C189 | 3C03 | 0009 | 0486 | C32F |
| 14499 | \\ | | GO-TO(18WH); | | | | | | | |
| 14500 | \\ | | (61AH) ID:0000(05H) RB:A1 WB:RB BALU:WB-SUB-IB | 61A | 2100 | C1E9 | 3C05 | 0009 | 0486 | C32F |
| 14501 | \\ | | LU-STALL' Y:LALU | | | | | | | |
| 14502 | \\ | | LU-STALL' Y:DALU | | | | | | | |
| 14503 | \\ | | (189H) LB-DA*RD-MEM-D IB:00FF(FFH) RB:A6 DALU:RB-AND-IB | 189 | 1B40 | C1BA | 8FFF | 200E | 04AF | FB2D |
| 14504 | \\ | | CK1F 4U:DALU ST-A6:WB FSEL-LINK:(F) | | | | | | | |
| 14505 | \\ | | (18AH) LB-STALL' YINC1 19:00C0(FFH) DALU:IB WH:DALU | 18A | 106C | CE1D | 3CFF | 2008 | 04AF | CB25 |
| 14506 | \\ | | CK1F ST-A0:WB | | | | | | | |
| 14507 | \\ | | (21BH) LB-DW IB:SBZEX DALU:IB WB:DALU RB:A6 | 213 | 0240 | C1A7 | 3C00 | 2000 | 31AF | 7B25 |
| 14508 | \\ | | GO-TO(1A7H); | | | | | | | |
| 14509 | \\ | | (61BH) LB-DA*RD-MEM-D IB:SB DALU:IB WB:DALU ST-20:WB | 61B | 1B40 | C1E9 | 3C00 | 2000 | 31AF | 4B25 |
| 14510 | \\ | | GO-TO(1B3H); | | | | | | | |
| 14511 | \\ | | (1B8H) LU-STALL | 1B8 | 0000 | C1A7 | 3000 | 0000 | 04AF | 0B2F |
| 14512 | \\ | | GO-TO(1A7H); | | | | | | | |
| 14513 | \\ | | (1A7H) LB-DA IB:SB RD:A0 DALU:RB-AND-IB WB:DALU ST-A0:WB | 1A7 | 1340 | 01C4 | 3C00 | 2008 | 04AF | 4B2D |
| 14514 | \\ | | CKHF | | | | | | | |
| 14515 | \\ | | GO-TO(1C4H); | | | | | | | |
| 14516 | \\ | | (1C4H) LB-RD-LOCAL(MMU,6) GP-MISC1:1X | 1C4 | 2A80 | C277 | 6600 | 0000 | 1EAF | 0B2F |
| 14517 | \\ | | GO-TO(277H); | | | | | | | |
| 14518 | \\ | | (277H) LB-STALL | 277 | 0000 | 01C5 | 3000 | 0000 | 04AF | 0B2F |
| 14519 | \\ | | GO-TO(1C5H); | | | | | | | |
| 14520 | \\ | | (1C5H) LB-DW*Y:BALU IB:SB RE:E0 WB:RE BALU:WB | 1C5 | 2285 | C26B | 3CC0 | 0000 | 04AF | 432F |
| 14521 | \\ | | CKHL | | | | | | | |
| 14522 | \\ | | IF:IBUS16 X2(SLD-TSTR,268H); | | | | | | | |
| 14523 | \\ | | (268H) LB-P:Y*NONPROC | 268 | 3BC0 | C199 | 3CC0 | 0000 | 04AF | 0B2F |
| 14524 | \\ | | CKVL | | | | | | | |
| 14525 | \\ | | GO-TO(199H); | | | | | | | |
| 14526 | \\ | | (199H) BALU:000000 LB-DA*Y:BALU | 199 | 2300 | CCFE | 3CC0 | 0000 | 04AC | 0B2F |
| 14527 | \\ | | GO-TO(0FEH); | | | | | | | |
| 14528 | \\ | | (0FEH) LB-PW*NONPROC(WW:WB) IB:SB DALU:IB WB:DALU | 0FE | 3500 | C1BC | 3200 | 0000 | 04AF | 4B25 |
| 14529 | \\ | | GO-TO(1HCH); | | | | | | | |
| 14530 | \\ | | (1ECH) LB-PW*NO:PROC(WR:WB) IB:SB DALU:IB WB:DALU | 1EC | 5500 | C1ED | 3100 | 0000 | 04AF | 4B25 |
| 14531 | \\ | | GO-TO(1BDH); | | | | | | | |
| 14532 | \\ | | (1BDH) LB-WR-LOCAL(MMU,3) | 1BD | 2880 | C1BE | 6300 | 0000 | 04AF | 0B2F |
| 14533 | \\ | | GO-TO(1BEH); | | | | | | | |
| 14534 | \\ | | (1BEH) IB:A6 WB:Y BALU:WB-ADD-IB LB-DA*Y:BALU | 1BE | 2319 | 5CFE | B000 | 000E | 0499 | 092F |
| 14535 | \\ | | IF:SELZERO*DEC XL*ELS(0FEH); | | | | | | | |
| 14536 | SXL:MMU-OOF | | (4FFH) RB:A6 WB:RB-SL4 ST-A6:WB FSEL-LINK:(E) | 4FF | 032C | CCFE | 8E00 | 200E | 04AF | 03EF |
| 14537 | \\ | | IF:LAFMODE* X2(SXL:MMU-OF,0FEH); | | | | | | | |
| 14538 | SLD-TSTR | | (668H) L3-RD-LOCAL(MMU,2) DALU:IB WB:DALU | 668 | 2A80 | C1C6 | 62FE | 2000 | 31AF | EB25 |

RTL/6000 FILE EDIT
MICROPROGRAM SECTION

```
LINE #                    SEQUENCE: S&MCS                                                              ADDRESS   IMAGE
                                                                                                       (HEX)     (HEX)
14533                           ST-J0:WB GP-MISC3:X1                              GO-TO(1C6N)          1C6   218C C1C7 3CFF 2008 04AF F809
14534  //        (1C6N) IB:00FF(FFN) RB:A0 DALU:RB-ADD1-IB WB:DALU                                     1C7   1380 C1C8 3300 0000 04AF 4B19
14535  //              CKHL ST-A0:WB DALU:WB LB-STALL'Y:DALU                      GO-TO(1C7N)
14536  //        (1C7N) LB-DA(WA:WD) IB:SB RB:B0 DALU:WB-ADD-IB WB:DALU                                1C8   2880 C1C0 6100 0000 32AF 0B2F
14537  //              CKHL                                                       GO-TO($FLUSH)
14538  $FLUSH    (1C8N) LB-WR-LOCAL(MMU,1) GP-MISC3:X0                                                 1D0   110C C101 3318 0000 04AF CB25
14539  //                                                                        GO-TO(1D0N)
14540  //        (1D0N) IB:0000(18N) DALU:IB WB:DALU LB-STALL'WA:WB                                    1D1   2880 CCFF 67C0 2008 04AF 03EF
14541  //                                                                        GO-TO(1D1N)
14542  //        (1D1N) LB-WR-LOCAL(MPU,7) RE:A0 WB:RE-SL4 ST-A0:WB                                    0FF   2880 C1D2 6300 0000 04AF 0B2F
14543  //                                                                        GO-TO(0FFN)
14544  //        (0FFN) LB-WR-LOCAL(MMU,3)
14545  //
14546  //        (1D2N) IB:A0 WB:Y BALU:WB-ADD-IB LH-DA'Y:DALU                                         1D2   2319 1CFF B000 0008 0499 092F
14547  //                        IF:SELZERO'DEC X2(SXL:MPU-UF,0FFN)
14548  $XL:MPU-OF (4FEN) IJ:0000(03N) RB:A1 WB:R0 BALU:WB-ADD-IB                                       4FE   232E 12CA A203 0009 0499 C32F
14549  //              LB-DA'Y:DALU FLINK:(2)
14550  //                                    IF:MISC1A- X2(1P:Y'NONPROC,2CAN)
14551  //        (2CAN) LB-P:Y'NONPROC                                                                 2CA   3HEC C673 3C00 0000 04AF 0B2F
14552  //              CKVL                  IF:LAFMODE X2(675N,273N)
14553  $LCAD     (2AEN)                                                                                2AE   032C C673 3C00 0000 04AF 0B2F
14554  //                                    IF:LAFMODE X2(673N,273N)
14555  //        (273N) LB-P4 IB:SB2EX DALU:IB WB:DALL ST-A6:WB FSEL:(7)                                273   954C 02A6 97C0 200E 04AF 7B25
14556  //              CKHF                                                       GO-TO(2A6N)
14557  //        (673N) LB-PA IB:SB DALU:IB WB:DALU ST-A6:WB FSEL:(7)                                  673   9040 C2A6 97C0 200E 04AF 4B25
14558  //              CKIF                                                       GO-TO(2A6N)
14559  //        (2A6N) LU-PW IB:S3 DALU:IH ST-L0:DALU W3:DALU-SW ST-A2:WU                             2A6   954C C2A5 3C00 780A 04AF 4A25
14560  //              CKHF                                                       GO-TO(2A5N)
14561  //        (2A5N) GP-MISC6:X0 RE:A2 DALU:RU-ADD-RB                                               2A5   03FC C215 3CCC 000A 62AF 0B13
14562  //              CKVL                  IF:DALU(26) X2(615N,215N)
14563  //        (615N) GP-MISC6:X1                                                                    615   052C C7C2 3C00 0000 61AF 0B2F
14564  //
14565  //        (215N)                                                                                215   032C C7C2 3C00 0000 04AF 0B2F
14566  //                                    IF:LAFMODE X2(SRSTR-L,SRSTR-S)
14567  $XL:RSTR:LEV (672N) RB:E2 WB:RU-SW ST-A7:WB DALU:RB                                             672   03FC C23C 3C00 320F 046F 022F
14568  //              CKVL                  IF:DALU(31)\LDMSK-31\ X2(SMLOAD,23CN)
14569  $XL:MT4:LEV1 (5F2N) RB:E2 WB:RB-SW ST-A7:WB DALU:RB                                             5F2   03FC C23C 3C00 320F 046F 022F
14570  //              CKHF                  IF:DALU(31)\LDMSK-31\ X2(SMLOAD,23CN)
14571  $MLOAD    (63CN) RB:A2 WB:RB-SR4 ST-A0:WB FLINK:(A)                                             63C   0300 C2BB AA00 3A08 046F 026F
14572  //                                                                        GO-TO(SMLOAD-LP)
14573  $MLOAD-LP (28BN) LB-PW IB:SB DALU:IB ST-DU:DALU WB:DALU-SW ST-U0:WB                             288   954C C270 3C00 E000 04AF 4A25
14574  //              CKHF                                                       GO-TO(SMTM2)
14575  $XL:MT4:LEV2 (5FAN) RB:A0 DALU:RU ST-M2:DALU FLINK:(B)                                          5FA   0300 C2BB 3000 3808 046F 026F
14576  //
14577  //        (33GN) R3:A3 WB:RU-SR4 ST-A0:WB                                                       330   0300 C2BB 3000 3B08 046F 026F
14578  //                                                                        GO-TO(SMLOAD-LP)
14579  $XL:MT4:LEV3 (5FBN) R3:A0 DALU:RU ST-M3:DALU FLINK:(C)                                          5FB   0300 C331 AC00 9B08 04AF 0B2F
```

RTL/6000 FILE EDIT
MICROPROGRAM SECTION

SEQUENCE: $$MCS

| LINE # | | | SEQUENCE | ADDRESS (HEX) | IMAGE (HEX) | | | | | |
|---|---|---|---|---|---|---|---|---|---|---|
| 14580 | | \\ | GO-TO(531N); | 331 | 2880 | C2BB | 5100 | 3C08 | 046F | 026F |
| 14581 | | \ | (531N) LD-WR-LOCAL(CIP,11N) RB:M4 WB:RB-SR4 ST-A0:WB | | | | | | | |
| 14582 | | \\ | GO-TO(SMLOAD-LP); | 5FC | 0300 | C329 | 3300 | 9C08 | 50AF | 02EF |
| 14583 | SXL:ATA:LEV4 | \ | (5FCN) RB:A0 DALU:RB ST-M4:DALU WB:RB-SR1 | | | | | | | |
| 14584 | | \\ | GP-MISCS:X0'(HOTM4) GO-TO(329N); | 329 | 2880 | C339 | 3100 | 3D08 | 046F | 026F |
| 14585 | | \ | (329N) L3-WR-LOCAL(SIP,11N) RB:M5 WB:RB-SR4 ST-A0:WB | | | | | | | |
| 14586 | | \\ | GO-TO(339N); | 339 | 9540 | C270 | ADC0 | E000 | 04AF | 7A25 |
| 14587 | | \ | (339N) LD-PW IB:SBZEX DALU:IB ST-D0:DALU WB:DALU-SW | | | | | | | |
| 14588 | | \\ | CKHF ST-B0:WB FLINK:(D) GO-TO(SMTM2); | 5FD | 0301 | C349 | AE00 | 9D08 | 04AF | 0B2F |
| 14589 | SXL:ATA:LEV5 | \ | (5FDN) RB:A0 DALU:RB ST-M5:DALU FLINK:(E) | | | | | | | |
| 14590 | | \\ | IF:SIPTRAP X2(749N,349N); | | | | | | | |
| 14591 | | \ | (349N) L3-WR-LOCAL(SIP,13N) RE:M6 WB:RB-SR4 ST-A0:WB | 349 | 2880 | C2BB | 3300 | 3E08 | 046F | 026F |
| 14592 | | \\ | GO-TO(SMLOAD-LP); | 749 | 0300 | C2BB | 3C00 | 3E08 | 046F | 026F |
| 14593 | | \ | (749N) RB:M6 WB:RB-SR4 ST-A0:WB | | | | | | | |
| 14594 | | \\ | GO-TO(SMLOAD-LP); | 5FE | 0300 | C335 | AF00 | 9E08 | 04AF | 0B2F |
| 14595 | SXL:ATA:LEV6 | \ | (5FEN) RB:A0 DALU:RB ST-M6:DALU FLINK:(F) | | | | | | | |
| 14596 | | \\ | GO-TO(SMLOAD-LP); | 335 | 0300 | C2BB | 3000 | 3F08 | 04AF | 0B2F |
| 14597 | | \ | (335N) RB:M7 WB:RB-SR4 ST-A0:WB | | | | | | | |
| 14598 | | \\ | GO-TO(23CN); | 5FF | 0300 | C23C | 3C00 | 9F08 | 04AF | 0B2F |
| 14599 | SXL:ATA:LEV7 | \ | (5FFN) RB:A0 DALU:RB ST-M7:CALU | | | | | | | |
| 14600 | | \\ | | | | | | | | |
| 14601 | | \ | (23CN) RB:E2 DALU:RB FLINK:(6) GP-MISC1:0X | 23C | 0FFC | C278 | A600 | 1206 | 1C6F | 0B2F |
| 14602 | | \\ | CKVL IF:DALU(30)\LDMSK-30\ X2(ST-LOAD,278N); | | | | | | | |
| 14603 | | \ | (278N) RD:E2 DALU:RB | 278 | 0FFC | C33F | 3CC0 | 1205 | 046F | 0B2F |
| 14604 | | \\ | CKVL IF:DALU(29)\LDMSK-29\ X2(SCIP-LOAD,S'T-LOAD) | | | | | | | |
| 14605 | ST-LOAD | \ | (13FN) RN:A2 IL:0000(60N) DALU:RU-AND-IB WB:DALU-SR4 | 13F | 036C | C6CF | 3C60 | 200A | 04AF | CA6D |
| 14606 | | \\ | CKHF ST-A2:WB IF:LAFMODE X2(6CFN,2CFN); | | | | | | | |
| 14607 | | \ | (2CFN) LD-PW IB:SBZEX DALU:IB ST-STKA:DALU RU:A2 | 2CF | 9500 | C31F | 3C00 | F30A | 04AF | 72E5 |
| 14608 | | \\ | WB:RC-SR1 ST-A2:WB GO-TO(31FN); | | | | | | | |
| 14609 | | \ | (6CFN) LD-PA IB:SD DALU:IB ST-STKA:DALU WB:DALU ST-AQ:WB | 6CF | 9DFB | C71F | 3C0C | F308 | 04AF | 4B25 |
| 14610 | | \\ | CKVL GO-TO(31FN); | | | | | | | |
| 14611 | | \ | (71FN) DALU:DUOUDO ST-STKP:DALU | 71F | 0300 | C7C6 | 3C00 | D400 | 04AF | 0B2C |
| 14612 | | \\ | GO-TO(SXL:STAX2:LEV); | | | | | | | |
| 14613 | | \ | (31FN) IB:A2 RB:STKA WB:RB DALU:WB-ADD-IB L3-DA'Y:DALU | 31F | 2300 | C111 | 3CC0 | 130A | 0459 | 032F |
| 14614 | | \\ | GO-TO(111N); | | | | | | | |
| 14615 | | \ | (111N) LN-DA*RD-PEN-D | 111 | 1D00 | C113 | 3C00 | 0000 | 04AF | 0B2F |
| 14616 | | \\ | GO-TO(113N); | | | | | | | |
| 14617 | | \ | (113N) L3-STALL FSEL:(0) | 113 | 0C2C | C65D | 9C00 | 0000 | 04AF | 0B2F |
| 14618 | | \\ | IF:LAFMODE X2(65DN,23DN); | | | | | | | |
| 14619 | | \ | (23DN) LJ-DX IH:SHZEX DALU:IB WH:DALU ST-A0:WB | 23D | 0240 | C502 | 3000 | 2008 | 04AF | 7B25 |
| 14620 | | \\ | GO-TO(SLDT-NEW); | | | | | | | |
| 14621 | | \ | (65DN) L3-DA IB:SB DALU:IB WB:DALU ST-A0:WB | 65D | 1540 | C5C2 | 3000 | 130A | 04AF | 4B25 |
| 14622 | | \\ | CKHF GO-TO(SLDT-NEW); | | | | | | | |
| 14623 | ST-LOAD | \ | (678N) DALU:000000 ST-STKA:DALU FSEL:(0) | 678 | 032C | C6CC | 9C00 | D300 | 04AF | 0B2C |
| 14624 | | \\ | IF:LAFMODE X2(6CCN,2CCN); | | | | | | | |
| 14625 | | \ | (2CCN) LJ-PW IB:SBZEX DALU:IB WB:DALU ST-A0:WB | 2CC | 9540 | C502 | 3000 | 2008 | 04AF | 7B25 |
| 14626 | | \\ | CKHF GO-TO(SLDT-NEW); | | | | | | | |

RTL/6000 FILE EDIT
MICROPROGRAM SECTION

SEQUENCE: $$MCS

| LINE # | | | | ADDRESS (HEX) | IMAGE (HEX) | | | | | |
|---|---|---|---|---|---|---|---|---|---|---|
| 14627 | * | | (0CC#) LB-PA IB:SB DALU:RB WB:DALU ST-A0:WB | 6CC | 9040 | C502 | 3000 | 2008 | 04AF | 4B25 |
| 14628 | / | | CKHF | | | | | | | |
| 14629 | * | $CIP-LOAD | (53F#) RB:A7 DALU:RB ST-E2:DALU WB:P-SL1 L9-DW(WA:W0) | 53F | 02FC | 127C | 3300 | D20F | 04AF | 016F |
| 14630 | / | | CKVL | IF:DALU(31)\LDMSK-23\ X2(67D#,27C#) | | | | | | |
| 14631 | * | | (6700) LB-PW*Y:BALU IB:0000(07#) RB:A1 WB:RB | 670 | 852C | C670 | 3007 | 0009 | 0486 | C32F |
| 14632 | / | | UALU:WB-SUM-IB | IF:LAFMODE X2(67H#,27B#) | | | | | | |
| 14633 | * | | (27B#) IB:0000(03#) WB:Y BALU:WB-ADD-IB LB-DW*Y:BALU | 27B | 2200 | C27D | 3003 | 0000 | 0499 | C92F |
| 14634 | / | | | GO-TO(27D#) | | | | | | |
| 14635 | * | | (27D#) LB-PW IB:SBZEX DALU:IB WB:DALU ST-RDDR:WB | 27D | 0540 | 0239 | 3000 | 2008 | 04AF | 7B25 |
| 14636 | / | | CKHF CIP-STALL | GO-TO(239#) | | | | | | |
| 14637 | * | | (67D#) LB-PA IB:SB DALU:IB WB:DALU ST-RDDR:WB CIP-STALL | 67D | DD40 | C239 | 3000 | 2008 | 04AF | 4B25 |
| 14638 | / | | CKHF | GO-TO(239#) | | | | | | |
| 14639 | * | | (239#) LB-WR-LOCAL(CIP,18#) IE:A7 IF:(BUS16\LDMSK-24\ X2(67C#,27C#) | 239 | 2885 | 027C | 5800 | 000F | 04AF | 0B2F |
| 14640 | / | | | | | | | | | |
| 14641 | * | | (67C#) LB-DA*RD-MEM-D | 67C | 1000 | C11E | 3000 | 0000 | 04AF | 0B2F |
| 14642 | / | | | GO-TO(11E#) | | | | | | |
| 14643 | * | | (11E#) LB-STALL | 11E | 002C | 067E | 3C00 | 0000 | 04A5 | 0B2F |
| 14644 | / | | IF:LAFMODE X2(67E#,27E#) | | | | | | | |
| 14645 | * | | (27E#) LB-DW*Y:BALU IB:SBZEX BALU:IB | 27E | 2200 | C11F | 3C00 | 0000 | 04A5 | 7B2F |
| 14646 | / | | | GO-TO(11F#) | | | | | | |
| 14647 | * | | (67E#) LB-DA*Y:BALU IB:SB BALU:IB | 67E | 2300 | C11F | 3C00 | 0000 | 04AF | 4B2F |
| 14648 | / | | | GO-TO(11F#) | | | | | | |
| 14649 | * | | (11F#) LB-DA*RD-MEM-D | 11F | 1000 | C3C1 | 3C00 | 0000 | 04AF | 0B2F |
| 14650 | / | | | GO-TO(301#) | | | | | | |
| 14651 | * | | (301#) LB-STALL | 301 | 002C | C6FF | 3C00 | 0000 | 04AF | 0B2F |
| 14652 | / | | IF:LAFMODE X2(67F#,27F#) | | | | | | | |
| 14653 | * | | (27F#) LB-DW*YINC1 IB:SBZEX DALU:IB ST-PCIP:DALU | 27F | 1200 | C3C2 | 3C00 | 0000 | 04AF | 7B25 |
| 14654 | / | | | GO-TO(302#) | | | | | | |
| 14655 | * | | (67F#) LB-DA*YINC2 IB:SB DALU:IB ST-PCIP:DALU | 67F | 3300 | 03C2 | 3C00 | D700 | 04AF | 4B25 |
| 14656 | / | | | GO-TO(302#) | | | | | | |
| 14657 | * | | (302#) WB:Y-SL1 LB-STALL*WBYTE CIP-STALL | 302 | 4100 | C23A | 3700 | 0000 | 04AF | 096F |
| 14658 | / | | | GO-TO(23A#) | | | | | | |
| 14659 | * | | (23A#) LB-WR-LOCAL(CIP,17#) | 23A | 2880 | C27C | 5700 | 0000 | 04AF | 0B2F |
| 14660 | / | | | GO-TO(27C#) | | | | | | |
| 14661 | * | | (27C#) RB:E2 DALU:RB WB:P-SL1 LB-STALL*WBYTE GP-MISC6:0X | 27C | 01FC | 0136 | 9700 | 1206 | 6C6F | 016F |
| 14662 | / | | CKJL FSEL:(7) | | | | | | | |
| 14663 | * | | IF:DALU(30)\LDMSK-22\ X2($SIP-LOAD,136#) | | | | | | | |
| 14664 | * | $SIP-LOAD | (536#) LB-P:Y*NOMPROC RB:E2 DALU:WB-ADD-IB LB-DA*Y:BALU | 536 | 2301 | 023B | 3D00 | 0000 | 04AF | C12F |
| 14665 | / | | CKVL | IF:SIPTRAP X2(63B#,23B#) | | | | | | |
| 14666 | * | | (23B#) LB-WR-LOCAL(SIP,10#) | 23B | 2880 | C638 | 3B00 | 0000 | 04AF | 0B2F |
| 14667 | / | | | GO-TO(638#) | | | | | | |
| 14668 | * | | (63B#) LB-P:Y*NOMPROC RB:E2 DALU:RB FLINK:(F) | 63B | 3BFC | C134 | AF00 | 1205 | 046F | 0B2F |
| 14669 | / | | CKVL IF:DALU(22)\LDMSK-21\ X2($KREG-LOAD,134#) | | | | | | | |
| 14670 | * | | (134#) RB:E2 DALU:RB FLINK:(F) | 134 | 03FC | C134 | AF00 | 1205 | 046F | 0B2F |
| 14671 | / | | CKVL IF:DALU(22)\LDMSK-21\ X2($KREG-LOAD,134#) | | | | | | | |
| 14672 | * | $KREG-LOAD | (534#) LB-PW IB:SB DALU:IB ST-K7SEL:DALU | 534 | 9500 | C3C6 | 3C00 | CF40 | 04AF | 4B25 |
| 14673 | / | | | GO-TO(306#) | | | | | | |

RTL/6000 FILE EDIT
MICROPROGRAM SECTION

```
LINE #     SEQUENCE: $$MCS                                                                              ADDRESS   IMAGE
                                                                                                        (HEX)     (HEX)
14674   $                                     IF:SELZERO'DEC X2(,307H)                                  306       9519 15C7 8C00 5F40 04AF 4825
14675   \\      (306H) LD-PW ID:5B DALU:IB ST-L7SEL:DALU
14676   $                                                                                               307       0519 0534 0000 0000 04AF 082F
14677   \\      (307H)                       IF:SELZERO- X2($KREG-LOAD,134H);
14678   \\              R3:LD  W0:RB GP-MISC5:X0'(RING) IB:A6 BALU:IB                                   134       211D 53B9 3400 180E 5065 032F
14679   \\              L8-STALL'Y:BALU IF:MISC6H- XL'ELS($SUPERHALT);
14680   $XL:P:A6        ID:A6 BALU:IB LB-STALL'Y:BALU GP-MISC0:0X                                       7BF       2100 C75D 3C00 000E 0CA5 082F
14681   \\                                                                     GO-TO($PLOAD);
14682   SKIP hOF:
14683   $IRO-XJ
14684   \\      (077H) W3:P BALU:W0 LD-STALL'Y:BALU                                                     077       2100 7400 3000 0000 04AF 012F
14685   $XW:DBL
14686   \2*\    (42CH) LJ-WR-MEM-D GP-MISC6:C0                                                          42D       1900 C130 3C00 0000 68AF 082F
14687   $XW:LAF
14688   \1*\    (428H) L9-WR-MEM-D GP-MISC6:00                                                          429       1900 C130 3C00 0000 68AF 082F
14689   $XW:SAF
14690   \1*\    (438H) RB:EU WB:RB LB-STALL'WH:WB                                                       439       0100 C43D 32CC 1000 046F 032F
14691   $XW:WORD                                                       GO-TO($XW:WORD);
14692   \\      (43CH) LB-WR-MEM-W'UNLOCK GP-MISC0:00                                                   43D       382B C130 3C00 0000 68AF 082F
14693   $                       IF:LOADMODE X2($30H,$PF-13);
14694   \\      (53CH) DALU:000000 ST-STKP:DALU WII:ESACK                                               530       9707 2CC8 CC8E D400 64AF 082C
14695   $XW:ULT                                                                                  XA;
14696   \1*\    (46DH) LB-WR-MEM-W'UNLOCK                                                               46D       3800 C130 3C00 0000 04AF 082F
14697   $XW:HALF
14698   \2*\    (44DH) LU-WR-MEH-H'YINC1 GF-MISC6:0C                                                    44D       1880 C130 3C00 0000 68AF 082F
14699   $XW:DBL-RR                                           GO-TO($PF-13);
14700   \\      (42EH) RU:A0 DALU:RB ST-D6SEL:DALU GP-MISC6:00                                          42E       0300 C43E 3C00 C648 68AF 082F
14701   $XW:KCP-R                                                      GO-TO($XW:WORD-R);
14702   \3*\    (43CH) GP-MISC6:00                                                                      43C       0300 C43E 3C00 C000 68AF 082F
14703   $XW:WORD-R
14704   \1*\    (43EH) RU:B0 DALU:RH ST-D7SEL:DALU                                                      43E       9707 2CC8 CD00 C740 64AF 082F
14705   $XW:ULT-R                                                                                XA;
14706   \2*\    (46EH) RU:B0 DALU:RH ST-D7SEL:DALU                                                      46E       9707 2CC8 CD00 C740 64AF 082F
14707   $XW:HALF-R                                                                               XA;
14708   \2*\    (44EH) IU:BO RU:D7SEL DALU:RB-XOR-IB ST-D7SEL:DALU                                      44E       0300 CC25 3C00 C740 046F 0B26
14709   $                (025H) I4:00FF(00W) RB:D7SEL DALU:RB-AND-IB ST-D7SEL:DALU                      025       0300 CC2D 3C00 C740 046F FB2D
14710   $                                                                     GO-TO($02DN);
14711   \\      (02DH) ID:B0 RB:D7SEL DALU:RB-XOR-IB ST-D7SEL:DALU                                      02D       9707 2CC8 CD00 C740 646F 0B26
14712   $XW:LAF-D                                                                                XA;
14713   \1*\    (42AH) R3:ED WB:RH ST-B7SEL:WB                                                          42A       9707 2CC8 CC00 3017 646F 032F
14714   $XW:SAF-D
14715   \1*\    (43AH) R6:ED WB:RB ST-B7SEL:WB                                                          43A       9707 2CC8 CC00 3017 646F 032F
14716   $XW:KCP-D
14717   \3*\    (42EH) LB-WR-LOCAL(CPU) GP-MISC6:00                                                     42E       2880 CC31 1C00 0000 68AF 082F
14718   $                                                              GO-TO($031H);
14719   \\      (031H) LB-DA'JXINST IB:SH DALU:IB W3:DALU ST-B7SEL:WU                                   031       9747 2CC8 CC00 2017 64AF 4025
14720           CKHF                                                                             XA;
```

RTL/6000 FILE EDIT
MICROPROGRAM SECTION

```
LINE #                  SEQUENCE: $$MCS
14721  $XL:LAF-K     (42EH) LJ-WR-LOCAL(CPU) IB:QZEX DALU:IB ST-L7SEL:DALU
14722   \\                                                           GO-TO(028H);
14723  $XW:SAF-K     (43EH) LD-WR-LOCAL(CPU) IB:QZEX DALU:IB ST-L7SEL:DALU
14724   \\                                                           GO-TO(028H);
14725  $            (02EH) LD-DW'JXINST ID:SB DALU:IB ST-K7SEL:DALU
14726   \\                                                           XA;
14727  $XW:DBL-K    (42FH) ID:AD DALU:IB ST-K7SEL:DALU
14728   \3\                                                GO-TO($XW:WORD-K);
14729  $XW:WRD-K    (43FH) RJ:DD DALU:IB ST-L7SEL:DALU GP-MISC6:00
14730                                                    GU-TO($PF-13);
14731  $XW:HALF-K   (44FH) \A\;
14732  $XW:BIT-K    (46FH) \A\;
14733  SKIP HDF:
14734  $UNDO        (61CH) FLINK:(9) GP-MISC5:X0
14735   $                                IF:FALSE XB'ELS(15CH);
14736   \\           (15CH) IB:KNOS DALU:IB WB:DALU'Q:DALU
14737   $             CKVL                IF:ASMAP2 XL'ELS(3A3H);
14738   $            (3A5H) ID:F-DSP DALU:IB ST-DO:DALU WB:DALU
14739   $                   FASP:WB'RING-IN  IF:ASMAP3 X2(68AH,28AH);
14740   $            (68AH) IB:0000(D8H) RB:DO DALU:RB-XOR-IB WB:DALU
14741   $             CKVL   IF:OBUS-ZERO-\AS5=0\ XL'ELS($UNDO-'FT-POP);
14742  $UNDO-'FT-POP (3A7H) IB:0000(02H) RB:STKT DALU:RJ-SUB-13 WB:DALU
14743   $             CKHL   ST-STKT:WB                   IF:LAFMODE XL'ELS(3A6H);
14744   $            (3A6H) RB:STKT DALU:RB-ADD1 WB:DALU ST-STKT:WB
14745   $             CKHL                               XL($XL:UNDO-P);
14746   $            (23AH) IB:0000(7FH) DALU:IB
14747   $             CKVL                                IF:DALU(SEL) X2(6BH,28BH);
14748   $            (23BH) IO:FFFF(EDH) RG:DO DALU:RB-XOR-IB WB:DALU
14749   $             CKVL  IF:OBUS-ZERO-\AS1=60\ XL'ELS($UNDO-FT-PP);
14750  $UNDO-FT-PP   (3A5H)
14751   $            (28BH) IB:QZEX R3:STKT DALU:RB-SUB-IB ST-STKT:WB
14752   $             CKVL                    IF:OP-WRITE X2(68DH,28DH);
14753   $            (68DH) IB:QZEX RB:STKT DALU:RB-ADD-IB ST-STKT:WB
14754   $                                                XL($XL:UNDO-P);
14755   $            (68DH) RB:STKT DALU:RB-SUB-IB
14756   $             CKVL                   IF:DCARRY16-\AS1<58\ XL'ELS(3A4H);
14757   $            (3A4H) R3:DD WB:RB-SR4 FASP:WB'RING-IH DALU:RB
14758   $             CKVL                    IF:DALU(28) X2($UNDO-X-PP,$UNDO-B-PP);
14759  $UNDO-B-PP   (28BH) R3:DD DALU:RB
14760   $             CKVL                    IF:DALU(27) X2(68EH,28EH);
14761   $            (28EH) IB:QZEX RB:B7SEL DALU:RJ-ADD-IB ST-B7SEL:WB
14762   $                                                XL($XL:UNDO-P);
14763   $            (68EH) RB:B7SEL DALU:RB-SUB-IB ST-B7SEL:WB
14764   $                                                XL($XL:UNDO-P);
14765  $UNDO-X-PP   (63CH) FA-SEL:FB RB:DO DALU:R3
14766   $             CKVL                    IF:DALU(29) X2(68FH,28FH);
```

```
ADDRESS  IMAGE
(HEX)    (HEX)
 428     2880 CC28 1CC0 5F40 04AF 3B25
 43B     2880 CC28 1C00 5F40 04AF 3B25
 028     9607 2CC8 CDC0 CF40 64AF 4B25
 42F     0300 C43F 3C00 CF48 04AF 0B25
 43F     0300 C130 3CC0 5F40 68AF 0B2F
 44F     0300 CC00 3C00 0000 04AF 0B2F
 46F     0300 0000 3000 0000 04AF 0B2F
 61C     0300 313C A900 0000 32AF 0B2F
 13C     0326 57A3 3000 0000 04AF CF25
 3A3     0327 C68A F500 C000 04AF AB25
 68A     03F9 53A7 3008 0000 04AF CB26
 3A7     03AC 57A6 3002 200C 04AF CB06
 3A6     0380 57A9 3000 200C 04AF 0B00
 28A     03FC C28B 3C7F 0017 04AF CB25
 28B     03FB 53A5 30E0 0000 04AF EB26
 3A5     030C C68D 3000 0000 04AF 0B2F
 28D     0300 57A9 3C00 200C 04AF 3B06
 68D     0300 57A9 3000 200C 04AF 3B19
 68D     03F8 57A4 30D8 0000 04AF EB06
 3A4     03FC C28C F500 0004 04AF 026F
 28C     03FC C28E 3000 0003 04AF 0B2F
 28E     0300 57A9 3000 2017 04AF 3B19
 68E     0300 57A9 3000 2017 04AF 3B06
 68C     03FC C28F D500 0005 04AF 0B2F
```

RTL/60C0 FILE EDIT
MICROPROGRAM SECTION

```
LINE #         SEQUENCE: $$MCS                                                              ADDRESS   IMAGE
                                                                                            (HEX)    (HEX)
14768    $                                                                                  28F     0340 57A9 3C00 C340 046F 0800
14769    \\       (28F#) RB:DSSEL DALU:RB-ADD1 ST-DSSEL:DALU
14770    \\                CKHF                                                    XL($XL:UNDO-P)
14771    \\       (68F#) RB:DSSEL DALU:RB-SUB1 ST-DSSEL:DALU                                 68F     0340 57A9 3C00 C340 046F 0B1F
14772   $XL:UNDO-T          CKHF                                                   XL($XL:UNDO-P);
14773    \\       (794#) 1B:STKT RB:K0 DALU:RB-ADD-1B WB:DALU ST-STKT:WB                     794     0380 C7A9 3000 280C 046F 0B19
14774    \\                CKHL                                                    GO-TO($XL:UNDO-P);
14775   $XL:UNDO-P       (7A9#) WB:ZS ST-A2:WB                                               7A9     0300 C2AF 3000 200A 04AF 006F
14776   $UNDO-P2         (2AF#) LB-P, IB:0000(0F#) RB:A2 DALU:RB-AND-1B WB:DALU    GO-TO($UNDO-P2);  2AF     9540 C182 3C0F 200A 04AF CB2D
14777    \\                CKHF ST-A2:WB
14778    \\       (182#) IB:A2 WB:P BALU:WB-SUB-1B LB-DA*Y:HALU                    GO-TO($182W);     182     2300 C75D 3C00 000A 0486 012F
14779    \\                                                                        GO-TO($PLOAD);
14780   SKIP HOF;
14781   $TV05            (21C#) IB:0000(50#) DALU:IB ST-E0:DALU WB:Y ST-A0:WB                21C     030C CCC2 3C3D F008 04AF C925
14782    \\                                                                        GO-TO($TRAP);
14783   $TV05-169        (169#)                                                              169     0300 C312 3C00 0000 04AF 0B2F
14784    \\                                                                        GO-TO($TV05);
14785   $TV05-2B0        (2B0#)                                                              2B0     0300 C312 3C00 0000 04AF 0B2F
14786    \\                                                                        GO-TO($TV05);
14787   $TV05            (312#) IB:0000(5B#) DALU:IB ST-E0:DALU                              312     0300 CCC2 303B D000 04AF CB25
14788    \\                                                                        GO-TO($TRAP);
14789   $TV05-5A9        (5A9#)                                                              5A9     0300 C312 3C0F 200A 04AF CB2D
14790    \\                                                                        GO-TO($TV05);
14791   $TV05-3F4        (3F4#)                                                              3F4     0300 C312 3CC0 0000 04AF 0B2F
14792    \\                                                                        GO-TO($TV05);
14793   $TV06            (558#) IB:0000(3A#) DALU:IB ST-E0:DALU WB:Y ST-A0:WB                558     0300 CCC2 3C3A F008 04AF C925
14794    \\                                                                        GO-TO($TRAP);
14795   $TV09            (5F8#) RB:E0 WB:RB ST-STK3:WB IB:0000(37#) DALU:IB        GO-TO($TRAP);     5F8     0300 CCC2 3C37 F00D 046F C325
14796    \\                ST-E0:DALU
14797   $TV10            (38C#) IB:0000(36#) DALU:IB ST-E0:DALU                              38C     0300 0CC2 3C36 D000 04AF CB25
14798    \\                                                                        GO-TO($TRAP);
14799   $TV12            (61E#) IB:0000(34#) DALU:IB ST-E0:DALU                              61E     0300 CCC2 3C34 D000 04AF CB25
14800    \\                                                                        GO-TO($TRAP);
14801   $TV13-2C9        (2C9#) GP-LOAD:0'TRAF                                               2C9     0300 C332 3C00 0000 67AF 0B2F
14802    \\                                                                        GO-TO($TV13);
14803   $TV13            (332#) IB:0000(33#) DALU:IB ST-E0:DALU GP-INIT                      332     0300 CCC2 3C33 D000 64AF CB25
14804    \\                                                                        GO-TO($TRAP);
14805   $TV16            (06A#) IB:0000(30#) DALU:IB ST-E0:DALU GP-INIT                      06A     0300 CCC2 3C30 D000 64AF CB25
14806    \\                                                                        GO-TO($TRAP);
14807   $TV16-119        (119#)                                                              119     0300 0C6A 3C00 0000 04AF 0B2F
14808    \\                                                                        GO-TO($TV16);
14809   $TV16-17A        (17A#)                                                              17A     0300 0C6A 3C00 0000 04AF 0B2F
14810    \\                                                                        GO-TO($TV16);
14811   $TV16-1CD        (1CD#)                                                              1CD     0300 CC6A 3000 0000 04AF 0B2F
14812    \\                                                                        GO-TO($TV16);
14813   $TV16-1DC        (1DC#)                                                              1DC     0300 CC6A 3C00 0000 04AF 0B2F
14814    \\                                                                        GO-TO($TV16);
```

HTL/3000 FILE EDIT
MICROPROGRAM SECTION

SEQUENCE: $&MCS

```
LINE #
14815  STV16-443    (443H)                                                                          GO-TO(STV16);
14816   \\
14817  STV16-5CD    (5CDH)                                                                          GO-TO(STV16);
14818   \\
14819  STV16-5F6    (5F6H)                                                                          GO-TO(STV16);
14820   \\
14821  SXL:TV16     (7DCH)                                                                          GO-TO(STV16);
14822   \\
14823 ;SKIP HOF;
14824  STRAP        (002H) LD:FFFF(00H) RB:IV DALU:RU-AND-IB WB:DALU'U:DALU
14825                      FSEL:(0) GF-SHIN:AR-24                           GO-TO($GET-NATSAP);
14826 ;GET-NATSAP   (3A8H) LD:0000(30M) DALU:IB WB:DALU-TW ST-A1:W3
14827                      CKHF                                                                     GO-TO(0E6H);
14828   \\
14829               (0E6H) IH:A1 RU:M0 DALU:RH-OR-IB ST-A0:DALU                                     GO-TO(0E7H);
14830   \\
14831               (0E7H) LD:00FF(FFH) RU:M0 DALU:RU-AJD-NOT-IB WB:DALU-SR4
14832                      CKHF ST-A1:WB  GP-MISCO:1X                                               GO-TO(082H);
14833   \\
14834               (082H) RD:A1 DALU:RB-ADD-RB WB:DALU-SW ST-A1:WB
14835                      CKHL GP-MISCO:1X                                                         GO-TO(083H);
14836   \\
14837               (083H) LD:02EX RB:E1 DALU:RB-ADD-IB ST-E1:DALU W0:MI-TW
14838                      CKHF ST-A7:WB GP-MISC6:XC (CLK-YL0)                                      GO-TO(085H);
14839   \\
14840               (035H) ID:A1 RD:E1 DALU:RB-SUB-IB WB:DALU ST-A1:WB
14841                      CKHL DALJ:WB DALU:IB LB-STALL Y:BALU                                     GO-TO(086H);
14842   \\
14843               (086H) LB-DA Y:HALU LB-DA Y:BALU  RB:A7 DALU:RB-AND-IB
14844                      CKHF WD:DALU-SW ST-A7:WB IF:SELZERO- X2(4C5H,0C5H);
14845   \\
14846               (4C5H) LB-STALL                                                                 GO-TO(4C5H);
14847   \\
14848               (065H) L9-DW IU:SBZEX DALU:IB WB:DALU ST-A6:W3
14849                      CKHF                              IF:LAFMODE X2(465H,065H);
14850   \\
14851               (465H) L9-DA IB:S0    DALU:IB WB:DALU ST-A6:WB
14852                      CKHF                                                                     GO-TO(088H);
14853   \\
14854               (089H) 95:IV AC:RB BALU:WB LU-DA Y:BALU                                         GO-TO($GETIV);
14855   \\
14856               (035H) LB-DA Y:RD-MEM-D
14857   \\
14858               (0C5H) IB:A7 RD:E0 DALU:RU-OR-IB WB:DALU-SW
14859                      LB-STALL WB:WB                    IF:LAFMODE X2(4C9H,0C9H);
14860   \\
14861               (0C9H) LJ-DW Y:BALU LD-DW Y:BALU IB:SBZEX DALU:IB WB:DALU ST-A7:WB
14862               (4C9H) LD-DA Y:BALU LD-DA Y:HALU IB:S0 DALU:IB WB:DALU ST-A7:WB
14863                      CKVL DALJ:WB-AD01            IF:0BUS-ZERO- X2(4CBH,0CAH);
14864               (0CAH) ID:A1 DALU:IB L9-STALL Y:BALU                                            GO-TO($SUPERHALT);
14865               (4CAH) RD:D3 WB:RB LB-DW(WR:WB)
14866               (4C8H) RD:D3 WH:RB LB-DW(WR:WB)
```

| ADDRESS (HEX) | IMAGE (HEX) |   |   |   |   |
|---|---|---|---|---|---|
| 443 | 0300 CC6A | 3000 0000 | 04AF | 0B2F |
| 5CD | 0300 CC6A | 3000 0000 | 04AF | 0B2F |
| 5F6 | 0300 CC6A | 3000 0000 | 04AF | 0B2F |
| 7DC | 0300 CC6A | 3000 0000 | 04AF | 0B2F |
| 002 | 0300 C3A8 | 9000 1500 | 486F | EF20 |
| 3A8 | 0340 CCE6 | 3080 2009 | 04AF | C8A5 |
| 0E6 | 0300 CCE7 | 3000 9809 | 046F | 0B27 |
| 0E7 | 0340 CC82 | 30FF 3809 | 326F | FA6E |
| 082 | 038C CC83 | 3000 2009 | 0EAF | 0A13 |
| 083 | 0300 CC84 | 3C10 F109 | 68AF | C265 |
| 084 | 0340 CC85 | 3400 F10F | 606F | 3819 |
| 085 | 2180 CC86 | 3000 3109 | 046F | 0B06 |
| 086 | 1059 04C5 | 00FF 200F | 04AF | CA20 |
| 4C5 | 002C C465 | 3000 0000 | 04AF | 0B2F |
| 065 | 0240 CC88 | 3C00 200E | 04AF | 7B25 |
| 465 | 1340 CC88 | 3000 200E | 04AF | 4B25 |
| 088 | 2300 CC89 | 3000 1500 | 046F | 032F |
| 089 | 1000 C171 | 3000 0000 | 04AF | 0A27 |
| 0C5 | 012C C4C9 | 3200 100F | 046F | 0A27 |
| 0C9 | 22FB CCCA | 3000 200F | 0480 | 7B25 |
| 4C9 | 23FB 1CCA | 3C00 200F | 0480 | 4B25 |
| 0CA | 2100 C1B9 | 3C00 0009 | 04A5 | 0B2F |
| 4CA | 022E C4CC | 3100 0300 | 046F | 032F |
| 4CB | 020C CC5C | 3100 0300 | 046F | 032F |

RTL/6000 FILE EDIT
MICROPROGRAM SECTION

SEQUENCE: SS4CS

```
LINE #
14864   (09CH) LD-DJ'YINC1
14865                                                        IF:MISC1A X2(4CCH,0CCH)
14866   (0CCH) LD-WR-MEM-D'YINC2(WR:WB) WB:ZS ST-A2:WB
14867                                                        IF:DCARRY16 X2(6DFH,2DFH);
14868                ID:0000(3EH) RB:EO DALU:RB-SUB-1B
14869                                                        GO-TO(0CDH);
14870   (6DFH) W3:P ST-A6:WB
14871   (0CEH) RB:A6 DALU:RB-SU31 WB:DALU ST-A6:WB
14872                                                        GO-TO(08AH);
14873   (03AH) W3:A0 DALU:RB-ADD1 WB:DALU ST-A0:WB
14874         CKHL
14875   (2DFH) W3:P ST-A6:WB GP-MISC1:1X
14876                                                        GO-TO(0CDH);
14877   (4CCH) LD-WR-MEM-D'YINC2(WR:WB) WB:A2 WB:RB
14878                                                        IF:MISC1A X2(4CDH,0CDH);
14879   (4CDH) LD-WR-MEM-D DALU:LD-DW(WR:WB)
14880                                                        GO-TO(0CDH);
14881   (0CDH) ID:0000(6FH) RB:A2 DALU:RB-1B-NOT ST-E1:DALU WB:Y
14882          ST-A2:WB GP-MISC6:XC"(MEMAD:NRM)
14883                                                        IF:MISC1A- X2(635H,235H);
14884   (635H) IB:A0 RB:E1 DALU:RB-ADD1-1B WB:DALU BALU:WB
14885          CKHL LD-STALL'Y:BALU GP-MISC1:00
14886                                                        GO-TO(080H);
14887   (235H) IB:A6 RB:E1 DALU:RB-ADD1-1B WB:DALU BALU:WB-ADD1
14888          CKHL LD-STALL'Y:BALU GP-MISC1:00
14889   (08BH) LD-DW'RB-MEM-W GP-LOAD:1
14890                                                        GO-TO(08CH);
14891   (08CH) ID:0000(02H) RB:A2 DALU:RB-ADD-1B ST-E1:DALU WB:RB
14892          CKHF BALU:WB LD-STALL'Y:BALU GP-MISC5:10
14893                                                        GO-TO(080H);
14894   (080H) LD-DW(WW:WB) IB:SB DALU:1B WB:DALU GP-LOAD:0'TRAF
14895                                                        IF:LAFMODE X2(4CEH,0CEH);
14896   (0CEH) LD-WR-MEM-D'YINC2(WW:WB) RB:A0 WB:RB
14897                                                        GO-TO(08EH);
14898   (4CEH) LD-WR-MEM-D'YINC2(WA:WB) RB:A0 WB:RB
14899                                                        GO-TO(091H);
14900   (08EH) LD-WR-MEM-D'YINC2(WA:WB) RB:A6 DALU:RB-ADD1 WB:DALU
14901          CKHF
14902   (091H) LD-WR-MEM-D'YINC2(WA:WB) RB:A6 DALU:RB-ADD1
14903                                                        GO-TO(08FH);
14904   (08FH) LD-WR-MEM-D'YINC2(WW:WB) RB:B3 WB:RB
14905                                                        GO-TO(092H);
14906   (092H) LD-WR-MEM-W'YINC1 ID:0000(40H) RB:E0
14907          DALU:RB-ADD-1B WB:DALU ST-A0:WB
14908                                                        GO-TO(093H);
14909   (093H) LD-WR-MEM-D RB:E0 DALU:RB-ADD-RB WB:DALU ST-A0:WB
14910                                                        GO-TO(094H);
```

| ADDRESS (HEX) | IMAGE (HEX) | | | | |
|---|---|---|---|---|---|
| 09C | 122E | C4CC | 3000 | 0000 | 04AF | 0B2F |
| 0CC | 0938 | C2BF | 313E | 300A | 046F | C046 |
| 6DF | 0300 | CCCB | 3C00 | 200E | 04AF | 012F |
| 0CB | 038C | CCBA | 3000 | 200E | 04AF | 0B1F |
| 08A | 0380 | CCCD | 3000 | 2008 | 04AF | 0B00 |
| 2DF | 032F | C4CD | 3000 | 200E | 1EAF | 012F |
| 4CC | 092F | C4CD | 3100 | 000A | 04AF | 032F |
| 4CD | 0200 | CCCD | 31D0 | 0000 | 04AF | CB25 |
| 0CD | 032E | 0235 | 310F | F10A | 60AF | C922 |
| 635 | 2180 | CC8B | 3C00 | 1108 | 186F | 0B09 |
| 235 | 218C | CC8B | 3C00 | 110E | 1840 | 0B09 |
| 08B | 1A00 | CC8C | 3C00 | 0000 | 36AF | 0B2F |
| 08C | 2140 | CC8D | 3CC2 | D10A | 5AAF | C319 |
| 080 | 022C | 04CE | 3200 | 0000 | 67AF | 4B25 |
| 0CE | 0900 | CC8E | 3200 | 0008 | 04AF | 032F |
| 4CE | 0900 | CC91 | 3200 | 0008 | 04AF | 032F |
| 08E | 0240 | CC8F | 3100 | 000E | 04AF | 0B00 |
| 091 | 0900 | CC92 | 3300 | 000E | 04AF | 032F |
| 08F | 0900 | CC90 | 3200 | 0003 | 04AF | 032F |
| 092 | 0900 | CC93 | 3300 | 0003 | 04AF | 032F |
| 090 | 1800 | CC94 | 3040 | 3008 | 046F | CB19 |
| 093 | 1900 | CC94 | 3000 | 3008 | 046F | 0B13 |

```
                              RTL/6000 FILE EDIT
                             MICROPROGRAM SECTION

SEQUENCE: SSMCS                           ADDRESS   IMAGE
                                                                    (HEX)     (HEX)

LINE #
14911
14912    (094H) IB:QZEX RB:A0 DALU:RB-ADD-IB WB:DALU'Q:DALU         094   2380 CC95 3C00 0008 04AF 3F19
14913           CKHL DALU:WB LB-DA'Y:BALU                GO-TO(095H)
14914    (095H) LB-DA'RD-MEM-D R3:E1 WB:RB ST-03:WB                 095   1B0C CC96 3000 3103 046F 032F
14915
14916    (096H) RB:IV WB:RB BALU:WB LB-STALL'Y:BALU      GO-TO(096H) 096   212C C4CF 3000 1500 046F 032F
14917           IF:LAFMODE X2(4CFH,0CFH):
14918    (0CFH) LB-DA'RD-MEM-W IB:SBZEX DALU:IB ST-E2:DALU WB:DALU   0CF   1AFB C571 3C00 D200 04AF 7B25
14919           CKVL        IF:OBUS-ZERO X2(571H,SGETIV):
14920    (4CFH) LB-DA'RD-MEM-D IB:SB DALU:IB ST-E2:DALU WB:DALU     4CF   1BFB C571 3C00 D200 04AF 4B25
14921           CKVL        IF:OBUS-ZERO X2(571H,SGETIV):
14922    (571H) IB:QZEX DALU:IB LB-STALL'Y:BALU                    571   2100 C3B9 3C00 0000 04A5 3B2F
14923  SGETIV                                      GO-TO(SUPERHALT):
14924    (171H) LB-STALL IB:FFF(FEW) DALU:IB ST-E1:DALU              171   002C C4DE 3CFE 0100 04AF EB25
14925           IF:LAFMODE X2(4DEH,0DEH):
14926    (0DEH) LB-DA'Y:BALU IB:SBZEX RB:E1 DALU:RB-ADD1-IB          0DE   22E3 CCDA 3000 310A 046F 7B09
14927           CKVL WB:DALU ST-A2:WB BALU:IB
14928                                  IF:DCARRY8 X2(4DAH,0DAH):
14929    (4DEH) LB-DA'Y:BALU IB:SB RB:E1 DALU:RB-ADD-IB WB:DALU      4DE   23E3 1CDA 3CC0 310A 046F 4B19
14930           CKVL ST-A7:WB BALU:WB IF:DCARRY8 X2(4DAH,0DAH):
14931    (0DAH) RB:IV WB:RB BALU:WB LH-DA'Y:BALU                    0DA   2300 C3B9 3CC0 1500 046F 032F
14932                                  GO-TO(SUPERHALT):
14933    (4DAH) LB-DA'RD-MEM-W                         GO-TO(0DBH): 4DA   1A00 CCDB 3C00 0000 04AF 0B2F
14934    (4DEH) LB-DA'RD-MEM-D                         GO-TO(17BH): 4DE   1B00 C17B 3C00 0000 04AF 0B2F
14935    (0DBH) IB:A7 BALU:IB LB-STALL'Y:BALU                       0DB   2119 CECD 0000 000F 04A5 0B2F
14936           IF:SELZERO- X2(6CDH,2CDH):
14937    (17EH) IB:A7 BALU:IB LB-STALL'Y:BALU                       17B   2119 C4DC 0000 000F 04A5 0B2F
14938           IF:SELZERO- X2(4DCH,0DCH):
14939    (6CDH) LB-DA'Y:BALU IB:SBZEX DALU:IB WB:DALU                6CD   22FB C17A 3000 200F 04A5 7B25
14940           CKVL ST-A7:WB          IF:SBV16-17A):
14941    (4DCH) LB-DA'RD-MEM-D IB:SB DALU:IB WB:DALU                 4DC   25FB 117A 3000 200F 04A5 4B25
14942           CKVL ST-A7:WB          IF:SBV16-17A):
14943    (2CDH) LB-DW IB:SBZEX DALU:IB WB:DALU ST-A6:WB              2CD   0240 C57A 3000 200E 04AF 7B25
14944                                           GO-TO(57AH):
14945    (0DCH) LB-DA IB:SB DALU:IB WB:DALU ST-A6:WB                 0DC   1340 C57B 3000 200E 04AF 4B25
14946                                           GO-TO(57BH):
14947    (57AH) LB-DW'RD-MEM-W(WA:WB) RB:A0 WB:RB                    57A   1A00 CCF1 3200 000E 04AF 032F
14948                                           GO-TO(0F1H):
14949    (57BH) LB-DA'RD-MEM-D(WA:WB) RB:A6 WB:RB                    57B   1B00 CCF1 3300 000E 04AF 032F
14950                                           GO-TO(0F1H):
14951    (0F1H) LB-STALL FLINK:(2)                                   0F1   002C C4DD A200 0000 04AF 0B2F
14952           IF:LAFMODE X2(4DDH,0DDH):
14953    (0DDH) LB-DW IB:SBZEX DALU:IB WB:DALU ST-A0:WB              0DD   02FB 00E4 3000 200B 04AF 7B25
14954           CKVL        IF:OBUS-ZERO- X2(4E4H,0E4H):
14955    (4DDH) LB-DA IB:SB DALU:IB WB:DALU ST-A0:WB                 4DD   13FB CCE9 3000 200B 04AF 4B25
14956           CKVL        IF:OBUS-ZERO- X2(4E9H,0E9H):
14957
```

```
                                     RTL/6000 FILE EDIT
                                     MICROPROGRAM SECTION

SEQUENCE: $$MCS                                          ADDRESS   IMAGE
                                                                         (HEX)    (HEX)
                                                                         0E4      183C CCEA 3200 000F 04AF 8325
LINE #
14958
14959  */    (0E4H) LB-WR-MEM-W'YINC1(WW:WB) RB:A7 WB:RH IB:F-VAL        4E4      183C 00EA F200 000F 04AF 8325
14960  */                    DALU:IB       IF:DALU(31) X2(4EAH,0EAH);
14961  */    (4E4H) LB-WR-MEM-W'YINC1(WW:WB) RB:A7 WB:RB FLINK:DEC       0E9      093C 0CEA 3300 000F 04AF 8325
14962  */                    IB:F-VAL DALU:IB  IF:DALU(31) X2(4EAH,0EAH);
14963  */    (0E9H) LB-WR-MEM-D'YINC2(WA:WB) RB:A7 WB:RH IB:F-VAL        4E9      093C 00EA F300 000F 04AF 8325
14964  */                    DALU:IB       IF:DALU(31) X2(4EAH,0EAH);
14965  */    (4E9H) LB-WR-MEM-D'YINC2(WA:WB) RB:A7 WB:RB FLINK:DEC       0EA      232C C4EB 3000 000A 04A5 0B2F
14966  */                    IB:F-VAL DALU:IB  IF:DALU(31) X2(4EAH,0EAH);
14967  */    (0EAH) IB:A2 BALU:IB LB-DA'Y:BALU                           4EA      ABC0 CCA0 3000 0000 04AF 0B2F
14968  */                                 IF:LAFMODE X2(4EBH,0EBH);
14969  */    (4EAH) LB-P:Y'PREFETCH                                      0A0      232C C4EB 3000 0009 04A5 0B2F
14970  */           CKVL                               GO-TO(0A0H);
14971  */    (0A0H) IB:A1 BALU:IB LB-DA'Y:BALU                           0EB      1819 C4EC 0200 0008 04AF 032F
14972  */                         IF:0000(7FH) DALU:IB  WB:DALU-TW
14973  */                         ST-A1:WB      IF:SELZERO- X2(4EBH,0EBH);
14974  */    (4EBH) LB-WR-MEM-W'YINC1(WW:WB) RB:A0 WB:RB                 4EB      0919 C4EC 0300 0008 04AF 032F
14975  */                         IF:0000(7FH) DALU:IB  WB:DALU-TW
14976  */                         ST-A1:WB      IF:SELZERO- X2(4ECH,0ECH);
14977  */    (0ECH) IB:A1 BALU:IB LB-DA'Y:BALU                           0EC      232C C4ED 3000 0009 04AF 0B2F
14978  */                                 IF:LAFMODE X2(4EDH,0EDH);
14979  */    (4ECH) LB-WR-MEM-D'YINC2(WA:WB) LB-DA'Y:BALU DALU:RB        4EC      232C C4ED 3000 000A 04AF 0B2F
14980  */                         IF:SIPTRAP X2(4EDH,0EDH);
14981  */    (0EDH) LB-WR-MEM-D'YINC1 IB:0000(7FH) DALU:IB AU:DALU-TW    0ED      1819 C4EE 007F 2009 04AF C8A5
14982  */                         ST-A1:WB      IF:SELZERO- X2($RTT-LOAD,0EEH);
14983  */    (4EDH) LB-WR-MEM-D'YINC2 DALU:IB WB:DALU-TW                 4ED      0919 C4EE 007F 2009 04AF C8A5
14984  */                         ST-A1:WB      IF:SELZERO- X2($RTT-LOAD,0EEH);
14985  */    (0EEH) RB:E2 A0:RB BALU:WB LB-DA'Y:BALU DALU:RB              0EE      23FC C4EF 3C00 1207 0C6F 032F
14986  */           CKVL GP-MISC0:0X     IF:DALU-(31) X2(4EFH,0EFH);
14987  */    (0EFH) LB-P:Y'PREFETCH GP-MISC1:X1                          0EF      ABC1 C17C 3C00 0000 11AF 0B2F
14988  */           CKVL                IF:SIPTRAP X2(57CH,17CH);
14989  */    (57CH)                                                      57C      0302 117C 3C00 0000 04AF 0B2F
14990  */    (57CH)                               GO-TO($IP-TV);         57D      0300 0561 3C00 0000 04AF 0B2F
14991  */    (17CH) CIP-STALL            IF:SIP-PRESENT X2(57FH,17FH);   17C      430S C17E 3CC0 0000 04AF CB25
14992  */    (57EH)                               GO-TO($IP-TV);         57E      030A C17E 3C00 0000 04AF 0B2F
14993  */                                IF:CIP-PRESENT X2(57FH,$RINGUP);
14994  */    (57FH)                                                      57F      0300 C168 3C00 0000 04AF 0B2F
14995  */                                IF:CIP-PRESENT X2(57FH,$RINGUP);
14996  */                                             GO-TO($CIP-TV);
14997  */    (17FH) DALU:FFFFFF WB:DALU GP-MISC5:X0'(RING)               17F      0500 C4EF 34CC 0000 50AF 0B23
14998  $RINGUP                                        GO-TO(4EFH);
14999  */    (4EFH) LB-P:Y'PREFETCH IB:0C00(02H) DALU:IB WB:DALU         4EF      ABC0 5731 3C02 C000 04AF CB25
15000  */           CKVL ST-00:DALU                  XL($XL:TRAP-PF);
15001  */    (731H) IB:A1 RB:M0 DALU:RB-AND-IB ST-M0:DALU     XAJ;       731      A707 2CC8 CC00 9X09 646F 0B2D
15002  $XL:TRAP-PF
15003  */    (4EEH) LB-PW IB:SB DALU:IB WB:DALU RILOAD:WB                4EE      9500 CC9A 30FF 0000 04AF 4B25
15004  $RTT-LOAD
15005  */                                                 GO-TO(09AH);
```

RTL/6000 FILE EDIT
MICROPROGRAM SECTION

```
LINE #                    SEQUENCE: $$MCS
15006  $     
15007  \\     (09AH) LD-PW IB:SB DALU:IB ST-D3;DALU          GO-TO(09BM);
15008  $     
15009  \\     (09BM) LD-PW                                    GO-TO(09DM);
15010  $     
15011  \\     (09CM) LD-PW IB:SU DALU:IB WB:DALU-SR1 ST-B0:WB
15012  $                 CKHF              IF:LAFMODE X2(4ESM,0ESM);
15013  \\     (0ESM) LD-PW RH:20 WB:RU-SW GP-MISC5:X0'(RING)  GO-TO(576M);
15014  $     
15015  \\     (4ESM) LH-PA RB:00 WB:RU-SW GP-MISC5:X0'(RING)  GO-TO(577M);
15016  $     
15017  \\     (576M) LD-PW'Y:BALU IB:SBZEX BALU:IB            GO-TO(09EM);
15018  $     
15019  \\     (577M) LD-PA'Y:BALU IB:SB    DALU:IB            GO-TO(09FM);
15020  $     
15021  \\     (09EM) LD-PW IB:SBZEX DALU:IB WB:DALU ST-B3:WB
15022  $                 CKHF GP-MISC0:0X                     GO-TO($PLOAD);
15023  \\     (09FM) LD-PA IB:SB DALU:IB WB:DALU ST-B3:WB GP-MISC0:0X
15024  $PLOAD             CKHF                                GO-TO($PLOAD);
15025  \\     (75DM) LD-P:Y'PREFETCH IB:000C(7FM) DALU:IB WB:DALU-TW
15026  $P:P1              CKVL ST-A1:WB                       GO-TO(SXL:TRAP-PF);
15027  \\     (6CMM) WB:P BALU:WB-ADD1 LB-DA'Y:BALU
15028  SKIP HDF:                                              GO-TO($PLOAD);
15029  $QLT   
15030  \\     (402M) IB:0000(05M) DALU:IB ST-01:DALU WB:DALU-SK4
15031  $                 CKHF ST-32:WB GP-XHLOAD              GO-TO(001M);
15032  \\     (001M) DALU:000000 ST-D6;DALU WB:DALU-SW'Q:HEXB ST-B3:WB
15033  $                                                      GO-TO(003M);
15034  \\     (003M) IB:0ZEX DALU:IB ST-01:DALU RH:D1 WB:RU-SR2
15035  $                 ST-B5:WB                              GO-TO(00RM);
15036  \\     (000M) IB:0000(80M) DALU:IB LB-DA'Y:BALU DALU:IB
15037  $QLT2             CKHF WB:DALU-SL1 ST-B1:WB            GO-TO($PLOAD);
15038  \END   (403M) \A\;
                                                              FILE\
                             OF
             THERE ARE NO SEVERE MESSAGES IN THE ABOVE FILE.
             THERE ARE NO WARNING MESSAGES IN THE ABOVE FILE.
```

| ADDRESS (HEX) | IMAGE (HEX) | | | | | |
|---|---|---|---|---|---|---|
| 09A | 950C | CC9B | 3C00 | C300 | 04AF | 4B25 |
| 09B | 9500 | CC90 | 3C00 | 0000 | 04AF | 0B2F |
| 09D | 956C | C4E5 | 3C00 | 2000 | 04AF | 4AE5 |
| 0E5 | 9500 | C576 | 3400 | 0000 | 50AF | 022F |
| 4E5 | 9D00 | C577 | 3400 | 0000 | 50AF | 022F |
| 576 | 8500 | C09E | 3000 | 0000 | 04A5 | 7B2F |
| 577 | 8D00 | C09F | 3C00 | 0000 | 04A5 | 4B2F |
| 09E | 9540 | C75D | 30C0 | 2003 | 0CAF | 7B25 |
| 09F | 9D40 | C75D | 3000 | 2003 | 0CAF | 4B25 |
| 75D | A8CD | C731 | 307F | 2009 | 04AF | C8A5 |
| 6CM | 250C | C75D | 3000 | 0000 | 0480 | 012F |
| 402 | 0340 | CCC1 | 3C05 | E102 | 05AF | CA65 |
| 001 | 0300 | CCC3 | 3CC0 | E603 | 04AF | 0E2C |
| 003 | 0390 | CCCB | 3000 | E105 | 046F | 32A5 |
| 00B | 2340 | C75D | 3080 | 2001 | 04A5 | CB65 |
| 403 | 0300 | CC00 | 3000 | 0000 | 04AF | 0B2F |

What is claimed is:

1. In a data processing system having a memory comprised of a plurality of addressable storage locations and a processing unit for executing procedures, each of the procedures including a series of operands, a stack control mechanism comprising:

stack forming means for establishing in said memory a stack of said addressable storage locations for storing said operands;

frame forming means for dynamically altering the number of storage locations in said stack by (1) acquiring a stack frame associated with each procedure to be executed by said processing unit, each of said stack frames comprising one or more storage locations for storing operands and data relating to said associated procedures, (2) modifying the number of storage locations in said acquired stack frame responsive to execution of said associated procedure; and (3) relinquishing each of said storage location in a stack frame after the execution of said associated procedure to make said relinquished storage location available to said processing unit, the most recently acquired stack frame comprising the top stack frame;

a bottom of frame register associated with each of said acquired stack frame for storing the number of storage locations included in said associated stack frames;

stack frame control means for dynamically modifying the size of said top stack frame by adding storage locations thereto or deleting storage locations therefrom in response to said processing unit executing said procedure associated with said top stack frame;

a stack top register for storing the address of the storage location in said top stack frame storing the operand most recently stored in said top stack frame;

a stack base register for storing the address of said storage location immediately preceding a storage location storing the first operand stored in said top stack frame;

means for updating the contents of said stack top register and said stack bottom register whenever a said operand is added to or deleted from said top stack frame; and operand accessing means for selectively accessing an operand stored in said top stack frame by indexing relative to the address stored in said stack top register or to the address stored in said stack base register.

2. A stack control mechanism according to claim 1 wherein said operand accessing means comprises an offset register for storing a positive or negative index value representing the relative address offset of an address storing a selected operand from said address stored in said stack top register and said stack bottom register, respectively, and means for adding a said positive index value to said address stored in said stack top register and a said negative index value to said address stored in said stack bottom register.

3. In a data processing system having a memory comprised of a plurality of addressable storage locations and a processing unit for executing procedures, each of the procedures including a series of operands, a method for creating a dynamically alterable operand stack in said memory comprising the steps of:

establishing in said memory a stack for storing said operands, said stack including a storage location storing an indication of the maximum number of storage locations allocatable to said stack, a storage location storing an indication of the number of storage locations currently allocated in said stack, and one or more storage locations for storing said operands;

acquiring different stack frames in said stack, each acquired stack frame being associated with a different one of said procedures to be executed by said processing unit and comprising one or more storage locations storing the operands and data relating to said associated procedure, the most recently established stack frame comprising the top stack frame;

dynamically modifying the size of said top stack frame in response to said processing unit executing a said procedure by allocating additional storage locations to said top stack frame to store additional operands and data or by deleting storage locations from said top stack frame as operands and data are removed from said top stack frame;

relinquishing the storage locations in a stack frame following the execution of said procedure associated with said stack frame, said relinquished storage locations being available for use by said processing unit;

storing in a stack top register the address of the storage location in said top stack frame storing the operand most recently stored in said top stack frame;

storing in a stack base register the address of said storage location immediately preceding the storage location storing the first operand stored in said top stack frame;

updating the contents of said stack top register and said stack bottom register whenever a said operand is added to or deleted from said top stack frame, respectively; and selectively accessing operands in said top stack frame by addressably indexing with respect to the address stored in said stack top register or the address stored in said stack base register.

4. A method according to claim 3 wherein said operand accessing step comprises the steps of:

generating an index offset having a positive value or a negative value; and generating the address of a selected operand in said top stack frame by adding said index offset to said address stored in said stack top register or said stack bottom register if said value of said index offset is positive or negative, respectively.

5. A stack control mechanism as in claim 1 wherein said stack forming means comprises means for indicating the maximum number of addressable storage locations allocatable to said established stack and means for indicating the total number of storage locations actually allocated to said stack.

6. A stack control mechanism as in claim 5 wherein said stack forming means further includes means associated with each said established stack frame for storing an indication of the number of said storage locations included within said associated stack frame.

7. A stack control mechanism according to claim 6 wherein said means for indicating the number of storage locations currently allocated to said stack comprises a storage location in said stack for storing a value corresponding to the number of said allocated storage locations.

8. A stack control mechanism according to claim 7 further including a stack pointer register for storing the address of said storage location of said means indicating the total number of storage locations allocated in said stack.

* * * * *